US011789565B2

(12) United States Patent
Parikh et al.

(10) Patent No.: US 11,789,565 B2
(45) Date of Patent: Oct. 17, 2023

(54) LID CONTROLLER HUB ARCHITECTURE FOR IMPROVED TOUCH EXPERIENCES

(71) Applicant: Intel Corporation, Santa Clara, CA (US)

(72) Inventors: Kunjal S. Parikh, Fremont, CA (US); Antonio S. Cheng, Portland, OR (US); Paul S. Diefenbaugh, Portland, OR (US); Jackson Tsai, New Taipei (TW); Edward James Raleigh, San Jose, CA (US); Vishal Ravindra Sinha, Portland, OR (US); Chung-yu Liang, Zhubei (TW); Aleksander Magi, Portland, OR (US); Yifan Li, Beaverton, OR (US); Matt King, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/134,396

(22) Filed: Dec. 26, 2020

(65) Prior Publication Data

US 2021/0132769 A1 May 6, 2021

Related U.S. Application Data

(60) Provisional application No. 63/067,071, filed on Aug. 18, 2020.

(51) Int. Cl.
*G06F 3/041* (2006.01)
*G06F 1/16* (2006.01)

(52) U.S. Cl.
CPC ........ *G06F 3/04184* (2019.05); *G06F 1/1637* (2013.01)

(58) Field of Classification Search
CPC .... G06F 1/1616; G06F 1/1684; G06F 1/3287; G06F 1/1637; G06F 1/1647; G06F 3/0304; G06F 3/04184
See application file for complete search history.

(56) References Cited

U.S. PATENT DOCUMENTS 8,386,800 B2  2/2013  Kocher et al.
8,681,098 B2  3/2014  Underkoffler et al.
(Continued)

FOREIGN PATENT DOCUMENTS

CN  102365616 B  5/2015
CN  110502153 A  11/2019
(Continued)

OTHER PUBLICATIONS

"HP Sure View," Technical White Paper, HP Development Company, LP; Nov. 2016 (5 pgs.).
(Continued)

*Primary Examiner* — Abbas I Abdulselam
(74) *Attorney, Agent, or Firm* — Alliance IP, LLC

(57) ABSTRACT

A lid controller hub (LCH) comprising processing components located in the lid of a mobile computing device, such as a laptop, processes sensor data generated by input sensors (microphones, cameras, touchscreen) and provides for improved and enhanced experiences over existing devices. For example, the LCH provides hardened privacy and the synchronization of touch display activities with the display refresh rate, the latter providing for a smoother and more responsive touch experience over existing designs. The LCH enables continuous gestures comprising touch gesture and in-air gesture portions as well as multi-plane gestures in which an initial touch gesture places the device into a mode or context in which it recognizes and acts upon subsequent in-air gestures. Touch operations of a mobile computing device can be based on user presence, user engagement, and a level of user interaction with the device.

23 Claims, 55 Drawing Sheets

(56) References Cited

U.S. PATENT DOCUMENTS

| | | | |
|---|---|---|---|
| 8,806,235 | B2 | 8/2014 | Deakin et al. |
| 9,093,050 | B1 | 7/2015 | Orlov et al. |
| 9,323,379 | B2 | 4/2016 | Aubauer et al. |
| 9,354,744 | B2 | 5/2016 | Johansson et al. |
| 9,465,276 | B2 | 10/2016 | Jonsson et al. |
| 9,699,217 | B2 | 7/2017 | Plagemann et al. |
| 9,710,046 | B2 | 7/2017 | Woo et al. |
| 9,727,134 | B2 | 8/2017 | Aurongzeb et al. |
| 10,488,883 | B2 | 11/2019 | Rothkopf |
| 10,687,184 | B2 | 6/2020 | Silverstein et al. |
| 10,817,018 | B1* | 10/2020 | Shao ............... G06F 1/1637 |
| 2010/0079508 | A1 | 4/2010 | Hodge et al. |
| 2010/0146504 | A1* | 6/2010 | Tang ............ G06F 9/45537 718/1 |
| 2011/0047494 | A1 | 2/2011 | Chaine et al. |
| 2013/0232353 | A1 | 9/2013 | Belesiu et al. |
| 2015/0215535 | A1 | 7/2015 | Takahashi |
| 2015/0242038 | A1* | 8/2015 | Steiner ........... G06F 3/041661 345/173 |
| 2017/0083272 | A1* | 3/2017 | Sun ............... G06F 3/0487 |
| 2017/0160839 | A1 | 6/2017 | Jordan |
| 2017/0344174 | A1* | 11/2017 | Pant ............... G06F 3/0442 |
| 2018/0059780 | A1 | 3/2018 | Mitchell et al. |
| 2018/0118123 | A1* | 5/2018 | Doi ................ B60N 2/75 |
| 2019/0073747 | A1 | 3/2019 | Burch et al. |
| 2020/0133374 | A1 | 4/2020 | Sinha et al. |

FOREIGN PATENT DOCUMENTS

| | | |
|---|---|---|
| JP | 2001350549 A | 12/2001 |
| KR | 101760092 B1 | 7/2017 |
| WO | 2014107197 A1 | 7/2014 |

OTHER PUBLICATIONS

"Password-less protection," Microsoft, copyright 2018, retrieved on Dec. 6, 2020 from https://query.prod.cms.rt.microsoft.com/cms/api/am/binary/RE2KEup (24 pgs.).

3M Privacy & Screen Protectors; 3M Products: as accessed Jan. 27, 2021 at "https://www.3m.com/3M/en_US/company-us/all-3m-products/~/All-3MProducts/Privacy-Screen-Protectors/?N=5002385+8710873+8711017+3294857497&rt=r3" (8 pgs.).

Dai et al., "Perception Optimized Signal Scaling for OLED Power Saving," SID Digest vol. 45, Issue 1 (Book 2, Session 50 pp. 732-735); Jul. 14, 2017, San Diego, CA. (4 pgs.).

Davenport, Corbin; "The Linux-based PinePhone is the most interesting smartphone I've tried in years," Android Police, Aug. 13, 2020. (10 pgs.).

Dostal, et al. "Subtle Gaze-Dependent Techniques for Visualising Display Changes in Multi-Display Environments," IUI'13, Mar. 19-22, 2013, Santa Monica, CA. (11 pgs.).

Google Nest Help, "FAQs on camera states and controls: Google Nest Hub Max," 2019; retrieved Jan. 27, 2020 at https://support.google.com/googlenest/answer/9449280?hl=en (2 pgs.).

Jordan, Jeremy; "An overview of semantic image segmentation," retrieved Nov. 20, 2020 from https://www.jeremyjordan.me/semantic-segmentation/ (29 pgs.).

Lyons, Kim; "Google to add background blur, captioning, and low-light mode to Meet video calls," The Verge, Jun. 27, 2020, retrieved Jan. 27, 2020 from https://www.theverge.com/2020/6/27/21305434/google-meet-background-blur-captioning-video-microsoft-teams-zoom (2 pgs.).

Microsoft Support, "Change your background for a Teams meeting," retrieved on Dec. 6, 2020 from https://support.microsoft.com/en-us/office/change-your-background-for-a-teams-meeting-f77a2381-443a-499d-825e-509a140f4780 (3 pgs.).

Perumal et al., "Disabling Camera Features in a Mobile Phone in Restricted Zones," Indian Journal of Science and Technology, vol. 9(33), DOI: 10.17485/ijst/2016/v9i33/99608, Aug. 2016 (6 pgs.).

PureSight Online Child Safety, "Web Filtering;" PureSight Technologies, Ltd., as accessed Dec. 7, 2020 at https://www.puresight.com/Features/web-filtering.html (4 pgs.).

Qualcomm Mobile Security, 2017; retrieved Jan. 27, 2020 at https://www.qualcomm.com/products/features/mobile-security (5 pgs.).

Redmond, Tony, "How to use Background Blur in Microsoft Teams," Sep. 25, 2018, retrieved from https://office365itpros.com/2018/09/25/background-blur-teams-meetings/ (12 pgs.).

Song et al., "In-air gestures around unmodified mobile devices;" UIST '14: Proceedings of the 27th annual ACM symposium on User interface software and technology; Oct. 2014, pp. 319-329 (11 pgs.).

Spycam Lizard, "Can a webcam's light be turned off?" Lizard Ware, as accessed Dec. 7, 2020 at www.spycamlizard.com/index.php?Page=Can-the-webcam-light-be-turned-off (2 pgs.).

ThinkShutter, from ThinkWiki; Jan. 4, 2020, as accessed Dec. 7, 2020 at https://www.thinkwiki.org/wiki/ThinkShutter (1 pgs.).

Wikipedia, "Intel Display Power Saving Technology," Apr. 6, 2020, retrieved on Dec. 6, 2020 from https://en.wikipedia.org/wiki/Intel_Display_Power_Saving_Technology (1 pg.).

EPO; Extended European Search Report issued in EP Patent Application No. 21185902.0, dated Jan. 18, 2022; 12 pages.

EPO; Office Action issued in EP Patent Application No. 21185902.0, dated Jul. 7, 2023; 8 pages.

* cited by examiner

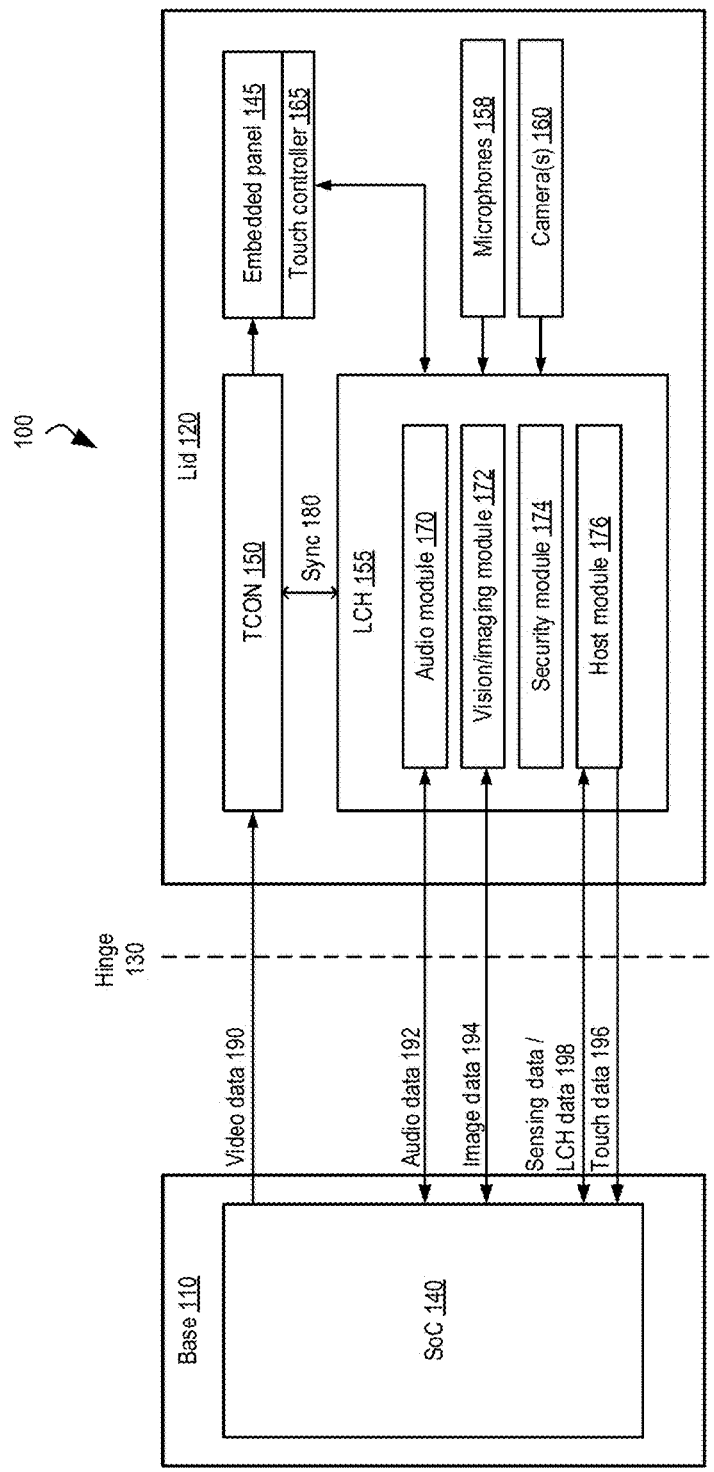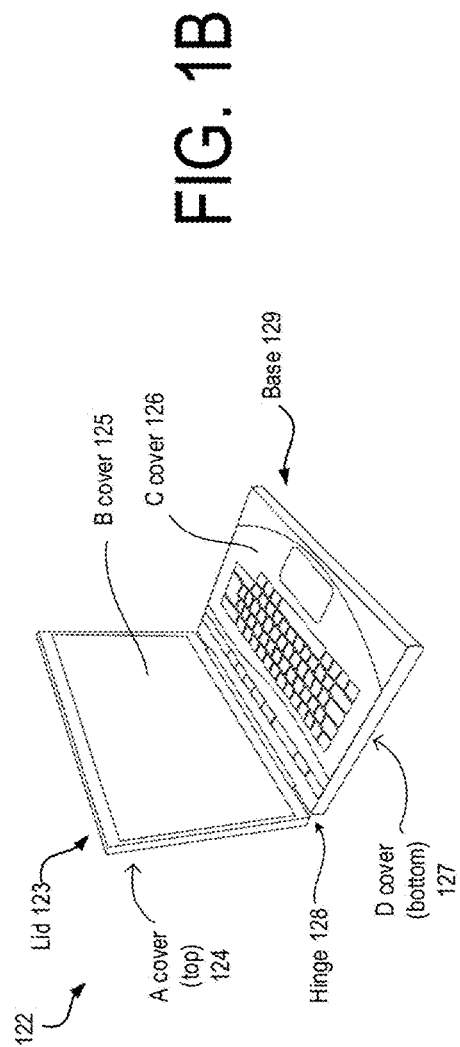

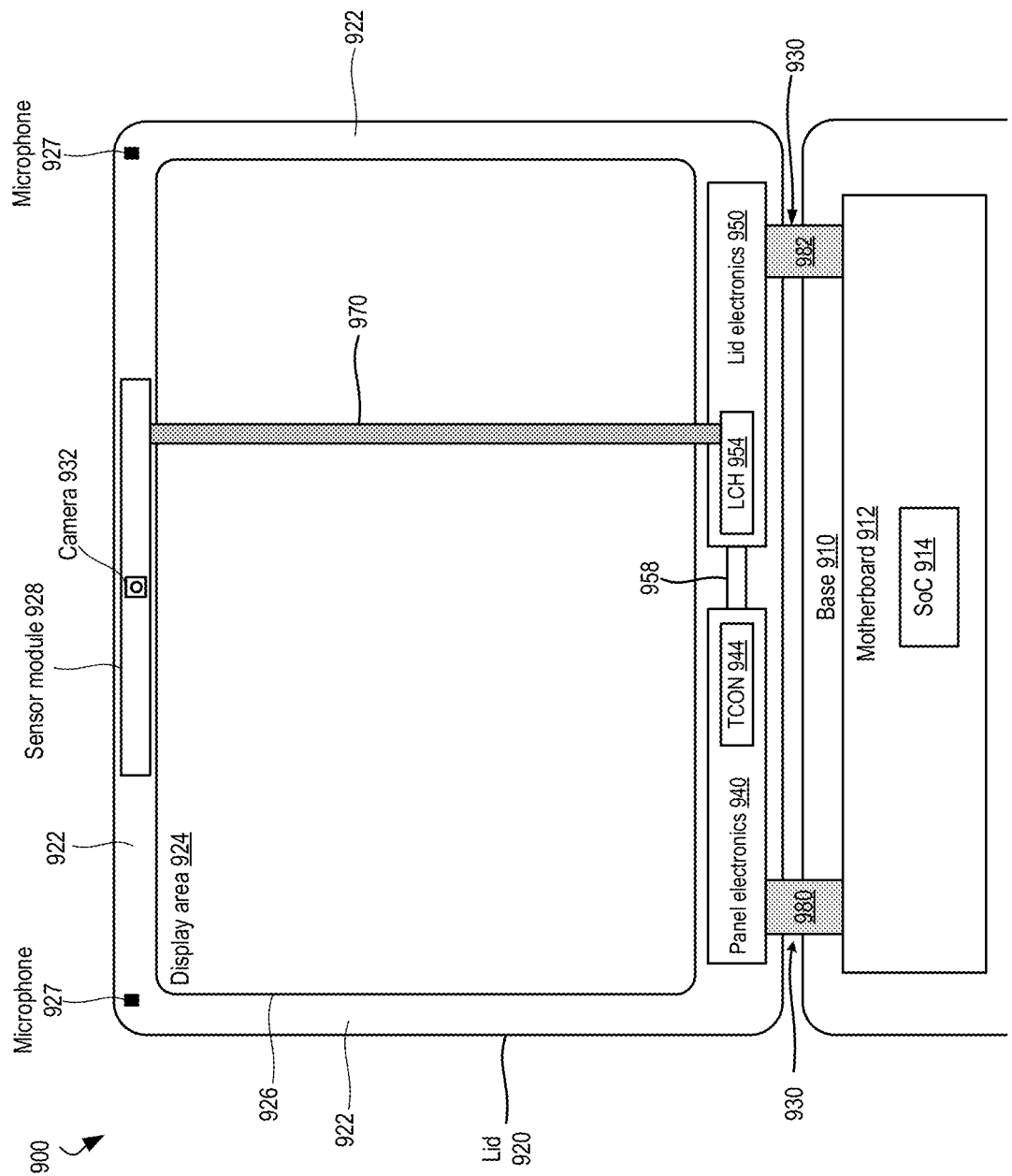

1100

| Signals | Data | Power | Total | Comments |
|---|---|---|---|---|
| Display | 19 | 16 | 35 | eDP x4 HBR2, 6 OEM signals |
| Image | 6 | 8 | 14 | 1 MP camera |
| Touch | 4 | 2 | 6 | I2C |
| Audio & Sensing | 8 | 2 | 10 | DMIC, I2C, INT |
| LCH | 7 | 0 | 7 | USB, QSPI |
| Total wires | 44 | 28 | 72 | |

| Wires | Data | Power | Total | Comments |
|---|---|---|---|---|
| Display | 14 | 4 | 18 | eDP x2 HBR2, 6 OEM signals, lid power |
| Image | 6 | 0 | 6 | 1 MP camera |
| Touch | 4 | 0 | 4 | I2C |
| Audio & Sensing | 8 | 0 | 8 | DMIC, I2C, INT |
| LCH | 3 | 0 | 3 | USB, QSPI |
| Total wires | 35 | 4 | 39 | |

| Wires | Data | Power | Total | Comments |
|---|---|---|---|---|
| Display | 8 | 4 | 12 | eDP x2 HBR2, lid power |
| Image | 8 | 0 | 8 | Dual cameras - RGB 2MP, IR |
| Touch | 0 | 0 | 0 | Touch over USB |
| Audio & Sensing | 4 | 0 | 4 | Soundwire |
| LCH | 5 | 0 | 5 | USB |
| Total wires | 25 | 4 | 29 | |

FIG. 11C

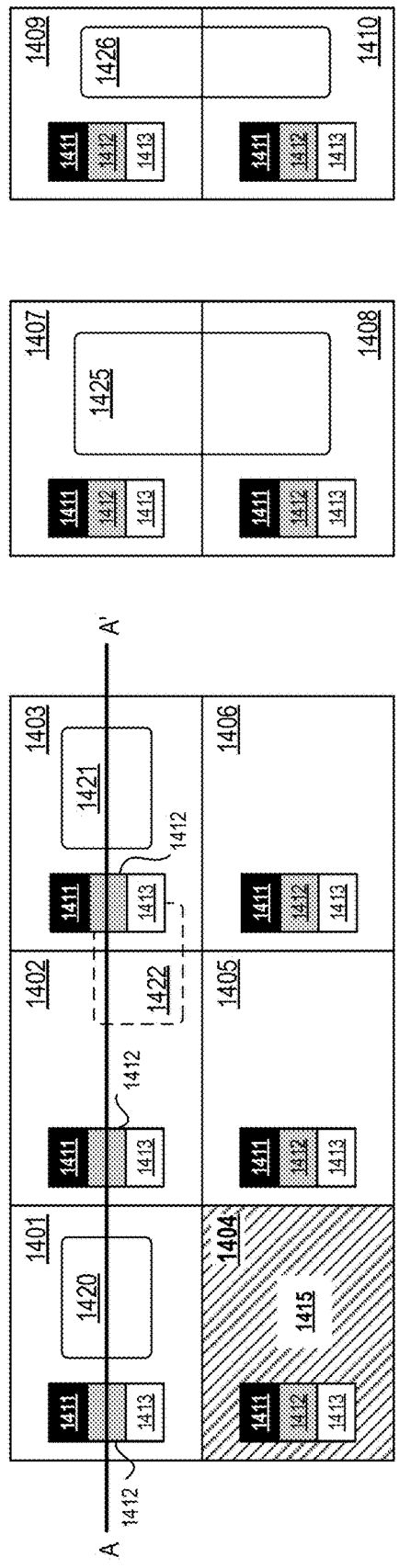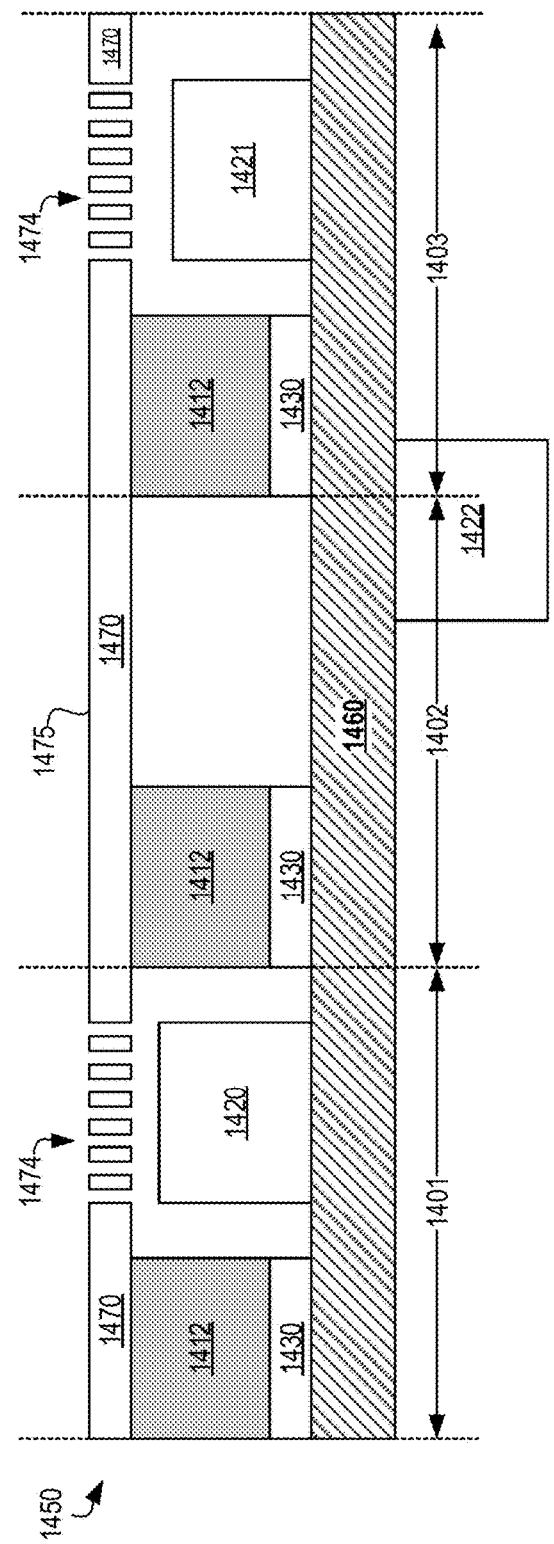

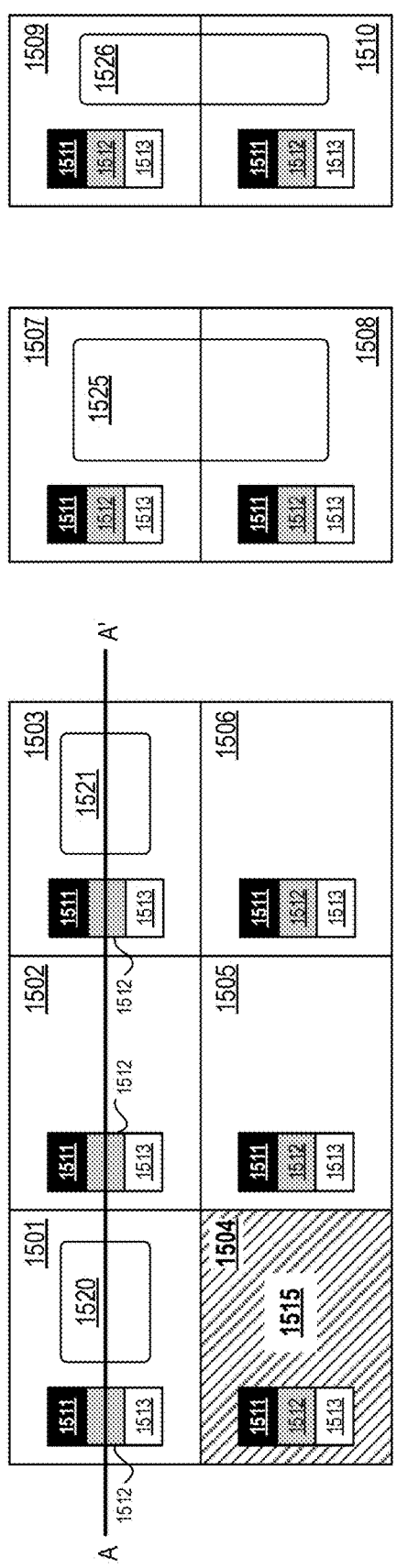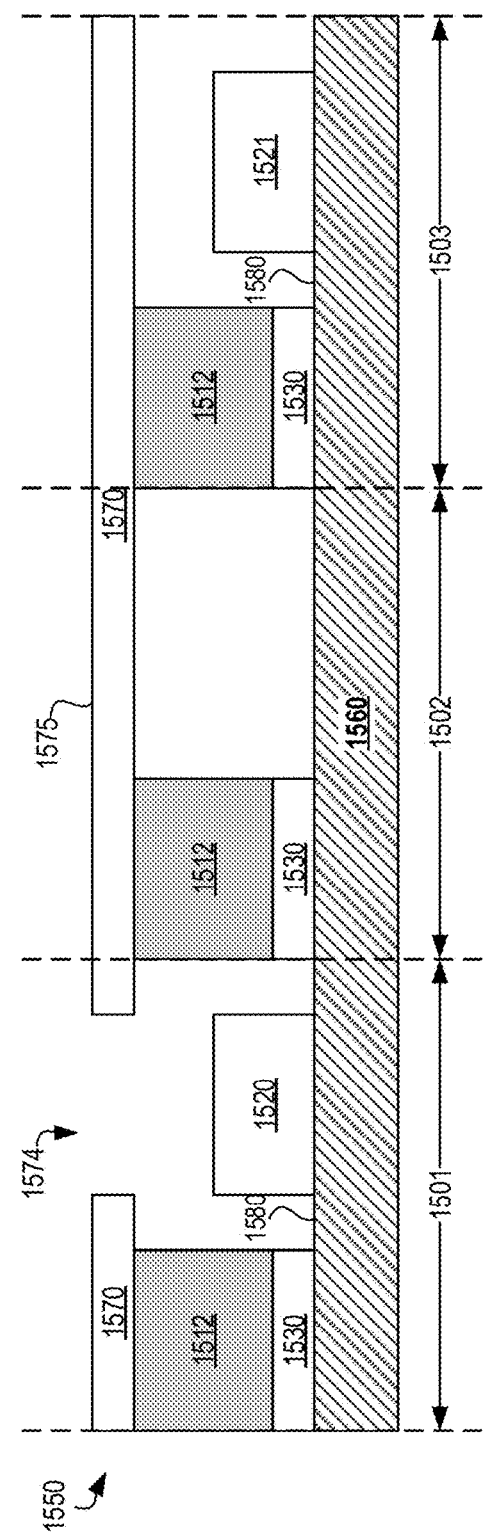
FIG. 15A FIG. 15B FIG. 15C FIG. 15D

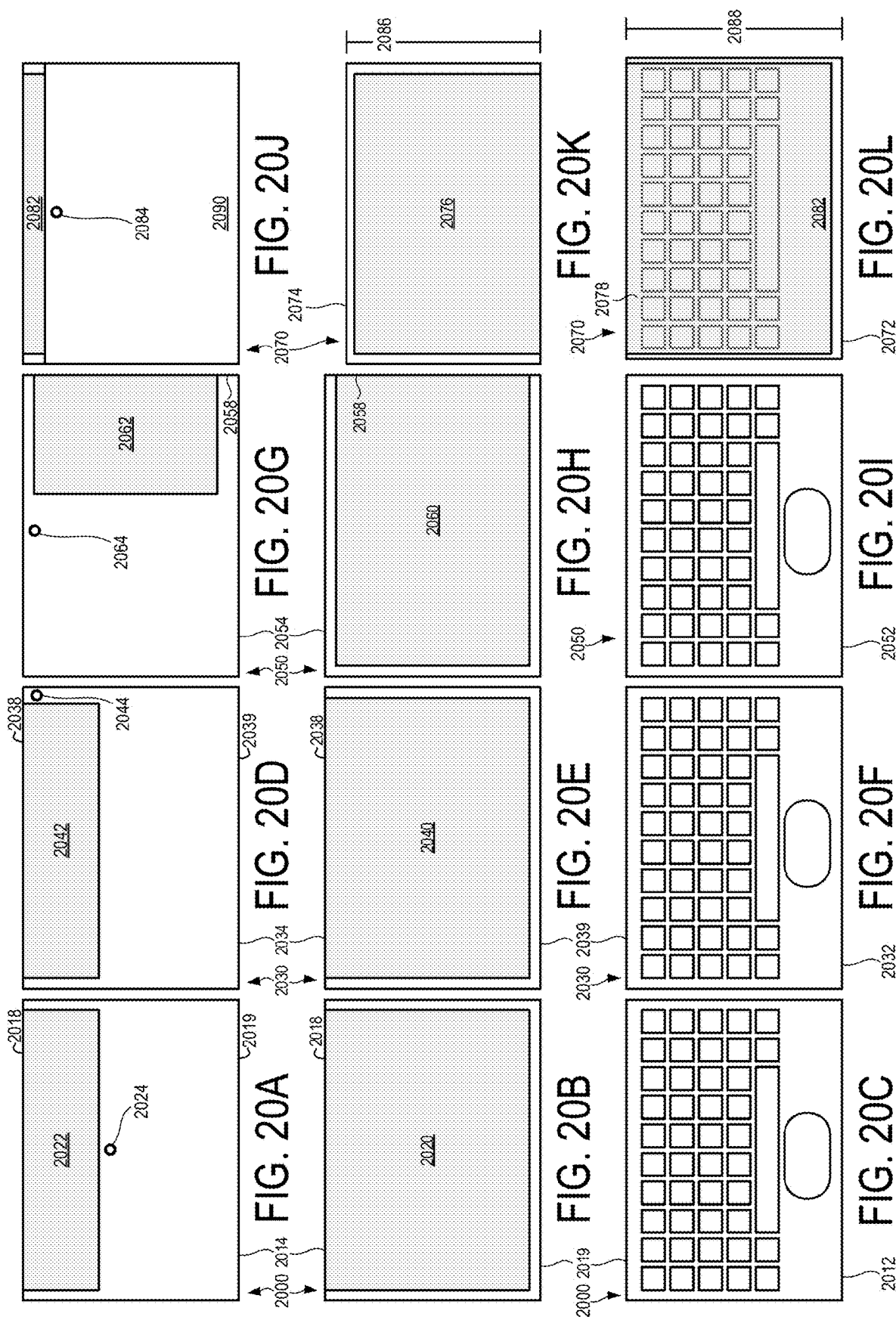

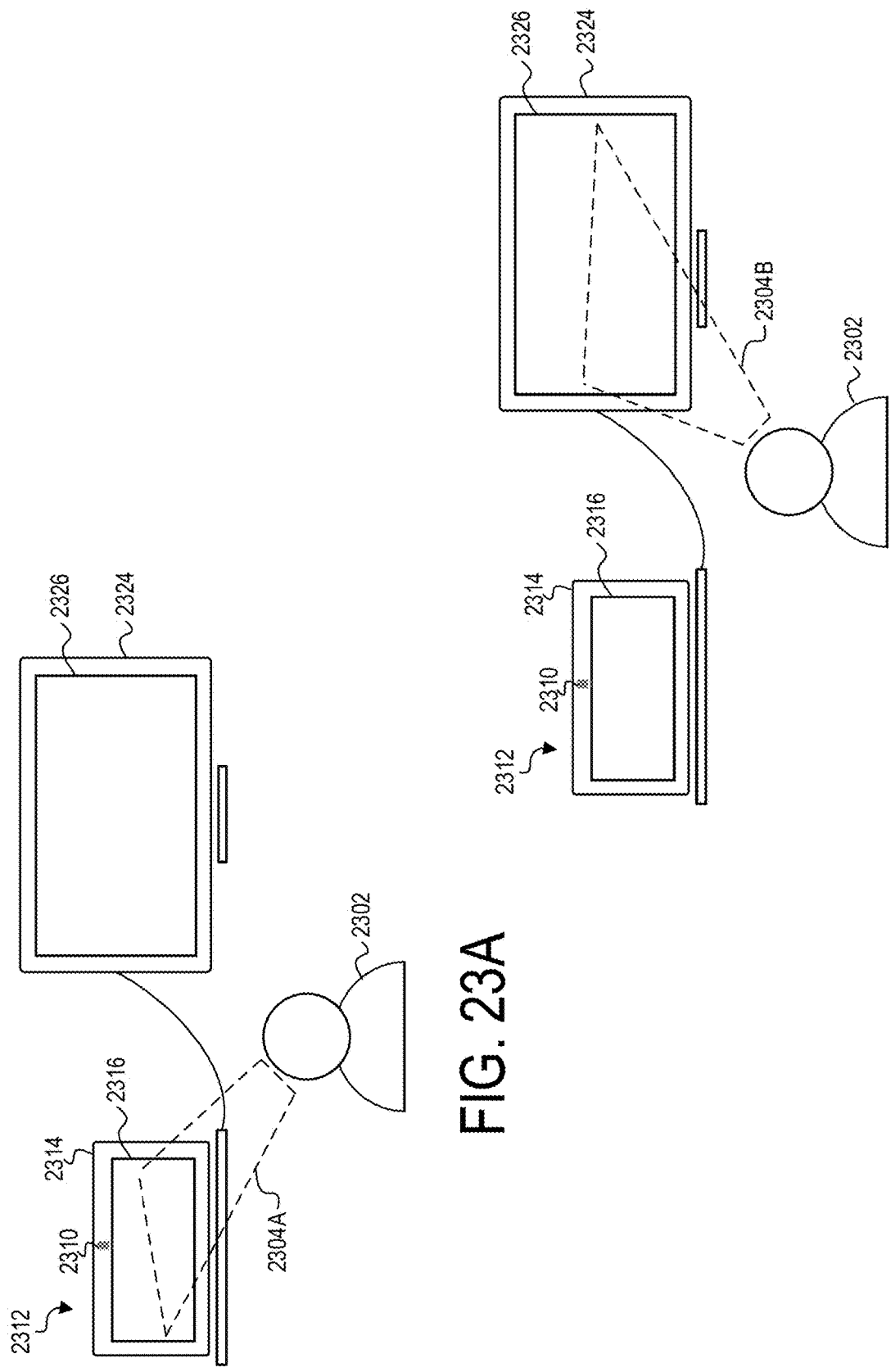

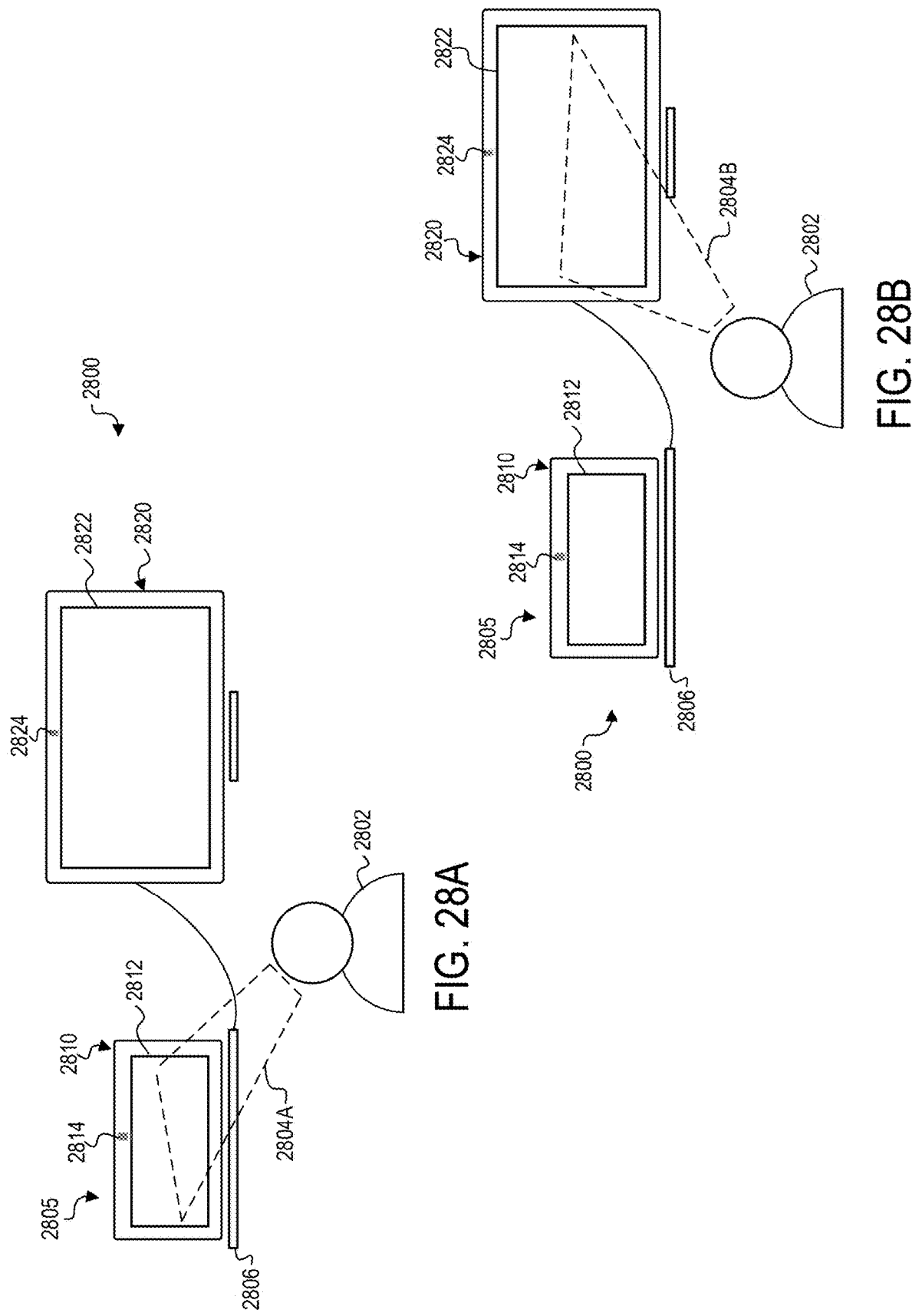

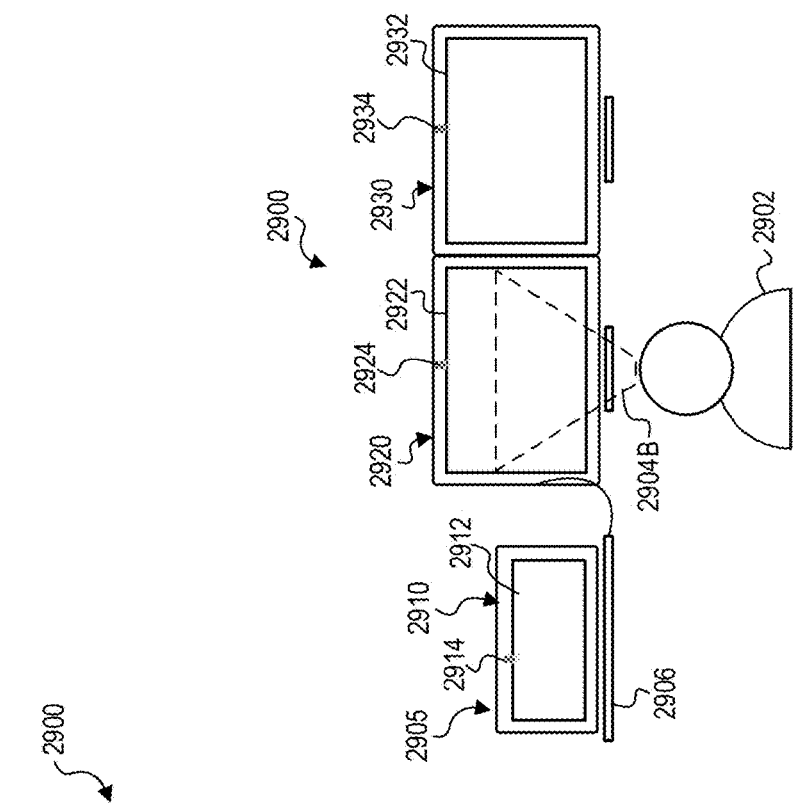
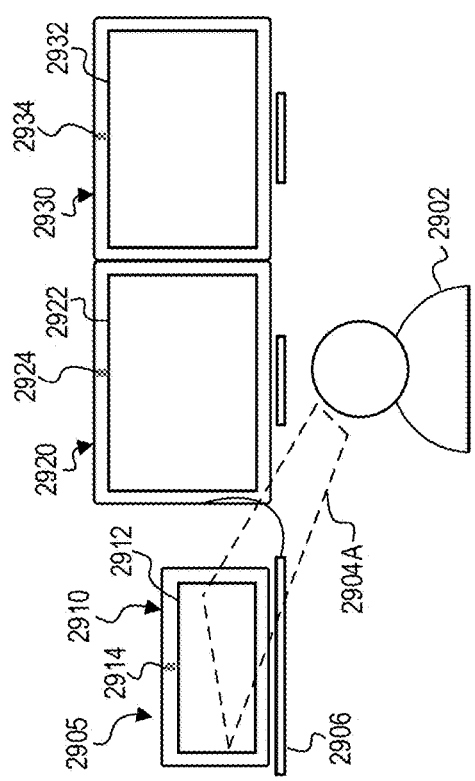
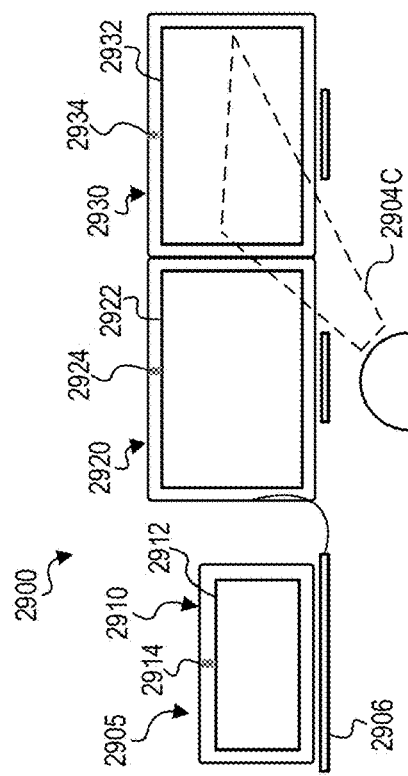
FIG. 29A
FIG. 29B
FIG. 29C

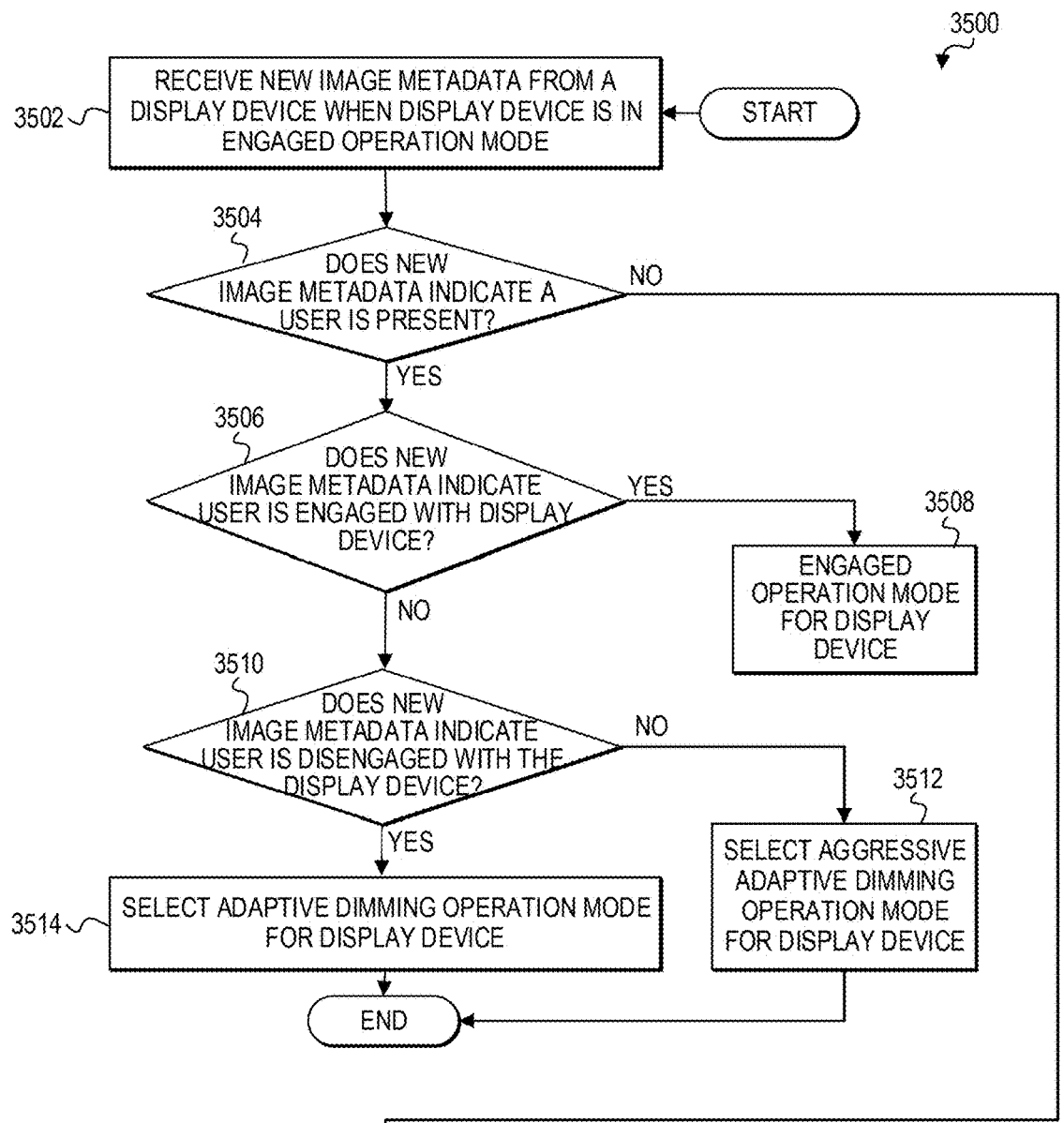
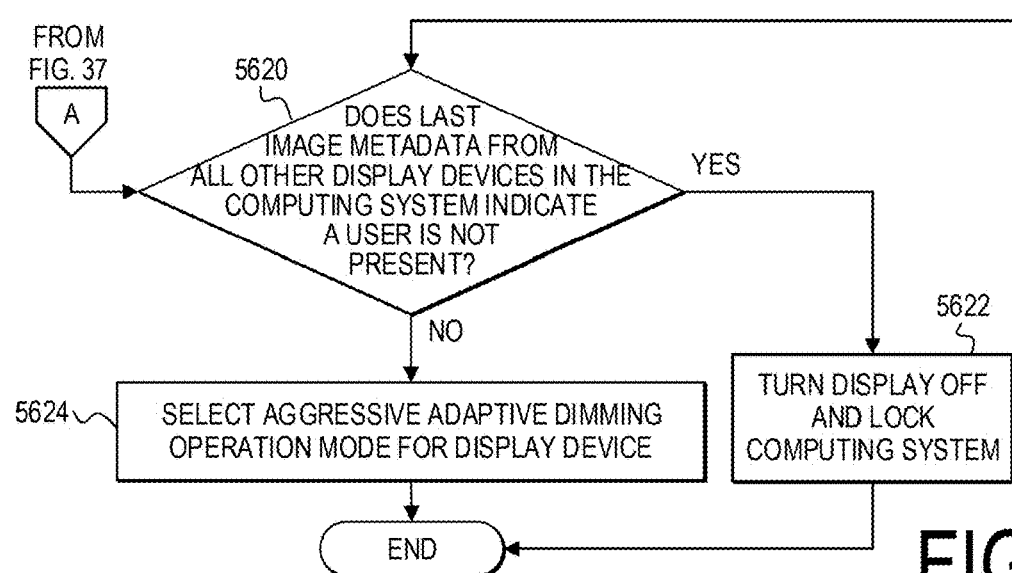
FIG. 35

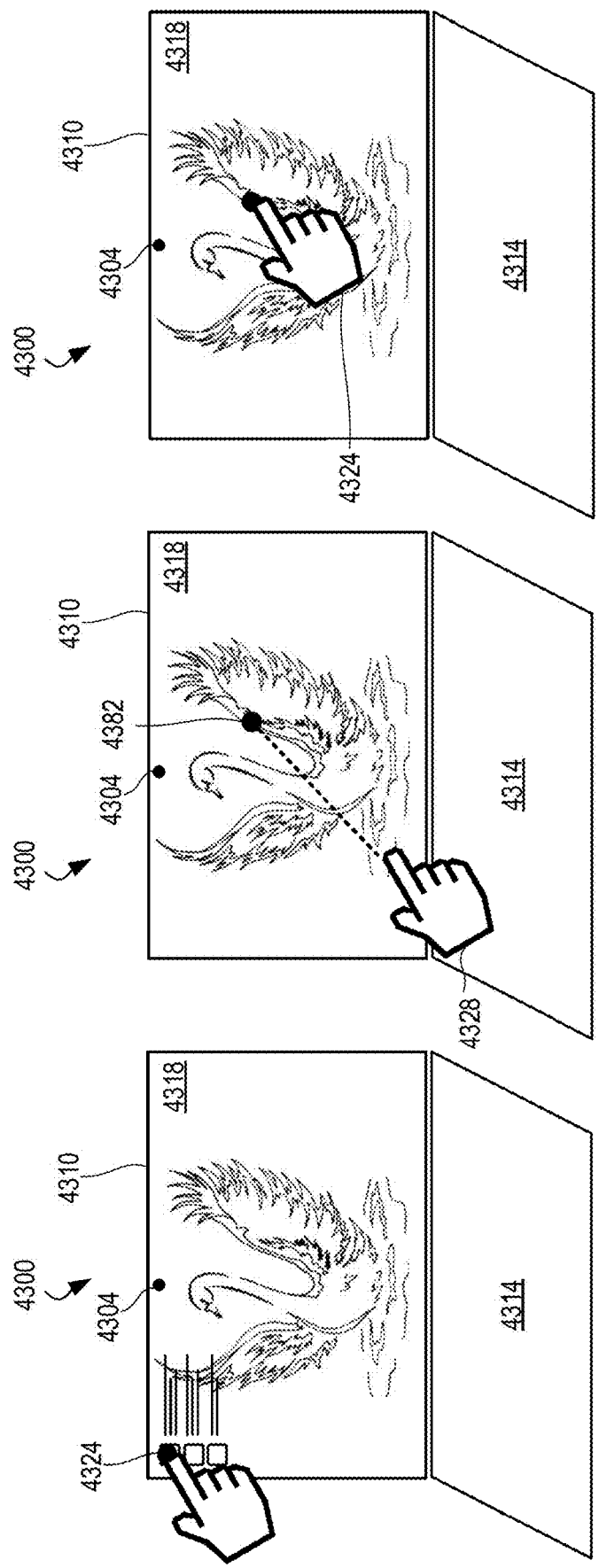

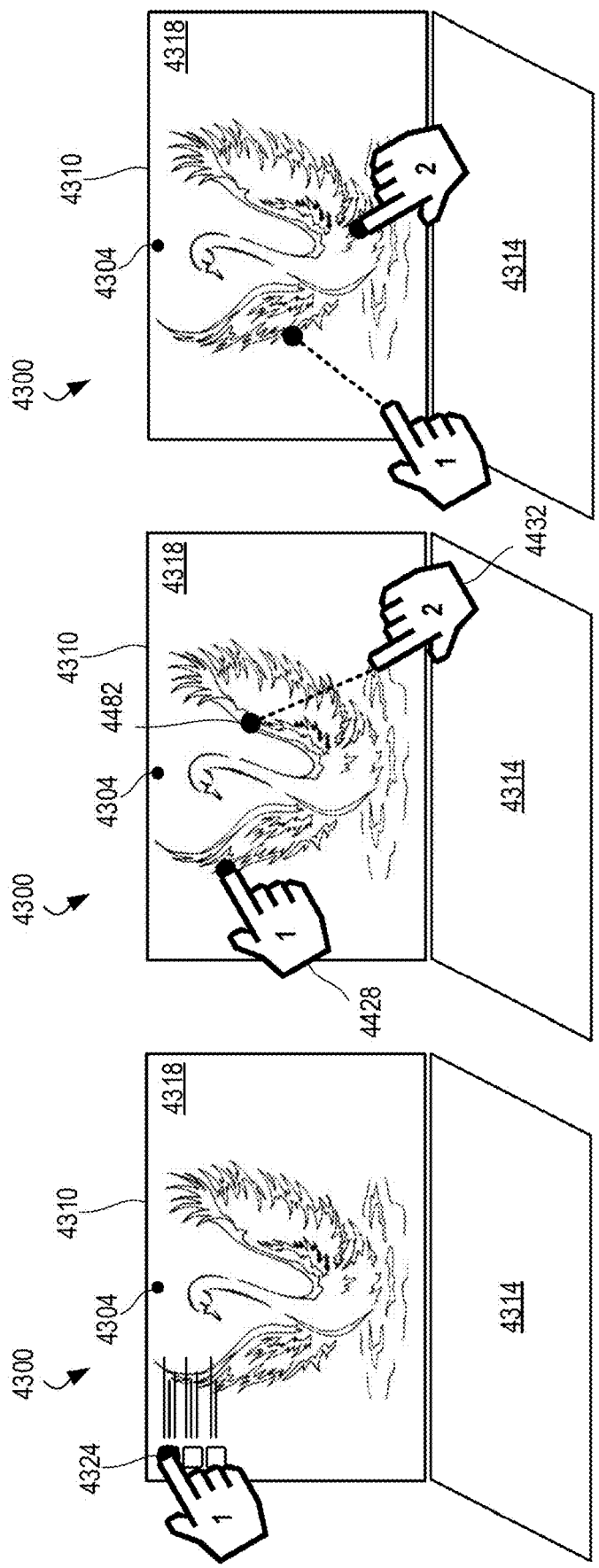

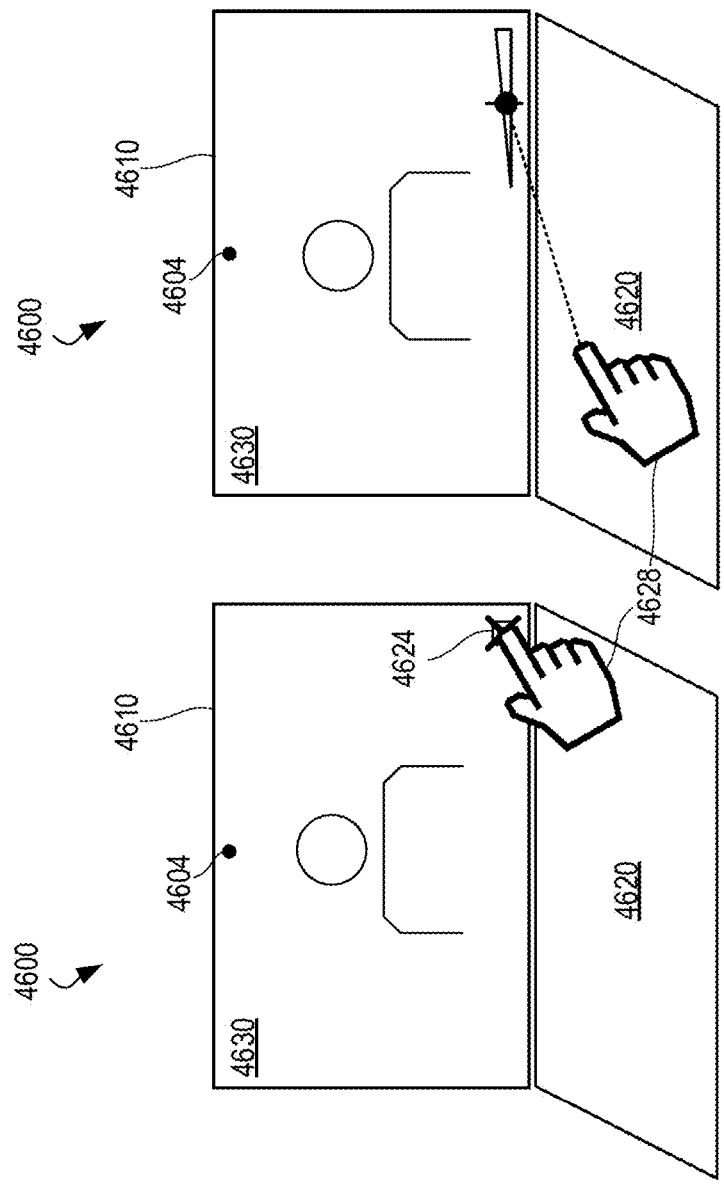

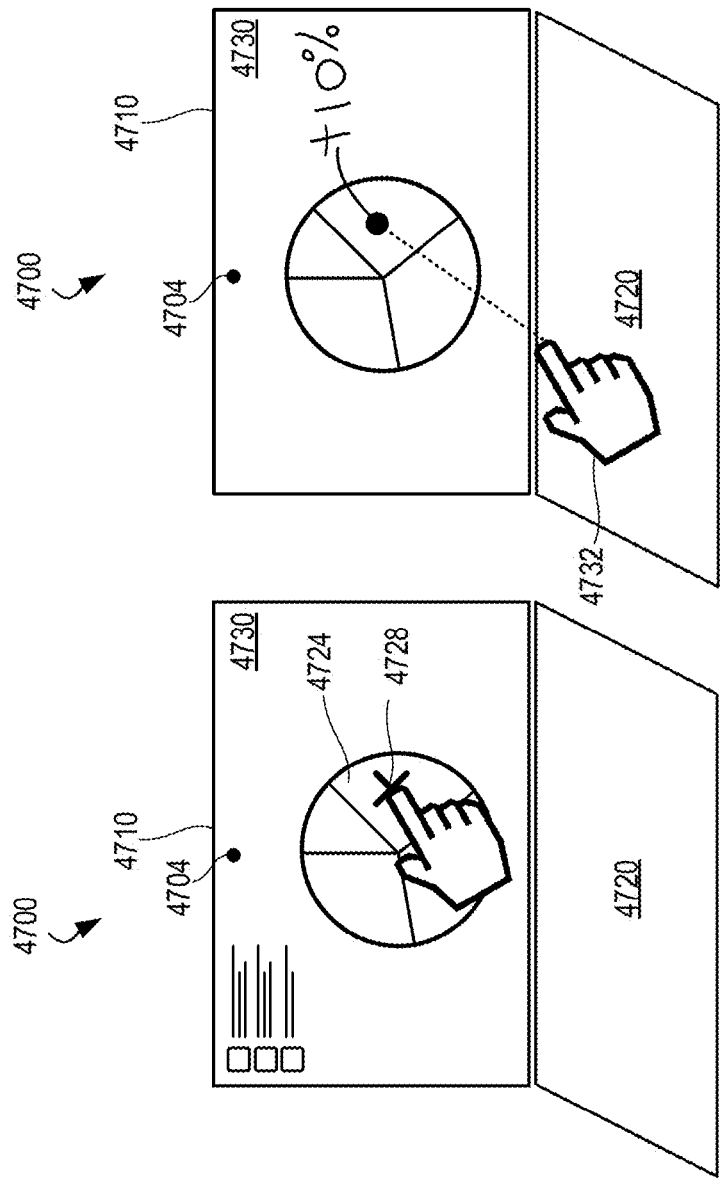

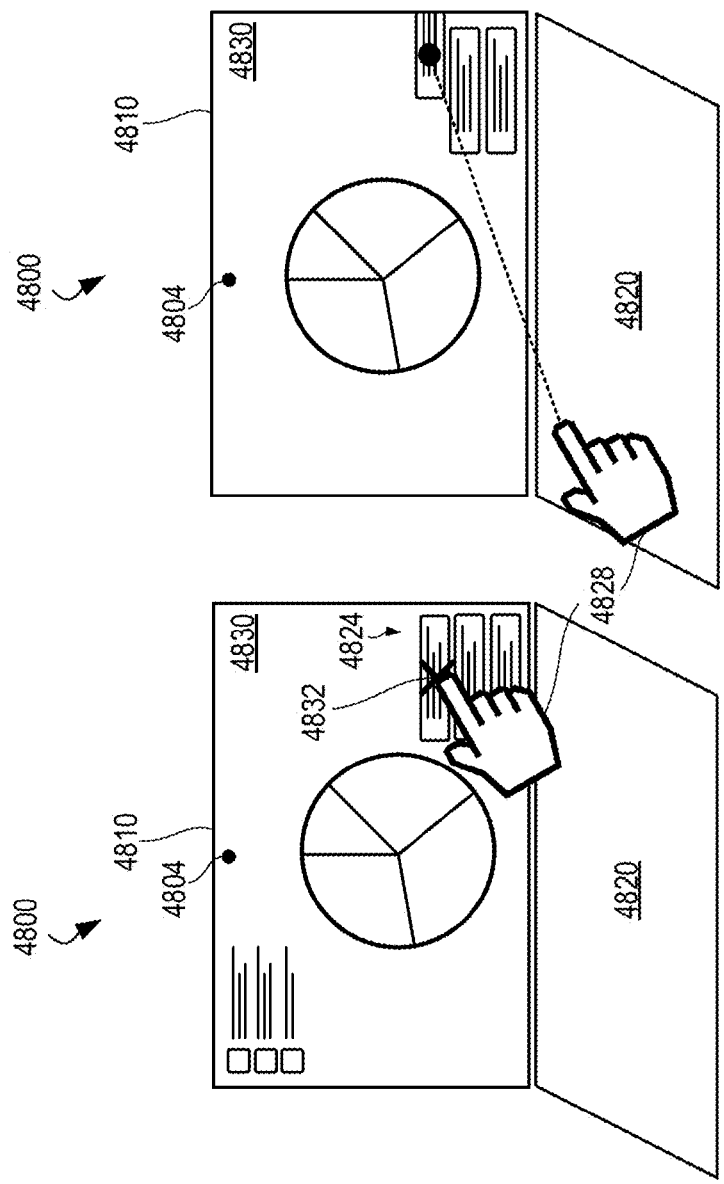

LID CONTROLLER HUB ARCHITECTURE FOR IMPROVED TOUCH EXPERIENCES

CROSS-REFERENCES TO RELATED APPLICATIONS

This Application claims the benefit of priority to U.S. Provisional Patent Application Ser. No. 63/067,071 filed on Aug. 18, 2020 and titled, "Lid Controller Hub Architecture for Improved Touch Experiences". The disclosure of the prior application is considered part of and are hereby incorporated by reference in its entirety in the disclosure of this application.

BACKGROUND

Existing laptops comprise various input sensors in the lid, such as microphones, cameras, and a touchscreen. The sensor data generated by these lid sensors are delivered by wires that travel across a hinge to the base of the laptop where they are processed by the laptop's computing resources and made accessible to the operating system and applications.

BRIEF DESCRIPTION OF THE DRAWINGS

FIG. 1A illustrates a block diagram of a first example computing device comprising a lid controller hub.

FIG. 1B illustrates a perspective view of a second example mobile computing device comprising a lid controller hub.

FIG. 9 illustrates a block diagram illustrating an example physical arrangement of components in a mobile computing device comprising a lid controller hub.

FIGS. 11A-11C show tables breaking down the hinge wire count for various lid controller hub embodiments.

FIG. 14A illustrates a set of example pixels with integrated microphones.

FIG. 14B illustrates a cross-section of the example pixels of FIG. 14A taken along the line A-A'.

FIGS. 14C-14D illustrate example microphones that span multiple pixels.

FIG. 15A illustrates a set of example pixels with in-display cameras.

FIG. 15B illustrates a cross-section of the example pixels of FIG. 15A taken along the line A-A'.

FIGS. 15C-15D illustrate example cameras that span multiple pixels.

FIGS. 20A-20L illustrate various views of mobile computing devices comprising a foldable display having a display portion that can be operated as an always-on display.

FIGS. 23A-23B are diagrammatic representations of user attentiveness to different display devices of a typical dual display computing system.

FIGS. 28A-28B are diagrammatic representations of user attentiveness to different display devices in a dual display computing system configured to perform user presence-based display management for multiple displays according to at least one embodiment.

FIGS. 29A-29C are diagrammatic representations of user attentiveness to different display devices in a multiple display computing system configured to perform user presence-based display management for multiple displays according to at least one embodiment.

FIG. 35 show a simplified flowchart of an example process that may be associated with adaptively dimming a display panel according to at least one embodiment.

FIGS. 43A-43C illustrate a first example of related multi-plane gestures and a reference touch gesture.

FIGS. 44A-44C illustrate a second example of related multi-plane multi-user gestures.

FIGS. 46A-46B illustrate a fourth example of related multi-plane gestures.

FIGS. 47A-47B illustrate a fifth example of related multi-plane gestures.

FIGS. 48A-48B illustrate a sixth example of related multi-plane gestures.

DETAILED DESCRIPTION

Figure 2:
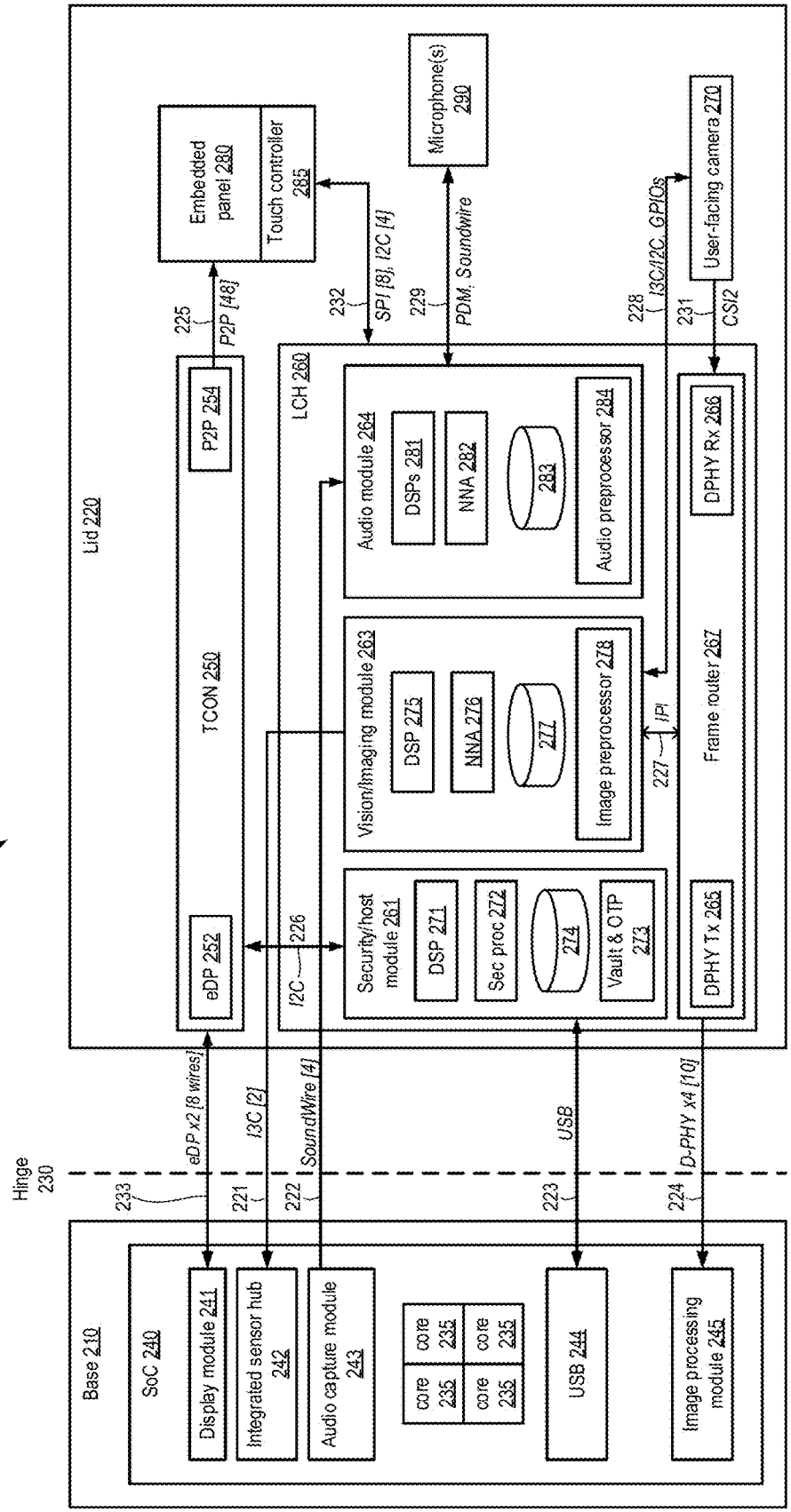
FIG. 2 illustrates a block diagram of a third example mobile computing device comprising a lid controller hub.

Lid controller hubs are disclosed herein that perform a variety of computing tasks in the lid of a laptop or computing devices with a similar form factor. A lid controller hub can process sensor data generated by microphones, a touchscreen, cameras, and other sensors located in a lid. A lid controller hub allows for laptops with improved and expanded user experiences, increased privacy and security, lower power consumption, and improved industrial design over existing devices. For example, a lid controller hub allows the sampling and processing of touch sensor data to be synchronized with a display's refresh rate, which can result in a smooth and responsive touch experience. The continual monitoring and processing of image and audio sensor data captured by cameras and microphones in the lid allow a laptop to wake when an authorized user's voice or face is detected. The lid controller hub provides enhanced security by operating in a trusted execution environment. Only properly authenticated firmware is allowed to operate in the lid controller hub, meaning that no unwanted applications can access lid-based microphones and cameras and that image and audio sensor data processed by the lid controller hub to support lid controller hub features stay local to the lid controller hub.

Enhanced and improved experiences are enabled by the lid controller hub's computing resources. For example, neural network accelerators within the lid controller hub can blur displays or faces in the background of a video call or filter out the sound of a dog barking in the background of an audio call. Further, power savings are realized through the use of various techniques such as enabling sensors only when they are likely to be in use, such as sampling touch display input at typical sampling rates when touch interaction is detected. Also, processing sensor data locally in the lid instead of having to send the sensor data across a hinge to have it processed by the operating system provides for latency improvements. Lid controller hubs also allow for laptop designs in which fewer wires are carried across a hinge. Not only can this reduce hinge cost, it can result in a simpler and thus more aesthetically pleasing industrial design. These and other lid controller hub features and advantages are discussed in greater detail below.

In the following description, specific details are set forth, but embodiments of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact. Terms modified by the word "substantially" include arrangements, orientations, spacings, or positions that vary slightly from the meaning of the unmodified term. For example, description of a lid of a mobile computing device that can rotate to substantially 360 degrees with respect to a base of the mobile computing includes lids that can rotate to within several degrees of 360 degrees with respect to a device base.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to embodiments of the present disclosure, are synonymous.

Reference is now made to the drawings, which are not necessarily drawn to scale, wherein similar or same numbers may be used to designate same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1A illustrates a block diagram of a first example mobile computing device comprising a lid controller hub. The computing device 100 comprises a base 110 connected to a lid 120 by a hinge 130. The mobile computing device (also referred to herein as "user device") 100 can be a laptop or a mobile computing device with a similar form factor. The base 110 comprises a host system-on-a-chip (SoC) 140 that comprises one or more processing units integrated with one or more additional components, such as a memory controller, graphics processing unit (GPU), caches, an image processing module, and other components described herein. The base 110 can further comprise a physical keyboard, touchpad, battery, memory, storage, and external ports. The lid 120 comprises an embedded display panel 145, a timing controller (TCON) 150, a lid controller hub (LCH) 155, microphones 158, one or more cameras 160, and a touch display controller (touch controller) 165. TCON 150 converts video data 190 received from the SoC 140 into signals that drive the display panel 145.

The display panel 145 can be any type of embedded display in which the display elements responsible for generating light or allowing the transmission of light are located in each pixel. Such displays may include TFT LCD (thin-film-transistor liquid crystal display), micro-LED (micro-light-emitting diode (LED)), OLED (organic LED), and QLED (quantum dot LED) displays. A touch controller 165 drives the touchscreen technology utilized in the display panel 145 and collects touch sensor data provided by the employed touchscreen technology. The display panel 145 can be a touch display and comprise a touchscreen comprising one or more dedicated layers for implementing touch capabilities or 'in-cell' or 'on-cell' touchscreen technologies that do not require dedicated touchscreen layers.

The microphones 158 can comprise microphones located in the bezel of the lid or in-display microphones located in the display area, the region of the panel that displays content. The one or more cameras 160 can similarly comprise cameras located in the bezel or in-display cameras located in the display area.

LCH 155 comprises an audio module 170, a vision/imaging module 172, a security module 174, and a host module 176. The audio module 170, the vision/imaging module 172 and the host module 176 interact with lid sensors process the sensor data generated by the sensors. The audio module 170 interacts with the microphones 158 and processes audio sensor data generated by the microphones 158, the vision/imaging module 172 interacts with the one or more cameras 160 and processes image sensor data generated by the one or more cameras 160, and the host module 176 interacts with the touch controller 165 and processes touch sensor data generated by the touch controller 165. A synchronization signal 180 is shared between the timing controller 150 and the lid controller hub 155. The synchronization signal 180 can be used to synchronize the sampling of touch sensor data and the delivery of touch sensor data to the SoC 140 with the refresh rate of the display panel 145 to allow for a smooth and responsive touch experience at the system level.

As used herein, the phrase "sensor data" can refer to sensor data generated or provided by sensor as well as sensor data that has undergone subsequent processing. For example, image sensor data can refer to sensor data received at a frame router in a vision/imaging module as well as processed sensor data output by a frame router processing stack in a vision/imaging module. The phrase "sensor data" can also refer to discrete sensor data (e.g., one or more images captured by a camera) or a stream of sensor data (e.g., a video stream generated by a camera, an audio stream generated by a microphone). The phrase "sensor data" can further refer to metadata generated from the sensor data, such as a gesture determined from touch sensor data or a head orientation or facial landmark information generated from image sensor data.

The audio module 170 processes audio sensor data generated by the microphones 158 and in some embodiments enables features such as Wake on Voice (causing the device 100 to exit from a low-power state when a voice is detected in audio sensor data), Speaker ID (causing the device 100 to exit from a low-power state when an authenticated user's voice is detected in audio sensor data), acoustic context awareness (e.g., filtering undesirable background noises), speech and voice pre-processing to condition audio sensor data for further processing by neural network accelerators, dynamic noise reduction, and audio-based adaptive thermal solutions.

The vision/imaging module 172 processes image sensor data generated by the one or more cameras 160 and in various embodiments can enable features such as Wake on Face (causing the device 100 to exit from a low-power state when a face is detected in image sensor data) and Face ID (causing the device 100 to exit from a low-power state when an authenticated user's face is detected in image sensor data). In some embodiments, the vision/imaging module 172 can enable one or more of the following features: head orientation detection, determining the location of facial landmarks (e.g., eyes, mouth, nose, eyebrows, cheek) in an image, and multi-face detection.

The host module 176 processes touch sensor data provided by the touch controller 165. The host module 176 is able to synchronize touch-related actions with the refresh rate of the embedded panel 145. This allows for the synchronization of touch and display activities at the system level, which provides for an improved touch experience for any application operating on the mobile computing device.

Thus, the LCH 155 can be considered to be a companion die to the SoC 140 in that the LCH 155 handles some sensor data-related processing tasks that are performed by SoCs in existing mobile computing devices. The proximity of the LCH 155 to the lid sensors allows for experiences and capabilities that may not be possible if sensor data has to be sent across the hinge 130 for processing by the SoC 140. The proximity of LCH 155 to the lid sensors reduces latency, which creates more time for sensor data processing. For example, as will be discussed in greater detail below, the LCH 155 comprises neural network accelerators, digital signals processors, and image and audio sensor data processing modules to enable features such as Wake on Voice, Wake on Face, and contextual understanding. Locating LCH computing resources in proximity to lid sensors also allows for power savings as lid sensor data needs to travel a shorter length—to the LCH instead of across the hinge to the base.

Lid controller hubs allow for additional power savings. For example, an LCH allows the SoC and other components in the base to enter into a low-power state while the LCH monitors incoming sensor data to determine whether the device is to transition to an active state. By being able to wake the device only when the presence of an authenticated user is detected (e.g., via Speaker ID or Face ID), the device can be kept in a low-power state longer than if the device were to wake in response to detecting the presence of any person. Lid controller hubs also allow the sampling of touch inputs at an embedded display panel to be reduced to a lower rate (or be disabled) in certain contexts. Additional power savings enabled by a lid controller hub are discussed in greater detail below.

As used herein the term "active state" when referencing a system-level state of a mobile computing device refers to a state in which the device is fully usable. That is, the full capabilities of the host processing unit and the lid controller hub are available, one or more applications can be executing, and the device is able to provide an interactive and responsive user experience—a user can be watching a movie, participating in a video call, surfing the web, operating a computer-aided design tool, or using the device in one of a myriad of other fashions. While the device is in an active state, one or more modules or other components of the device, including the lid controller hub or constituent modules or other components of the lid controller hub, can be placed in a low-power state to conserve power. The host processing units can be temporarily placed in a high-performance mode while the device is in an active state to accommodate demanding workloads. Thus, a mobile computing device can operate within a range of power levels when in an active state.

As used herein, the term "low-power state" when referencing a system-level state of a mobile computing device refers to a state in which the device is operating at a lower power consumption level than when the device is operating in an active state. Typically, the host processing unit is operating at a lower power consumption level than when the device is in an active state and more device modules or other components are collectively operating in a low-power state than when the device is in an active state. A device can operate in one or more low-power states with one difference between the low-power states being characterized by the power consumption level of the device level. In some embodiments, another difference between low-power states is characterized by how long it takes for the device to wake in response to user input (e.g., keyboard, mouse, touch, voice, user presence being detected in image sensor data, a user opening or moving the device), a network event, or input from an attached device (e.g., USB device). Such low-power states can be characterized as "standby", "idle", "sleep" or "hibernation" states.

In a first type of device-level low-power state, such as ones characterized as an "idle" or "standby" low-power state, the device can quickly transition from the low-power state to an active state in response to user input, hardware or network events. In a second type of device-level low-power state, such as one characterized as a "sleep" state, the device consumes less power than in the first type of low-power state and volatile memory is kept refreshed to maintain the device state. In a third type of device-level low-power state, such as one characterized as a "hibernate" low-power state, the device consumes less power than in the second type of low-power state. Non-volatile memory is not kept refreshed and the device state is stored in non-volatile memory. The device takes a longer time to wake from the third type of low-power state than from a first or second type of low-power state due to having to restore the system state from non-volatile memory. In a fourth type of low-power state, the device is off and not consuming power. Waking the device from an off state requires the device to undergo a full reboot. As used herein, waking a device refers to a device transitioning from a low-power state to an active state.

In reference to a lid controller hub, the term "active state", refers to a lid controller hub state in which the full resources of the lid controller hub are available. That is, the LCH can be processing sensor data as it is generated, passing along sensor data and any data generated by the LCH based on the sensor data to the host SoC, and displaying images based on video data received from the host SoC. One or more components of the LCH can individually be placed in a low-power state when the LCH is in an active state. For example, if the LCH detects that an authorized user is not detected in image sensor data, the LCH can cause a lid display to be disabled. In another example, if a privacy mode is enabled, LCH components that transmit sensor data to the host SoC can be disabled. The term "low-power" state, when referring to a lid controller hub can refer to a power state in which the LCH operates at a lower power consumption level than when in an active state, and is typically characterized by one or more LCH modules or other components being placed in a low-power state than when the LCH is in an active state. For example, when the lid of a computing device is closed, a lid display can be disabled, an LCH vision/imaging module can be placed in a low-power state and an LCH audio module can be kept operating to support a Wake on Voice feature to allow the device to continue to respond to audio queries.

A module or any other component of a mobile computing device can be placed in a low-power state in various manners, such as by having its operating voltage reduced, being supplied with a clock signal with a reduced frequency, or being placed into a low-power state through the receipt of control signals that cause the component to consume less power (such as placing a module in an image display pipeline into a low-power state in which it performs image processing on only a portion of an image).

In some embodiments, the power savings enabled by an LCH allow for a mobile computing device to be operated for a day under typical use conditions without having to be recharged. Being able to power a single day's use with a lower amount of power can also allow for a smaller battery to be used in a mobile computing device. By enabling a smaller battery as well as enabling a reduced number of wires across a hinge connecting a device to a lid, laptops comprising an LCH can be thinner and lighter and thus have an improved industrial design over existing devices.

In some embodiments, the lid controller hub technologies disclosed herein allow for laptops with intelligent collaboration and personal assistant capabilities. For example, an LCH can provide near-field and far-field audio capabilities that allow for enhanced audio reception by detecting the location of a remote audio source and improving the detection of audio arriving from the remote audio source location. When combined with Wake on Voice and Speaker ID capabilities, near- and far-field audio capabilities allow for a mobile computing device to behave similarly to the "smart speakers" that are pervasive in the market today. For example, consider a scenario where a user takes a break from working, walks away from their laptop, and asks the laptop from across the room, "What does tomorrow's weather look like?" The laptop, having transitioned into a low-power state due to not detecting the face of an authorized user in image sensor data provided by a user-facing camera, is continually monitoring incoming audio sensor data and detects speech coming from an authorized user. The laptop exits its low-power state, retrieves the requested information, and answers the user's query.

The hinge 130 can be any physical hinge that allows the base 110 and the lid 120 to be rotatably connected. The wires that pass across the hinge 130 comprise wires for passing video data 190 from the SoC 140 to the TCON 150, wires for passing audio data 192 between the SoC 140 and the audio module 170, wires for providing image data 194 from the vision/imaging module 172 to the SoC 140, wires for providing touch data 196 from the LCH 155 to the SoC 140, and wires for providing data determined from image sensor data and other information generated by the LCH 155 from the host module 176 to the SoC 140. In some embodiments, data shown as being passed over different sets of wires between the SoC and LCH are communicated over the same set of wires. For example, in some embodiments, touch data, sensing data, and other information generated by the LCH can be sent over a single USB bus.

In some embodiments, the lid 120 is removably attachable to the base 110. In some embodiments, the hinge can allow the base 110 and the lid 120 to rotate to substantially 360 degrees with respect to either other. In some embodiments, the hinge 130 carries fewer wires to communicatively couple the lid 120 to the base 110 relative to existing computing devices that do not have an LCH. This reduction in wires across the hinge 130 can result in lower device cost, not just due to the reduction in wires, but also due to being a simpler electromagnetic and radio frequency interface (EMI/RFI) solution.

The components illustrated in FIG. 1A as being located in the base of a mobile computing device can be located in a base housing and components illustrated in FIG. 1A as being located in the lid of a mobile computing device can be located in a lid housing.

FIG. 1B illustrates a perspective view of a secondary example mobile computing comprising a lid controller hub. The mobile computing device 122 can be a laptop or other mobile computing device with a similar form factor, such as a foldable tablet or smartphone. The lid 123 comprises an "A cover" 139 that is the world-facing surface of the lid 123 when the mobile computing device 122 is in a closed configuration and a "B cover" 140 that comprises a user-facing display when the lid 123 is open. The base 129 comprises a "C cover" 126 that comprises a keyboard that is upward facing when the device 122 is an open configuration and a "D cover" 127 that is the bottom of the base 129. In some embodiments, the base 129 comprises the primary computing resources (e.g., host processing unit(s), GPU) of the device 122, along with a battery, memory, and storage, and communicates with the lid 123 via wires that pass through a hinge 128. Thus, in embodiments where the mobile computing device is a dual-display device, such as a dual display laptop, tablet, or smartphone, the base can be regarded as the device portion comprising host processing units and the lid can be regarded as the device portion comprising an LCH. A Wi-Fi antenna can be located in the base or the lid of any computing device described herein.

In other embodiments, the computing device 122 can be a dual display device with a second display comprising a portion of the C cover 126. For example, in some embodiments, an "always-on" display (AOD) can occupy a region of the C cover below the keyboard that is visible when the lid 123 is closed. In other embodiments, a second display covers most of the surface of the C cover and a removable keyboard can be placed over the second display or the second display can present a virtual keyboard to allow for keyboard input.

Lid controller hubs are not limited to being implemented in laptops and other mobile computing devices having a form factor similar to that illustrated FIG. 1B. The lid controller hub technologies disclosed herein can be employed in mobile computing devices comprising one or more portions beyond a base and a single lid, the additional one or more portions comprising a display and/or one or more sensors. For example, a mobile computing device comprising an LCH can comprise a base; a primary display portion comprising a first touch display, a camera, and microphones; and a secondary display portion comprising a second touch display. A first hinge rotatably couples the base to the secondary display portion and a second hinge rotatably couples the primary display portion to the secondary display portion. An LCH located in either display portion can process sensor data generated by lid sensors located in the same display portion that the LCH is located in or by lid sensors generated in both display portions. In this example, a lid controller hub could be located in either or both of the primary and secondary display portions. For example, a first LCH could be located in the secondary display that communicates to the base via wires that pass through the first hinge and a second LCH could be located in the primary display that communicates to the base via wires passing through the first and second hinge.

FIG. 2 illustrates a block diagram of a third example mobile computing device comprising a lid controller hub. The device 200 comprises a base 210 connected to a lid 220 by a hinge 230. The base 210 comprises an SoC 340. The lid 220 comprises a timing controller (TCON) 250, a lid controller hub (LCH) 260, a user-facing camera 270, an embedded display panel 280, and one or more microphones 290.

The SoC 340 comprises a display module 391, an integrated sensor hub 392, an audio capture module 393, a Universal Serial Bus (USB) module 394, an image processing module 395, and a plurality of processor cores 235. The display module 391 communicates with an embedded DisplayPort (eDP) module in the TCON 250 via an eight-wire eDP connection 233. In some embodiments, the embedded display panel 280 is a "3K2K" display (a display having a 3K×2K resolution) with a refresh rate of up to 120 Hz and the connection 233 comprises two eDP High Bit Rate 2 (HBR2 (17.28 Gb/s)) connections. The integrated sensor hub 392 communicates with a vision/imaging module 263 of the LCH 260 via a two-wire Mobile Industry Processor Interface (MIPI) I3C (SenseWire) connection 221, the audio capture module 393 communicates with an audio module 264 of the LCH 260 via a four-wire MIPI SoundWire® connection 222, the USB module 394 communicates with a security/host module 261 of the LCH 260 via a USB connection 223, and the image processing module 395 receives image data from a MIPI D-PHY transmit port 265 of a frame router 267 of the LCH 260 via a four-lane MIPI D-PHY connection 239 comprising 10 wires. The integrated sensor hub 392 can be an Intel® integrated sensor hub or any other sensor hub capable of processing sensor data from one or more sensors.

As used herein, the term "port" can refer to any interface, module, connector, etc. that transmits and/or receives information or signals from one module, circuit, component, etc. to another. A port can be implemented in hardware, software, firmware, or a component thereof.

The TCON 250 comprises the eDP port 402 and a Peripheral Component Interface Express (PCIe) port 404 that drives the embedded display panel 280 using PCIe's peer-to-peer (P2P) communication feature over a 48-wire connection 240.

The LCH 260 comprises the security/host module 261, the vision/imaging module 263, the audio module 264, and a frame router 267. The security/host module 261 comprises a digital signal processing (DSP) processor 271, a security processor 272, a vault and one-time password generator (OTP) 273, and a memory 274. In some embodiments, the DSP 271 is a Synopsis® DesignWare® ARC® EM7D or EM11D DSP processor and the security processor is a Synopsis® DesignWare® ARC® SEM security processor. In addition to being in communication with the USB module 394 in the SoC 340, the security/host module 261 communicates with the TCON 250 via an inter-integrated circuit (I2C) connection 226 to provide for synchronization between LCH and TCON activities. The memory 274 stores instructions executed by components of the LCH 260.

The vision/imaging module 263 comprises a DSP 275, a neural network accelerator (NNA) 276, an image preprocessor 278, and a memory 277. In some embodiments, the DSP 275 is a DesignWare® ARC® EM11D processor. The vising/imaging module 263 communicates with the frame router 267 via an intelligent peripheral interface (IPI) connection 227. The vision/imaging module 263 can perform face detection, detect head orientation, and enables device access based on detecting a person's face (Wake on Face) or an authorized user's face (Face ID) in image sensor data. In some embodiments, the vision/imaging module 263 can implement one or more artificial intelligence (AI) models via the neural network accelerators 276 to enable these functions. For example, the neural network accelerator 276 can implement a model trained to recognize an authorized user's face in image sensor data to enable a Wake on Face feature. The vision/imaging module 263 communicates with the camera 270 via a connection 228 comprising a pair of I2C or I3C wires and a five-wire general-purpose I/O (GPIO) connection. The frame router 267 comprises the D-PHY transmit port 265 and a D-PHY receiver 266 that receives image sensor data provided by the user-facing camera 270 via a connection 231 comprising a four-wire MIPI Camera Serial Interface 2 (CSI2) connection. The LCH 260 communicates with a touch display controller (touch controller) 285 via a connection 232 that can comprise an eight-wire serial peripheral interface (SPI) or a four-wire I2C connection.

The audio module 264 comprises one or more DSPs 281, a neural network accelerator 282, an audio preprocessor 284, and a memory 283. In some embodiments, the lid 220 comprises four microphones 290 and the audio module 264 comprises four DSPs 281, one for each microphone. In some embodiments, each DSP 281 is a Cadence® Tensilica® HiFi DSP. The audio module 264 communicates with the one or more microphones 290 via a connection 229 that comprises a MIPI SoundWire® connection or signals sent via pulse-density modulation (PDM). In other embodiments, the connection 229 comprises a four-wire digital microphone (DMIC) interface, a two-wire integrated inter-IC sound bus (I2S) connection, and one or more GPIO wires. The audio module 264 enables waking the device from a low-power state upon detecting a human voice (Wake on Voice) or the voice of an authenticated user (Speaker ID), near- and far-field audio (input and output), and can perform additional speech recognition tasks. In some embodiments, the NNA 282 is an artificial neural network accelerator implementing one or more artificial intelligence (AI) models to enable various LCH functions. For example, the NNA 282 can implement an AI model trained to detect a wake word or phrase in audio sensor data generated by the one or more microphones 290 to enable a Wake on Voice feature.

In some embodiments, the security/host module memory 274, the vision/imaging module memory 277, and the audio module memory 283 are part of a shared memory accessible to the security/host module 261, the vision/imaging module 263, and the audio module 264. During startup of the device 200, a section of the shared memory is assigned to each of the security/host module 261, the vision/imaging module 263, and the audio module 264. After startup, each section of shared memory assigned to a module is firewalled from the other assigned sections. In some embodiments, the shared memory can be a 12 MB memory partitioned as follows: security/host memory (1 MB), vision/imaging memory (3 MB), and audio memory (8 MB).

Any connection described herein connecting two or more components can utilize a different interface, protocol, or connection technology and/or utilize a different number of wires than that described for a particular connection. Although the display module 391, integrated sensor hub 392, audio capture module 393, USB module 394, and image processing module 395 are illustrated as being integrated into the SoC 340, in other embodiments, one or more of these components can be located external to the SoC. For example, one or more of these components can be located on a die, in a package, or on a board separate from a die, package, or board comprising host processing units (e.g., cores 235).

Figure 3:
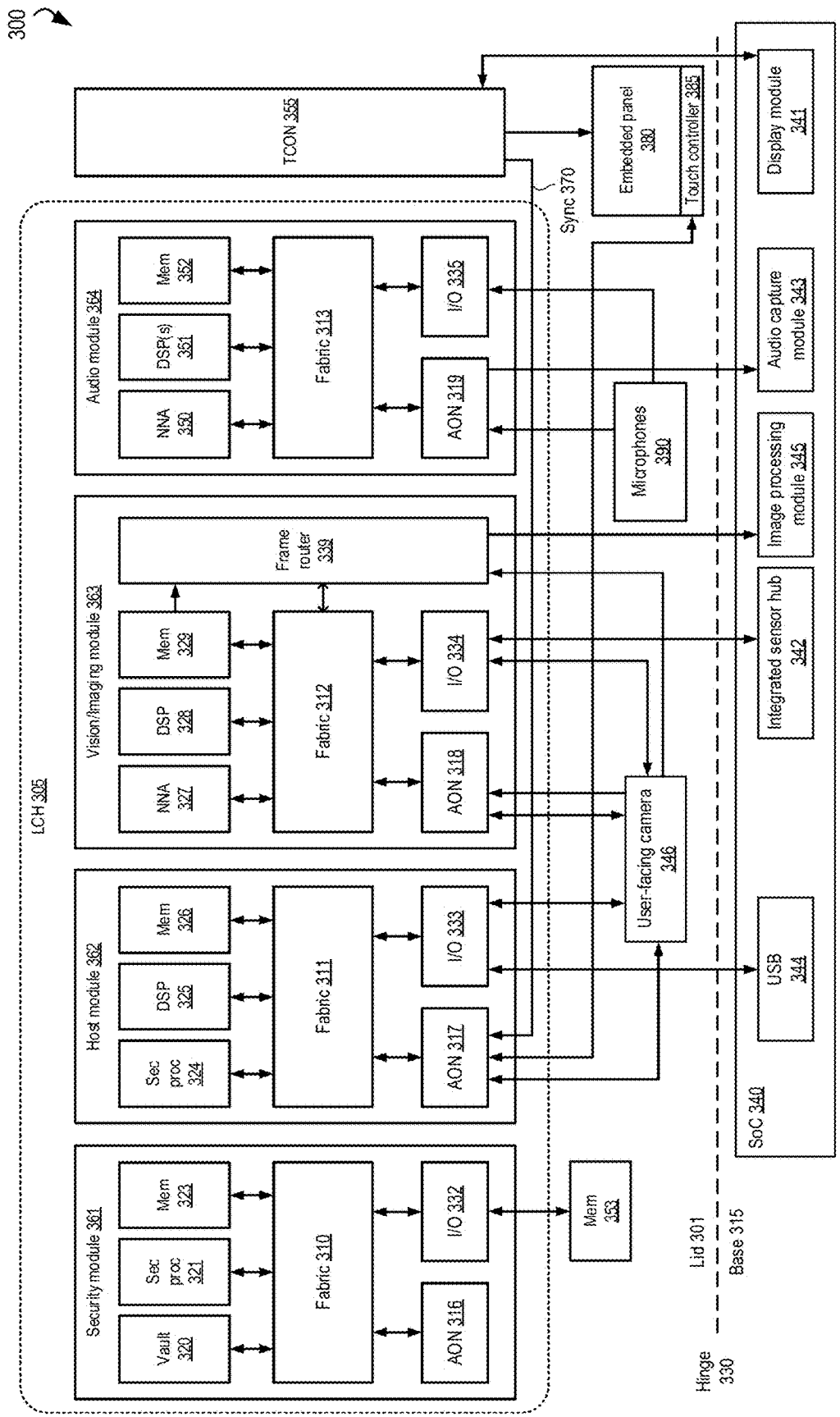
FIG. 3 illustrates a block diagram of a fourth example mobile computing device comprising a lid controller hub.

FIG. 3 illustrates a block diagram of a fourth example mobile computing device comprising a lid controller hub. The mobile computing device 300 comprises a lid 301 connected to a base 315 via a hinge 330. The lid 301 comprises a lid controller hub (LCH) 305, a timing controller 355, a user-facing camera 346, microphones 390, an embedded display panel 380, a touch display controller (display controller) 385, and a memory 353. The LCH 305 comprises a security module 361, a host module 362, a vision/imaging module 363, and an audio module 364. The security module 361 provides a secure processing environment for the LCH 305 and comprises a vault 320, a security processor 321, a fabric 310, I/Os 332, an always-on (AON) block 316, and a memory 323. The security module 361 is responsible for loading and authenticating firmware stored in the memory 353 and executed by various components (e.g., DSPs, neural network accelerators) of the LCH 305. The security module 361 authenticates the firmware by executing a cryptographic hash function on the firmware and making sure the resulting hash is correct and that the firmware has a proper signature using key information stored in the security module 361. The cryptographic hash function is executed by the vault 320. In some embodiments, the vault 320 comprises a cryptographic accelerator. In some embodiments, the security module 361 can present a product root of trust (PRoT) interface by which another component of the device 200 can query the LCH 305 for the results of the firmware authentication. In some embodiments, a PRoT interface can be provided over an I2C/I3C interface (e.g., I2C/I3C interface 470).

As used herein, the terms "operating", "executing", or "running" as they pertain to software or firmware in relation to a lid controller hub, a lid controller hub component, host processing unit, SoC, or other computing device component are used interchangeably and can refer to software or firmware stored in one or more computer-readable storage media accessible by the computing device component, even though the instructions contained in the software or firmware are not being actively executed by the component.

The security module 361 also stores privacy information and handles privacy tasks. In some embodiments, information that the LCH 305 uses to perform Face ID or Speaker ID to wake a computing device if an authenticated user's voice is picked up by the microphone or if an authenticated user's face is captured by a camera is stored in the security module 361. The security module 361 also enables privacy modes for an LCH or a computing device. For example, if user input indicates that a user desires to enable a privacy mode, the security module 361 can disable access by LCH resources to sensor data generated by one or more of the lid input devices (e.g., touchscreen, microphone, camera). In some embodiments, a user can set a privacy setting to cause a device to enter a privacy mode. Privacy settings include, for example, disabling video and/or audio input in a videoconferencing application or enabling an operating system level privacy setting that prevents any application or the operating system from receiving and/or processing sensor data. Setting an application or operating system privacy setting can cause information to be sent to the lid controller hub to cause the LCH to enter a privacy mode. In a privacy mode, the lid controller hub can cause an input sensor to enter a low-power state, prevent LCH resources from processing sensor data or prevent raw or processed sensor data from being sent to a host processing unit.

In some embodiments, the LCH 305 can enable Wake on Face or Face ID features while keeping image sensor data private from the remainder of the system (e.g., the operating system and any applications running on the operating system). In some embodiments, the vision/imaging module 363 continues to process image sensor data to allow Wake on Face or Face ID features to remain active while the device is in a privacy mode. In some embodiments, image sensor data is passed through the vision/imaging module 363 to an image processing module 345 in the SoC 340 only when a face (or an authorized user's face) is detected, irrespective of whether a privacy mode is enabled, for enhanced privacy and reduced power consumption. In some embodiments, the mobile computing device 300 can comprise one or more world-facing cameras in addition to user-facing camera 346 as well as one or more world-facing microphones (e.g., microphones incorporated into the "A cover" of a laptop).

In some embodiments, the lid controller hub 305 enters a privacy mode in response to a user pushing a privacy button, flipping a privacy switch, or sliding a slider over an input sensor in the lid. In some embodiments, a privacy indicator can be provided to the user to indicate that the LCH is in a privacy mode. A privacy indicator can be, for example, an LED located in the base or display bezel or a privacy icon displayed on a display. In some embodiments, a user activating an external privacy button, switch, slider, hotkey, etc. enables a privacy mode that is set at a hardware level or system level. That is, the privacy mode applies to all applications and the operating system operating on the mobile computing device. For example, if a user presses a privacy switch located in the bezel of the lid, the LCH can disable all audio sensor data and all image sensor data from being made available to the SoC in response. Audio and image sensor data is still available to the LCH to perform tasks such as Wake of Voice and Speaker ID, but the audio and image sensor data accessible to the lid controller hub is not accessible to other processing components.

The host module 362 comprises a security processor 324, a DSP 325, a memory 326, a fabric 311, an always-on block 317, and I/Os 333. In some embodiments, the host module 362 can boot the LCH, send LCH telemetry and interrupt data to the SoC, manage interaction with the touch controller 385, and send touch sensor data to the SoC 340. The host module 362 sends lid sensor data from multiple lid sensors over a USB connection to a USB module 344 in the SoC 340. Sending sensor data for multiple lid sensors over a single connection contributes to the reduction in the number of wires passing through the hinge 330 relative to existing laptop designs. The DSP 325 processes touch sensor data received from the touch controller 385. The host module 362 can synchronize the sending of touch sensor data to the SoC 340 with the display panel refresh rate by utilizing a synchronization signal 370 shared between the TCON 355 and the host module 362.

The host module 362 can dynamically adjust the refresh rate of the display panel 380 based on factors such as user presence and the amount of user touch interaction with the panel 380. For example, the host module 362 can reduce the refresh rate of the panel 380 if no user is detected or an authorized user is not detected in front of the camera 346. In another example, the refresh rate can be increased in response to detection of touch interaction at the panel 380 based on touch sensor data. In some embodiments and depending upon the refresh rate capabilities of the display panel 380, the host module 362 can cause the refresh rate of the panel 380 to be increased up to 120 Hz or down to 20 Hz or less.

The host module 362 can also adjust the refresh rate based on the application that a user is interacting with. For example, if the user is interacting with an illustration application, the host module 362 can increase the refresh rate (which can also increase the rate at which touch data is sent to the SoC 340 if the display panel refresh rate and the processing of touch sensor data are synchronized) to 120 Hz to provide for a smoother touch experience to the user. Similarly, if the host module 362 detects that the application that a user is currently interacting with is one where the content is relatively static or is one that involves a low degree of user touch interaction or simple touch interactions (e.g., such as selecting an icon or typing a message), the host module 362 can reduce the refresh rate to a lower frequency. In some embodiments, the host module 362 can adjust the refresh rate and touch sampling frequency by monitoring the frequency of touch interaction. For example, the refresh rate can be adjusted upward if there is a high degree of user interaction or if the host module 362 detects that the user is utilizing a specific touch input device (e.g., a stylus) or a particular feature of a touch input stylus (e.g., a stylus' tilt feature). If supported by the display panel, the host module 362 can cause a strobing feature of the display panel to be enabled to reduce ghosting once the refresh rate exceeds a threshold value.

The vision/imaging module 363 comprises a neural network accelerator 327, a DSP 328, a memory 329, a fabric 312, an AON block 318, I/Os 334, and a frame router 339. The vision/imaging module 363 interacts with the user-facing camera 346. The vision/imaging module 363 can interact with multiple cameras and consolidate image data from multiple cameras into a single stream for transmission to an integrated sensor hub 342 in the SoC 340. In some embodiments, the lid 301 can comprise one or more additional user-facing cameras and/or world-facing cameras in addition to user-facing camera 346. In some embodiments, any of the user-facing cameras can be in-display cameras. Image sensor data generated by the camera 346 is received by the frame router 339 where it undergoes preprocessing before being sent to the neural network accelerator 327 and/or the DSP 328. The image sensor data can also be passed through the frame router 339 to an image processing module 345 in the SoC 340. The neural network accelerator 327 and/or the DSP 328 enable face detection, head orientation detection, the recognition of facial landmarks (e.g., eyes, cheeks, eyebrows, nose, mouth), the generation of a 3D mesh that fits a detected face, along with other image processing functions. In some embodiments, facial parameters (e.g., location of facial landmarks, 3D meshes, face physical dimensions, head orientation) can be sent to the SoC at a rate of 30 frames per second (30 fps).

The audio module 364 comprises a neural network accelerator 350, one or more DSPs 351, a memory 352, a fabric 313, an AON block 319, and I/Os 335. The audio module 364 receives audio sensor data from the microphones 390. In some embodiments, there is one DSP 351 for each microphone 390. The neural network accelerator 350 and DSP 351 implement audio processing algorithms and AI models that improve audio quality. For example, the DSPs 351 can perform audio preprocessing on received audio sensor data to condition the audio sensor data for processing by audio AI models implemented by the neural network accelerator 350. One example of an audio AI model that can be implemented by the neural network accelerator 350 is a noise reduction algorithm that filters out background noises, such as the barking of a dog or the wailing of a siren. A second example is models that enable Wake on Voice or Speaker ID features. A third example is context awareness models. For example, audio contextual models can be implemented that classify the occurrence of an audio event relating to a situation where law enforcement or emergency medical providers are to be summoned, such as the breaking of glass, a car crash, or a gun shot. The LCH can provide information to the SoC indicating the occurrence of such an event and the SoC can query to the user whether authorities or medical professionals should be summoned.

The AON blocks 316-319 in the LCH modules 361-364 comprises various I/Os, timers, interrupts, and control units for supporting LCH "always-on" features, such as Wake on Voice, Speaker ID, Wake on Face, and Face ID and an always-on display that is visible and presents content when the lid 301 is closed.

Figure 4:
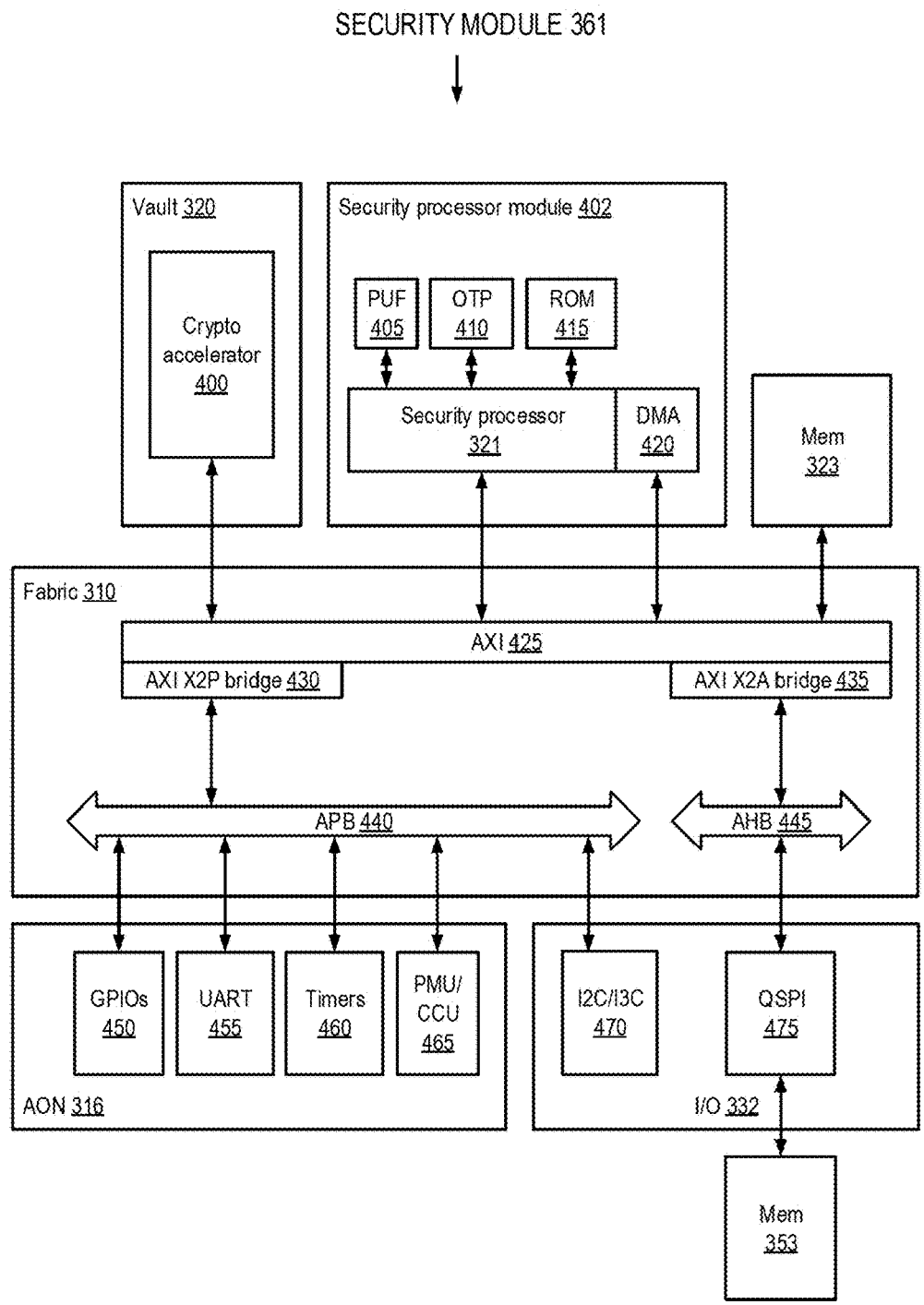
FIG. 4 illustrates a block diagram of the security module of the lid controller hub of FIG. 3.

FIG. 4 illustrates a block diagram of the security module of the lid controller hub of FIG. 3. The vault 320 comprises a cryptographic accelerator 400 that can implement the cryptographic hash function performed on the firmware stored in the memory 353. In some embodiments, the cryptographic accelerator 400 implements a 128-bit block size advanced encryption standard (AES)-compliant (AES-128) or a 384-bit secure hash algorithm (SHA)-complaint (SHA-384) encryption algorithm. The security processor 321 resides in a security processor module 321 that also comprises a platform unique feature module (PUF) 405, an OTP generator 410, a ROM 415, and a direct memory access (DMA) module 420. The PUF 405 can implement one or more security-related features that are unique to a particular LCH implementation. In some embodiments, the security processor 321 can be a DesignWare® ARC® SEM security processor. The fabric 310 allows for communication between the various components of the security module 361 and comprises an advanced extensible interface (AXI) 425, an advanced peripheral bus (APB) 440, and an advanced high-performance bus (AHB) 445. The AXI 425 communicates with the advanced peripheral bus 440 via an AXI to APB (AXI X2P) bridge 430 and the advanced high-performance bus 445 via an AXI to AHB (AXI X2A) bridge 435. The always-on block 316 comprises a plurality of GPIOs 450, a universal asynchronous receiver-transmitter (UART) 455, timers 460, and power management and clock management units (PMU/CMU) 465. The PMU/CMU 465 controls the supply of power and clock signals to LCH components and can selectively supply power and clock signals to individual LCH components so that only those components that are to be in use to support a particular LCH operational mode or feature receive power and are clocked. The I/O set 332 comprises an I2C/I3C interface 470 and a queued serial peripheral interface (QSPI) 475 to communicate to the memory 353. In some embodiments, the memory 353 is a 16 MB serial peripheral interface (SPI)-NOR flash memory that stores the LCH firmware. In some embodiments, an LCH security module can exclude one or more of the components shown in FIG. 4. In some embodiments, an LCH security module can comprise one or more additional components beyond those shown in FIG. 4.

Figure 5:
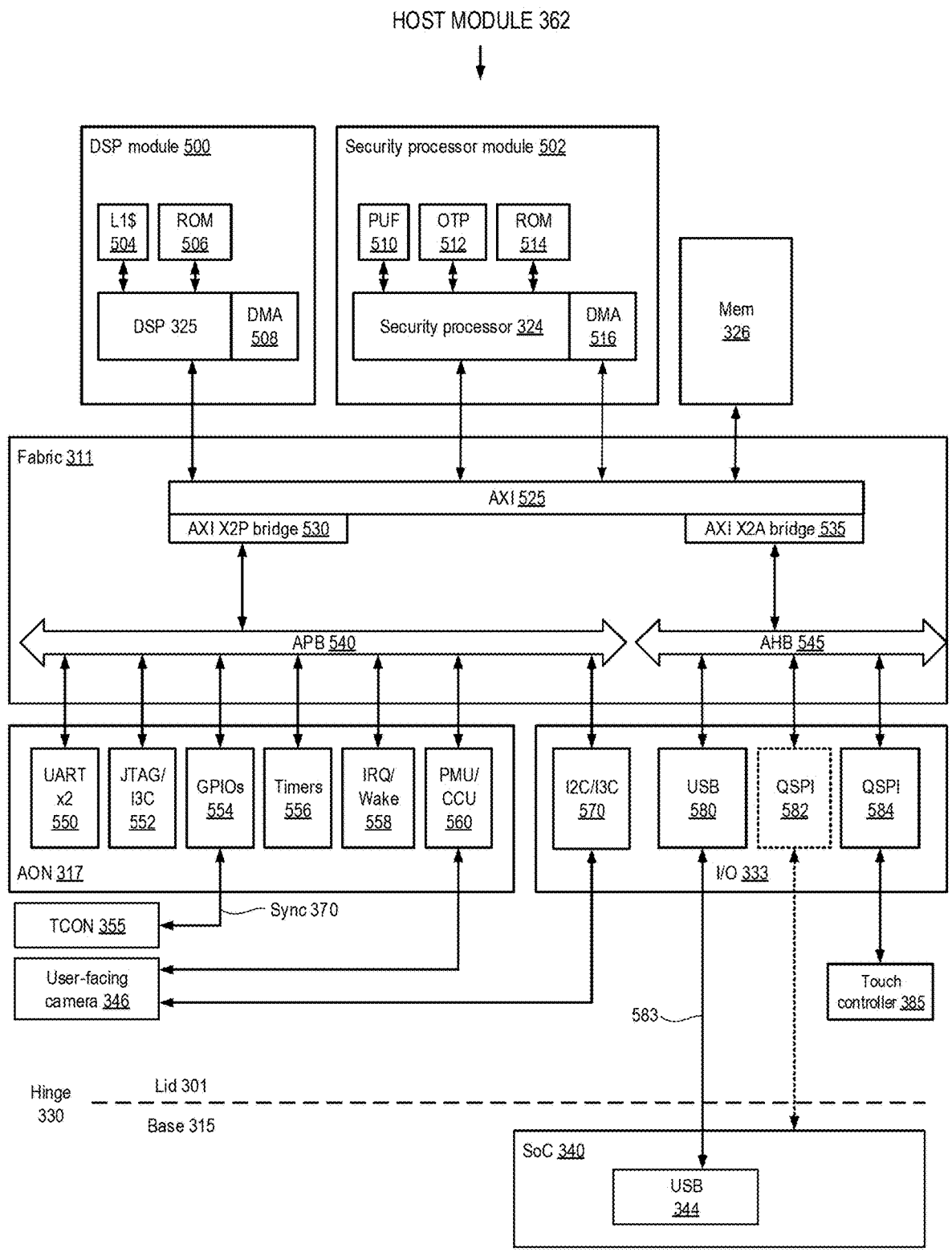
FIG. 5 illustrates a block diagram of the host module of the lid controller hub of FIG. 3.

FIG. 5 illustrates a block diagram of the host module of the lid controller hub of FIG. 3. The DSP 325 is part of a DSP module 500 that further comprises a level one (L1) cache 504, a ROM 506, and a DMA module 508. In some embodiments, the DSP 325 can be a DesignWare® ARC® EM11D DSP processor. The security processor 324 is part of a security processor module 502 that further comprises a PUF module 510 to allow for the implementation of platform-unique functions, an OTP generator 512, a ROM 514, and a DMA module 516. In some embodiments, the security processor 324 is a Synopsis® DesignWare® ARC® SEM security processor. The fabric 311 allows for communication between the various components of the host module 362 and comprises similar components as the security component fabric 310. The always-on block 317 comprises a plurality of UARTs 550, a Joint Test Action Group (JTAG)/I3C port 552 to support LCH debug, a plurality of GPIOs 554, timers 556, an interrupt request (IRQ)/wake block 558, and a PMU/CCU port 560 that provides a 19.2 MHz reference clock to the camera 346. The synchronization signal 370 is connected to one of the GPIO ports. I/Os 333 comprises an interface 570 that supports I2C and/or I3C communication with the camera 346, a USB module 580 that communicates with the USB module 344 in the SoC 340, and a QSPI block 584 that communicates with the touch controller 385. In some embodiments, the I/O set 333 provides touch sensor data with the SoC via a QSPI interface 582. In other embodiments, touch sensor data is communicated with the SoC over the USB connection 583. In some embodiments, the connection 583 is a USB 2.0 connection. By leveraging the USB connection 583 to send touch sensor data to the SoC, the hinge 330 is spared from having to carry the wires that support the QSPI connection supported by the QSPI interface 582. Not having to support this additional QSPI connection can reduce the number of wires crossing the hinge by four to eight wires.

In some embodiments, the host module 362 can support dual displays. In such embodiments, the host module 362 communicates with a second touch controller and a second timing controller. A second synchronization signal between the second timing controller and the host module allows for the processing of touch sensor data provided by the second touch controller and the sending of touch sensor data provided by the second touch sensor delivered to the SoC to be synchronized with the refresh rate of the second display. In some embodiments, the host module 362 can support three or more displays. In some embodiments, an LCH host module can exclude one or more of the components shown in FIG. 5. In some embodiments, an LCH host module can comprise one or more additional components beyond those shown in FIG. 5.

Figure 6:
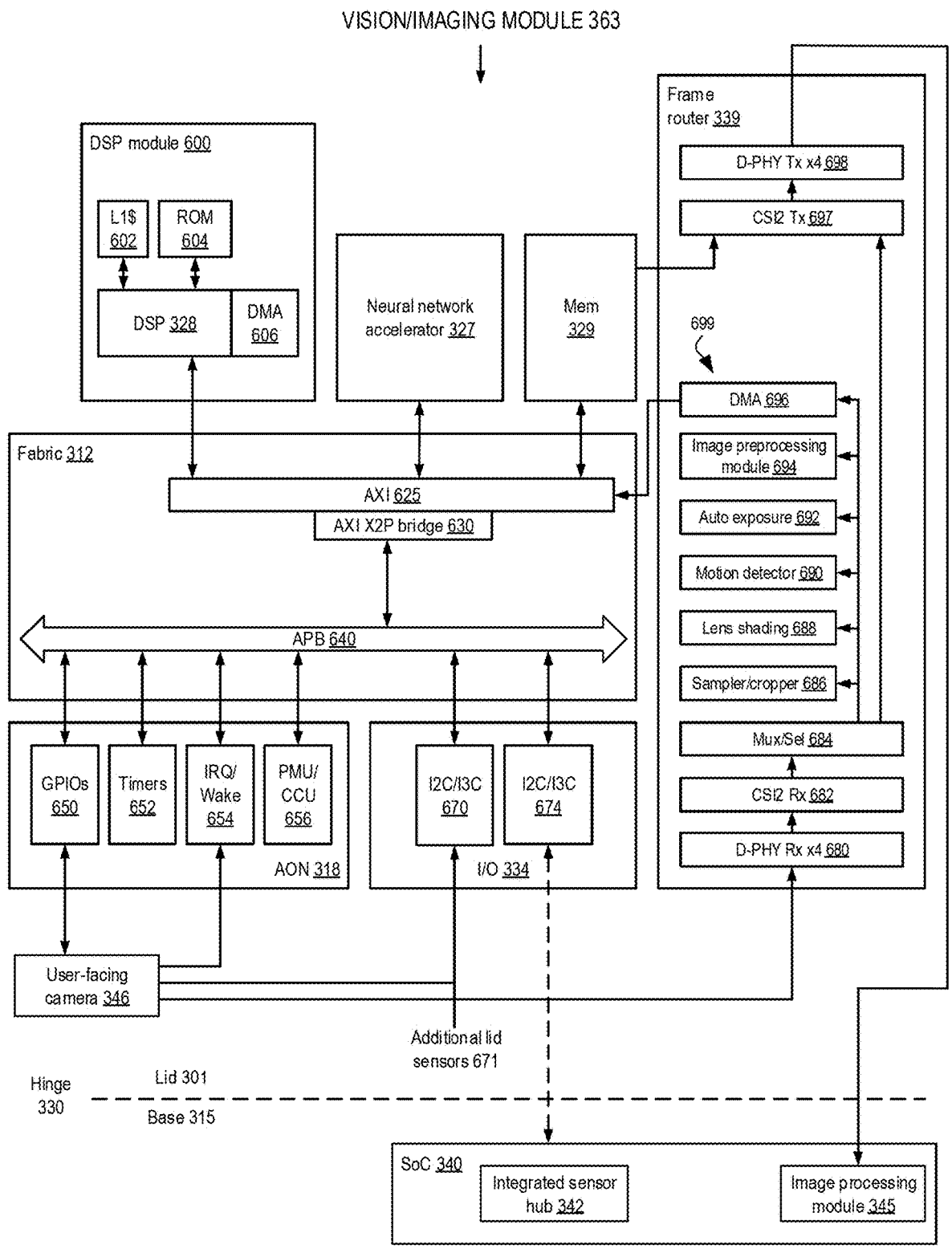
FIG. 6 illustrates a block diagram of the vision/imaging module of the lid controller hub of FIG. 3.

FIG. 6 illustrates a block diagram of the vision/imaging module of the lid controller hub of FIG. 3. The DSP 328 is part of a DSP module 600 that further comprises an L1 cache 602, a ROM 604, and a DMA module 606. In some embodiments, the DSP 328 can be a DesignWare® ARC® EM11D DSP processor. The fabric 312 allows for communication between the various components of the vision/imaging module 363 and comprises an advanced extensible interface (AXI) 640 connected to an advanced peripheral bus (APB) 640 by an AXI to APB (X2P) bridge 630. The always-on block 318 comprises a plurality of GPIOs 650, a plurality of timers 652, an IRQ/wake block 654, and a PMU/CCU 656. In some embodiments, the IRQ/wake block 654 receives a Wake on Motion (WoM) interrupt from the camera 346. The WoM interrupt can be generated based on accelerometer sensor data generated by an accelerator located in or communicatively coupled to the camera or generated in response to the camera performing motion detection processing in images captured by the camera. The I/Os 334 comprise an I2C/I3C interface 674 that sends metadata to the integrated sensor hub 342 in the SoC 340 and an I2C3/I3C interface 670 that connects to the camera 346 and other lid sensors 671 (e.g., lidar sensor, radar sensor, ultrasound sensor, time-of-flight camera, infrared sensor). The vision/imaging module 363 can receive sensor data from the additional lid sensors 671 via the I2C/I3C interface 670. In some embodiments, the metadata comprises information such as information indicating whether information being provided by the lid controller hub is valid, information indicating an operational mode of the lid controller hub (e.g., off, a "Wake on Face" low power mode in which some of the LCH components are disabled but the LCH continually monitors image sensor data to detect a user's face), auto exposure information (e.g., the exposure level automatically set by the vision/imaging module 363 for the camera 346), and information relating to faces detected in images or video captured by the camera 346 (e.g., information indicating a confidence level that a face is present, information indicating a confidence level that the face matches an authorized user's face, bounding box information indicating the location of a face in a captured image or video, orientation information indicating an orientation of a detected face, and facial landmark information).

The frame router 339 receives image sensor data from the camera 346 and can process the image sensor data before passing the image sensor data to the neural network accelerator 327 and/or the DSP 328 for further processing. The frame router 339 also allows the received image sensor data to bypass frame router processing and be sent to the image processing module 345 in the SoC 340. Image sensor data can be sent to the image processing module 345 concurrently with being processed by a frame router processing stack 699. Image sensor data generated by the camera 346 is received at the frame router 339 by a MIPI D-PHY receiver 680 where it is passed to a MIPI CSI2 receiver 682. A multiplexer/selector block 684 allows the image sensor data to be processed by the frame router processing stack 699, to be sent directly to a CSI2 transmitter 697 and a D-PHY transmitter 698 for transmission to the image processing module 345, or both.

The frame router processing stack 699 comprises one or more modules that can perform preprocessing of image sensor data to condition the image sensor data for processing by the neural network accelerator 327 and/or the DSP 328, and perform additional image processing on the image sensor data. The frame router processing stack 699 comprises a sampler/cropper module 686, a lens shading module 688, a motion detector module 690, an auto exposure module 692, an image preprocessing module 694, and a DMA module 696. The sampler/cropper module 686 can reduce the frame rate of video represented by the image sensor data and/or crops the size of images represented by the image sensor data. The lens shading module 688 can apply one or more lens shading effect to images represented by the image sensor data. In some embodiments, a lens shading effects to be applied to the images represented by the image sensor data can be user selected. The motion detector 690 can detect motion across multiple images represented by the image sensor data. The motion detector can indicate any motion or the motion of a particular object (e.g., a face) over multiple images.

The auto exposure module 692 can determine whether an image represented by the image sensor data is over-exposed or under-exposed and cause the exposure of the camera 346 to be adjusted to improve the exposure of future images captured by the camera 346. In some embodiments, the auto exposure module 362 can modify the image sensor data to improve the quality of the image represented by the image sensor data to account for over-exposure or under-exposure. The image preprocessing module 694 performs image processing of the image sensor data to further condition the image sensor data for processing by the neural network accelerator 327 and/or the DSP 328. After the image sensor data has been processed by the one or more modules of the frame router processing stack 699 it can be passed to other components in the vision/imaging module 363 via the fabric 312. In some embodiments, the frame router processing stack 699 contains more or fewer modules than those shown in FIG. 6. In some embodiments, the frame router processing stack 699 is configurable in that image sensor data is processed by selected modules of the frame processing stack. In some embodiments, the order in which modules in the frame processing stack operate on the image sensor data is configurable as well.

Once image sensor data has been processed by the frame router processing stack 699, the processed image sensor data is provided to the DSP 328 and/or the neural network accelerator 327 for further processing. The neural network accelerator 327 enables the Wake on Face function by detecting the presence of a face in the processed image sensor data and the Face ID function by detecting the presence of the face of an authenticated user in the processed image sensor data. In some embodiments, the NNA 327 is capable of detecting multiple faces in image sensor data and the presence of multiple authenticated users in image sensor data. The neural network accelerator 327 is configurable and can be updated with information that allows the NNA 327 to identify one or more authenticated users or identify a new authenticated user. In some embodiments, the NNA 327 and/or DSP 328 enable one or more adaptive dimming features. One example of an adaptive dimming feature is the dimming of image or video regions not occupied by a human face, a useful feature for video conferencing or video call applications. Another example is globally dimming a screen while a computing device is in an active state and a face is no longer detected in front of the camera and then undimming the display when the face is again detected. If this latter adaptive dimming feature is extended to incorporate Face ID, the screen is undimmed only when an authenticated user is again detected.

In some embodiments, the frame router processing stack 699 comprises a super resolution module (not shown) that can upscale or downscale the resolution of an image represented by image sensor data. For example, in embodiments where image sensor data represents 1-megapixel images, a super resolution module can upscale the 1-megapixel images to higher resolution images before they are passed to the image processing module 345. In some embodiments, an LCH vision/imaging module can exclude one or more of the components shown in FIG. 6. In some embodiments, an LCH vision/imaging module can comprise one or more additional components beyond those shown in FIG. 6.

Figure 7:
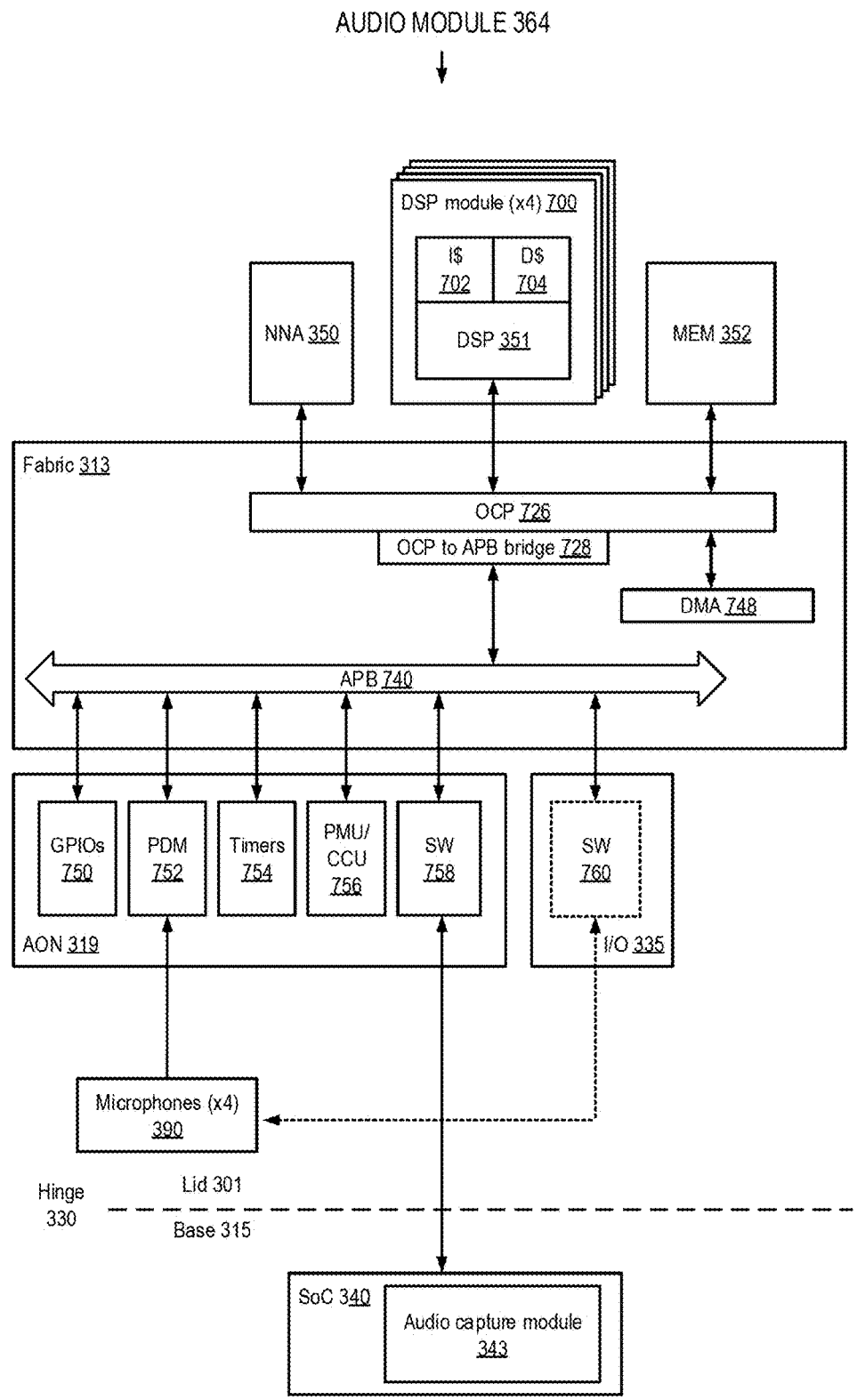
FIG. 7 illustrates a block diagram of the audio module of the lid controller hub of FIG. 3.

FIG. 7 illustrates a block diagram of the audio module 364 of the lid controller hub of FIG. 3. In some embodiments, the NNA 350 can be an artificial neural network accelerator. In some embodiments, the NNA 350 can be an Intel® Gaussian & Neural Accelerator (GNA) or other low-power neural coprocessor. The DSP 351 is part of a DSP module 700 that further comprises an instruction cache 702 and a data cache 704. In some embodiments, each DSP 351 is a Cadence® Tensilica® HiFi DSP. The audio module 364 comprises one DSP module 700 for each microphone in the lid. In some embodiments, the DSP 351 can perform dynamic noise reduction on audio sensor data. In other embodiments, more or fewer than four microphones can be used, and audio sensor data provided by multiple microphones can be processed by a single DSP 351. In some embodiments, the NNA 350 implements one or more models that improve audio quality. For example, the NNA 350 can implement one or more "smart mute" models that remove or reduce background noises that can be disruptive during an audio or video call.

In some embodiments, the DSPs 351 can enable far-field capabilities. For example, lids comprising multiple front-facing microphones distributed across the bezel (or over the display area if in-display microphones are used) can perform beamforming or spatial filtering on audio signals generated by the microphones to allow for far-field capabilities (e.g., enhanced detection of sound generated by a remote acoustic source). The audio module 364, utilizing the DSP 351s, can determine the location of a remote audio source to enhance the detection of sound received from the remote audio source location. In some embodiments, the DSPs 351 can determine the location of an audio source by determining delays to be added to audio signals generated by the microphones such that the audio signals overlap in time and then inferring the distance to the audio source from each microphone based on the delay added to each audio signal. By adding the determined delays to the audio signals provided by the microphones, audio detection in the direction of a remote audio source can be enhanced. The enhanced audio can be provided to the NNA 350 for speech detection to enable Wake on Voice or Speaker ID features. The enhanced audio can be subjected to further processing by the DSPs 351 as well. The identified location of the audio source can be provided to the SoC for use by the operating system or an application running on the operating system.

In some embodiments, the DSPs 351 can detect information encoded in audio sensor data at near-ultrasound (e.g., 15 kHz-20 kHz) or ultrasound (e.g., >20 kHz) frequencies, thus providing for a low-frequency low-power communication channel. Information detected in near-ultrasound/ultrasound frequencies can be passed to the audio capture module 343 in the SoC 340. An ultrasonic communication channel can be used, for example, to communicate meeting connection or Wi-Fi connection information to a mobile computing device by another computing device (e.g., Wi-Fi router, repeater, presentation equipment) in a meeting room. The audio module 364 can further drive the one or more microphones 390 to transmit information at ultrasonic frequencies. Thus, the audio channel can be used as a two-way low-frequency low-power communication channel between computing devices.

In some embodiments, the audio module 364 can enable adaptive cooling. For example, the audio module 364 can determine an ambient noise level and send information indicating the level of ambient noise to the SoC. The SoC can use this information as a factor in determining a level of operation for a cooling fan of the computing device. For example, the speed of a cooling fan can be scaled up or down with increasing and decreasing ambient noise levels, which can allow for increased cooling performance in noisier environments.

The fabric 313 allows for communication between the various components of the audio module 364. The fabric 313 comprises open core protocol (OCP) interfaces 726 to connect the NNA 350, the DSP modules 700, the memory 352 and the DMA 748 to the APB 740 via an OCP to APB bridge 728. The always-on block 319 comprises a plurality of GPIOs 750, a pulse density modulation (PDM) module 752 that receives audio sensor data generated by the microphones 390, one or more timers 754, a PMU/CCU 756, and a MIPI SoundWire® module 758 for transmitting and receiving audio data to the audio capture module 343. In some embodiments, audio sensor data provided by the microphones 390 is received at a DesignWare® Sound-Wire® module 760. In some embodiments, an LCH audio module can exclude one or more of the components shown in FIG. 7. In some embodiments, an LCH audio module can comprise one or more additional components beyond those shown in FIG. 7.

Figure 8:
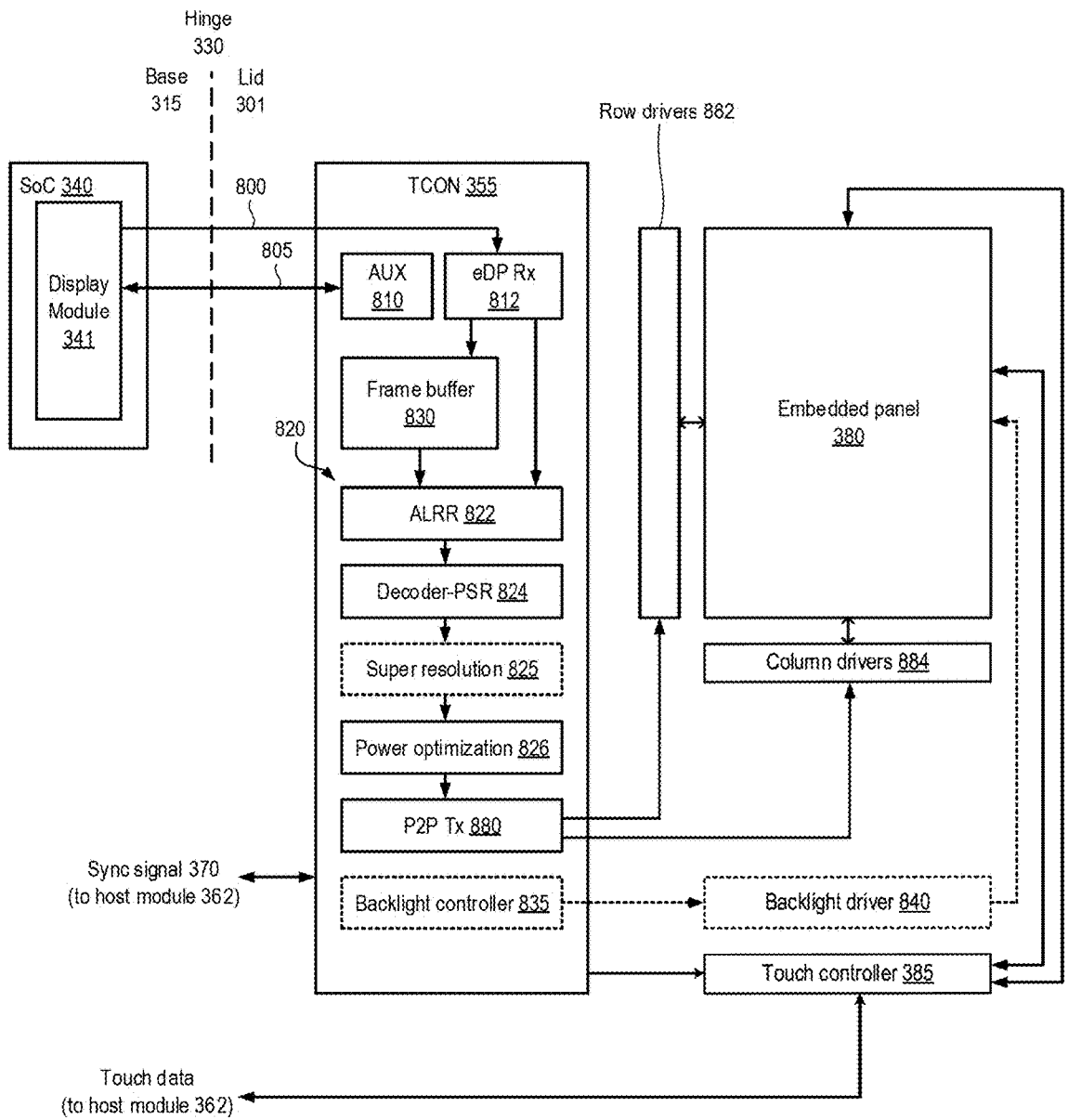
FIG. 8 illustrates a block diagram of the timing controller, embedded display panel, and additional electronics used in conjunction with the lid controller hub of FIG. 3

FIG. 8 illustrates a block diagram of the timing controller, embedded display panel, and additional electronics used in conjunction with the lid controller hub of FIG. 3. The timing controller 355 receives video data from the display module 341 of the SoC 340 over an eDP connection comprising a plurality of main link lanes 800 and an auxiliary (AUX) channel 805. Video data and auxiliary channel information provided by the display module 341 is received at the TCON 355 by an eDP main link receiver 812 and an auxiliary channel receiver 810 and. A timing controller processing stack 820 comprises one or more modules responsible for pixel processing and converting the video data sent from the display module 341 into signals that drive the control circuitry of the display panel 380, (e.g., row drivers 882, column drivers 884). Video data can be processed by timing controller processing stack 820 without being stored in a frame buffer 830 or video data can be stored in the frame buffer 830 before processing by the timing controller processing stack 820. The frame buffer 830 stores pixel information for one or more video frames (or frames, as used herein, the terms "image" and "frame" are used interchangeably). For example, in some embodiments, a frame buffer can store the color information for pixels in a video frame to be displayed on the panel.

The timing controller processing stack 820 comprises an autonomous low refresh rate module (ALRR) 822, a decoder-panel self-refresh (decoder-PSR) module 839, and a power optimization module 826. The ALRR module 822 can dynamically adjust the refresh rate of the display 380. In some embodiments, the ALRR module 822 can adjust the display refresh rate between 20 Hz and 120 Hz. The ALRR module 822 can implement various dynamic refresh rate approaches, such as adjusting the display refresh rate based on the frame rate of received video data, which can vary in gaming applications depending on the complexity of images being rendered. A refresh rate determined by the ALRR module 822 can be provided to the host module as the synchronization signal 370. In some embodiments, the synchronization signal comprises an indication that a display refresh is about to occur. In some embodiments, the ALRR module 822 can dynamically adjust the panel refresh rate by adjusting the length of the blanking period. In some embodiments, the ALRR module 822 can adjust the panel refresh rate based on information received from the host module 362. For example, in some embodiments, the host module 362 can send information to the ALRR module 822 indicating that the refresh rate is to be reduced if the vision/imaging module 363 determines there is no user in front of the camera. In some embodiments, the host module 362 can send information to the ALRR module 822 indicating that the refresh rate is to be increased if the host module 362 determines that there is touch interaction at the panel 380 based on touch sensor data received from the touch controller 385.

In some embodiments, the decoder-PSR module 839 can comprise a Video Electronics Standards Association (VESA) Display Streaming Compression (VDSC) decoder that decodes video data encoded using the VDSC compression standard. In other embodiments, the decoder-panel self-refresh module 839 can comprise a panel self-refresh (PSR) implementation that, when enabled, refreshes all or a portion of the display panel 380 based on video data stored in the frame buffer and utilized in a prior refresh cycle. This can allow a portion of the display pipeline leading up to the frame buffer to enter into a low-power state. In some embodiments, the decoder-panel self-refresh module 839 can be the PSR feature implemented in eDP v1.3 or the PSR2 feature implemented in eDP v1.4. In some embodiments, the TCON can achieve additional power savings by entering a zero or low refresh state when the mobile computing device operating system is being upgraded. In a zero-refresh state, the timing controller does not refresh the display. In a low refresh state, the timing controller refreshes the display at a slow rate (e.g., 20 Hz or less).

In some embodiments, the timing controller processing stack 820 can include a super resolution module 825 that can downscale or upscale the resolution of video frames provided by the display module 341 to match that of the display panel 380. For example, if the embedded panel 380 is a 3K×2K panel and the display module 341 provides 4K video frames rendered at 4K, the super resolution module 825 can downscale the 4K video frames to 3K×2K video frames. In some embodiments, the super resolution module 825 can upscale the resolution of videos. For example, if a gaming application renders images with a 1360×768 resolution, the super resolution module 825 can upscale the video frames to 3K×2K to take full advantage of the resolution capabilities of the display panel 380. In some embodiments, a super resolution module 825 that upscales video frames can utilize one or more neural network models to perform the upscaling.

The power optimization module 826 comprises additional algorithms for reducing power consumed by the TCON 355.

In some embodiments, the power optimization module 826 comprises a local contrast enhancement and global dimming module that enhances the local contrast and applies global dimming to individual frames to reduce power consumption of the display panel 380.

In some embodiments, the timing controller processing stack 820 can comprise more or fewer modules than shown in FIG. 8. For example, in some embodiments, the timing controller processing stack 820 comprises an ALRR module and an eDP PSR2 module but does not contain a power optimization module. In other embodiments, modules in addition to those illustrated in FIG. 8 can be included in the timing controller stack 820. The modules included in the timing controller processing stack 820 can depend on the type of embedded display panel 380 included in the lid 301. For example, if the display panel 380 is a backlit liquid crystal display (LCD), the timing controller processing stack 820 would not include a module comprising the global dimming and local contrast power reduction approach discussed above as that approach is more amenable for use with emissive displays (displays in which the light emitting elements are located in individual pixels, such as QLED, OLED, and micro-LED displays) rather than backlit LCD displays. In some embodiments, the timing controller processing stack 820 comprises a color and gamma correction module.

After video data has been processed by the timing controller processing stack 820, a P2P transmitter 880 converts the video data into signals that drive control circuitry for the display panel 380. The control circuitry for the display panel 380 comprises row drivers 882 and column drivers 884 that drive rows and columns of pixels in a display 380 within the embedded panel 380 to control the color and brightness of individual pixels.

In embodiments where the embedded panel 380 is a backlit LCD display, the TCON 355 can comprise a backlight controller 835 that generates signals to drive a backlight driver 840 to control the backlighting of the display panel 380. The backlight controller 835 sends signals to the backlight driver 840 based on video frame data representing the image to be displayed on the panel 380. The backlight controller 835 can implement low-power features such as turning off or reducing the brightness of the backlighting for those portions of the panel (or the entire panel) if a region of the image (or the entire image) to be displayed is mostly dark. In some embodiments, the backlight controller 835 reduces power consumption by adjusting the chroma values of pixels while reducing the brightness of the backlight such that there is little or no visual degradation perceived by a viewer. In some embodiments the backlight is controlled based on signals send to the lid via the eDP auxiliary channel, which can reduce the number of wires sent across the hinge 330.

The touch controller 385 is responsible for driving the touchscreen technology of the embedded panel 380 and collecting touch sensor data from the display panel 380. The touch controller 385 can sample touch sensor data periodically or aperiodically and can receive control information from the timing controller 355 and/or the lid controller hub 305. The touch controller 385 can sample touch sensor data at a sampling rate similar or close to the display panel refresh rate. The touch sampling can be adjusted in response to an adjustment in the display panel refresh rate. Thus, if the display panel is being refreshed at a low rate or not being refreshed at all, the touch controller can be placed in a low-power state in which it is sampling touch sensor data at a low rate or not at all. When the computing device exits the low-power state in response to, for example, the vision/ imaging module 363 detecting a user in the image data being continually analyzed by the vision/imaging module 363, the touch controller 385 can increase the touch sensor sampling rate or begin sampling touch sensor data again. In some embodiments, as will be discussed in greater detail below, the sampling of touch sensor data can be synchronized with the display panel refresh rate, which can allow for a smooth and responsive touch experience. In some embodiments, the touch controller can sample touch sensor data at a rate that is independent from the display refresh rate.

Although the timing controllers 250 and 355 of FIGS. 2 and 3 are illustrated as being separate from lid controller hubs 260 and 305, respectively, any of the timing controllers described herein can be integrated onto the same die, package, or printed circuit board as a lid controller hub. Thus, reference to a lid controller hub can refer to a component that includes a timing controller and reference to a timing controller can refer to a component within a lid controller hub. FIGS. 10A-10D illustrate various possible physical relationships between a timing controller and a lid controller hub.

In some embodiments, a lid controller hub can have more or fewer components and/or implement fewer features or capabilities than the LCH embodiments described herein. For example, in some embodiments, a mobile computing device may comprise an LCH without an audio module and perform processing of audio sensor data in the base. In another example, a mobile computing device may comprise an LCH without a vision/imaging module and perform processing of image sensor data in the base.

FIG. 9 illustrates a block diagram illustrating an example physical arrangement of components in a mobile computing device comprising a lid controller hub. The mobile computing device 900 comprises a base 910 connected to a lid 920 via a hinge 930. The base 910 comprises a motherboard 912 on which an SoC 914 and other computing device components are located. The lid 920 comprises a bezel 922 that extends around the periphery of a display area 939, which is the active area of an embedded display panel 926 located within the lid, e.g., the portion of the embedded display panel that displays content. The lid 920 further comprises a pair of microphones 927 in the upper left and right corners of the lid 920, and a sensor module 928 located along a center top portion of the bezel 922. The sensor module 928 comprises a front-facing camera 932. In some embodiments, the sensor module 928 is a printed circuit board on which the camera 932 is mounted. The lid 920 further comprises panel electronics 940 and lid electronics 950 located in a bottom portion of the lid 920. The lid electronics 950 comprises a lid controller hub 954 and the panel electronics 940 comprises a timing controller 944. In some embodiments the lid electronics 950 comprises a printed circuit board on which the LCH 954 in mounted. In some embodiments the panel electronics 940 comprises a printed circuit board upon which the TCON 944 and additional panel circuitry is mounted, such as row and column drivers, a backlight driver (if the embedded display is an LCD backlit display), and a touch controller. The timing controller 944 and the lid controller hub 954 communicate via a connector 958 which can be a cable connector connecting two circuit boards. The connector 958 can carry the synchronization signal that allows for touch sampling activities to be synchronized with the display refresh rate. In some embodiments, the LCH 954 can deliver power to the TCON 944 and other electronic components that are part of the panel electronics 940 via the connector 958. A sensor data cable 970 carries image sensor data generated by the camera 932, audio sensor data generated by the microphones 927, a touch sensor data generated by the touchscreen technology to the lid controller hub 954. Wires carrying audio signal data generated by the microphones 927 can extend from the microphones 927 in the upper and left corners of the lid to the sensor module 928, where they aggregated with the wires carrying image sensor data generated by the camera 932 and delivered to the lid controller hub 954 via the sensor data cable 970.

The hinge 930 comprises a left hinge portion 980 and a right hinge portion 982. The hinge 930 physically couples the lid 920 to the base 910 and allows for the lid 920 to be rotated relative to the base. The wires connecting the lid controller hub 954 to the base 910 pass through one or both of the hinge portions 980 and 982. Although shown as comprising two hinge portions, the hinge 930 can assume a variety of different configurations in other embodiments. For example, the hinge 930 could comprise a single hinge portion or more than two hinge portions, and the wires that connect the lid controller hub 954 to the SoC 914 could cross the hinge at any hinge portion. With the number of wires crossing the hinge 930 being less than in existing laptop devices, the hinge 930 can be less expensive and simpler component relative to hinges in existing laptops.

In other embodiments, the lid 920 can have different sensor arrangements than that shown in FIG. 9. For example, the lid 920 can comprise additional sensors such as additional front-facing cameras, a front-facing depth sensing camera, an infrared sensor, and one or more world-facing cameras. In some embodiments, the lid 920 can comprise additional microphones located in the bezel, or just one microphone located on the sensor module. The sensor module 928 can aggregate wires carrying sensor data generated by additional sensors located in the lid and deliver them to the sensor data cable 970, which delivers the additional sensor data to the lid controller hub 954.

In some embodiments, the lid comprises in-display sensors such as in-display microphones or in-display cameras. These sensors are located in the display area 939, in pixel area not utilized by the emissive elements that generate the light for each pixel and are discussed in greater detail below. The sensor data generated by in-display cameras and in-display microphones can be aggregated by the sensor module 928 as well as other sensor modules located in the lid and deliver the sensor data generated by the in-display sensors to the lid controller hub 954 for processing.

In some embodiments, one or more microphones and cameras can be located in a position within the lid that is convenient for use in an "always-on" usage scenario, such as when the lid is closed. For example, one or more microphones and cameras can be located on the "A cover" of a laptop or other world-facing surface (such as a top edge or side edge of a lid) of a mobile computing device when the device is closed to enable the capture and monitoring of audio or image data to detect the utterance of a wake word or phrase or the presence of a person in the field of view of the camera.

Figure 10A:
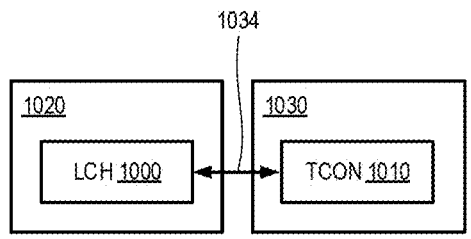
FIGS. 10A-10E illustrates block diagrams of example timing controller and lid controller hub physical arrangements within a lid.
Figure 10B:
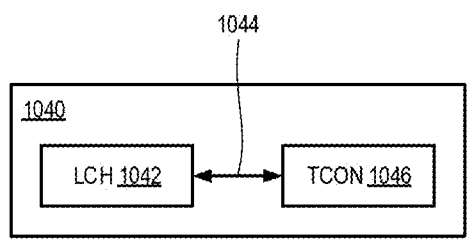

FIGS. 10A-10E illustrate block diagrams of example timing controller and lid controller hub physical arrangements within a lid. FIG. 10A illustrates a lid controller hub 1000 and a timing controller 1010 located on a first module 1020 that is physically separate from a second module 1030. In some embodiments, the first and second modules 1020 and 1030 are printed circuit boards. The lid controller hub 1000 and the timing controller 1010 communicate via a connection 1034. FIG. 10B illustrates a lid controller hub 1042 and a timing controller 1046 located on a third module 1040. The LCH 1042 and the TCON 1046 communicate via a connection 1044. In some embodiments, the third module 1040 is a printed circuit board and the connection 1044 comprises one or more printed circuit board traces. One advantage to taking a modular approach to lid controller hub and timing controller design is that it allows timing controller vendors to offer a single timing controller that works with multiple LCH designs having different feature sets.

Figure 10C:
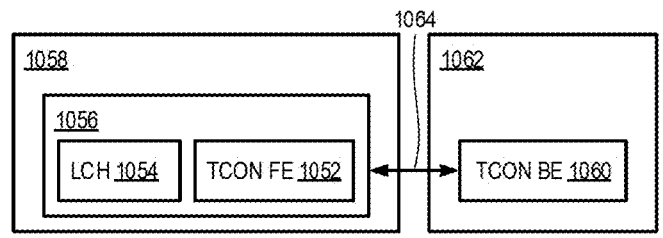

FIG. 10C illustrates a timing controller split into front end and back end components. A timing controller front end (TCON FE) 1052 and a lid controller hub 1054 are integrated in or are co-located on a first common component 1056. In some embodiments, the first common component 1056 is an integrated circuit package and the TCON FE 1052 and the LCH 1054 are separate integrated circuit die integrated in a multi-chip package or separate circuits integrated on a single integrated circuit die. The first common component 1056 is located on a fourth module 1058 and a timing controller back end (TCON BE) 1060 is located on a fifth module 1062. The timing controller front end and back end components communicate via a connection 1064. Breaking the timing controller into front end and back end components can provide for flexibility in the development of timing controllers with various timing controller processing stacks. For example, a timing controller back end can comprise modules that drive an embedded display, such as the P2P transmitter 880 of the timing controller processing stack 820 in FIG. 8 and other modules that may be common to various timing controller frame processor stacks, such as a decoder or panel self-refresh module. A timing controller front end can comprise modules that are specific for a particular mobile device design. For example, in some embodiments, a TCON FE comprises a power optimization module 826 that performs global dimming and local contrast enhancement that is desired to be implemented in specific laptop models, or an ALRR module where it is convenient to have the timing controller and lid controller hub components that work in synchronization (e.g., via synchronization signal 370) to be located closer together for reduced latency.

Figure 10D:
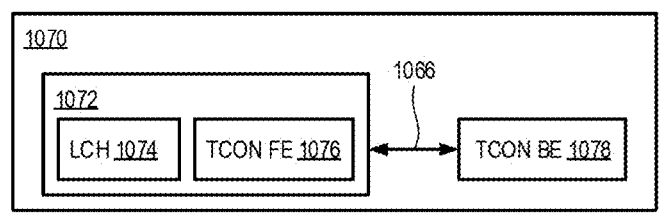
Figure 10E:
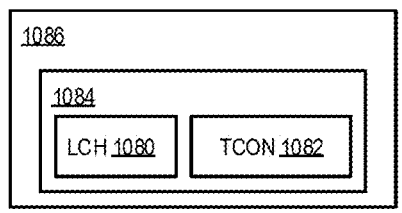

FIG. 10D illustrates an embodiment in which a second common component 1072 and a timing controller back end 1078 are located on the same module, a sixth module 1070, and the second common component 1072 and the TCON BE 1078 communicate via a connection 1066. FIG. 10E illustrates an embodiment in which a lid controller hub 1080 and a timing controller 1082 are integrated on a third common component 1084 that is located on a seventh module 1086. In some embodiments, the third common component 1084 is an integrated circuit package and the LCH 1080 and TCON 1082 are individual integrated circuit die packaged in a multi-chip package or circuits located on a single integrated circuit die. In embodiments where the lid controller hub and the timing controller are located on physically separate modules (e.g., FIG. 10A, FIG. 10C), the connection between modules can comprise a plurality of wires, a flexible printed circuit, a printed circuit, or by one or more other components that provide for communication between modules.

The modules and components in FIGS. 10C-10E that comprise a lid controller hub and a timing controller (e.g., fourth module 1058, second common component 1072, and third common component 1084) can be referred to a lid controller hub.

FIGS. 11A-11C show tables breaking down the hinge wire count for various lid controller hub embodiments. The display wires deliver video data from the SoC display module to the LCH timing controller, the image wires deliver image sensor data generated by one or more lid cameras to the SoC image processing module, the touch wires provide touch sensor data to the SoC integrated sensor hub, the audio and sensing wires provide audio sensor data to the SoC audio capture module and other types sensor data to the integrated sensor hub, and the additional set of "LCH" wires provide for additional communication between the LCH and the SoC. The type of sensor data provided by the audio and sensing wires can comprise visual sensing data generated by vision-based input sensors such as fingerprint sensors, blood vessel sensors, etc. In some embodiment, the vision sensing data can be generated based on information generated by one or more general-purpose cameras rather than a dedicated biometric sensor, such as a fingerprint sensor.

Table 1100 shows a wire breakdown for a 72-wire embodiment. The display wires comprise 19 data wires and 16 power wires for a total of 35 wires to support four eDP HBR2 lanes and six signals for original equipment manufacturer (OEM) use. The image wires comprise six data wires and eight power wires for a total of 14 wires to carry image sensor data generated by a single 1-megapixel camera. The touch wires comprise four data wires and two power wires for a total of six wires to support an I2C connection to carry touch sensor data generated by the touch controller. The audio and sensing wires comprise eight data wires and two power wires for a total of ten wires to support DMIC and I2C connections to support audio sensor data generated by four microphones, along with a single interrupt (INT) wire. Seven additional data wires carry additional information for communication between the LCH and SoC over USB and QSPI connections.

Table 1110 shows a wire breakdown for a 39-wire embodiment in which providing dedicated wires for powering the lid components and eliminating various data signals contribute to the wire count reduction. The display wires comprise 14 data wires and 4 power wires for a total of 18 wires that support two eDP HBR2 lines, six OEM signals and power delivery to the lid. The power provided over the four power wires power the lid controller hub and the other lid components. Power resources in the lid receive the power provided over the dedicated power wires from the base and control the delivery of power to the lid components. The image wires, touch wires, and audio & sensing wires comprise the same number of data wires as in the embodiment illustrated in table 1100, but do not comprise power wires due power being provided to the lid separately. Three additional data wires carry additional information between the LCH and the SoC, down from seven in the embodiment illustrated in table 1100.

Table 1120 shows a wire breakdown for a 29-wire embodiment in which further wire count reductions are achieved by leveraging the existing USB bus to also carry touch sensor data and eliminating the six display data wires carrying OEM signals. The display wires comprise eight data wires and four power wires for a total of 12 wires. The image wires comprise four data wires each for two cameras—a 2-megapixel RGB (red-green-blue) camera and an infrared (IR) camera. The audio & sensing comprise four wires (less than half the embodiment illustrated in table 1110) to support a SoundWire® connection to carry audio data for four microphones. There are no wires dedicated to the transmission of touch sensor data and five wires are used to communicate the touch sensor data. Additional information is to be communicated between the LCH and SoC via a USB connection. Thus, tables 1100 and 1120 illustrate wire count reductions that are enabled by powering the lid via a set of dedicated power wires, reducing the number of eDP channels, leveraging an existing connection (USB) to transport touch sensor data, and eliminating OEM-specific signals. Further reduction in the hinge wire count can be realized via streaming video data from the base to the lid, and audio sensor data, touch sensor data, image sensor data, and sensing data from the lid to the base over a single interface. In some embodiments, this single connection can comprise a PCIe connection.

In embodiments other than those summarized in tables 1100, 1110, and 1120, a hinge can carry more or fewer total wires, more or fewer wires to carry signals of each type listed type (display, image, touch, audio & sensing, etc.), and can utilize connection and interface technologies other than those shown in tables 1100, 1100, and 1120.

Figure 12A:
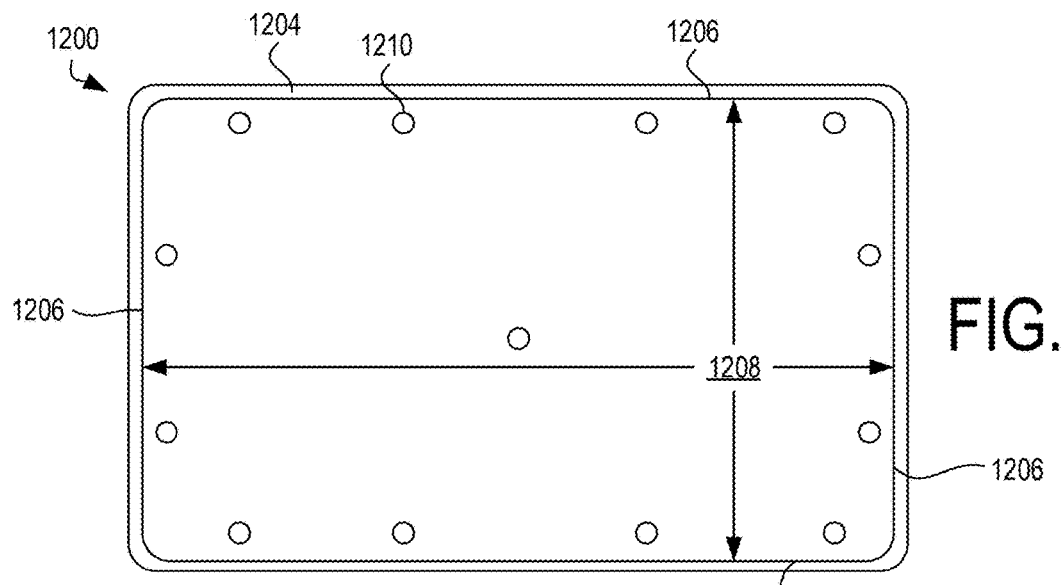
FIGS. 12A-12C illustrate example arrangements of in-display microphones and cameras in a lid.
Figure 12B:
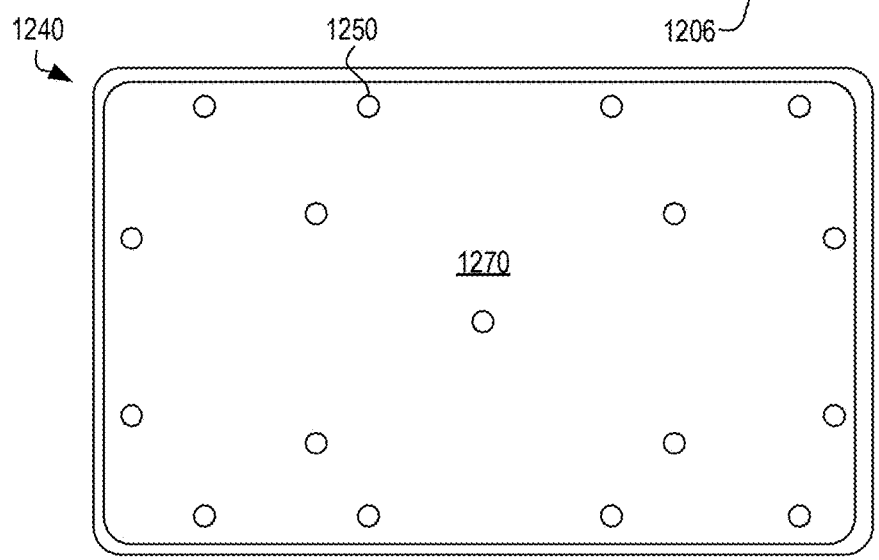
Figure 12C:
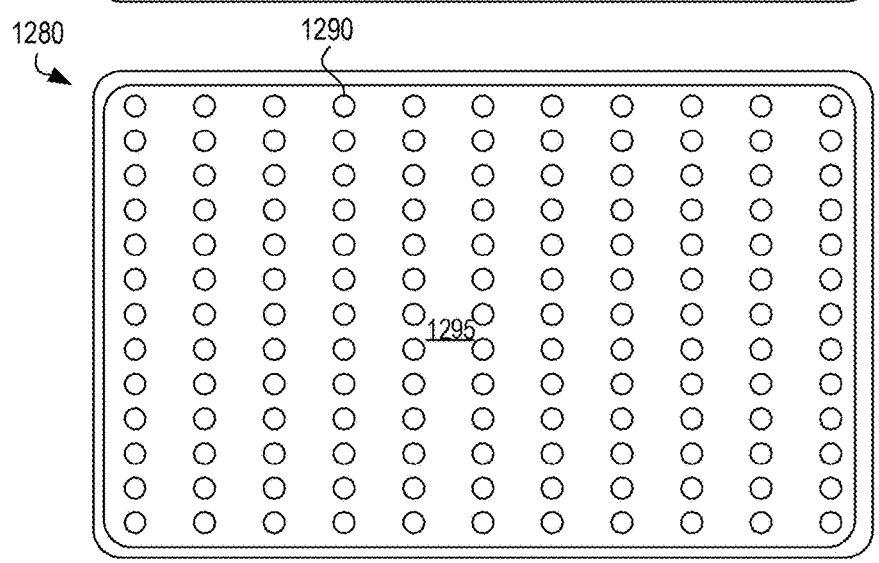

As mentioned earlier, a lid can comprise in-display cameras and in-display microphones in addition to cameras and microphones that are located in the lid bezel. FIGS. 12A-12C illustrate example arrangements of in-display microphones and cameras in a lid. FIG. 12A illustrates a lid 1200 comprising a bezel 1204, in-display microphones 1210, and a display area 1208. The bezel 1204 borders the display area 1208, which is defined by a plurality of pixels that reside on a display substrate (not shown). The pixels extend to interior edges 1206 of the bezel 1204 and the display area 1028 thus extends from one interior bezel edge 1206 to the opposite bezel edge 1206 in both the horizontal and vertical directions. The in-display microphones 1210 share real estate with the pixel display elements, as will be discussed in greater detail below. The microphones 1210 include a set of microphones located in a peripheral region of a display area 1208 and a microphone located substantially in the center of the display area 1208. FIG. 12B illustrates a lid 1240 in which in-display microphones 1400 include a set of microphones located in a peripheral region of a display area 1270, a microphone located at the center of the display area 1270, and four additional microphones distributed across the display area 1270. FIG. 12C illustrates a lid 1280 in which an array of in-display microphones 1290 are located within a display area 1295 of the lid 1280. In other embodiments, a display can have a plurality of in-display microphones that vary in number and arrangement from the example configurations shown in FIGS. 12A-12C.

FIGS. 12A-12C also illustrate example arrangements of front-facing cameras in an embedded display panel, with 1210, 1400, and 1290 representing in-display cameras instead of microphones. In some embodiments, an embedded display panel can comprise a combination of in-display microphones and cameras. An embedded display can comprise arrangements of in-display cameras or combinations of in-display cameras and in-display microphones that vary in number and arrangement from the example configurations shown in FIGS. 12A-12C.

Figure 13A:
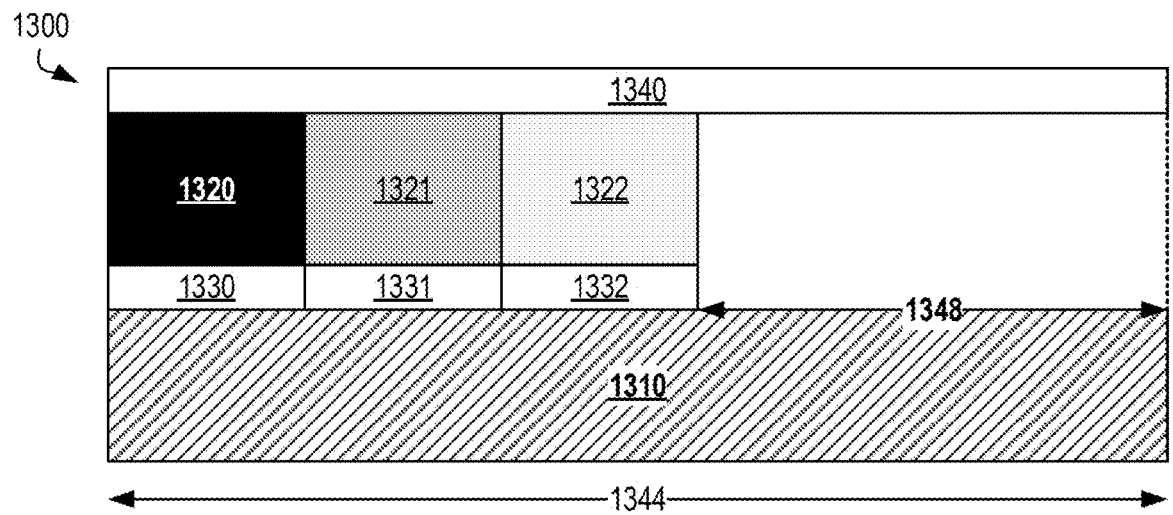
FIGS. 13A-13B illustrate simplified cross-sections of pixels in an example emissive display.
Figure 13B:
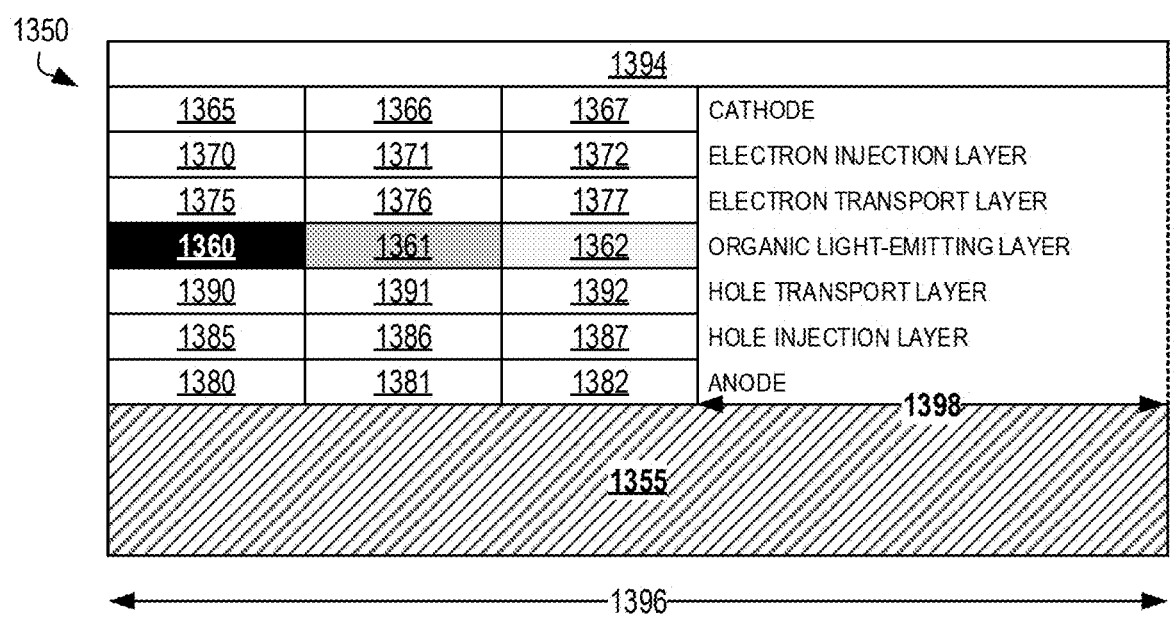

FIGS. 13A-13B illustrate simplified cross-sections of pixels in an example emissive display. FIG. 13A illustrates a simplified illustration of the cross-section of a pixel in an example micro-LED display. Micro-LED pixel 1300 comprises a display substrate 1310, a red LED 1320, a green LED 1321, a blue LED 1322, electrodes 1330-1332, and a transparent display medium 1340. The LEDs 1320-1322 are the individual light-producing elements for the pixel 1300, with the amount of light produced by each LED 1320-1322 being controlled by the associated electrode 1330-1332.

The LED stacks (red LED stack (layers 1320 and 1330), green LED stack (layers 1321 and 1331) and blue LED stack (layers 1322 and 1332)) can be manufactured on a substrate using microelectronic manufacturing technologies. In some embodiments, the display substrate 1310 is a substrate different from the substrate upon which the LEDs stacks are manufactured and the LED stacks are transferred from the manufacturing substrate to the display substrate 1310. In other embodiments, the LED stacks are grown directly on the display substrate 1310. In both embodiments, multiple pixels can be located on a single display substrate and multiple display substrates can be assembled to achieve a display of a desired size.

The pixel 1300 has a pixel width 1344, which can depend on, for example, display resolution and display size. For example, for a given display resolution, the pixel width 1344 can increase with display size. For a given display size, the pixel width 1344 can decrease with increased resolution. The pixel 1300 has an unused pixel area 1348, which is part of the black matrix area of a display. In some displays, the combination of LED size, display size, and display resolution can be such that the unused pixel area 1348 can be large enough to accommodate the integration of components, such as microphones, within a pixel.

FIG. 13B illustrates a simplified illustration of the cross-section of a pixel in an example OLED display. OLED pixel 1350 comprises a display substrate 1355, organic light-emitting layers 1360-1362, which are capable of producing red (layer 1360), green (layer 1361) and blue (layer 1362) light, respectively. The OLED pixel 1350 further comprises cathode layers 1365-1367, electron injection layers 1370-1372, electron transport layers 1375-1377, anode layers 1380-1382, hole injections layers 1385-1387, hole transport layers 1390-1392, and a transparent display medium 1394. The OLED pixel 1350 generates light through application of a voltage across the cathode layers 1365-1367 and anode layers 1380-1382, which results in the injection of electrons and holes into electron injection layers 1370-1372 and hole injection layers 1385-1387, respectively. The injected electrons and holes traverse the electron transport layers 1375-1377 and hole transport layers 1390-1392, respectively, and electron-hole pairs recombine in the organic light-emitting layers 1360-1362, respectively, to generate light.

Similar to the LED stacks in micro-LED displays, OLED stacks (red OLED stack (layers 1365, 1370, 1375, 1360, 1390, 1385, 1380), green OLED stack (layers 1366, 1371, 1376, 1361, 1391, 1386, 1381), and blue OLED stack (layers 1367, 1372, 1377, 1362, 1392, 1387, 1382), can be manufactured on a substrate separate from the display substrate 1355. In some embodiments, the display substrate 1355 is a substrate different from the substrate upon which the OLED stacks are transferred from the manufacturing substrate to the display substrate 1355. In other embodiments, the OLED stacks are directly grown on the display substrate 1355. In both types of embodiments, multiple display substrate components can be assembled in order to achieve a desired display size. The transparent display mediums 1340 and 1394 can be any transparent medium such as glass, plastic or a film. In some embodiments, the transparent display medium can comprise a touchscreen.

Again, similar to the micro-LED pixel 1300, the OLED pixel 1350 has a pixel width 1396 that can depend on factors such as display resolution and display size. The OLED pixel 1350 has an unused pixel area 1398 and in some displays, the combination of OLED stack widths, display size, and display resolution can be such that the unused pixel area 1398 is large enough to accommodate the integration of components, such as microphones, within a pixel.

As used herein, the term "display substrate" can refer to any substrate used in a display and upon which pixel display elements are manufactured or placed. For example, the display substrate can be a backplane manufactured separately from the pixel display elements (e.g., micro-LED/OLEDs in pixels 1300 and 1350) and upon which pixel display elements are attached, or a substrate upon which pixel display elements are manufactured.

FIG. 14A illustrates a set of example pixels with integrated microphones. Pixels 1401-1406 each have a red display element 1411, green display element 1412, and blue display element 1413, which can be, for example, micro-LEDs or OLEDs. Each of the pixels 1401-1406 occupies a pixel area. For example, the pixel 1404 occupies pixel area 1415. The amount of pixel area occupied by the display elements 1411-1413 in each pixel leaves enough remaining black matrix space for the inclusion of miniature microphones. Pixels 1401 and 1403 contain front-facing microphones 1420 and 1421, respectively, located alongside the display elements 1411-1413. As rear-facing microphones are located on the back side of the display substrate, they are not constrained by unused pixel area or display element size and can be placed anywhere on the back side of a display substrate. For example, rear-facing microphone 1422 straddles pixels 1402 and 1403.

FIG. 14B illustrates a cross-section of the example pixels of FIG. 14A taken along the line A-A'. Cross-section 1450 illustrates the cross-section of pixels 1401-1403. Green display elements 1412 and corresponding electrodes 1430 for the pixels 1401-1403 are located on display substrate 1460. The pixels 1401-1403 are covered by transparent display medium 1470 that has holes 1474 above microphones 1420 and 1421 to allow for acoustic vibrations reaching a display surface 1475 to reach the microphones 1420 and 1421. The rear-facing microphone 1422 is located on the back side of the display substrate 1460. In some embodiments, a display housing (not shown) in which pixels 1401-1403 are located has vents or other openings to allow acoustic vibrations reaching the back side of the housing to reach rear-facing microphone 1422.

In some embodiments, the microphones used in the technologies described herein can be discrete microphones that are manufactured or fabricated independently from the pixel display elements and are transferred from a manufacturing substrate or otherwise attached to a display substrate. In other embodiments, the microphones can be fabricated directly on the display substrate. Although front-facing microphones are shown as being located on the surface of the display substrate 1460 in FIG. 14B, in embodiments where the microphones are fabricated on a display substrate, they can reside at least partially within the display substrate.

As used herein, the term "located on" in reference to any sensors (microphones, piezoelectric elements, thermal sensors) with respect to the display substrate refers to sensors that are physically coupled to the display substrate in any manner (e.g., discrete sensors that are directly attached to the substrate, discrete sensors that are attached to the substrate via one or more intervening layers, sensors that have been fabricated on the display substrate). As used herein, the term "located on" in reference to LEDs with respect to the display substrate similarly refers to LEDs that are physically coupled to the display substrate in any manner (e.g., discrete LEDs that are directly attached to the substrate, discrete LEDs that are attached to the substrate via one or more intervening layers, LEDs that have been fabricated on the display substrate). In some embodiments, front-facing microphones are located in the peripheral area of a display to reduce any visual distraction that holes in the display above the front-facing microphones (such as holes 1474) may present to a user. In other embodiments, holes above a microphone may small enough or few enough in number such that they present little or no distraction from the viewing experience.

Although the front-facing microphones 1420 and 1421 are each shown as residing within one pixel, in other embodiments, front-facing microphones can straddle multiple pixels. This can, for example, allow for the integration of larger microphones into a display area or for microphones to be integrated into a display with smaller pixels. FIGS. 14C-14D illustrate example microphones that span multiple pixels. FIG. 14C illustrates adjacent pixels 1407 and 1408 having the same size as pixels 1401-1406 and a front-facing microphone 1440 that is bigger than front-facing microphones 1420-1421 and occupies pixel area not used by display elements in two pixels. FIG. 14D illustrates adjacent pixels 1409 and 1410 that are narrower in width than pixels 1401-1406 and a front-facing microphone 1426 that spans both pixels. Using larger microphones can allow for improved acoustic performance of a display, such as allowing for improved acoustic detection. Displays that have many integrated miniature microphones distributed across the display area can have acoustic detection capabilities that exceed displays having just one or a few discrete microphones located in the display bezel.

In some embodiments, the microphones described herein are MEMS (microelectromechanical systems) microphones. In some embodiments, the microphones generate analog audio signals that are provided to the audio processing components and in other embodiments, the microphones provide digital audio signals to the audio processing components. Microphones generating digital audio signals can contain a local analog-to-digital converter and provide a digital audio output in pulse-density modulation (PDM), I2S (Inter-IC Sound), or other digital audio signal formats. In embodiments where the microphones generate digital audio signals, the audio processing components may not comprise analog-to-digital converters. In some embodiments, the integrated microphones are MEMS PDM microphones having dimensions of approximately 3.5 mm (width)×2.65 mm (length)×0.98 mm (height).

As microphones can be integrated into individual pixels or across several pixels using the technologies described herein, a wide variety of microphone configurations can be incorporated into a display. FIGS. 12A-12C and 14A-14D illustrate several microphone configurations and many more are possible. The display-integrated microphones described herein generate audio signals that are sent to the audio module of a lid controller hub (e.g., audio module 364 in FIGS. 3 and 7).

Displays with microphones integrated into the display area as described herein can perform various audio processing tasks. For example, displays in which multiple front-facing microphones are distributed over the display area can perform beamforming or spatial filtering on audio signals generated by the microphones to allow for far-field capabilities (e.g., enhanced detection of sound generated by a remote acoustic source). Audio processing components can determine the location of a remote audio source, select a subset of microphones based on the audio source location, and utilize audio signals from the selected subset of microphones to enhance detection of sound received at the display from the audio source. In some embodiments, the audio processing components can determine the location of an audio source by determining delays to be added to audio signals generated by various combinations of microphones such that the audio signals overlap in time and then inferring the distance to the audio source from each microphone in the combination based on the added delay to each audio signal. By adding the determined delays to the audio signals provided by the microphones, audio detection in the direction of the remote audio source can be enhanced. A subset of the total number of microphones in a display can be used in beamforming or spatial filtering, and microphones not included in the subset can be powered off to reduce power. Beamforming can similarly be performed using rear-facing microphones distributed across the back side of the display substrate. As compared to displays having a few microphones incorporated into a display bezel, displays with microphones integrated into the display area are capable of improved beamforming due to the greater number of microphones that can be integrated into the display and being spread over a greater area.

In some embodiments, a display is configured with a set of rear-facing microphones distributed across the display area that allows for a closeable device incorporating the display to have audio detection capabilities when the display is closed. For example, a closed device can be in a low-power mode in which the rear-facing microphones and audio processing components capable of performing wake phrase or word detection or identifying a particular user (Speaker ID) are enabled.

In some embodiments, a display comprising both front- and rear-facing microphones can utilize both types of microphones for noise reduction, enhanced audio detection (far field audio), and enhanced audio recording. For example, if a user is operating a laptop in a noisy environment, such as a coffee shop or cafeteria, audio signals from one or more rear-facing microphones picking up ambient noise can be used to reduce noise in an audio signal provided by a front-facing microphone containing the voice of the laptop user. In another example, an audio recording made by a device containing such a display can include audio received by both front- and rear-facing microphones. By including audio captured by both front- and rear-facing microphones, such a recording can provide a more accurate audio representation of the recorded environment. In further examples, a display comprising both front- and rear-facing microphones can provide for 360-degree far field audio reception. For example, the beamforming or spatial filtering approaches described herein can be applied to audio signals provided by both front- and rear-facing microphones to provide enhanced audio detection.

Displays with integrated microphones located within the display area have advantages over displays with microphones located in a display bezel. Displays with microphones located in the display area can have a narrower bezel as bezel space is not needed for housing the integrated microphones. Displays with reduced bezel width can be more aesthetically pleasing to a viewer and allow for a larger display area within a given display housing size. The integration of microphones in a display area allows for a greater number of microphones to be included in a device, which can allow for improved audio detection and noise reduction. Moreover, displays that have microphones located across the display area allow for displays with enhanced audio detection capabilities through the use of beamforming or spatial filtering of received audio signals as described above. Further, the cost and complexity of routing audio signals from microphones located in the display area to audio processing components that are also located in the display area can be less than wiring discrete microphones located in a display bezel to audio processing components located external to the display.

FIG. 15A illustrates a set of example pixels with in-display cameras. Pixels 1501-1506 each have a red display element 1511, green display element 1512, and blue display element 1513. In some embodiments, these display elements are micro-LEDs or OLEDs. Each of the pixels 1501-1506 occupies a pixel area. For example, the pixel 1504 occupies pixel area 1515. The amount of pixel area occupied by the display elements 1511-1513 in each pixel leaves enough remaining black matrix area for the inclusion of miniature cameras or other sensors. Pixels 1501 and 1503 contain cameras 1520 and 1521, respectively, located alongside the display elements 1511-1513. As used herein, the term "in-display camera" refers to a camera that is located in the pixel area of one or more pixels within a display. Cameras 1520 and 1521 are in-display cameras.

FIG. 15B illustrates a cross-section of the example pixels of FIG. 15A taken along the line A-A'. Cross-section 1550 illustrates a cross-section of pixels 1501-1503. The green display elements 1512 and the corresponding electrodes 1530 for the pixels 1501-1503 are located on display substrate 1560 and are located behind a transparent display medium 1570. A camera located in a display area can receive light that passes or does not pass through a transparent display medium. For example, the region of the transparent display medium 1570 above the camera 1520 has a hole in it to allow for light to hit the image sensor of the camera 1520 without having to pass through the transparent display medium. The region of the transparent display medium 1570 above the camera 1521 does not have a hole and the light reaching the image sensor in the camera 1521 passes through the transparent display medium.

In some embodiments, in-display cameras can be discrete cameras manufactured independently from pixel display elements and the discrete cameras are attached to a display substrate after they are manufactured. In other embodiments, one or more camera components, such as the image sensor can be fabricated directly on a display substrate. Although the cameras 1520-1521 are shown as being located on a front surface 1580 of the display substrate 1560 in FIG. 15B, in embodiments where camera components are fabricated on a display substrate, the cameras can reside at least partially within the display substrate.

As used herein, the term "located on" in reference to any sensors or components (e.g., cameras, thermal sensors) with respect to the display substrate refers to sensors or components that are physically coupled to the display substrate in any manner, such as discrete sensors or other components that are directly attached to the substrate, discrete sensors or components that are attached to the substrate via one or more intervening layers, and sensors or components that have been fabricated on the display substrate. As used herein, the term "located on" in reference to LEDs with respect to the display substrate similarly refers to LEDs that are physically coupled to the display substrate in any manner, such as discrete LEDs that are directly attached to the substrate, discrete LEDs that are attached to the substrate via one or more intervening layers, and LEDs that have been fabricated on the display substrate.

Although cameras 1520 and 1521 are shown as each residing within one pixel in FIGS. 15A and 15B, in other embodiments, in-display cameras can span multiple pixels. This can allow, for example, for the integration of larger cameras into a display area or for cameras to be integrated into a display with pixels having a smaller black matrix area. FIGS. 15C-15D illustrate example cameras that span multiple pixels. FIG. 15C illustrates adjacent pixels 1507 and 1508 having the same size as pixels 1501-1506 and a camera

1540 that is bigger than cameras 1520-1521 and that occupies a portion of the pixel area in the pixels 1507-1508. FIG. 15D illustrates adjacent pixels 1509 and 1510 that are narrower in width than pixels 1501-1506 and a camera 1526 that spans both pixels. Using larger cameras can allow for an improved image or video capture, such as for allowing the capture of higher-resolution images and video at individual cameras.

As cameras can be integrated into individual pixels or across several pixels, a wide variety of camera configurations can be incorporated into a display. FIGS. 12A-12C, and 15A-15D illustrate just a few camera configurations and many more are possible. In some embodiments, thousands of cameras could be located in the display area. Displays that have a plurality of in-display cameras distributed across the display area can have image and video capture capabilities exceeding those of displays having just one or a few cameras located in a bezel.

The in-display cameras described herein generate image sensor data that is sent to a vision/imaging module in a lid controller hub, such as vision/imaging module 363 in FIGS. 3 and 6. Image sensor data is the data that is output from the camera to other components. Image sensor data can be image data, which is data representing an image or video data, which is data representing video. Image data or video data can be in compressed or uncompressed form. Image sensor data can also be data from which image data or video data is generated by another component (e.g., the vision/imaging module 363 or any component therein).

The interconnections providing the image sensor data from the cameras to a lid controller hub can be located on the display substrate. The interconnections can be fabricated on the display substrate, attached to the display substrate, or physically coupled to the display substrate in any other manner. In some embodiments, display manufacture comprises manufacturing individual display substrate portions to which pixels are attached and assembling the display substrate portions together to achieve a desired display size.

Figure 16:
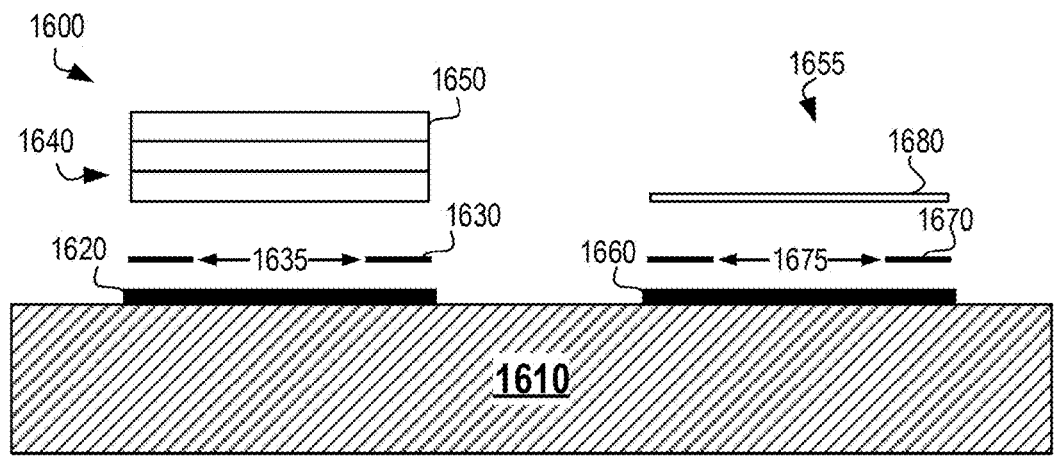
FIG. 16 illustrates example cameras that can be incorporated into an embedded display.

FIG. 16 illustrates example cameras that can be incorporated into an embedded display. A camera 1600 is located on a display substrate 1610 and comprises an image sensor 1620, an aperture 1630, and a microlens assembly 1640. The image sensor 1620 can be a CMOS photodetector or any other type of photodetector. The image sensor 1620 comprises a number of camera pixels, the individual elements used for capturing light in a camera, and the number of pixels in the camera can be used as a measure of the camera's resolution (e.g., 1 megapixel, 12 megapixels, 20 megapixels). The aperture 1630 has an opening width 1635. The microlens assembly 1640 comprises one or more microlenses 1650 that focus light to a focal point and which can be made of glass, plastic, or other transparent material. The microlens assembly 1640 typically comprises multiple microlenses to account for various types of aberrations (such as chromatic aberration) and distortions.

A camera 1655 is also located on display substrate 1610 and comprises an image sensor 1660, an aperture 1670 and a metalens 1680. The camera 1655 is similar to camera 1600 except for the use of a metalens instead of a microlens assembly as the focusing element. Generally, a metalens is a planar lens comprising physical structures on its surface that act to manipulate different wavelengths of light such they reach the same focal point. Metalenses do not produce the chromatic aberration that can occur with single existing microlenses. Metalenses can be much thinner than glass, plastic or other types of microlenses and can be fabricated using MEMS (microelectromechanical systems) or NEMS (nanoelectromechanical systems) approaches. As such, a camera comprising a single, thin metalens, such as the camera 1655 can be thinner than a camera comprising a microlens assembly comprising multiple microlenses, such as the camera 1600. The aperture 1670 has an opening width 1675.

The distance from the microlens assembly 1640 to image sensor 1620 and from the metalens 1680 to the image sensor 1660 defines the focal length of the cameras 1600 and 1655, respectively, and the ratio of the focal length to the aperture opening width (1635, 1675) defines the f-stop for the camera, a measure of the amount of light that reaches the surface of the image sensor. The f-stop is also a measure of the camera's depth of field, with small f-stop cameras having shallower depths of field and large f-stop cameras having deeper depths of field. The depth of field can have a dramatic effect on a captured image. In an image with a shallow depth of field it is often only the subject of the picture that is in focus whereas in an image with a deep depth of field, most objects are typically in focus.

In some embodiments, the cameras 1600 and 1655 are fixed-focus cameras. That is, their focal length is not adjustable. In other embodiments, the focal length of cameras 1600 and 1655 can be adjusted by moving the microlens assembly 1640 or the metalens 1680 either closer to or further away from the associated image sensor. In some embodiments, the distance of the microlens assembly 1640 or the metalens 1680 to their respective image sensors can be adjusted by MEMS-based actuators or other approaches.

In-display cameras can be distributed across a display area in various densities. For example, cameras can be located at 100-pixel intervals, 10-pixel intervals, in adjacent pixels, or in other densities. A certain level of camera density (how many cameras there are per unit area for a region of the display) may be desirable for a particular use case. For example, if the cameras are to be used for image and video capture, a lower camera density may suffice than if the cameras are to be used for touch detection or touch location determination.

In some embodiments, image data corresponding to images captured by multiple individual cameras can be utilized to generate a composite image. The composite image can have a higher resolution than any image capable of being captured by the individual cameras. For example, a system can utilize image data corresponding to images captured by several 3-megapixel cameras to produce a 6-megapixel image. In some embodiments, composite images or videos generated from images or videos captured by individual in-display cameras could have ultra-high resolution, such as in the gigapixel range. Composite images and videos could be used for ultra-high resolution self-photography and videos, ultra-high resolution security monitors, or other applications.

The generation of higher-resolution images from image data corresponding to images captured by multiple individual cameras can allow for individual cameras with lower megapixel counts to be located in the individual pixels. This can allow for cameras to be integrated into higher resolution displays for a given screen size or in smaller displays for a given resolution (where there are more pixels per unit area of display size and thus less free pixel area available to accommodate the integration of cameras at the pixel level). Composite images can be generated in real time as images are captured, with only the image data for the composite image being stored, or the image data for e images captured by the individual cameras can be stored and a composite image can be generated during post-processing. Composite video can be similarly generated using video data corresponding to videos generated by multiple individual cameras, with the composite video being generated in real time or during post-processing.

In some embodiments, in-display cameras can be used in place of touchscreens to detect an object (e.g., finger, stylus) touching the display surface and determining where on the display the touch has occurred. Some existing touchscreen technologies (e.g., resistance-based, capacitance-based) can add thickness to a display though the addition of multiple layers on top of a transparent display medium while others use in-cell or on-cell touch technologies to reduce display thickness. As used herein, the term "transparent display medium" includes touchscreen layers, regardless of whether the touchscreen layers are located on top of a transparent display medium or a transparent display medium is used as a touchscreen layer. Some existing touchscreen technologies employ transparent conductive surfaces laminated together with an isolation layer separating them. These additional layers add thickness to a display and can reduce the transmittance of light through the display. Eliminating the use of separate touchscreen layers can reduce display expense as the transparent conductors used in touchscreens are typically made of indium tin oxide, which can be expensive.

Touch detection and touch location determination can be performed using in-display cameras by, for example, detecting the occlusion of visible or infrared light caused by an object touching or being in close proximity to the display. A touch detection module, which can be located in the display or otherwise communicatively coupled to the display can receive images captured by in-display cameras and process the image data to detect one or more touches to the display surface and determine the location of the touches. Touch detection can be done by, for example, determining whether image sensor data indicates that the received light at an image sensor has dropped below a threshold. In another example, touch detection can be performed by determining whether image sensor data indicates that the received light at a camera has dropped by a determined percentage or amount. In yet another example, touch detection can be performed by determining whether image sensor data indicates that the received light at a camera has dropped by a predetermined percentage or amount within a predetermined amount of time.

Touch location determination can be done, for example, by using the location of the camera whose associated image sensor data indicates that a touch has been detected at the display (e.g., the associated image sensor data indicates that the received light at an image sensor of the camera has dropped below a threshold, dropped by a predetermined percentage or amount, or dropped by a predetermined percentage or amount in a predetermined amount of time) as the touch location. In some embodiments, the touch location is based on the location within an image sensor at which the lowest level of light is received. If the image sensor data associated with multiple neighboring cameras indicate a touch, the touch location can be determined by determining the centroid of the locations of the multiple neighboring cameras.

In some embodiments, touch-enabled displays that utilize in-display cameras for touch detection and touch location determination can have a camera density greater than displays comprising in-displays cameras that are not touch-enabled. However, it is not necessary that displays that are touch-enabled through the use of in-display cameras have cameras located in every pixel. The touch detection module can utilize image sensor data from one or more cameras to determine a touch location. The density of in-display cameras can also depend in part on the touch detection algorithms used.

Information indicating the presence of a touch and touch location information can be provided to an operating system, an application, or any other software or hardware component of a system comprising a display or communicatively coupled to the display. Multiple touches can be detected as well. In some embodiments, in-display cameras provide updated image sensor data to the touch detection module at a frequency sufficient to provide for the kind of touch display experience that users have come to expect of modern touch-enabled devices. The touch detection capabilities of a display can be temporarily disabled as in-display cameras are utilized for other purposes as described herein.

In some embodiments, if a touch is detected by the system in the context of the system having prompted the user to touch their finger, thumb, or palm against the display to authenticate a user, the system can cause the one or more pixel display elements located at or in the vicinity of where a touch has been detected to emit light to allow the region where a user's finger, thumb, or palm is touching to be illuminated. This illumination may allow for the capture of a fingerprint, thumbprint, or palmprint in which print characteristics may be more discernible or easily extractible by the system or device.

The use of in-display cameras allows for the detection of a touch to the display surface by a wider variety of objects than can be detected by existing capacitive touchscreen technologies. Capacitive touchscreens detect a touch to the display by detecting a local change in the electrostatic field generated by the capacitive touchscreen. As such, capacitive touchscreens can detect a conductive object touching or in close proximity to the display surface, such as a finger or metallic stylus. As in-display cameras rely on the occlusion of light to detect touches and not on sensing a change in capacitance at the display surface, in-display camera-based approaches for touch sensing can detect the touch of a wide variety of objects, including passive styluses. There are no limitations that the touching object be conductive or otherwise able to generate a change in a display's electrostatic field.

In some embodiments, in-display cameras can be used to detect gestures that can be used by a user to interface with a system or device. A display incorporating in-display cameras can allow for the recognition of two-dimensional (2D) gestures (e.g., swipe, tap, pinch, unpinch) made by one or more fingers or other objects on a display surface or of three-dimensional (3D) gestures made by a stylus, finger, hand, or another object in the volume of space in front of a display. As used herein, the phrase "3D gesture" or "in-air gesture" describes a gesture, at least a portion of which, is made in the volume of space in front of a display and without touching the display surface.

The twist gesture can be mapped to an operation to be performed by an operating system or an application executing on the system. For example, a twist gesture can cause the manipulation of an object in a CAD (computer-aided design) application. For instance, a twist gesture can cause a selected object in the CAD application to be deformed by the application keeping one end of the object fixed and rotating the opposite end of the object by an amount corresponding to a determined amount of twisting of the physical object by the user. For example, a 3D cylinder in a CAD program can be selected and be twisted about its longitudinal axis in response to the system detecting a user twisting a stylus in front of the display. The resulting deformed cylinder can look like a piece of twisted licorice candy. The amount of rotation, distortion, or other manipulation that a selected object undergoes in response to the detection of a physical object being in front of the display being rotated does not need to have a one-to-one correspondence with the amount of detected rotation of the physical object. For example, in response to detecting that a stylus is rotated 360 degrees, a selected object can be rotated 180 degrees (one-half of the detected amount of rotation), 720 degrees (twice the detected amount of rotation), or any other amount proportional to the amount of detected rotation of the physical object.

Systems incorporating a display or communicatively coupled to a display with in-display cameras are capable of capturing 3D gestures over a greater volume of space in front of the display than what can be captured by only a small number of cameras located in a display bezel. This is due to in-display cameras being capable of being located across a display collectively have a wider viewing area relative to the collective viewing area of a few bezel cameras. If a display contains only one or more cameras located in a display bezel, those cameras will be less likely to capture 3D gestures made away from the bezel (e.g., in the center region of the display) or 3D gestures made close to the display surface. Multiple cameras located in a display area can also be used to capture depth information for a 3D gesture.

The ability to recognize 3D gestures in front of the display area allows for the detection and recognition of gestures not possible with displays comprising resistive or capacitive touchscreens or bezel cameras. For example, systems incorporating in-display cameras can detect 3D gestures that start or end with a touch to the display. For example, a "pick-up-move-place" gesture can comprise a user performing a pinch gesture on the display surface to select an object shown at or in the vicinity of the location where the pinched fingers come together (pinch location), picking up the object by moving their pinched fingers away from the display surface, moving the object by moving their pinched fingers along a path from the pinched location to a destination location, placing the object by moving their pinched finger back towards the display surface until the pinched fingers touch the display surface and unpinching their fingers at the destination location.

During a "pick-up-move-place" gesture, the selected object can change from an unselected appearance to a selected appearance in response to detection of the pinch portion of the gesture, the selected object can be moved across the display from the pinch location to the destination location in response to detection of the move portion of the gesture, and the selected object can change back to an unselected appearance in response to detecting the placing portion of the gesture. Such a gesture could be used for the manipulation of objects in a three-dimensional environment rendered on a display. Such a three-dimensional environment could be part of a CAD application or a game. The three-dimension nature of this gesture could manifest itself by, for example, the selected object not interacting with other objects in the environment located along the path traveled by the selected objected as it is moved between the pinched location and the destination location. That is, the selected object is being picked up and lifted over the other objects in the application via the 3D "pick-up-move-place" gesture.

Variations of this gesture could also be recognized. For example, a "pick-up-and-drop" gesture could comprise a user picking up an object by moving their pinched fingers away from the display surface after grabbing the object with a pinch gesture and then "dropping" the object by unpinching their fingers while they are located above the display. An application could generate a response to detecting that a picked-up object has been dropped. The magnitude of the response could correspond to the "height" from which the object was dropped, the height corresponding to a distance from the display surface that the pinched fingers were determined to be positioned when they were unpinched. In some embodiments, the response of the application to an object being dropped can correspond to one or more attributes of the dropped object, such as its weight.

For example, in a gaming application, the system could detect a user picking up a boulder by detecting a pinch gesture at the location where the boulder is shown on the display, detect that the user has moved their pinched fingers a distance from the display surface, and detect that the user has unpinched their pinched fingers at a distance from the display surface. The application can interpret the unpinching of the pinched fingers at a distance away from the display surface as the boulder being dropped from a height. The gaming application can alter the gaming environment to a degree that corresponds to the "height" from which the boulder was dropped, the height corresponding to a distance from the display surface at which the system determined the pinched fingers to have been unpinched and the weight of the boulder. For example, if the boulder was dropped from a small height, a small crater may be created in the environment, and the application can generate a soft thud noise as the boulder hits the ground. If the boulder is dropped from a greater height, a larger crater can be formed, nearby trees could be knocked over, and the application could generate a loud crashing sound as the boulder hits the ground. In other embodiments, the application can take into account attributes of the boulder, such as its weight, in determining the magnitude of the response, a heavier boulder creating a greater alternation in the game environment when dropped.

In some embodiments, a measure of the distance of unpinched or pinched fingers from the display surface can be determined by the size of fingertips extracted from image sensor data generated by in-display cameras, with larger extracted fingertip sizes indicating that the fingertips are closer to the display surface. The determined distance of pinched or unpinched fingers does not need to be determined according to a standardized measurement system (e.g., metric, imperial), and can be any metric wherein fingers located further away from the display surface are a greater distance away from the display surface than fingers located nearer the display surface.

Figure 17:
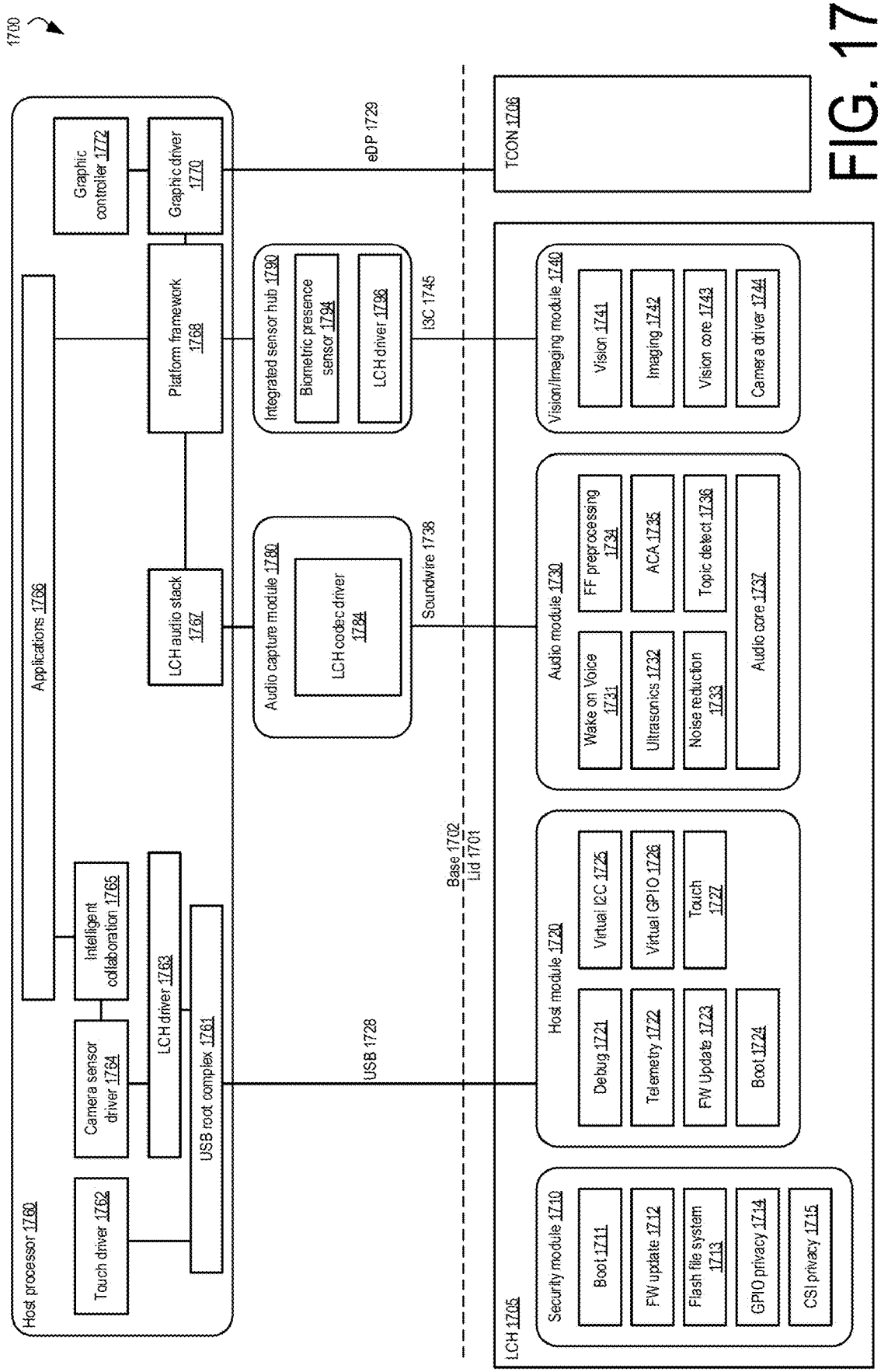
FIG. 17 illustrates a block diagram of an example software/firmware environment of a mobile computing device comprising a lid controller hub.

FIG. 17 illustrates a block diagram of an example software/firmware environment of a mobile computing device comprising a lid controller hub. The environment 1700 comprises a lid controller hub 1705 and a timing controller 1706 located in a lid 1701 in communication with components located in a base 1702 of the device. The LCH 1705 comprises a security module 1710, a host module 1720, an audio module 1730, and a vision/imaging module 1740. The security module 1710 comprises a boot module 1711, a firmware update module 1712, a flash file system module 1713, a GPIO privacy module 1714, and a CSI privacy module 1715. In some embodiments, any of the modules 1711-1715 can operate on or be implemented by one or more of the security module 1710 components illustrated in FIGS. 2-4 or otherwise disclosed herein. The boot module 1711 brings the security module into an operational state in response to the computing device being turned on. In some embodiments, the boot module 1711 brings additional components of the LCH 1705 into an operational state in response to the computing device being turned on. The firmware update module 1712 updates firmware used by the security module 1710, which allows for updates to the modules 1711 and 1713-1715. The flash file system module 1713 implements a file system for firmware and other files stored in flash memory accessible to the security module 1710. The GPIO and CSI privacy modules 1714 and 1715 control the accessibility by LCH components to image sensor data generated by cameras located in the lid.

The host module 1720 comprises a debug module 1721, a telemetry module 1722, a firmware update module 1723, a boot module 1739, a virtual I2C module 1740, a virtual GPIO 1726, and a touch module 1727. In some embodiments, any of the modules 1721-1727 can operate on or be implemented by one or more of the host module components illustrated in FIGS. 2-3 and 5 or otherwise disclosed herein. The boot module 1739 brings the host module 1720 into an operational state in response to the computing device being turned on. In some embodiments, the boot module 1739 brings additional components of the LCH 1705 into an operational responsible in response to the computing device being turned on. The firmware update module 1723 updates firmware used by the host module 1720, which allows for updates to the modules 1721-1722 and 1739-1727. The debug module 1721 provides debug capabilities for the host module 1720. In some embodiments the debug module 1721 utilizes a JTAG port to provide debug information to the base 1702. In some embodiments. The telemetry module 1722 generates telemetry information that can be used to monitor LCH performance. In some embodiments, the telemetry module 1722 can provide information generated by a power management unit (PMU) and/or a clock controller unit (CCU) located in the LCH. The virtual I2C module 1740 and the virtual GPIO 1726 allow the host processor 1760 to remotely control the GPIO and I2C ports on the LCH as if they were part of the SoC. By providing control of LCH GPIO and I2C ports to a host processor over a low-pin USB connection allows for the reduction in the number of wires in the device hinge. The touch module 1727 processes touch sensor data provided to the host module 1720 by a touch sensor controller and drives the display's touch controller. The touch module 1727 can determine, for example, the location on a display of one or more touches to the display and gesture information (e.g., type of gesture, information indicating the location of the gesture on the display). Information determined by the touch module 1727 and other information generated by the host module 1720 can be communicated to the base 1702 over the USB connection 1728.

The audio module 1730 comprises a Wake on Voice module 1731, an ultrasonics module 1732, a noise reduction module 1733, a far-field preprocessing module 1734, an acoustic context awareness module 1735, a topic detection module 1736, and an audio core 1737. In some embodiments, any of the modules 1731-1737 can operate on or be implemented by one or more of the audio module components illustrated in FIGS. 2-3 and 6 or otherwise disclosed herein. The Wake on Voice module 1731 implements the Wake on Voice feature previously described and in some embodiments can further implement the previously described Speaker ID feature. The ultrasonics module 1732 can support a low-power low-frequency ultrasonic channel by detecting information in near-ultrasound/ultrasonic frequencies in audio sensor data. In some embodiments, the ultrasonics module 1732 can drive one or more speakers located in the computing device to transmit information via ultrasonic communication to another computing device. The noise reduction module 1733 implements one or more noise reduction algorithms on audio sensor data. The far-field preprocessing module 1734 perform preprocessing on audio sensor data to enhance audio signals received from a remote audio source. The acoustic context awareness module 1735 can implement algorithms or models that process audio sensor data based on a determined audio context of the audio signal (e.g., detecting an undesired background noise and then filtering the unwanted background noise out of the audio signal).

The topic detection module 1736 determines one or more topics in speech detected in audio sensor data. In some embodiments, the topic detection module 1736 comprises natural language processing algorithms. In some embodiments, the topic detection module 1736 can determine a topic being discussed prior to an audio query by a user and provide a response to the user based on a tracked topic. For example, a topic detection module 1736 can determine a person, place, or other topic discussed in a time period (e.g., in the past 30 seconds, past 1 minute, past 5 minutes) prior to a query, and answer the query based on the topic. For instance, if a user is talking to another person about Hawaii, the topic detection module 1736 can determine that "Hawaii" is a topic of conversation. If the user then asks the computing device, "What's the weather there?", the computing device can provide a response that provides the weather in Hawaii. The audio core 1737 is a real-time operating system and infrastructure that the audio processing algorithms implemented in the audio module 1730 are built upon. The audio module 1730 communicates with an audio capture module 1780 in the base 1702 via a SoundWire® connection 1738.

The vision/imaging module 1740 comprises a vision module 1741, an imaging module 1742, a vision core 1743, and a camera driver 1744. In some embodiments, any of the components 1741-1744 can operate on or be implemented by one or more of the vision/imaging module components illustrated in FIGS. 2-3 and 7 or otherwise disclosed herein. The vision/imaging module 1740 communicates with an integrated sensor hub 1790 in the base 1702 via an I3C connection 1745. The vision module 1741 and the imaging module 1742 can implement one or more of the algorithms disclosed herein as acting on image sensor data provided by one or more cameras of the computing device. For example, the vision and image modules can implement, separately or working in concert, one or more of the Wake on Face, Face ID, head orientation detection, facial landmark tracking, 3D mesh generation features described herein. The vision core 1743 is a real-time operating system and infrastructure that video and image processing algorithms implemented in the vision/imaging module 1740 are built upon. The vision/imaging module 1740 interacts with one or more lid cameras via the camera driver 1744. In some instance the camera driver 1744 can be a microdriver.

The components in the base comprise a host processor 1760, an audio capture module 1780 and an integrated sensor hub 1790. In some embodiments, these three components are integrated on an SoC. The audio capture module 1780 comprises an LCH audio codec driver 1784. The integrated sensor hub 1790 can be an Intel® integrated sensor hub or any other sensor hub capable of processing sensor data from one or more sensors. The integrated sensor hub 1790 communicates with the LCH 1705 via an LCH driver 1798, which, in some embodiments, can be a microdriver. The integrated sensor hub 1790 further comprises a biometric presence sensor 1794. The biometric presence sensor 1794 can comprise a sensor located in the base 1702 that is capable of generating sensor data used by the computing device to determine the presence of a user. The biometric presence sensor 1794 can comprise, for example, a pressure sensor, a fingerprint sensor, an infrared sensor, or a galvanic skin response sensor. In some embodiments, the integrated sensor hub 1790 can determine the presence of a user based on image sensor data received from the LCH and/or sensor data generated by a biometric presence sensor located in the lid (e.g., lid-based fingerprint sensor, a lid-based infrared sensor).

The host processor 1760 comprises a USB root complex 1761 that connects a touch driver 1762 and an LCH driver 1763 to host module 1720. The host module 1720 communicates data determined from image sensor data, such as the presence of one or more users in an image or video, facial landmark data, 3D mesh data, etc. to one or more applications 1766 on the host processor 1760 via the USB connection 1728 to the USB root complex 1761. The data passes from the USB root complex 1761 through an LCH driver 1763, a camera sensor driver 1764, and an intelligent collaboration module 1765 to reach the one or more applications 1766.

The host processor 1760 further comprises a platform framework module 1768 that allows for power management at the platform level. For example, the platform framework module 1768 provides for the management of power to individual platform-level resources such as the host processor 1760, SoC components (GPU, I/O controllers, etc.), LCH, display, etc. The platform framework module 1768 also provides for the management of other system-level settings, such as clock rates for controlling the operating frequency of various components, fan settings to increase cooling performance. The platform framework module 1768 communicates with an LCH audio stack 1767 to allow for the control of audio settings and a graphic driver 1770 to allow for the control of graphic settings. The graphic driver 1770 provides video data to the timing controller 1706 via an eDP connection 1729 and a graphic controller 1772 provides for user control over a computing device's graphic settings. For example, a user can configure graphic settings to optimize for performance, image quality, or battery life. In some embodiments, the graphic controller is an Intel® Graphic Control Panel application instance.

Low-Power Always-On Display

In some embodiments, a mobile computing device comprises a foldable display that includes an "always-on" portion that is visible to a user and displays content when the device is closed and in a low-power mode. To reduce power consumption when the device is in this low-power mode, the portion of the display not visible to a user when the device is closed is disabled. This can be done by placing one or more components of the display pipeline (such as the frame buffer, image processing modules, row drivers, and column drivers) in a low-power state. The content displayed on the always-on portion of the display while the device is closed can be updated periodically with new images provided by an SoC display module, but in some embodiments, a second display module that is part of a low-power subsystem can provide images to the lid, thus allowing the SoC display module to remain in a low-power state. Extending an existing display to provide an always-on display capability by selectively disabling a portion of the display is less expensive than adding a second display and a second timing controller and can result in a lower device cost.

Embodiments provide a mobile computing device that has a base, a foldable display, and a lid rotatably attached to the base. The lid might comprise a timing controller comprising a frame buffer. The timing controller of the computing device can enable a first display portion of the foldable display when the computing device is in a full display mode, and disable the first display portion and enable a second display portion of the foldable display when the computing device is in a partial display mode. The first display portion may be, for example, visible when the computing device is in an open configuration and may not be visible when the computing device is in a closed configuration. By contrast, the second display portion may be visible when the computing device is in the closed configuration, wherein the computing device can be in a closed configuration when in the partial display mode. The timing controller of the computing device may be further able to place at least a portion of a frame buffer into a frame buffer low-power state, when the computing device is in the partial display mode. The frame buffer may store image data corresponding to images displayed at the foldable display. Optionally, the timing controller can enable the second display portion when the mobile computing device is in the full display mode. In an example, the computing device might be in the partial display mode. In this mode, the timing controller may place one or more row drivers and/or one more column drivers that drive rows and columns of the first display portion, respectively, into a low-power state.

Figure 18A:
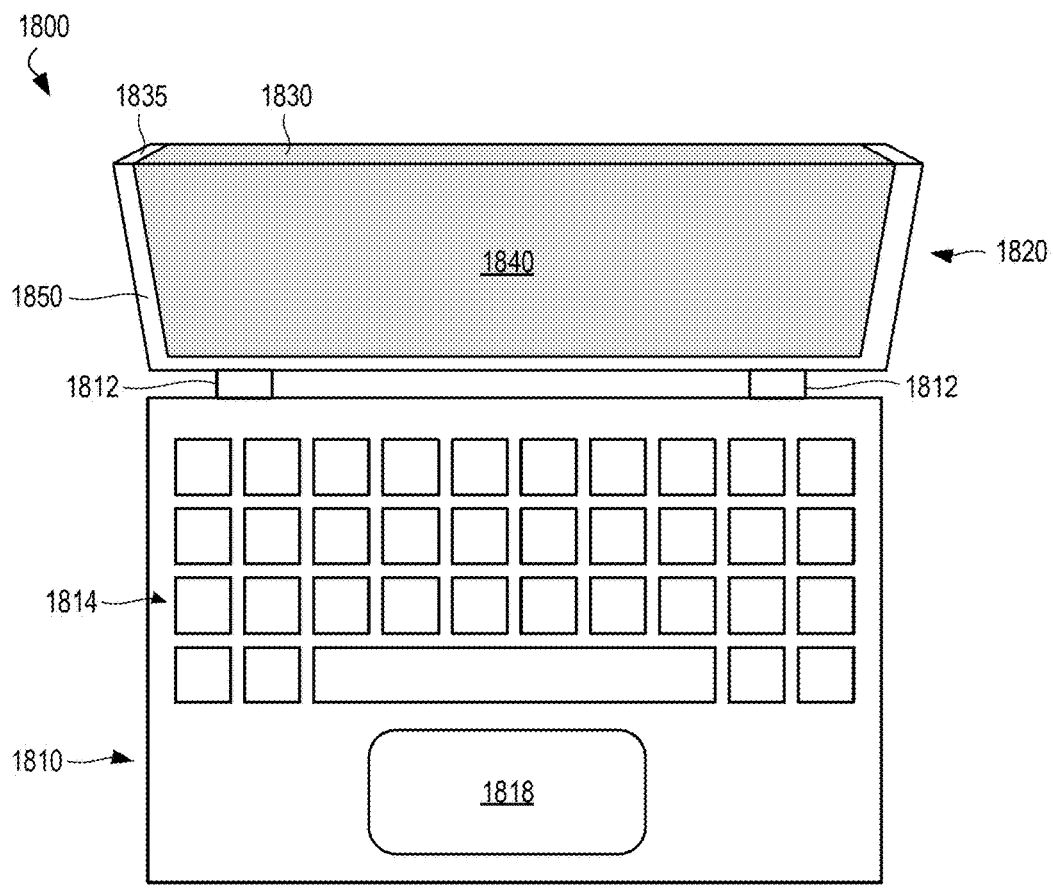
FIGS. 18A and 18B illustrate top views of a mobile computing device in open and closed configurations, respectively, with a first example foldable display comprising a portion that can be operated as an always-on display.
Figure 18B:
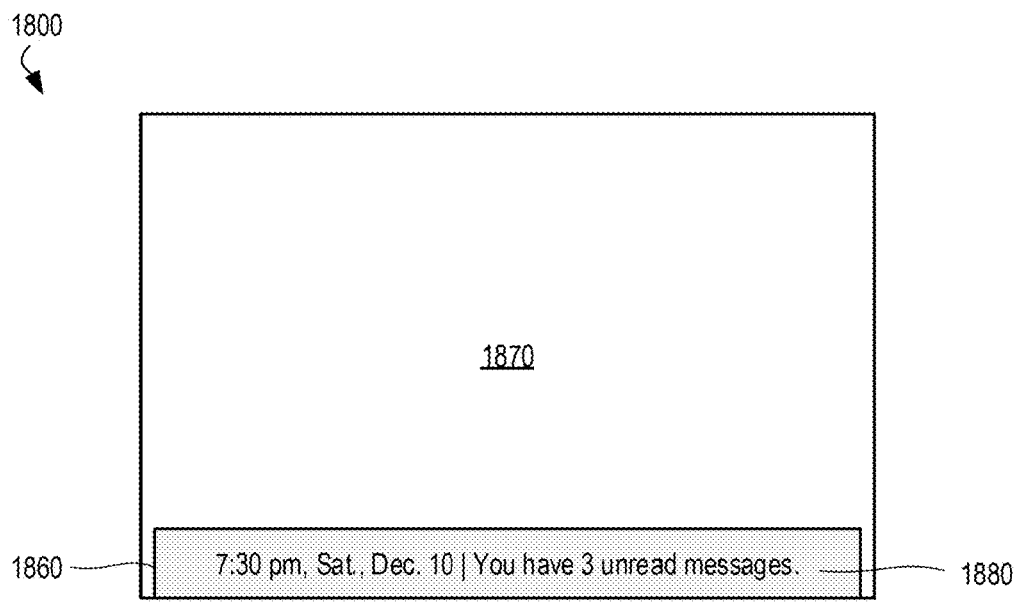

FIGS. 18A and 18B illustrate top views of a mobile computing device in open and closed configurations, respectively, with a first example foldable display comprising a portion that can be operated as an always-on display. The mobile computing device 1800 comprises a base 1810 rotatably attached to a lid 1820 via a hinge 1812. The base 1810 comprises a physical keyboard 1814 and a trackpad 1818. The lid 1820 comprises a foldable display 1830 wrapped around a lid top edge 1835. The foldable display 1830 comprises a first display portion 1840 located on a surface 1850 of the lid 1820 that is user-facing when the device 1800 is in an open configuration and a second display portion 1860 on a surface 1870 of the lid. The second display portion 1860 can be operated as an always-on portion of the display 1830 as it is visible when the device 1800 is in the closed configuration, as shown in FIG. 18B. A notification 1880 is shown on the second display portion 1860 while the device 1800 is closed. With reference to FIG. 1B, the lid surfaces 1850 and 1870 correspond to the B cover and A cover, respectively, of the mobile computing device 1800.

Figure 19A:
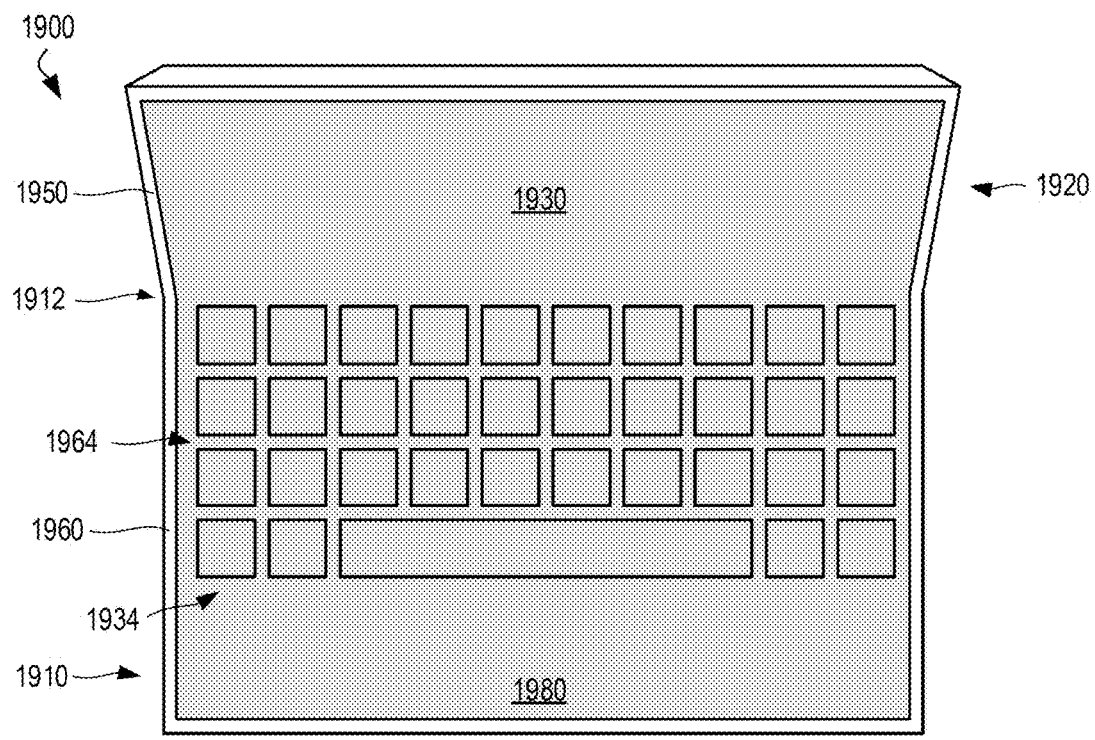
FIG. 19A illustrates a top view of a mobile computing device in an open configuration with a second example foldable display comprising a portion that can be operated as an always-on display.
Figure 19B:
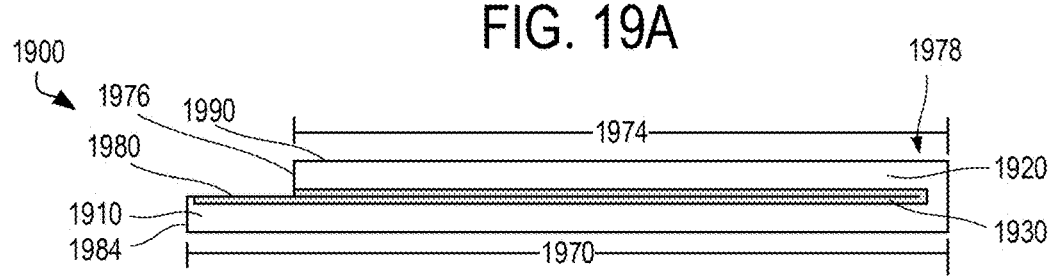
FIGS. 19B and 19C illustrate a cross-sectional side view and top view, respectively, of the mobile computing device of FIG. 65A in a closed configuration.
Figure 19C:
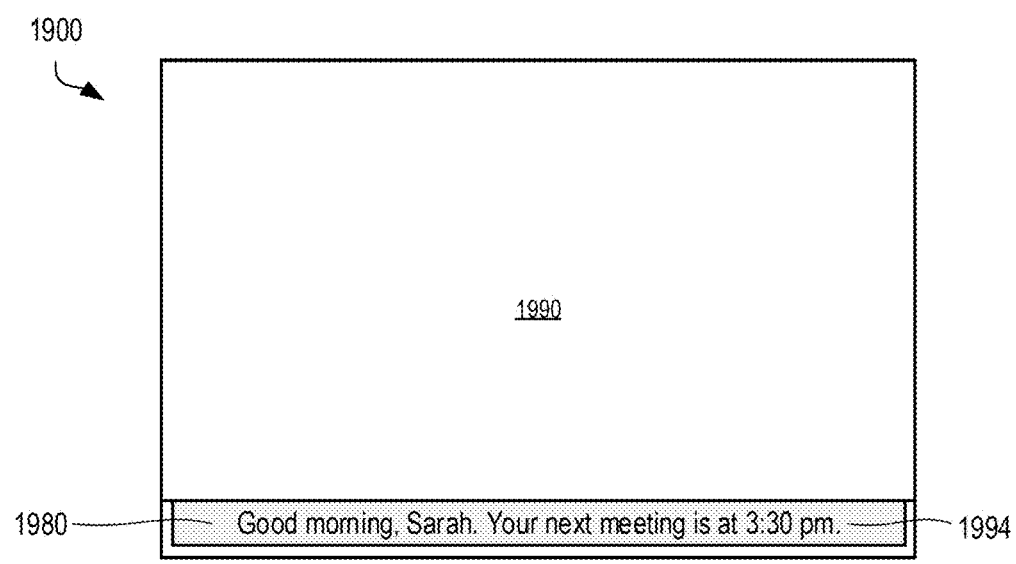

FIG. 19A illustrates a top view of a mobile computing device in an open configuration with a second example foldable display comprising a portion that can be operated as an always-on display. The mobile computing device 1900 comprises a base 1910 rotatably attached to a lid 1920. The device 1900 comprises a foldable display 1930 that covers a portion of a lid surface 1950 and a portion of a base surface 1960, the lid surface 1950 being a user-facing surface and the base surface being an upward-facing surface when the device 1900 is in an open configuration. A virtual keyboard 1934 is displayed on a base display portion 1964 of the foldable display 1930. FIGS. 19B and 19C illustrate a cross-sectional side view and top view, respectively, of the mobile computing device of FIG. 19A in a closed configuration. A length 1974 of the lid 1920 from a lid top edge 1976 to a hinge end portion 1978 is less than a length 1970 of the base 1910 extending from a base front edge 1984 to the hinge end portion 1978, leaving a display portion 1980 of the foldable display 1930 visible when the device 1900 is closed. Display portion 1980 can be operated as an always-on display. Viewed from above, a top surface 1990 of the lid 1920 appears adjacent to the always-on display portion 1980. Notification content 1994 can be shown on the always-on display portion 1980 while the device 1900 is closed. With reference to FIG. 1B, the lid surface 1950, the base surface 1960, and the lid top surface 1990, correspond to the B cover, C cover, and A cover, respectively, of the mobile computing device 1900.

FIGS. 20A-20L illustrate various views of mobile computing devices comprising a foldable display having a display portion that can be operated as an always-on display. FIGS. 20A-20C illustrate views of the A cover, B cover, and C cover, respectively, of a mobile computing device 2000 comprising a base 2012, a lid 2014, and a foldable display that wraps over a top edge 2018 of the lid 2014. The lid top edge 2018 is located distally from a hinge end portion 2019 at which the mobile computing device 2000 rotatably attaches to the base 2012. The foldable display comprises a first display portion 2020 and a second display portion 2022. The first display portion 2020 is user-facing when the device 2000 is in an open configuration and the second display portion 2022 is world-facing when the device 2000 is in either the open configuration or a closed configuration. The second display portion 2022 can be operated as an always-on display portion as it is visible when the device 2000 is in a closed configuration. A camera 2024 is located on the A cover of the device 2000, below the second display portion 2022.

FIGS. 20D-20F illustrate A cover, B cover, and C cover views, respectively, of a mobile computing device 2030 comprising a base 2032, a lid 2034, and a foldable display that wraps over a top edge 2038 of the lid 2034. The lid top edge 2038 is located distally from a hinge end portion 2039 at which the mobile computing device 2030 rotatably attaches to the base 2032. The foldable display comprises a first display portion 2040 and a second display portion 2042. The first display portion 2040 is user-facing when the device 2030 is in an open configuration and the second display portion 2042 is world-facing when the device 2030 is in either the open configuration or a closed configuration. The second display portion 2042 can be operated as an always-on display portion as it is visible when the device 2030 is in a closed configuration. A camera 2044 is located on the A cover of the device 2030, to the side of the second display portion 2042.

FIGS. 20G-20I illustrate A cover, B cover, and C cover views, respectively, of a mobile computing device 2050 comprising a base 2052, a lid 2054, and a foldable display that wraps around a side edge 2058 of the lid 2054. The foldable display comprises a first display portion 2060 and a second display portion 2062. The first display portion 2060 is user-facing when the device 2050 is in an open configuration and the second display portion 2062 is world-facing when the device 2050 is in either the open configuration or a closed configuration. The second display portion 2062 can be operated as an always-on display portion as it is visible when the device 2050 is in a closed configuration. A camera 2064 is located on the A cover of the device 2050, to the side of the second display portion 2062. In other embodiments, a foldable display can wrap around both side edges of a lid and comprise two world-facing second display portions, either or both of which can be operated as an always-on display.

FIGS. 20J-20L illustrate a top, B cover, and C cover views, respectively, of a mobile computing device 2070 comprising a base 2072, a lid 2074, and a foldable display that extends across the base 2072 and the lid 2074. The foldable display comprises a first display portion 2076 located in the lid and a second display portion 2078 located in the base. The first display portion 2076 is user-facing and the second display portion 2078 is upward-facing when the device 2070 is in an open configuration. A portion 2082 of the second display portion 2078 can be operated as an always-on display portion as it is visible when the device 2070 is in a closed configuration. A camera 2084 is located on the A cover of the device 2070. FIG. 20J illustrates a top view of the mobile computing device 2070 while in a closed configuration and shows the always-on display portion 2082 of the second display portion 2078 that is visible when the mobile computing device 2070 is closed, due to a lid length 2086 being shorter than a base length 2088. The always-on display portion 2082 appears adjacent to an A cover 2090 of the computing device 2070 when viewed from above.

Figure 21:
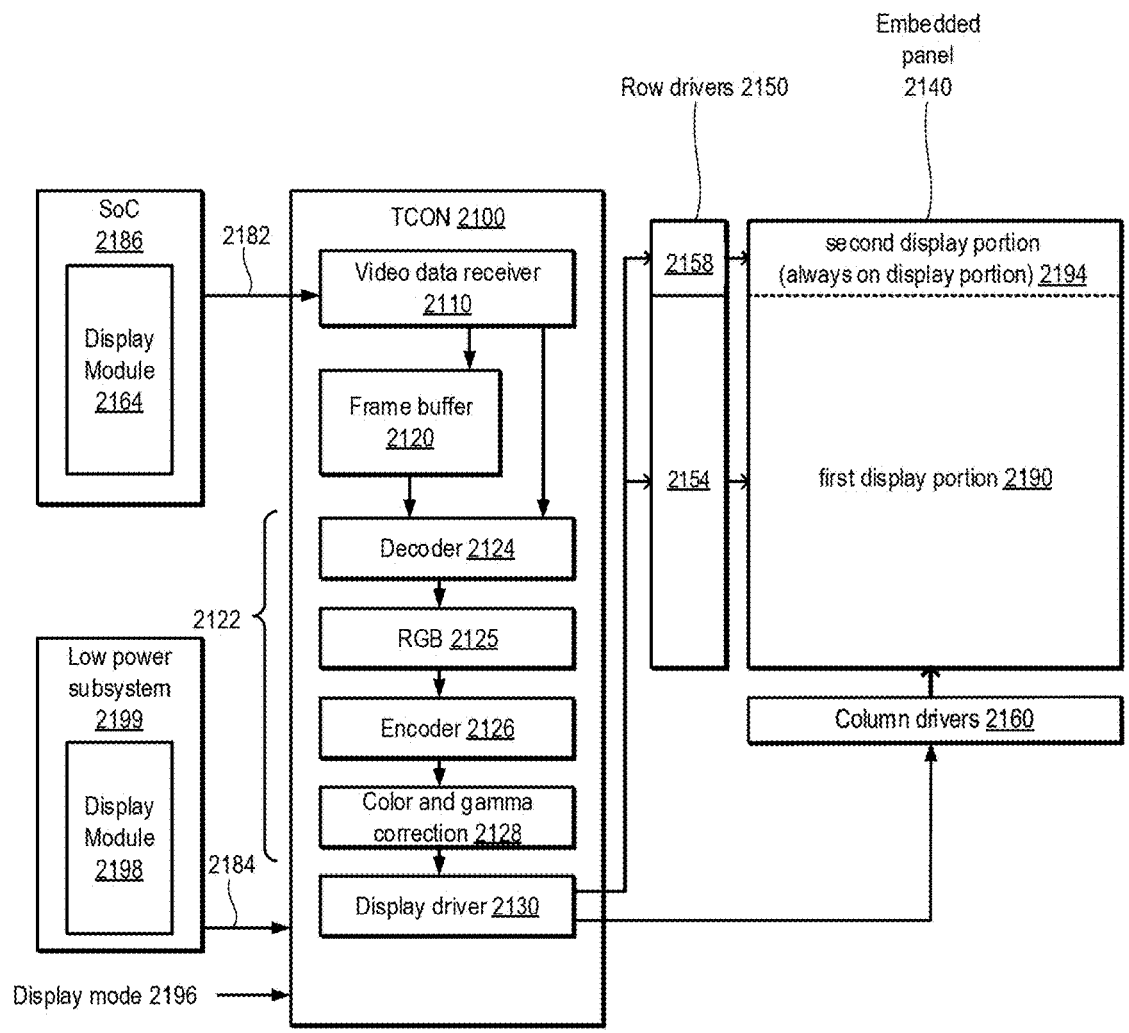
FIG. 21 is a block diagram of an example timing controller and additional display pipeline components associated with a foldable display having an always-on display portion.

FIG. 21 illustrates a block diagram of an example timing controller and additional display pipeline components associated with a foldable display having a portion that can be operated as an always-on display. The timing controller 2100 comprises a video data receiver 2110, a frame buffer 2120, a processing stack 2122, and a display driver 2130. The timing controller 2100, along with an embedded foldable display panel 2140 and display panel control circuitry (e.g., row drivers 2150 and column drivers 2160) are located in the lid of a mobile computing device. The video data receiver 2110 receives video data over a connection 2182 from a display module 2164 that is part of an SoC 2186 and located in a base of the mobile computing device. The frame processing stack 2122 comprises a decoder 2139, an RGB module 2140, and a VDSC encoder 2126. The decoder 2139 decodes encoded frames before they are processed by the RGB module 2140 and encoder 2126 re-encodes the frames before they are processed by the color and gamma correction module 2128. The color and gamma correction module 2128 performs color and gamma correction on the frames. In some embodiments, the decoder 2139 and the encoder 2126 perform frame decoding and encoding in accordance with the VESA® Display Compression Standard (VDSC).

In one or more embodiments, the timing controller 2100 represents an example implementation of TCON 150, 250, 355 and the embedded panel 2140 represents an example implementation of embedded display panel 145, 280, 380 either of which can be used in an example implementation of lid 120, 220, 301, 1820 which in turn can be part of an example implementation of mobile computing device (user device) 100, 200, 300. In one or more embodiments, the display module 2164 represents an example implementation of display module 391, 341, which can be used in an example implementation of SoC 140, 340, which can be located in base 210, 315, 1810 which in turn can be part of mobile computing device (user device) 100, 200, 300.

In some embodiments, the frame processing stack 2122 comprises one or more modules in addition to those shown in FIG. 21. The additional image processing modules can include any of the modules illustrated in FIG. 8 or any other image processing modules described or referenced herein. In some embodiments, the frame processing stack 2122 can comprise fewer modules than those shown in FIG. 21. In some embodiments, the display module 2164 communicates with the TCON 2100 over an eDP connection and the video data receiver 2110 comprises an eDP main link receiver. In some embodiments, the display driver 2130 is a P2P transmit module.

The foldable display panel 2140 comprises a first display portion 2190 and a second display portion 2194. The first display portion 2190 is visible when the mobile computing device is an open configuration and is not visible when the mobile computing device is a closed configuration (such as first display portion 1840 in FIG. 18A and display portions 2020, 2040, 2060, and 2076 in FIGS. 20B, 20E, 20H, and 20K, respectively), and the second display portion 2194 is visible when the mobile computing device is in a closed configuration (such as second display portion 1860 in FIG. 18B and display portions 2022, 2042, 2062, and 2082 in FIGS. 20A, 20D, 20G, and 20J, respectively). The second display portion 2194 can operate as an always-on display portion when the mobile device is in a closed configuration. The first display portion 2190 and the second display portion 2194 are enabled based on a display mode of the mobile computing device. When the mobile computing device is in an open configuration, the device can be in a full display mode in which both the first and second display portions 2190 and 2194 are enabled. In some embodiments multiple full display modes are possible. For example, in a first full display mode, the first display portion 2190 is enabled and the second display portion 2194 is disabled and in a second full display mode, the first and second display portions 2190 and 2194 are enabled and displaying content. When the mobile computing device is in a closed configuration, the device can be in a partial display mode in which the first display portion 2190 is disabled and does not display content and the second display portion 2194 is enabled and operates as an always-on display.

In some embodiments, in addition to being based on a physical configuration of the mobile computing device, the display mode is further based on user-configurable settings. For example, user-configurable display settings may be provided to a user that allow the user to select whether the second display portion is to be enabled or disabled when the device is in an open configuration and whether the second display portion is to be enabled when the device is in a closed configuration. The timing controller 2100 receives display mode information 2196 from a lid controller hub or a component in the base of the mobile computing device, such as the display module 2164.

To reduce device power consumption, one or more components of a display pipeline of the device can be placed into a low-power state when the device is in a partial display mode. The display pipeline comprises components involved in the generation, processing, and displaying of images displayed at the display panel 2140. In the embodiment illustrated in FIG. 21, display pipeline components include the display module 2164, the video data receiver 2110, the frame buffer 2120, the frame processing stack 2122, the display driver 2130, the row drivers 2150, and the column drivers 2160. Placing the mobile computing device in a lower power state can comprise placing any of its constituent components in a low-power state. For example, a row driver can be placed in a row driver low-power state, a column driver can be placed in a column driver low-power state, a frame buffer can be placed in a frame buffer low power state, a display module can be placed in a display module low-power state, etc. Placing a component or a portion of a component in a low-power state can comprise, for example, reducing its operating voltage, operating the component at a lower frequency, disabling the component, or disabling component functionality (such as disabling a portion of a memory array or disabling output drivers). A display pipeline component can be placed into a low-power state by timing controller control logic or by display mode information (e.g., display mode information 2196) being provided directly to individual display pipeline components and causing the module to be placed into a low-power state.

In some embodiments, when a device is in a partial display mode, row drivers 2154 that drive the first display portion 2190 can be placed into a low-power state while row drivers 2158 that drive the second display portion 2194 remain enabled. In other embodiments, the column drivers 2160 can comprise a first set of column drivers that drive a first display portion and a second set of column drivers that drive an always-on display portion and the first set of column drivers are disabled and the second set of column drivers are enabled when the device is in a partial display mode. In some embodiments, portions of a timing controller display driver (e.g., display driver 2130) that drive row or column drivers that drive a first display portion can be placed in a low-power state when the device is in a partial display mode.

In some embodiments, a portion of the frame buffer 2120 is placed into a low-power state when the device is in a partial display mode. Placing a portion of the frame buffer 2120 in a low-power state can comprise disabling the portions of the memory array in the frame buffer 2120 that store images displayed at the first display portion 2190, disabling control circuitry that control the portions of the memory array that store images displayed in the first display portion 2190, or only storing image data corresponding to images displayed on the second display portion 2194 of the display.

In some embodiments, the TCON 2100 comprises a first frame buffer that stores image data corresponding to images to be displayed at the first display portion 2190 and a second frame buffer that stores image data corresponding to images to be displayed at the second display portion 2194. The first and second frame buffers are sized based on the size of the first and second display portions, respectively, and are thus each smaller than the size of a single frame buffer (e.g., frame buffer 2120) that would be needed to store image data for images to be displayed across display portions 2190 and 2194. The first frame buffer can be placed into a low-power state when the device is in a partial display mode.

In some embodiments, the TCON 2100 comprises a first frame buffer to store images to be displayed across the first display portion 2190 and the second display portion 2194 and a second frame buffer to store images to be displayed at the second display portion 2194, the second frame buffer being smaller than the first frame buffer. When a mobile computing device is in a full display mode, the TCON 2100 utilizes the first frame buffer and the second frame buffer is placed in a low-power state and when in a partial display mode, the TCON 2100 places the first frame buffer into a low-power state and utilizes the second frame buffer.

In some embodiments, one or more image processing components of the frame processing stack 2122 can be bypassed when the mobile computing device is in a partial display mode to reduce display pipeline power consumption. For example, if content displayed at the second display portion 2194 when the device is in a partial display mode is displayed in black and white or otherwise would not benefit from processing by modules in the frame processing stack, those modules can be bypassed when the device is in a partial display mode. Bypassing a component can comprise placing at least a portion of the bypassed components into a low-power state. As an example, a portion of a bypassed module can remain enabled to allow for image data to pass through the module while the remainder of the bypassed component can be disabled.

In some embodiments, display pipeline power consumption can be reduced by components in the pipeline operating only on the portion of image data corresponding to content displayed at the second display portion 2194. In components that operate on pixel data for pixels in parallel, the portion of the component that performs operations on pixel data corresponding to the first display portion can be disabled. In modules that operate on pixel data for multiple pixels serially, the module can be configured (by, for example, timing controller logic) to operate only on pixel data for pixels corresponding to the second display portion 2194.

In some embodiments, the content displayed at the second display 2194 when the device is in a partial display mode can comprise notification content updated at a rate that is less than the embedded panel's typical refresh rate (e.g., 30-120 Hz) when operating in full display mode. For example, if the notification content comprises a clock that shows the hour and minute, the display module 2164 can exit from a low-power state once a minute to generate a new image for display at the second display portion that shows the current time. After generating the updated image, the display module 2164 can return to a low-power state. Examples of other types of information that can be included in notification content and displayed at the second display portion 2194 while the device is in partial display mode include information about an upcoming meeting, remaining battery life, number of unread messages (e.g., email, text, social media), and a context-based greeting (e.g., "Good Morning!"). Many other types of information can be included in the notification content. Notification content can be updated at various intervals depending on the information being displayed (e.g., once a minute if displaying a clock, once every 5 or 10 minutes to update unread message information, once every 60 minutes to update meeting information). In some embodiments, the timing controller can signal to a display module when to wake up and generate updated notification content. In other embodiments, the waking of the display module to generate updated information can be controlled by a component in the base.

In some embodiments, notification content can be provided to the TCON 2100 over an out-of-band connection 2184 by a display module 2198 that is part of a low-power subsystem 2199 located in the device base (e.g., 210, 315, 1810). The low-power subsystem 2199 can generate notification content at a lower power level than the SoC 2186. The notification content can be provided as video data provided to the TCON 2100 over a connection 2184 that is separate from the connection 2182 used by the display module 2164 to provide video data to the video data receiver 2110. By using the low-power subsystem 2199 to generate notification content, the SoC 2186 and the display module 2164 can be kept in a low-power state and power consumption of the mobile computing device reduced. In some embodiments, the out-of-band connection 2184 is a USB connection or a MIPI Display Serial Interface (MIPI DSI) connection.

Figure 22:
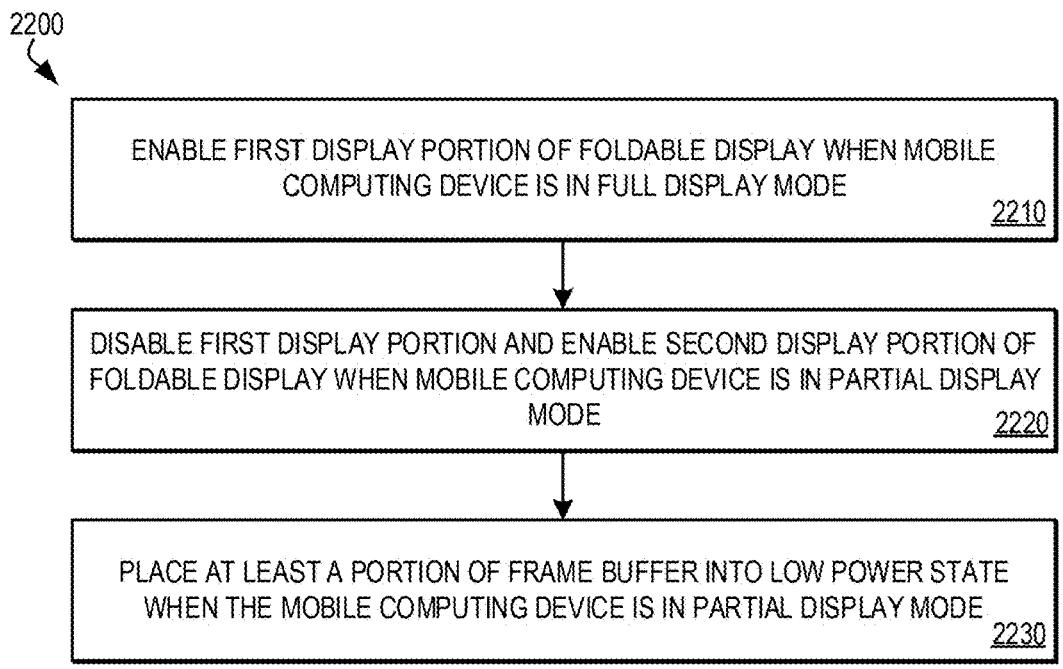
FIG. 22 illustrates an example method for operating a foldable display of a mobile computing device capable of operating as an always-on display.

FIG. 22 illustrates an example method for operating a foldable display of a mobile computing device capable of operating as an always-on display. The method 2200 can be performed by, for example, a laptop comprising a foldable display that wraps around the top of the lid of the laptop. The foldable display has a user-facing portion when the lid is open and a world-facing portion that operates as an always-on display when the laptop lid is closed. At 2210, a first display portion of a foldable display of a mobile computing device is enabled when the mobile computing device is in a full display mode. In the example, the user-facing portion of the laptop is enabled and displays content when the laptop enters a full display mode in response to the lid being opened. At 2220, the first display portion is disabled and a second display portion of the foldable display is enabled when the mobile computing device is in a partial display mode. The first display portion is visible when the mobile computing device is in an open configuration and not visible when the mobile computing device is in a closed configuration. The second display portion is visible when the mobile computing device is in the closed configuration, and the mobile computing device is in the closed configuration when in the partial display mode. In the example, the user-facing portion of the display is disabled and the world-facing portion of the display is enabled when the lid is closed, and the second display portion operates as an always-on display. At 2230, at least a portion of a frame buffer is placed into a frame buffer low-power state when the mobile computing device is in the partial display mode, the frame buffer storing image data corresponding to images displayed at the foldable display. In the example, the portion of the memory array in the frame buffer used to store images for display at the foldable display is placed into a lower power state. That is, only the portion of the memory array in the frame buffer that stores images to be displayed at the always-on display is enabled.

Additional examples of the presently described low-power always-on embodiments include the following, non-limiting implementations. Each of the following non-limiting examples may stand on its own or may be combined in any permutation or combination with any one or more of the other examples provided below or throughout the present disclosure.

Example AA1 is a method comprising: enabling a first display portion of a foldable display of a mobile computing device when the mobile computing device is in a full display mode; disabling the first display portion and enabling a second display portion of the foldable display when the mobile computing device is in a partial display mode, the first display portion visible when the mobile computing device is in an open configuration and not visible when the mobile computing device is in a closed configuration, the second display portion visible when the mobile computing device is in the closed configuration, the mobile computing device in the closed configuration when in the partial display mode; and placing at least a portion of a frame buffer into a frame buffer low-power state when the mobile computing device is in the partial display mode, the frame buffer storing image data corresponding to images to be displayed at the foldable display.

Example AA2 includes the method of Example AA1, further comprising enabling the second display portion when the mobile computing device is in the full display mode.

Example AA3 includes the method of Example AA1 or AA2, further comprising, when the mobile computing device is in the partial display mode, placing one or more row drivers that drive rows of the first display portion into a row driver low-power state.

Example AA4 includes the method of any one of Examples AA1-AA3, further comprising, when the mobile computing device is in the partial display mode, placing one or more column drivers that drive columns of the first display portion into a column driver low-power state.

Example AA5 includes the method of any one of Examples AA1-AA4, wherein the frame buffer is a first frame buffer and the mobile computing device comprises a second frame buffer that is smaller than the first frame buffer, the method further comprising, when the mobile computing device is in the partial display mode, utilizing the second frame buffer to store image data corresponding to images to be displayed at the second display portion.

Example AA6 includes the method of any one of Examples AA1-AA5, further comprising bypassing one or more image processing components in a display pipeline when the mobile computing device is in the partial display mode.

Example AA7 includes the method of any one of Examples AA1-AA6, further comprising configuring one or more image processing components in a display pipeline to not process image data corresponding to a portion of an image to be displayed on the first display portion when the mobile computing device is in the partial display mode.

Example AA8 includes the method of any one of Examples AA1-AA7, further comprising: displaying first images at the first display portion when the mobile computing device is in the full display mode, the first images corresponding to video data provided by a first display module; and displaying second images at the second display portion when the mobile computing device is in the partial display mode, the second images corresponding to video data provided by a second display module.

Example AA9 includes the method of Example AA8, further comprising, when the mobile computing device is in the partial display mode: placing the first display module into a first display module low-power state; and periodically waking the second display module from a second display module low-power state to generate a new image to be displayed at the second display portion.

Example AA10 includes the method of any one of Examples AA1-AA9, wherein the mobile computing device comprises a lid rotatably attached to a base and the foldable display covers at least a portion of a first surface of the lid and at least a portion of a second surface of the lid, the first surface of the lid being a user-facing surface when the mobile computing device is in an open configuration and the second surface of the lid being a world-facing surface.

Example AA11 includes the method of Example 10, wherein the lid comprises a top edge located distally from a hinge end portion at which the lid rotatably attaches to the base and the foldable display wraps around the top edge of the lid.

Example AA12 includes the method of Example 10, wherein the lid comprises side edges and the foldable display wraps around at least one of the side edges.

Example AA13 includes the method of any one of Examples AA1-AA9, wherein the mobile computing device comprises a lid rotatably attached to a base, the foldable display covers at least a portion of a first surface of the lid and at least a portion of a first surface of the base, the first surface of the lid and the first surface of the base facing each other when the mobile computing device is in the closed configuration, the lid having a lid length extending from a hinge end portion at which the lid rotatably attaches to the base to a lid top edge located distally from the hinge end portion, the base having a base length extending from a hinge end portion at which the base rotatably attaches to the lid to a base front edge located distally from the hinge end portion, the lid length being less than the base length, and the second display portion located on the first surface of the base.

Example AA14 includes the method of any one of Examples AA1-AA13 wherein placing at least a portion of the frame buffer into the frame buffer low-power state comprises disabling the frame buffer.

Example AA15 includes the method of any one of Examples AA1-AA13 wherein placing at least a portion of the frame buffer into the frame buffer low-power state comprises disabling a portion of a memory array of the frame buffer.

Example AA16 includes the method of any one of Examples AA1-AA13 wherein placing at least a portion of the frame buffer into the frame buffer low-power state comprises reducing an operating voltage of the frame buffer.

Example AB1 includes a mobile computing device comprising: a base; a foldable display; and a lid rotatably attached to the base, the lid comprising a timing controller comprising a frame buffer, the timing controller to: enable a first display portion of the foldable display when the mobile computing device is in a full display mode; disable the first display portion and enable a second display portion of the foldable display when the mobile computing device is in a partial display mode, the first display portion visible when the mobile computing device is in an open configuration and not visible when the mobile computing device is in a closed configuration, the second display portion visible when the mobile computing device is in the closed configuration, the mobile computing device in the closed configuration when in the partial display mode; and place at least a portion of a frame buffer into a frame buffer low-power state when the mobile computing device is in the partial display mode, the frame buffer storing image data corresponding to images to be displayed at the foldable display.

Example AB2 includes the mobile computing device of Example AB1, the timing controller further to enable the second display portion when the mobile computing device is in the full display mode.

Example AB3 includes the mobile computing device of Example AB1 or AB2, the timing controller further to, when the mobile computing device is in the partial display mode, place one or more row drivers that drive rows of the first display portion into a row driver low-power state.

Example AB4 includes the mobile computing device of any one of Examples AB1-AB3, the timing controller further, when the mobile computing device is in the partial display mode, place one or more column drivers that drive columns of the first display portion into a column driver low-power state.

Example AB5 includes the mobile computing device of any one of Examples AB1-AB4, wherein the frame buffer is a first frame buffer, the timing controller further comprising a second frame buffer that is smaller the first frame buffer, the timing controller further to, when the mobile computing device is in the partial display mode, utilize the second frame buffer to store image data corresponding to images to be displayed at the second display portion.

Example AB6 includes the mobile computing device of any one of Examples AB1-AB5, wherein the timing controller further comprises one or more image processing components, the timing controller further to bypass one or more image processing components in a display pipeline when the mobile computing device is in the partial display mode.

Example AB7 includes the mobile computing device of any one of Examples AB1-AB6, wherein the timing controller further comprises one or more image processing components, the timing controller further to configure one or more image processing components in a display pipeline to not process image data corresponding to a portion of an image to be displayed on the first display portion when the mobile computing device is in the partial display mode.

Example AB8 includes the mobile computing device of any one of Examples AB1-AB7, the timing controller further to: display first images at the first display portion when the mobile computing device is in the full display mode; and display second images at the second display portion when the mobile computing device is in the partial display mode; and the mobile computing device further comprising: a first display module to provide the first images to the timing controller; and a second display module to provide the second images to the timing controller.

Example AB9 includes the mobile computing device of any one of Examples AB1-AB8, wherein the lid comprises a top edge located distally from a hinge end portion at which the lid rotatably attaches to the base and the foldable display wraps around the top edge of the lid.

Example AB10 includes the mobile computing device of any one of Examples AB1-AB8, wherein the lid comprises one or more side edges and the foldable display wraps around at least one of the side edges.

Example AB11 includes the mobile computing device of any one of Examples AB1-AB8, wherein the foldable display covers at least a portion of a first surface of the lid and at least a portion of a first surface of the base, the first surface of the lid and the first surface of the base facing each other when the mobile computing device is in the closed configuration, the lid having a lid length extending from a hinge end portion at which the lid rotatably attaches to the base to a lid top edge located distally from the hinge end portion, the base having a base length extending from a hinge end portion at which the base rotatably attaches to the lid to a base front edge located distally from the hinge end portion, the lid length being less than the base length, and the second display portion located on the first surface of the base.

Example AB12 includes the mobile computing device of any one of Examples AB1-AB11 wherein placing at least a portion of the frame buffer into the frame buffer low-power state comprises disabling the frame buffer.

Example AB13 includes the mobile computing device of any one of Examples AB1-AB11 wherein placing at least a portion of the frame buffer into the frame buffer low-power state comprises disabling a portion of a memory array of the frame buffer.

Example AB14 includes the mobile computing device of any one of Examples AB1-AB11 wherein placing at least a portion of the frame buffer into the frame buffer low-power state comprises reducing an operating voltage of the frame buffer.

Example AC1 includes one or more non-transitory computer-readable storage media storing computer-executable instructions for causing a mobile computing device to perform any one of the methods of Examples AA herein above.

Example AD1 includes a system comprising one or more means to implement one or more of the methods of Examples AA herein above.

Display Management for a Multiple Display Computing System

Display power, which can include a backlight and panel electronics, consumes a significant amount of power on systems today. A display in a computing system can incur forty to sixty percent (40-60%) of the total system power. An SoC and system power increases significantly when there are multiple external displays. For example, significantly higher power costs may be incurred for connecting to two 4K monitors due to rendering the additional high-resolution displays.

Many current computing devices switch between power modes to save energy, extend the life of the battery, and/or to prevent burn-in on certain display screens. Energy efficiency techniques implemented in a computing system, however, may negatively impact user experience if the techniques impair responsiveness or performance of the system.

Display management solutions to save power and energy for displays have involved user presence detection from a single display system in which a display panel is dimmed or turned off if a user is not detected. For example, a backlight may be dimmed such that brightness is reduced or the backlight may be turned off entirely. For example, software-based solutions may determine if a user's face is oriented at the single display and dim or turn off that display accordingly. Software-based solutions, however, incur significant power, in the amount of Watts range, for example. In addition, software-based solutions are only capable of handling an embedded display and would need to be more conservative when determining when to turn off the display. Moreover, these single-display solutions only have as much accuracy as the field-of-view of the single display.

Single-display user presence solutions cannot appropriately manage battery life, responsiveness gains, and privacy and security features collectively or effectively. In single-display systems, only one input from one display is obtained, which limits the amount of data that can be used to effectively manage multiple display scenarios. Depending on where the user presence enabled system is placed, the system may not effectively receive accurate information as to when the user is approaching their computing system (e.g., at a workstation, desk) and where they are looking when situated at their computing system. Moreover, if the user closes their laptop having a single-display user presence solution, then there is no way to manage the external monitor display and save power if the user looks away from that external monitor. When the laptop is closed, the external monitor would not be able to respond to any user presence behaviors.

External and high-resolution displays (e.g., 4K displays) are increasingly being used in extended display scenarios. Such displays, however, significantly increase the display and system power and energy. These solutions do not have a method for handling user presence to save power and energy, which can potentially impact meeting certain state and/or federal certifications such as the California Energy Commission and Energy Star. The high resolution can also impact performance by fifty percent (50%) or more, which can further diminish user experience.

In another example, authentication software (e.g., Microsoft® Windows Hello® authentication software) allows users to place a clip-on camera on each monitor and run face authentication on the monitor to which the user's attention is directed. Such solutions are only available for authentication (e.g., by facial recognition) and logging in the user when the user is positioned at the right distance and orientation in front of the display panel. These authentication solutions do not address managing display power and brightness based on user presence.

More recent developments have included a low power component that provides human presence and attentiveness sensing to deliver privacy and security through different operational modes based on a user's presence and attentiveness. While significant for laptops or other single device implementations, these advances do not address issues surrounding multiple display modules in today's most common computing environments.

It is common in today's computing environments for users to dock their laptops at their workstations, whether in the office or at home. Studies have shown that corporate users work in a docked scenario for approximately eighty percent (80%) of the time. A common scenario is for users to dock their laptop and work mainly on a docking station with an external monitor, where the external monitor can be a larger main display that the user is engaged with for most of the docking time.

Embodiments provide a computing system that comprises a first display device including a first display panel, a first camera, and first circuitry to generate first image metadata based on first image sensor data captured by the first camera and second display device including a second display panel, a second camera, and second circuitry to generate second image metadata based on second image sensor data captured by the second camera. The computing system may further include a processor operably coupled to the first display device and the second display device. The processor is configured to select the operation mode for the display devices based on the image metadata. For instance, the processor may select a first operation mode for the first display device based on the first image metadata and a second operation mode for the second display device based on the second image metadata.

The first and second image metadata may for example indicate whether the user is engaged with the first display device or second display device, respectively, and the operation mode of the individual display devices may be selected based on this indication. The detection of the engagement or disengagement of the user with a display device could be for example based on face recognition. For example, the first circuitry may detect a face of a user in the first image sensor data; determine that the user is present in a first field of view of the first camera based on detecting the face of the user in the first image sensor data; determine, based on the first image sensor data, a first orientation of the face of the user; and determine whether the user is engaged or disengaged with the first display device based, at least in part, on the first orientation of the face of the user. A similar operation may be performed by the second circuitry in order to determine whether the user is engaged or disengaged with the second display device. If the user is disengaged to a particular one of the display devices, an operating mode may be selected for the one display device in which the brightness of a backlight for the display panel of the one display device is progressively reduced over a time period until a user event occurs or until the backlight is reduced to a predetermined minimum level of brightness (or until the backlight is even turned off).

User presence may be used to unlock the computing system and/or authenticate the user. For example, a processor of the computing system may further determine that access to the computing system is locked, determine that an authentication mechanism is not currently running on the second display device; trigger the authentication mechanism to authenticate the user via the display device to which the user is engaged; and leave the other display device turned off until the user is authenticated.

FIGS. 23A-23B demonstrate scenarios of a user's possible attentiveness in a computing system where the laptop is connected to one additional external monitor. FIG. 23A includes a user 2302, a laptop 2312 and an external monitor 2339 communicatively coupled to laptop 2312. Laptop 2312 includes a primary display panel 2316 in a lid 2314 of the laptop and a user-facing camera 2310 coupled to the lid. External monitor 2339 includes a secondary display panel 2326. Only laptop 2312 is enabled with user presence and attentiveness detection where the user presence policy can dim the display and/or turn it off altogether based on whether the user is disengaged or not present from that single embedded primary display panel 2316. Because laptop 2312 is the only system enabled with user presence and attentiveness detection, then that system is the only one that can dim or turn off its embedded display panel based on the user's attentiveness, i.e., based on that display's point of view. Thus, display management may be applied only to the primary display panel in the laptop, or it may be uniformly applied to all screens.

In FIG. 23A, when the user's attentiveness is directed to primary display panel 2316, as indicated at 2304A, laptop 2312 can detect the user's face and presence and initiate (or maintain) the appropriate operational mode to enable use of the laptop and its primary display panel 2316, while external monitor 2339 also remains on and incurs power and energy. When the user's attentiveness is directed to secondary display panel 2326 of external monitor 2339, as indicated at 2304B in FIG. 23B, laptop 2312 can apply display management to its primary display panel 2316. In cases where display management is uniformly applied to both monitors, then any change (e.g., dimming, sleep mode) applied to primary display panel 2316 is also applied to secondary display panel 2326 even though the user is engaged with secondary display panel 2326.

Figure 24B:
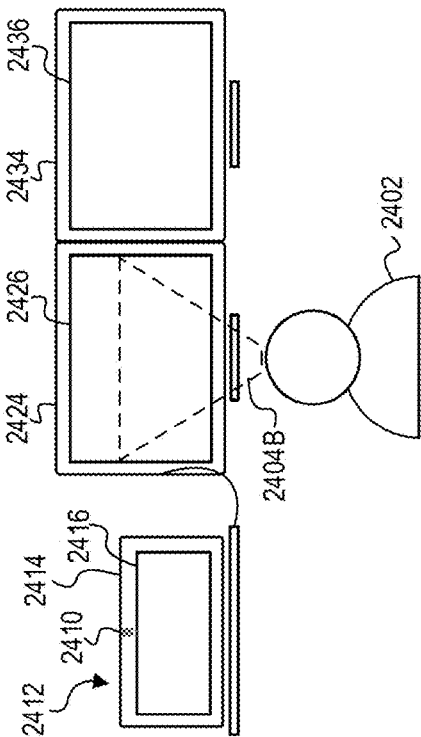
FIGS. 24A-24C are diagrammatic representations of user attentiveness to different display devices of a typical multiple display computing system.
Figure 24A:
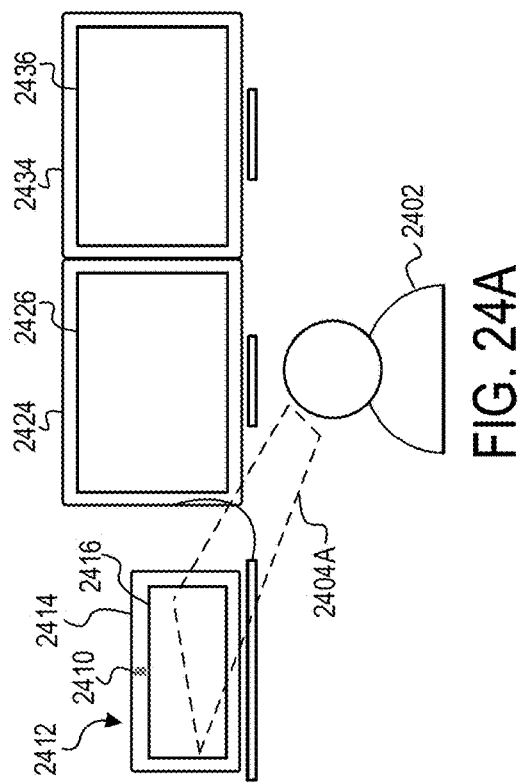
Figure 24C:
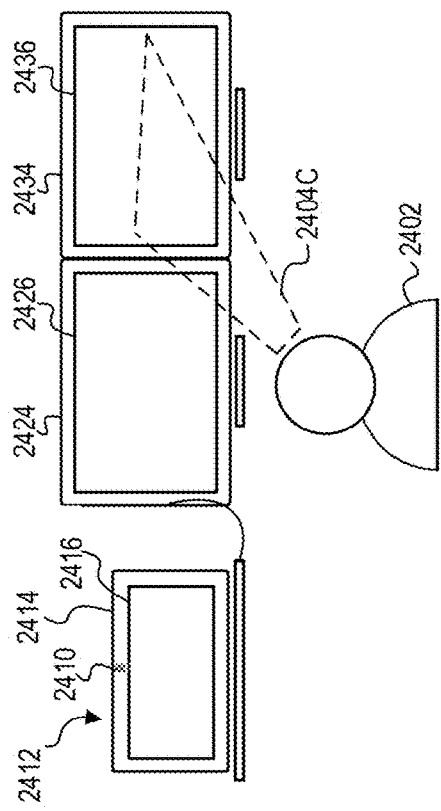

There are many multiple screen and docking configurations. In another example, FIG. 24A-24C demonstrate scenarios of a user's possible attentiveness in a computing system where the laptop is connected to two additional external monitors. FIG. 24A includes a user 2402, a laptop 2412, and first and second external monitors 2424 and 2434 communicatively coupled to laptop 2412. Laptop 2412 includes a primary display panel 2416 in a lid 2414 of the laptop and a camera 2410, including an image sensor, coupled to the primary display panel. External monitor 2424 includes a secondary display panel 2426, and external monitor 2434 also includes a secondary display panel 2436. Only laptop 2412 is enabled with user presence and attentiveness detection. The user can be engaged and focused on any of the three monitors. Because laptop 2412 is the only system enabled with user presence and attentiveness detection, then that system is the only one that can dim or turn off its embedded display based on the user's attentiveness, i.e., based on that display's point of view. If the user remains engaged to just that laptop display, the other two monitors would remain powered on since they do not provide any user presence-based inputs into the policy. Thus, display management may be applied only to the display panel in the laptop, or it may be uniformly applied to all three screens.

In FIG. 24A, when the user's attentiveness is directed to primary display panel 2416 of laptop 2412, as indicated at 2404A, laptop 2412 can detect the user's face and presence and initiate (or maintain) the appropriate operational mode to enable use of the system, while both external monitors 2424 and 2434 also remain powered on and incur power and energy. When the user's attentiveness is directed to the middle screen, as indicated at 2404B in FIG. 24B, laptop 2412 can apply display management to its primary display panel 2416, while secondary display panel 2436 would remain powered on and incur power and energy. This also may make for a less ideal user experience since only one display can handle dimming policies while the other external monitor remains on. Similarly, when the user's attentiveness is directed to the last screen, as indicated at 2404C in FIG. 24C, laptop 2412 can apply display management to its primary display panel 2416, while the middle display panel 2426 would remain powered on and incur power and energy.

Display power management for multiple displays and docking scenarios based on user presence and attentiveness, as disclosed herein, can resolve these issues. Embodiments described herein expand a single display policy to handle multiple displays to seamlessly manage each individual display panel according to a global collective policy. The embodiments disclosed herein enable a primary display device (e.g., lid containing embedded display panel in a mobile computing device, monitor connected to a desktop) in a multiple display computing system, and one or more secondary displays (e.g., external monitors) in the multiple display computing system, to perform user presence and attentiveness detection and individualized display management based on the detection. Thus, any display panel of a display device can be dimmed and/or turned off according to the user's behavior. Policies can be implemented to manage multiple display panels (e.g., a primary display panel of a computing device and one or more other display panels in external monitors operably coupled to the computing device) in a cohesive manner. Examples can include policies to accommodate waking the system upon face detection from any of the multiple display devices, adaptively dimming display panels (e.g., by reducing the backlight) based on user attentiveness to a particular display device, preventing locking a display panel if a user is detected (even if the user is not interacting with the computing system), and locking the computing system when the use is no longer detected by any of the display devices.

In one or more embodiments, a lid controller hub, such as LCH 155, 260, 305, 954, 1860, 2830A, 2830B, or at least certain features thereof, can be used to implement the user presence and attentiveness-based display management for multiple displays and docking scenarios. The embodiments disclosed herein can intelligently handle inputs received from every display (e.g., via respective LCHs) to seamlessly dim or turn off each display based on user presence and attentiveness data. In one or more embodiments, a system can be triggered to wake even before the user sits down. In addition, the area in which a user can be detected may be enlarged by using a camera for each display. The system can also be triggered to wake even before any usages of the system when the user is already logged on. Embodiments herein also provide for preventing a system from dimming a display panel or setting the system in a low-power state based on user presence at any one of multiple displays, even if the user is not actively interacting with the system. Accordingly, power and energy can be saved and user experience improved when more than one (or all) displays can provide user presence and attentiveness detection.

Figure 25:
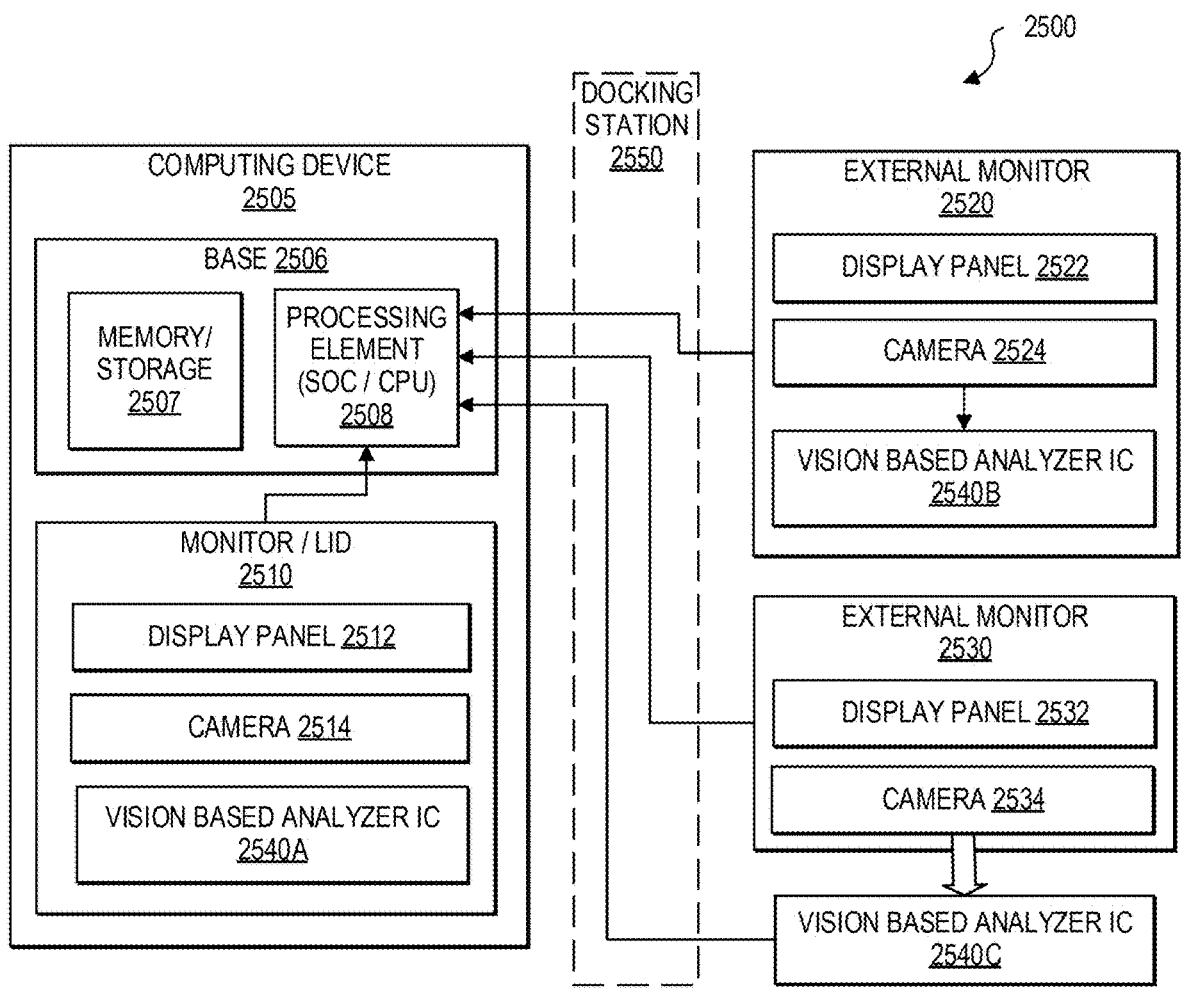
FIG. 25 is a simplified block diagram of a multiple display computing system configured to manage the display devices based on user presence and attentiveness according to at least one embodiment.

Turning to FIG. 25, FIG. 25 is a simplified block diagram illustrating possible details of a multiple display system 2500 in which an embodiment for user presence-based display management can be implemented to apply a global policy to handle the multiple display devices. In one or more embodiments, each display device is adapted to provide its own user presence and attentiveness input. Multiple display system 2500 can include a computing device 2505 such as a laptop or any other mobile computing device, connected to one or more additional display devices. In at least one example, computing device 2505 (and its components) represents an example implementation of other computing devices (and their components) disclosed herein (e.g., 100, 122, 200, 300, 900, 1700-2300, 2800A, 2800B). Additional display devices in example system 2500 are embodied in a first external monitor 2520 and a second external monitor 2530. In one possible implementation, external monitors 2520 and 2530 may be docked to computing device 2505 via a docking station 2550. It should be apparent, however, that other implementations are possible. For example, external monitors 2520 and 2530 may be directly connected to computing device 2505 (e.g., via HDMI ports on the computing device), or may connect to computing device 2505 using any other suitable means.

Computing device 2505 can be configured with a base 2506 and a lid 2510. A processing element 2508, such as a system-on-a-chip (SoC) or central processing unit (CPU), may be disposed in base 2506. A display panel 2512 and a user-facing camera 2514 may be disposed in lid 2510. External monitors 2520 and 2530 are also configured with respective display panels 2522 and 2532 and respective cameras 2539 and 2534.

Each display device, including the primary display device (e.g., 2512) of the computing device and the one or more additional external (or secondary) display device(s) connected to the computing device (e.g., 2520, 2530), can be configured with its own vision-based analyzer integrated circuit (IC), which may be included contain some or all of the features of one or more lid controller hubs described herein (e.g., LCH 155, 260, 305, 954, 1860, 2830A, 2830B). For example, a vision-based analyzer IC 2540A is disposed in lid 2510 of computing device 2505, a vision-based analyzer IC 2540B is disposed in first external monitor 2520, and a vision-based analyzer IC 2540C is disposed external to second external monitor 2530.

The vision-based analyzer ICs 2540A, 2540B, and 2540C each comprise circuitry to perform machine learning algorithms that can, based on image sensor data generated by an associated camera, perform user presence detection, face detection, and face orientation detection in an imaging field of view from their respective cameras 2514, 2539, and 2534. Vision-based analyzer ICs 2540A, 2540B, and 2540C can generate respective image metadata based on respective image sensor data generated by respective cameras 2514, 2539, and 2534. The image metadata generated by a given vision-based analyzer IC associated with a given camera may indicate whether a user is present in the field of view of the given camera, engaged with a display panel associated with the given camera, disengaged from the display panel associated with the given camera, and/or not present in the field of view of the given camera.

Image metadata generated by vision-based analyzer ICs 2540A, 2540B, and 2540C can be provided to SoC 2508, which can selectively control settings of particular performance parameters affecting the power levels and/or the performance levels of the multiple display devices 2510, 2520, and 2530 and computing device 2505 to which the multiple display devices are docked or otherwise connected. Settings for the display devices can be controlled according to policies that are defined based on user presence, user absence, user engagement, and/or user disengagement with each display device. Because a dedicated camera and a vision-based analyzer IC are implemented for each display device (e.g., primary display device of a computing device and secondary display devices of external monitor(s)), user presence-based policies can be more accurately managed. Examples of user presence-based policies can include, but are not necessarily limited to face and head presence and orientation detection for waking the system when a user is detected, adaptively dimming display panels when a user is not attentive, not locking the system when a user is present, and locking the system when a user is absent. Each vision-based analyzer IC coupled to a camera for a display panel can provide input that indicates a user approaching its display device from a unique field of view, which can improve the accuracy and speed to wake the system and trigger face authentication. Also, more accuracy can be provided to manage a display device (e.g., dim or turn off the backlight of the display panel when the user is disengaged or not present), for each display individually and collectively. Importantly, power and performance can improve when one or more display panels can be dimmed or turned off by adjusting the backlight, and/or when a display panel refresh rate and rendering can be reduced for one or more display panels. In at least the context of embodiments for display management for a multiple display computing system, a display panel can be dimmed by adjusting the backlight of the display panel to a reduced brightness, and is turned off when no backlight is provided to the display panel. It should be noted, however, that even when no backlight is provided to the display panel such that the display panel is effectively turned off, cameras 2514, 2539, and 2534 may be configured for "always-on" usage such that each camera can continue to capture images and generate image sensor data, and vision based analyzer ICs 2540A, 2540B, and 2540B can continue to evaluate the image sensor data.

In one or more embodiments, a dedicated vision-based analyzer IC may be provisioned for each display device in a multiple display system (e.g., 2500). Embodiments allow for a vision-based analyzer IC to be integrated into a display device or to be configured as an add-on device to a display device. For example, in some cases, dedicated vision-based analyzer ICs may be integrated into a lid of a computing device and into external monitors. In other scenarios, however, a vision-based analyzer IC may be configured as a dongle or other small device capable of being connected to and used with any display device in a computing system. For example, in system 2500, lid 2510 of computing device 2505 and first external monitor 2520 may have respective integrated vision-based analyzer ICs 2540A and 2540B. However, second external monitor 2530 may have an add-on vision-based analyzed IC 2540C. In one example, add-on vision-based analyzer IC 2540C may be integrated with its own camera and attached to the housing of second external monitor 2530 such that the external camera is positioned to capture images of an appropriate imaging field of view for second external monitor 2530. In another example, second external monitor 2530 may be configured with a port that allows add-on vision-based analyzer IC 2540C to be connected a camera embedded in the second external monitor, such as camera 2534.

Figure 26:
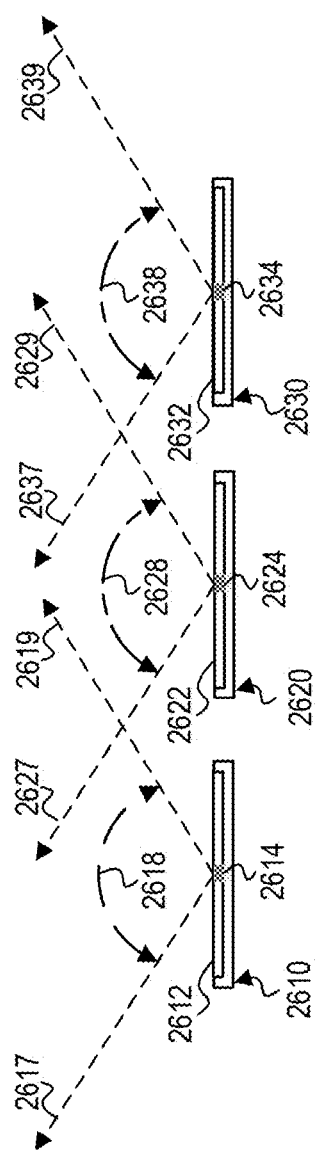
FIG. 26 is a top plan view illustrating possible fields of view of cameras in a multiple display computing system.

FIG. 26 is a top plan view illustrating possible fields of view of cameras in a multiple display system. In this example scenario, top plan views of a first display device 2610, a second display device 2620, and a third display device 2630 are shown. At least one of the display devices may be configured as part of a computing device (e.g., lid 2510 of computing device 2505). The other two display devices may be embodied as external monitors (e.g., 2520, 2530) or other devices including display panels operably coupled to the computing device. First display device 2610 includes a first display panel 2612 and a first user-facing camera 2614, second display device 2620 includes a second display panel 2622 and a second camera 2624, and third display device 2630 includes a third display panel 2632 and a third camera 2634. Each camera can be configured for always-on usage and can face the direction of its associated display panel. Each camera 2614, 2639, and 2634 can be disposed in a bezel area surrounding its respective display panel 2612, 2622, or 2632, coupled to its respective display panel 2612, 2622, or 2632, externally attached to its respective display device 2610, 2620, or 2630, and/or located on another portion of its respective display device or associated computing device.

In at least one embodiment, each camera is associated with an imaging field of view (FoV), and may include (or be operably coupled to) a suitable image sensor for detecting movement and/or light that may indicate the presence of a user in the camera's imaging FoV. For example, first camera 2614 is associated with a first imaging FoV 2618 spanning between dashed lines 2617 and 2619. Second camera 2624 is associated with a second imaging FoV 2628 spanning between dashed lines 2627 and 2629. Third camera 2634 is associated with a third imaging FoV 2638 spanning between dashed lines 2637 and 2639. In the example of FIG. 26, first camera 2614 generates image sensor data representing an image of the area surrounding first display device 2610 that is visible within imaging FoV 2618. Second camera 2624 generates image sensor data representing an image of the area surrounding second display device 2620 that is visible within second imaging FoV 2628. Third camera 2634 generates image sensor data representing an image of the area surrounding third display device 2630 that is visible within third imaging FoV 2638.

As shown in FIG. 26, depending on the arrangement of a multiple display system, imaging FoVs may overlap. In this example, imaging FoVs 2618, 2628, and 2638 associated with display devices 2610, 2620, and 2630 overlap to create an extended area that is larger than the FoV of a single camera and in which the presence of a user can be sensed by one or more of cameras 2614, 2639, and 2634. It should be noted that although the multiple devices shown in FIG. 26 are arranged along a generally straight line, numerous other configurations are possible. For example, any of the display devices may be angled or turned based on particular needs and preferences of a user. Different arrangements (e.g., angles, tilts, positions) may result in different fields of view and different overlapping portions of the fields of view for the multiple cameras.

Figure 27C:
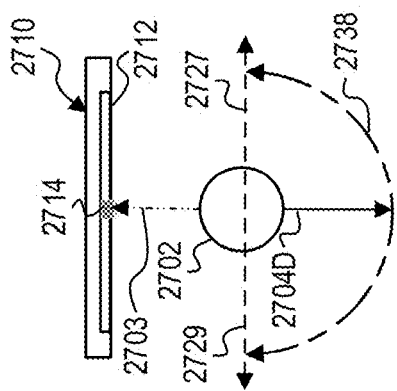
FIGS. 27A-27C are top plan views illustrating possible head/face orientations of a user relative to a display device.
Figure 27B:
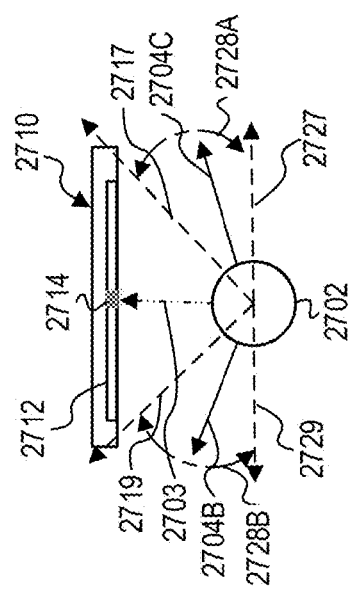
Figure 27A:
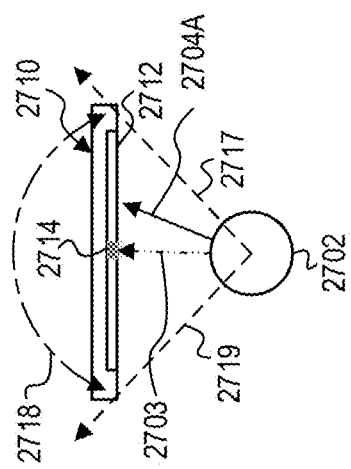

FIGS. 27A-27C are top plan views illustrating possible head/face orientations of a user relative to a display device. In these example scenarios, a display device 2710, which includes a display panel 2712 and a user-facing camera 2714, is shown. A user 2702 is also shown positioned opposite to display panel 2712, such that the user can view the display panel. In this example, user 2702 is located within a field of view (FoV) of camera 2714 and thus, image sensor data generated by camera 2714 can include data representing user 2702. For illustrative purposes, face orientations 2704A-2704D indicate example directions of the gaze of user 2702 relative to display panel 2712. In one or more examples, a face orientation or gaze direction extends perpendicularly from the user's face (e.g., the center of the user's face such as the nose, the center point between the eyes, the center point of lips). Display device 2710 represents an example lid of a computing device (e.g., lid 2510 of computing device 2505) or an external monitor (e.g., 2520, 2530) or other device with a display panel operably coupled to a computing device.

In one or more embodiments, image sensor data generated by camera 2714 can be analyzed by a vision-based analyzer IC (e.g., 2540A, 2540B, 2540C) to determine whether a user is present in the camera's imaging field of view (FoV) as described with reference to FIG. 26. In addition, when a user is determined to be present in the imaging FoV of camera 2714, the vision-based analyzer IC may determine a face orientation of user 2702 relative to display panel 2712. Machine learning algorithm(s) may be used to train the vision-based analyzer IC to recognize human facial features and, based on the recognition of such facial features, to determine a user's face orientation, the location of the user's head/face within an imaging field of view (FoV) of the associated camera. In at least one embodiment, a user's intent (e.g., engaged, disengaged) can be inferred from the identified face orientation, and parameters defining the maximum angle of rotation for a user's face and/or gaze direction.

In one or more embodiments, determining whether user 2702 is engaged or disengaged from display panel 2712 can be accomplished by determining whether an angle of rotation of a user's face relative to display panel 2712 is within a first-level area between user 2702 and display panel 2712. In one example, the angle of rotation of a user's face relative to display panel 2712 may be calculated as the angle defined between a direct display path (e.g., 2703) and the user's face orientation or gaze direction (e.g., 2704A-2704D). The direct display path (e.g., 2703) may be defined as a generally direct path from camera 2714 to user 2702, as the camera is typically proximate to the display panel. The user's head orientation (e.g., 2704A-2704D) may correspond to a perpendicular direction extending from the user's face (e.g., from the nose, the center of the lips, the center of the forehead between the eyes). The first-level area may be defined as the area between a first-level maximum angle of rotation of a user's face to the left of the direct display path and a first-level maximum angle of rotation of the user's face to the right of the direct display path. In one or more implementations, the first-level maximum angle of rotation to the left is the same as the first-level maximum angle of rotation to the right and may be, for example forty-five degrees) (45°). The first-level maximum angles of rotation may be user and/or system configurable in at least one embodiment.

As shown in FIGS. 27A-27C, the direct display path 2703 and face orientations 2704A-2704D indicate possible scenarios of a user's face orientation relative to display panel 2712, from which the engagement or non-engagement of user 2702 to display panel 2712 can be inferred. Generally, if user 2702 is facing towards display panel 2712 (regardless of whether the user is located directly in front of display panel 2712 or at some other location within the imaging FoV of camera 2714), the vision-based analyzer IC may infer that the user is interested (e.g., engaged) in the content rendered on the display panel and, therefore, does not want the operation of the computing device or the brightness of display panel 2712 to be negatively impacted. In another scenario, if user 2702 is turned to either side relative to a direct display path from the user to display panel 2712, but not turned completely away from display panel 2712, vision-based analyzer IC may infer that the user is not currently interested (e.g., present but disengaged) in contents rendered on display panel 2712, but is still present and engaged with the operation of the computing device. For example, user 2702 may be sitting at his or her desk within the imaging FoV associated with camera 2714 but turned to the side to view a second display panel of a docked external monitor. Thus, while the user may be disengaged from display panel 2712, the user may be interested in contents rendered on the second display panel of the external monitor and therefore, may want the operation of the computing device to continue. In this case, display panel 2712 may be progressively dimmed over time (e.g., brightness of a backlight is reduced) assuming the user does not redirect his or her attention back to display panel 2712. However, a vision-based analyzer IC associated with the external monitor may determine that user 2702 is present and engaged with the second display panel in the external monitor. Thus, the operation of the computing device and the second display panel of the external monitor would not be negatively impacted (e.g., display panel dimmed, SoC transitioning into a low-power state) in this scenario. Generally, the performance of the computing device, display panel 2712, and the second display panel of the external monitor can be adjusted based on the inferred engagement of user 2702 to either increase performance for improved user experience (e.g., when the user is engaged) or decrease performance to conserve power (e.g., when the user is either present and disengaged or absent).

In at least one embodiment, image metadata indicating user presence, absence, engagement, or disengagement with respect to display panel 2712 may be generated based on identifying user presence/absence and face orientation of a detected human face. This image metadata can be provided to a processing element of a computing device (e.g., SoC 2508 of computing device 2505) communicatively coupled to the vision-based analyzer IC of display device 2710. Based on the indication of whether a user is engaged, disengaged, present, and/or absent, and on one or more predefined rules, the computing device can control settings for particular performance parameters affecting the power level and/or performance level of display device 2710.

In a first example shown in FIG. 27A, the vision-based analyzer IC may determine that user 2702 is present and engaged with respect to display panel 2712 based on determining that the user's face orientation 2704A is within a first-level area 2718. In one implementation, first-level area 2718 may extend forty-five degrees (45°) to the left and forty-five degrees (45°) to the right of the direct display path 2703. In this example, first-level area 2718 may span approximately ninety degrees (90°) between dashed line 2717, which represents a first-level maximum angle of rotation to the right, and dashed line 2719, which represents a first-level maximum angle of rotation to the left. The user's face orientation 2704A, forms an angle of rotation with direct display path 2703 that is less than the first-level maximum angle of rotation to the right indicated by dashed line 2717. Therefore, the user's face orientation 2704A is within first-level area 2718. Accordingly, the vision-based analyzer IC can infer that user 2702 is engaged with display panel 2712 (e.g., interested in content rendered on display panel 2712), even if user 2702 is not currently interacting with a user interface (e.g., keyboard, touchpad, mouse, touchscreen).

In a second example shown in FIG. 27B, the vision-based analyzer IC may determine that user 2702 is present but not engaged with respect to display panel 2712 based on determining that the user's face orientation 2704B or 2704C is within a second-level area 2728B or 2728C. In one implementation, each second-level area 2728B and 2728C lies outside first-level area 2718, but does not extend past a second-level maximum angle of rotation to the left or to the right from the direct display path. In one example, the second-level maximum angles of rotation from direct display path 2703 are ninety degrees (90°) to the left indicated at dashed line 2729 and ninety degrees (90°) to the right indicated at dashed line 2727. The left and right second-level areas may span approximately forty-five degrees (45°) each and may be defined between dashed lines 2719 and 2729 and between dashed lines 2717 and 2727. In one scenario of FIG. 27B, user's face orientation 2704C forms an angle of rotation with the direct display path 2703 that is between the first-level maximum angle of rotation to the right indicated by dashed line 2717 and the second-level maximum angle of rotation to the right indicated by dashed line 2727. Therefore, the user's face orientation 2704C is within second-level area 2728A. Accordingly, in this scenario, the vision-based analyzer IC can infer that user 2702 is not engaged with display panel 2712, but is still present and possibly engaged with another display device. In the other scenario of FIG. 27B, user's face orientation 2704B forms an angle of rotation with the direct display path 2703 that is between the first-level maximum angle of rotation to the left indicated by dashed line 2719 and the second-level maximum angle of rotation to the left indicated by dashed line 2729. Therefore, the user's face orientation 2704B is within second-level area 2728B. Accordingly, in this scenario, the vision-based analyzer IC can infer that user 2702 is not engaged with display panel 2712, but is still present and possibly engaged with another display device.

In a third example shown in FIG. 27C, the vision-based analyzer IC may determine either that user 2702 is not present or that the user is present but the user's face is undetectable with respect to display panel 2712 based on determining that the user's face orientation 2704D is within a third level area 2738. In one implementation, third level area 2738 may extend past a second-level maximum angle of rotation to the left or to the right from the direct display path. In one example, third level area 2738 may span approximately one-hundred eighty degrees (180°) between dashed line 2727, which represents the second-level maximum angle of rotation to the right, and dashed line 2729, which represents the second-level maximum angle of rotation to the left. The user's face orientation 2704D is not identified because the face of user 2702 is not captured by camera 2714 since it is turned away from camera 2714 and display panel 2712. Accordingly, the vision-based analyzer IC can infer that user 2702 is not present. In some scenarios, however, the vision-based analyzer IC may infer that user 2702 is present (e.g., based on other detectable features like a body, a back of a head) but that the user's face is not detectable. This may be useful, for example, to implement a more aggressive dimming policy, rather than a dimming policy that is applied when the user's face orientation is within the second-level area.

In one or more embodiments, an additional level area may be defined. In this embodiment, when a user's face orientation is determined to be within the additional level area, the user's attentiveness is unknown. In one possible implementation, first-level area 2718 and second-level areas 2728A and 2728B may be reduced in size to create additional level area on the right and left between the first and second-level areas shown in FIGS. 27A-27C. For example, a first-level area (e.g., 2718) may span seventy-four degrees (74°) between a first-level maximum angle of rotation to the right (e.g., 37°), and a first-level maximum angle of rotation to the left (e.g., 37°). A second (additional) level area on the right may span fifteen degrees (15°) between the first-level maximum angle of rotation to the right (e.g., 37°) and a second-level maximum angle of rotation to the right (e.g., 31°). A second (additional) level area on the left may span fifteen degrees (15°) between the first-level maximum angle of rotation to the left (e.g., 37°) and a second-level maximum angle of rotation to the left (e.g., 31°). A third level area (e.g., 2728A) on the right may span thirty-eight degrees (38°) between the second-level maximum angle of rotation to the right (e.g., 31°) and a third level maximum angle of rotation to the right (e.g., 90°). A third level area on the left may span thirty-eight degrees (38°) between the second-level maximum angle of rotation to the left (e.g., 31°) and a third level maximum angle of rotation to the left (e.g., 90°). A fourth level area (e.g., 2738) may span one hundred eighty degrees (180°) between the third level maximum angle of rotation to the right (90°) and the third level maximum angle of rotation to the left (90°).

In this example, when the face orientation of the user is in one of the additional second-level areas, a determination may be made that the status of the user's engagement with the display device is unknown. In this scenario where a user has an unknown status, display management may be handled in any suitable manner according to particular implementations and needs. In one example, an unknown status may prevent the display panel from being progressively dimmed to ensure that it is not dimming prematurely and/or undesirably. In some implementations, a timer may be started to monitor the time that the user remains in the unknown status orientation. If a threshold amount of time expires, then the display brightness may be reduced immediately to a predetermined minimum level of display brightness for users who are still present but not engaged, or progressive dimming may be applied to the display device. The other level areas may be evaluated in the same manner as described with reference to FIGS. 27A-27C. In particular, if the user's face orientation is within the first-level area, then it is inferred that the user is engaged with the display panel and a normal/default level of brightness may be provided to the display panel. If the user's face orientation is within the third level area, then it is inferred that the user is present but disengaged with the display panel associated with the captured image sensor data, but the user may be engaged with another display device. In this scenario, dimming the backlight may be progressively applied to the display panel. If the user's face orientation is within the fourth level area, then an inference is drawn that the user is either not present or the user's face is not detectable. In this scenario, the display panel may be turned off immediately (e.g., if all other display devices provide image sensor data indicating the user is not present) or aggressive dimming may be progressively applied to the display panel until the display panel is turned off and no backlight is provided.

It should be noted that the particular values (e.g., degrees, distances) provided herein for user fields of view are for illustrative purposes only. While such given values may indeed be implemented in one or more scenarios, such values may be adjusted to any other suitable values based on particular needs and implementations. Furthermore, such values may be adjusted per display device. For example, in some scenarios it may be desirable for a particular display device, such as one that is at the end of several display devices in a single workstation, to have the range of rotation of the first-level area expanded to ensure that the display panel is not dimmed too frequently.

FIGS. 28A-28B illustrate an example two display system 2800 in which an embodiment of user presence-based display management is implemented. The two-display system 2800 includes a computing device 2805 and an external monitor 2820 operably coupled to computing device 2805. Computing device 2805 may include a base 2806 and a lid 2810. In this example, lid 2810 includes an embedded primary display panel 2812 and a user-facing camera 2814, including an image sensor. External monitor 2820 includes a secondary display panel 2822 and a user-facing camera 2839 that includes an image sensor. In this example, cameras 2814 and 2839 are embedded in bezel areas of their respective lid and monitor. It should be apparent, however, that these cameras may be integrated with or externally coupled to their respective lid and monitor in any other suitable manner. FIGS. 28A-28B also show a user 2802 and possible attentiveness directed toward the two display panels 2812 and 2822.

Each of the user-facing cameras 2814 and 2839 can be coupled to a respective vision-based analyzer IC (e.g., an LCH as described herein such as LCH 155, 260, 305, 954, 1860, 2830A, 2830B, etc. or circuitry that contains some of the features thereof), which may be disposed within the lid/monitor housing or could be operably coupled to the lid/monitor by an external connector (e.g., a dongle). Each vision-based analyzer IC can be configured to provide input to computing device 2805 indicating whether a user is present, engaged, disengaged, or not present in a field of view of its associated user-facing camera. The input from a given vision-based analyzer IC can be generated based on image sensor data generated for images captured by its associated camera 2814 or 2839.

FIG. 28A shows the attentiveness of user 2802, which is directed to primary display panel 2812 as indicated at 2804A. Camera 2814 can capture images in a first field of view specific to camera 2814. A first vision-based analyzer IC coupled to camera 2814 can use image sensor data from the captured images to detect the user's presence and the user's face orientation. The first vision-based analyzer IC can then provide input to computing device 2805 indicating whether the user is present, engaged, disengaged, or not present based on the first field of view of camera 2814. Camera 2839 can capture images in a second field of view specific to camera 2839. A second vision-based analyzer IC coupled to camera 2839 can use image sensor data from the captured images to detect the user's presence and face orientation from the second field of view. The second vision-based analyzer IC can then provide input to the computing device 2805 indicating whether the user is present, engaged, disengaged, or not present based on the second field of view of camera 2839.

Embodiments implemented in the dual display and docking scenario of FIGS. 28A-28B have the capability to dim and turn off the appropriate display, depending on where the user is facing. For example, in FIG. 28A, the vision-based analyzer IC associated with display panel 2812 in lid 2810 of computing device 2805 can detect user presence and face orientation as indicated at 2804A, while the vision-based analyzer IC associated with display panel 2822 of external monitor 2820 may detect user presence but not user attentiveness because the user's face is turned toward computing device 2805 instead. Accordingly, the computing device can initiate (or maintain) the appropriate operational mode to enable use of the computing device and its primary display panel 2812. The computing device can also adaptively dim display panel 2822 of external monitor 2820, until a threshold amount of time passes without detecting user attentiveness toward the external monitor. Once a threshold amount of time has passed, display panel 2822 may be turned off, while the user continues to use the computing device and its embedded display panel 2812.

In FIG. 28B, the vision-based analyzer IC associated with display panel 2822 of external monitor 2820 can detect user presence and face orientation as indicated at 2804B, while the vision-based analyzer IC associated with display panel 2812 in lid 2810 of computing device 2805 may detect user presence but not user attentiveness because the user's face is turned toward external monitor 2820 instead. Accordingly, the computing device can initiate (or maintain) the appropriate operational mode to enable use of the computing device and external display panel 2822. The computing device can also adaptively dim display panel 2812 of computing device 2805, until a threshold amount of time passes without detecting user attentiveness toward the computing device. Once a threshold amount of time has passed, display panel 2812 may be turned off, while the user continues to use the computing device and external monitor 2820.

Where a computing device is connected to more than one additional external monitor, user presence-based policies can be applied to any number of displays. FIGS. 29A-29C illustrate an example multiple display system 2900 in which display management based on user presence and attentiveness is implemented. The multiple display system 2900 includes a computing device 2905, a first external monitor 2920 operably coupled to computing device 2905, and a second external monitor 2930 operably coupled to computing device 2905. Computing device 2905 may include a base 2906 and a lid 2910. In this example, lid 2910 includes an embedded primary display panel 2912 and a user-facing camera 2914, including an image sensor. First external monitor 2920 includes a secondary display panel 2922 and a user-facing camera 2939 that includes an image sensor. Second external monitor 2930 also includes a secondary display panel 2932 and a user-facing camera 2934 that includes an image sensor. In this example, cameras 2914, 2939, and 2934 are embedded in bezel areas of their respective lid/monitors. It should be apparent, however, that these cameras may be integrated with or externally coupled to their respective lid/monitors in any other suitable manner. FIGS. 29A-29C also show a user 2902 and possible attentiveness directed toward the multiple display panels 2912, 2922, and 2932.

Each of the user-facing cameras 2914, 2939, and 2934 can be coupled to a respective vision-based analyzer IC (e.g., an LCH as disclosed herein such as LCH 155, 260, 305, 954, 1860, 2830A, 2830B, etc. or circuitry that contains some of the features thereof), which may be disposed within the lid/monitor housing or could be operably coupled to the lid/monitor by an external connector (e.g., a dongle). Each vision-based analyzer IC can be configured to provide input to computing device 2905 indicating whether a user is present, engaged, disengaged, or not present in a field of view of its associated user-facing camera. The input from a given vision-based analyzer IC can be generated based on image sensor data generated for images captured by its associated camera 2914, 2939, or 2934.

FIG. 29A shows the attentiveness of user 2902, which is directed to primary display panel 2912 as indicated at 2904A. Camera 2914 can capture images in a first field of view specific to camera 2914. A first vision-based analyzer IC coupled to camera 2914 can use image sensor data from the captured images to detect the user's presence and the user's face orientation. The first vision-based analyzer IC can then provide input to computing device 2905 indicating whether the user is present, engaged, disengaged, or not present based on the first field of view of camera 2914. Camera 2939 can capture images in a second field of view specific to camera 2939. A second vision-based analyzer IC coupled to camera 2939 can use the captured images to detect the user's presence and face orientation from the second field of view. The second vision-based analyzer IC can then provide input to computing device 2905 indicating whether the user is present, engaged, disengaged, or not present based on the second field of view of camera 2939. Camera 2934 can capture images in a third field of view specific to camera 2934. A third vision-based analyzer IC coupled to camera 2934 can use the captured images to detect the user's presence and face orientation from the third field of view. The third vision-based analyzer IC can then provide input to computing device 2905 indicating whether the user is present, engaged, disengaged, or not present based on the third field of view of camera 2934.

Embodiments implemented in the multiple display of FIGS. 29A-29C have the capability to dim and turn off the appropriate display, depending on where the user is facing. For example, in FIG. 29A, the first vision-based analyzer IC associated with display panel 2912 in lid 2910 of computing device 2905 can detect user presence and face orientation as indicated at 2904A. The second vision-based analyzer IC associated with display panel 2922 of external monitor 2920 may detect user presence but not user attentiveness because the user's face is turned toward computing device 2905 instead. Similarly, the third vision-based analyzer IC associated with display panel 2932 of external monitor 2930 may detect user presence but not user attentiveness because the user's face is turned toward computing device 2905 instead. Accordingly, the computing device can initiate (or maintain) the appropriate operational mode to enable use of the computing device and its primary display panel 2912. The computing device can also adaptively dim display panel 2922 of external monitor 2920 until a threshold amount of time passes without detecting user attentiveness toward external monitor 2920. Once a threshold amount of time has passed, display panel 2922 may be turned off, while the user continues to use the computing device and its embedded display panel 2912. Similarly, the computing device can also adaptively dim display panel 2932 of external monitor 2930 until a threshold amount of time passes without detecting user attentiveness toward the external monitor 2930. Once a threshold amount of time has passed, display panel 2932 may be turned off, while the user continues to use the computing device and its embedded display panel 2912.

In FIG. 29B, the vision-based analyzer IC associated with display panel 2922 of external monitor 2920 can detect user presence and face orientation as indicated at 2904B. The first vision-based analyzer IC associated with display panel 2912 in lid 2910 of computing device 2905 may detect user presence but not user attentiveness because the user's face is turned toward external monitor 2920 instead. Similarly, the third vision-based analyzer IC associated with display panel 2932 of external monitor 2930 may detect user presence but not user attentiveness because the user's face is turned toward external monitor 2920 instead. Accordingly, the computing device can initiate (or maintain) the appropriate operational mode to enable use of the computing device and the display panel 2922 of external monitor 2920. The computing device can adaptively dim display panel 2912 of computing device 2905, until a threshold amount of time passes without detecting user attentiveness toward the computing device. Once a threshold amount of time has passed, display panel 2912 may be turned off, while the user continues to use the external monitor 2920. The computing device can also adaptively dim display panel 2932 of external monitor 2930, until a threshold amount of time passes without detecting user attentiveness toward the external monitor 2930. Once a threshold amount of time has passed, display panel 2932 may be turned off, while the user continues to use the external monitor 2920.

In FIG. 29C, the vision-based analyzer IC associated with display panel 2932 of external monitor 2930 can detect user presence and face orientation as indicated at 2904C. The first vision-based analyzer IC associated with display panel 2912 in lid 2910 of computing device 2905 may detect user presence but not user attentiveness because the user's face is turned toward external monitor 2930 instead. Similarly, the second vision-based analyzer IC associated with display panel 2922 of external monitor 2920 may detect user presence but not user attentiveness because the user's face is turned toward external monitor 2930 instead. Accordingly, the computing device can initiate (or maintain) the appropriate operational mode to enable use of the computing device and the display panel 2932 of external monitor 2930. The computing device can adaptively dim display panel 2912 of computing device 2905, until a threshold amount of time passes without detecting user attentiveness toward the computing device. Once a threshold amount of time has passed, display panel 2912 may be turned off, while the user continues to use the external monitor 2930. The computing device can also adaptively dim display panel 2922 of external monitor 2920, until a threshold amount of time passes without detecting user attentiveness toward the external monitor 2920. Once a threshold amount of time has passed, display panel 2922 may be turned off, while the user continues to use the external monitor 2930.

Figure 30:
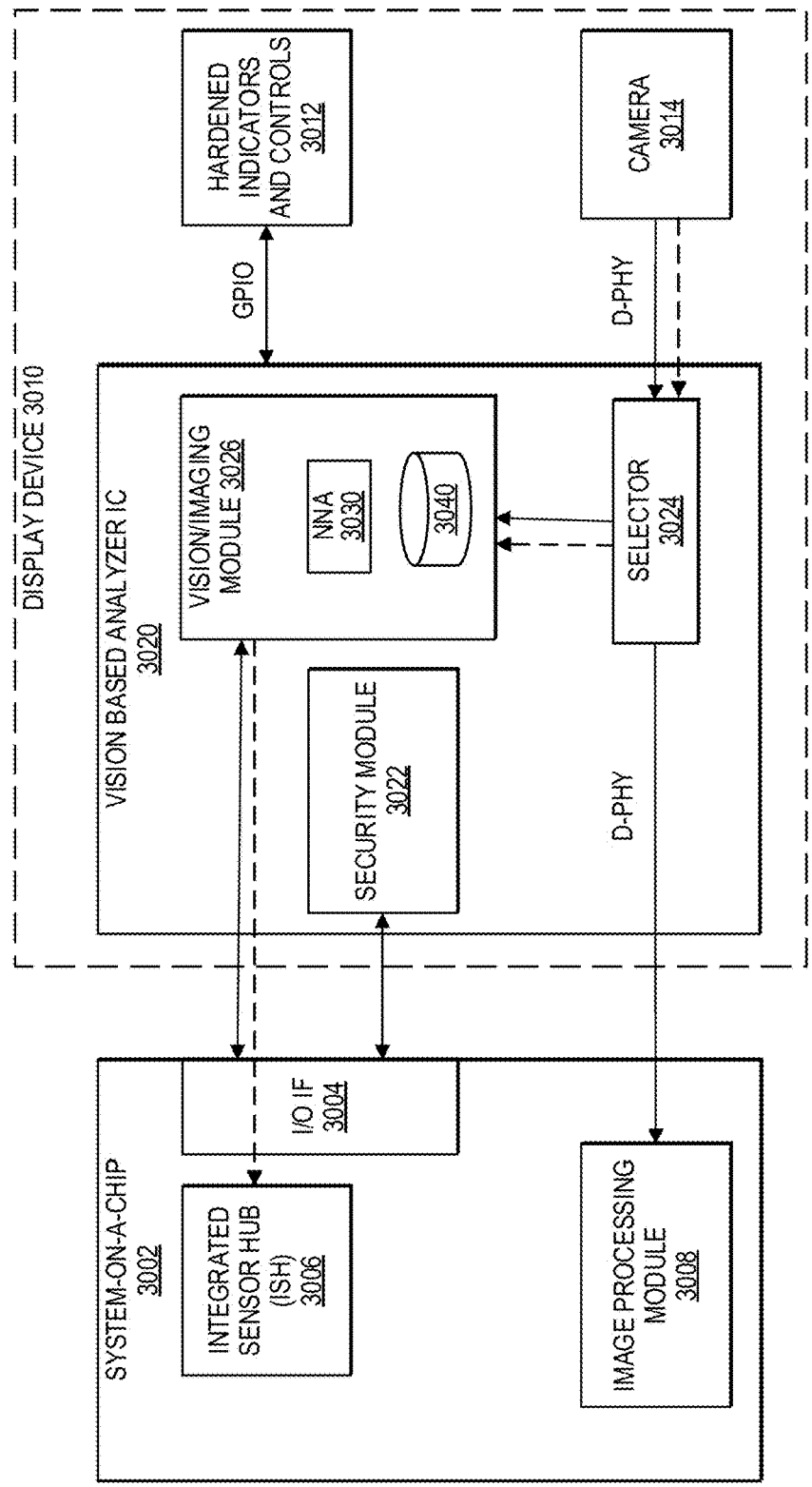
FIG. 30 is a schematic illustration of additional details of the computing system of FIG. 46 according to at least one embodiment.

FIG. 30 is a block diagram illustrating additional possible details of a vision-based analyzer IC 3020 operably coupled to an SoC 3002 in a multiple display computing system, such as multiple display computing system 2500. In one or more examples, SoC 3002 shows possible details of SoC 2508 in computing device 2505 of multiple display computing system 2500 of FIG. 25. In one or more examples, vision-based analyzer IC 3020 shows possible details of vision-based analyzer ICs 2540A, 2540B, and 2540C, which are implemented respectively in lid 2510 of computing device 2505, in first external monitor 2520, and external to second external monitor 2530 of multiple display computing system 2500. Accordingly, a display device 3010 is illustrated in FIG. 30 to represent any one of the possible display devices in which vision-based analyzer IC 3020 may be implemented. A camera 3014 may be integrated with display device 3010 or coupled to the display device as an add-on and communicatively coupled to vision-based analyzer IC 3020. Camera 3014 is arranged to be user-facing and can have a unique imaging field of view that extends outwardly from a display panel in display device 3010. Hardened indicators and control 3012 may be provided in display device 3010 and can include light-emitting diodes (LEDs) to indicate how camera 3014 is being used (e.g., by software running in SoC 3002, by vision-based analyzer IC 3020).

Generally, in one or more embodiments, SoC 3002 and vision-based analyzer ICs 3020 can perform different functions associated with display management for a multiple display computing system as described herein. In some examples, SoC 3002 includes an input/output (I/O) interface (IF) 3004, an integrated sensor hub (ISH) 3006, and an image processing module 3008. In some examples, vision-based analyzer IC 3020 includes a vision/imaging module 3026, a security module 3022, and a selector 3024. Vision/imaging module 3026 is an artificial intelligence-based vision processing unit that supports processing image sensor data for detecting human face(s) and head/face orientation. Image sensor data can be generated for each frame of a sequence of images captured by user-facing camera 3014 and streamed into vision/imaging module 3026 where, for each frame of image sensor data, human face(s) and head/face orientation are detected, image metadata is generated (e.g., indicating user presence, absence, engagement, and/or disengagement), and the image metadata is sent to ISH 3006 of SoC 3002. In some embodiments, the image metadata may indicate when a user is present but the user's face is undetectable such as when a user is turned around from a display screen (e.g., user's face orientation is within the third level area 2738). In one or more examples, camera 3014 can send a stream of image data sensor files (or frames) to vision/imaging module 3026, which may include a neural network accelerator (NNA) 3030 and a storage unit such as a database 3040. In one or more examples, SoC 3002 and vision-based analyzer IC 3020, and components thereof, may be the configured with at least some of the same features as provided in one or more other SoCs (e.g., 140, 390, 340, 914, 1840, 2840A, 2840B, 2508) and/or lid controller hubs (e.g., 155, 260, 305, 954, 1705, 1860, 2830A, 2830B) disclosed herein.

NNA 3030 may be configured to perform an initial analysis of image sensor data generated by the camera 3014 embedded in or coupled to display device 3010 to determine whether a user is present or not present in a field of view, and engaged or disengaged with the display device. NNA 3030 may utilize machine learning algorithms (e.g., neural networks) to detect a human face, a face orientation, and/or multiple faces in image sensor data received from camera 3014. NNA 3030 may include hardware, firmware, software, or any suitable combination thereof to perform the human face(s) and face orientation detections. Image metadata for display device 3010 may be created each time image sensor data is generated by camera 3014 and analyzed by NNA 3030. The image metadata can indicate whether a user is present or not present in the field of view of camera 3014, and whether the user is engaged with or disengaged from display device 3010.

The example vision-based analyzer IC 3020 may be implemented as a separate die from SoC 3002 and specifically designed to perform this vision-based analysis with relatively low power (e.g., around 10 mW) for an "always-on" implementation. Vision-based analyzer IC 3020 is one example implementation of vision-based analyzers 2540A, 2540B, 2540C and may be implemented in display device 3010. Vision-based analyzer IC 3020 may be configured as a lid controller hub (LCH), or portions thereof, as disclosed herein (e.g., LCH 155, 260, 305, 954, 1860, 2830A, 2830B). Subsequent to analyzing image sensor data and generating image metadata in response to the analysis, vision/imaging module 3026 may transmit (e.g., via an I²C serial bus) the image metadata to integrated sensor hub (ISH) 3006 of SoC 3002 for further processing. In one optimization, the image metadata may be stored in database 3040 for comparison to subsequent image metadata that is generated for new image sensor data captured by camera 3014. In this optimization, image metadata is only transmitted to the SoC in response to determining that an event has occurred based on a comparison of the newly generated image metadata to previously generated image metadata that is stored in database 3040.

When ISH 3006 receives image metadata from vision-based analyzer IC 3020 of display device 3010, the ISH may use the image metadata to identify an appropriate operation mode for the SoC 3002, the display device associated with the received image metadata, and other display devices operably coupled to SoC 3002, and to adjust corresponding performance parameters accordingly. Examples of operation modes may include, but are not necessarily limited to one or more of 1) present and engaged, 2) present and passively engaged, 3) present and disengaged, 4) not present.

As shown in the illustrated example, the vision-based analyzer IC 3020 is communicatively coupled between camera 3014 and SoC 3002 to enable vision/imaging module 3026 to perform the initial low power analysis of image sensor data. However, when a user initiates an operation that involves the use of the camera 3014 (e.g., for a video conferencing call), an example selector 3024 may forward the image sensor data directly to an image processing unit 3008 of SoC 3002 and bypass vision/imaging module 3026.

In some examples, vision-based analyzer IC 3020 includes security module 3022 to maintain the security and/or integrity of the vision-based analyzer IC 3020. Security module 3022 can give end-users full visibility and control of user-facing camera 3014. In some implementations, security module 3022 communicates with SoC 3002 via I/O interface 3004. However, security module 3022 ensures that no image sensor data representing what is captured in an imaging field of view of camera 3014, is exposed to SoC 3002 without authorization. For example, a user can have the option to authorize video frames of a video call. In addition, security module 3022 ensures that image sensor data cannot be accessed by potential malware without the user's knowledge (e.g., via hardened indicators and controls 3012) or control (e.g., via a privacy switch). In particular, hardened indicators and controls 3012 can ensure the current state of selector 3024 (e.g., Normal, ULP Vision, or Privacy Mode) is properly reflected by the indicators. In addition to receiving image sensor data, vision-based analyzer IC 3020 may also receive inputs for hardened indicators and controls 3012 and provide appropriate signals to the LEDs via general purpose inputs/outputs (GPIOs).

Figure 31:
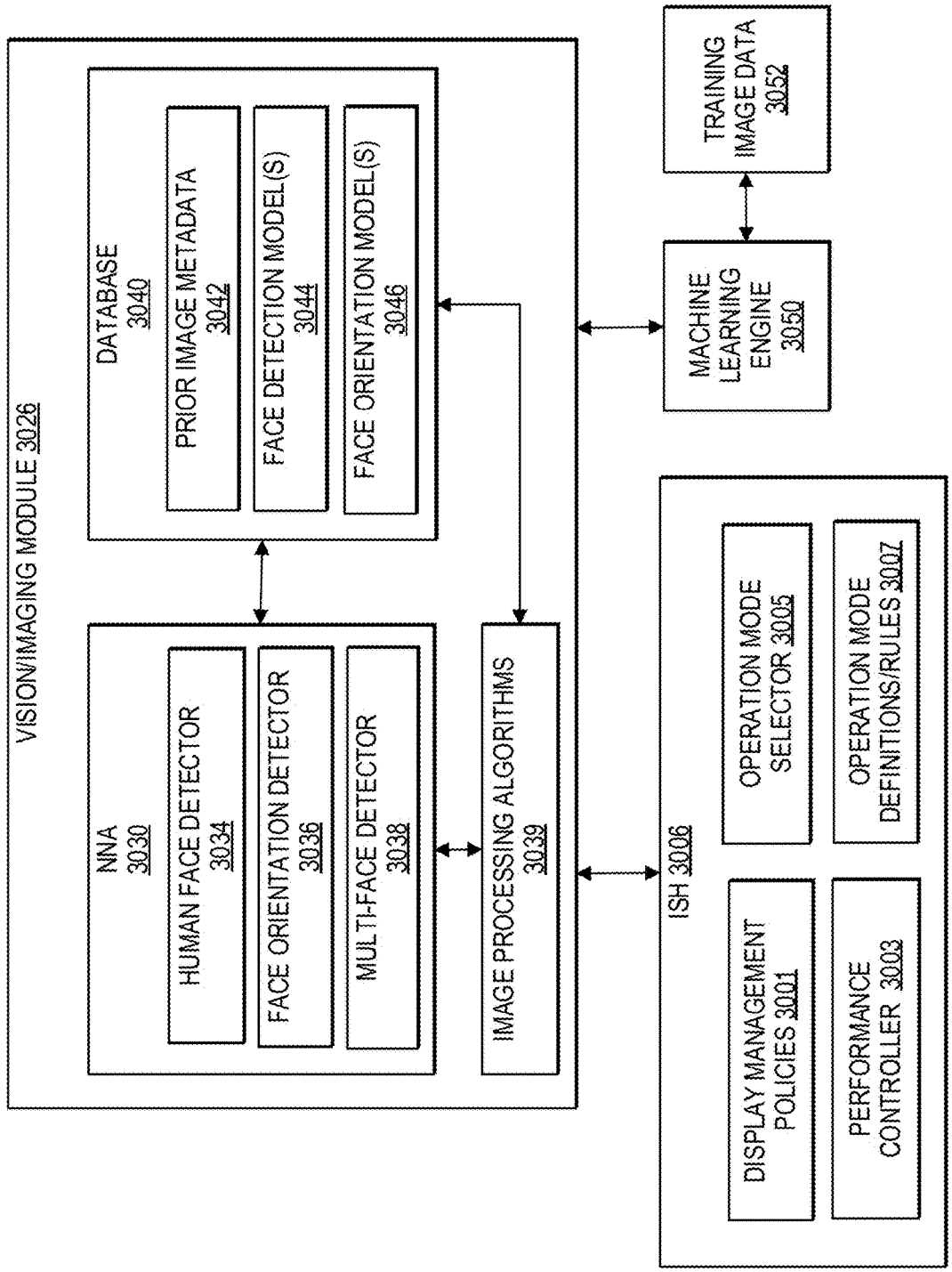
FIG. 31 is a simplified block diagram illustrating additional details of the components of FIG. 30 according to at least one embodiment.

FIG. 31 is a block diagram illustrating additional possible details of vision/imaging module 3026 of vision-based analyzer IC 3020 and integrated sensor hub (ISH) 3006 of SoC 3002. Vision/imaging module 3026 can include NNA 3030, database 3040, and image processing algorithms 3039. ISH 3006 can include display management policies 3001, performance controller 3003, an operation mode selector 3005, and operation mode definitions/rules 3007.

NNA 3030 may implement one or more deep neural networks (DNNs) such as convolutional neural networks (CNNs) that are tuned for human face, head/face orientation, and multi-face detection. In at least one embodiment, neural networks may be implemented using machine learning models that are trained to recognize a human face and the orientation of the face. In at least one example, a machine learning model is trained to identify the orientation of a human face in degrees of rotation. In at least one embodiment the degrees of rotation may be measured from a path between the human face and the display device where the camera is embedded or coupled. A machine learning engine 3050 can train the machine learning models using training image data 3052. The example training image data 3052 can include historical image data for a particular user or users and/or a plurality of other human subjects. Machine learning engine 3050 may run in the computing device (e.g., 2505) associated with vision-based analyzer ICs that are using the models, in a local or remote server, in the cloud, or in any other suitable system or device from which the trained models can be provided to or accessed by the appropriate vision-based analyzer ICs, such as vision-based analyzer IC 3020.

Training image data 3052 may be stored in any suitable storage unit or memory. In some examples, training image data 3052 may be stored in the same system or device in which machine learning engine 3050 is stored and/or running. In other examples, the training image data 3052 may be stored external to the system or device in which machine learning engine 3050 is stored and/or running, but may be in a location that is accessible to machine learning engine 3050.

Trained models may be stored in database 3040 to be used by NNA 3030 to detect a human face (or faces) and to determine the orientation of a human face. For example, a face detection model(s) 3044 and a face orientation model(s) 3046 may be stored in database 3040.

In one or more examples, NNA 3030 can include a human face detector 3034, a face orientation detector 3036, and a multi-face detector 3038. Human face detector 3034 may use face detection model(s) 3044 to identify a human face from image sensor data generated by user-facing camera 3014 from its unique imaging FoV, which surrounds a front portion of the display device in which vision-based analyzer IC 3020 is disposed. Detecting a human face in the image sensor data is an indication that a user is present in the imaging FoV. Not detecting a human face in the image sensor data is an indication that a user is not present (or is absent) in the imaging FoV. Human face detector 3034 may also generate information that can be used to determine the distance of the detected user's face from the camera that generated the image sensor data. In one example, a neural network of human face detector 3034 may be trained to predict a bounding box of a human head as part of detecting a human face. Once a bounding box has been determined and the human face has been recognized, the distance of the user (e.g., the user's face) to the camera can be determined based on the size of the bounding box. In some implementations, this determination may be made by NNA 3030. In other implementations, the bounding box information may be provided to image processing algorithms 3039 to determine the distance of a detected human face to the camera associated with the display device.

If a human face is detected, face orientation detector 3036 may use face orientation model(s) 3046 to determine the orientation of the face. In one example, the orientation of the face may be provided in degrees relative to a path between user facing camera 3014 and the detected human face. The face orientation may be determined based on identification of facial features in the image sensor data (e.g., number of ears visible, number of eyes visible). The face orientation can be used to infer whether the user is engaged or disengaged with the particular display device associated with the camera that generated the image sensor data. In one example as previously described herein, if the user's face orientation is within a level one area, then it may be inferred that the user is engaged with the display device associated with camera 3014. If the user's face orientation is within a level two area, then it may be inferred that the user is not engaged with the display device associated with camera 3014, but may be engaged with another display device docked or otherwise connected to the same computing device. If the user's face orientation is within a level three area, then it may be inferred that the user is not engaged with the display device associated with camera 3014 or any other display device docked or otherwise connected to the same computing device. In some implementations, these inferences may be determined by NNA 3030. In other implementations, these inferences may be determined by image processing algorithms 3039.

In one or more embodiments, NNA 3030 may also include multi-face detector 3038 to detect multiple faces within image sensor data generated by user-facing camera 3014 from its unique imaging FoV. In at least one embodiment, face detection model(s) 3044 may be trained to detect multiple human faces in image sensor data of a single image. In other embodiments, face detection model(s) 3044 may be trained to detect a single human face and another model may be trained for multi-face detection. When multiple human faces are detected, in at least one embodiment, each detected face may be analyzed to determine face orientation, and to infer whether the user associated with the detected face is engaged in the display device. Dimming and/or turning off a display panel of the display device associated with camera 3014 may be done only if all of the detected human faces are determined to be disengaged with the display device.

Image processing algorithms 3039 may be provided in vision imaging module 3026 as part of NNA 3030 or separately implemented. Image processing algorithms 3039 may be implemented in circuitry and may include hardware, firmware, software, or any suitable combination thereof. Image processing algorithms 3039 may use information generated by human face detector 3034, face orientation detector 3036, and multi-face detector 3038 based on a current frame of image sensor data to generate new image metadata for an image captured by camera 3014. The new image metadata can indicate whether a user is present, not present, engaged, or not engaged in current image sensor data representing the captured image. Once the new image metadata has been generated, image processing algorithms 3039 may compare the new image metadata with prior image metadata 3042 stored in database 3040 to determine whether any changes between the two image metadata binaries (or files) indicate that an event has occurred that is relevant to a user's presence, absence, engagement or disengagement with the display device associated with camera 3014. Prior image metadata 3042 can represent image metadata that was generated based on a frame of image sensor data received by vision/imaging module 3026 immediately prior to receiving the frame of image sensor data from which the new image metadata was generated.

If it is determined that an event has occurred based on the comparison, then vision/imaging module 3026 can store a copy of the new image metadata in database 3040 as prior image metadata 3042 and send the new image metadata to ISH 3006. If it is determined that no events have occurred based on the comparison, then the new image metadata may not be sent to ISH 3006 in at least one embodiment, in order to save processing resources. However, the new image metadata may still be stored in database 3040 as prior image metadata 3042.

In one or more embodiments, ISH 3006 of SoC 3002 is configured to receive image metadata from vision/imaging module 3026, to apply the appropriate policy based on the image metadata, to select the appropriate operation mode for the display device associated with the received image metadata and possibly the computing device to which the display device is docked or otherwise connected, and to adjust performance parameters based on the selected operation mode, if needed.

Operation mode definitions/rules 3007 may include various operation modes that may be applied to each display device (e.g., 2510, 2520, 2530) separately based on the image metadata that is generated for each display device. Based on the image metadata and applicable policy for the received metadata, an appropriate operation mode can be selected and applied to the display device associated with the received image metadata. In one example, operation modes that may be applied to a particular display device can include, but are not necessarily limited to:

Engaged Operation Mode—Image metadata indicates user is present and engaged—user is detected and gaze direction is in a level one area relative to the display device (e.g., user may be reading or watching a video on the display device);

Adaptive Dimming Operation Mode (regular or aggressive)—Image metadata indicates user is present and disengaged—user is detected but is not engaged with display device (but may be engaged with another display device in the computing system); and Absent Operation Mode—Image metadata indicates user is not present or user face is undetectable—user face is not detected It should be noted that other operation modes may also be used, such as operation modes for an SoC or other processing element of a computing device. These other operation modes may be used in conjunction with the operation modes for display devices as described herein.

In one or more embodiments, a performance controller 3003 may control performance parameters governing the power consumption, performance, and/or system responsiveness of computing device 2505 and the multiple display devices 2510, 2520, and 2530 docked or otherwise connected to the computing device. The performance parameters may be adjusted in response to a determination of the presence and/or engagement of a user with one or more display devices 2510, 2520, 2530 in computing system 2500. For instance, performance controller 3003 may control performance parameters to wake the system when one of the display devices in the system detects a user approaching, and may trigger a face-based authentication. In another instance, performance controller 3003 may control performance parameters to dim the backlight for a particular display device if the user is determined to not be engaged with that particular display device. The backlight may be progressively dimmed (e.g., brightness of a backlight is reduced) based on predetermined periods of time during which the user does not engage with the display device. In another example, performance controller 3003 may control performance parameters to lock a computing system quickly upon determining that the user has walked away from the multiple displays in a computing system. In yet another example, performance controller 3003 may control performance parameters to override any attempts by the SoC to lock the system if at least one of the display devices of the computing system detects a user that is present and engaged even if the user is not interacting with a user interface such as a keyboard, a mouse, a touch pad, etc.

Various display management policies 3001 may be implemented by SoC 3002 based on image metadata received from vision/imaging module 3026. Example display management policies 3001 may include, but are not necessarily limited to a Wake on Face policy, an Adaptive Dimming policy, a No Lock on Presence policy, and a Lock on Absence policy. In a multiple display computing system, a Wake on Face policy can be invoked as a user approaches the computing system and enters a field of view of one or more of the cameras associated with each display device. When a Wake on Face policy is invoked, the computing system wakes and a face-based authentication (e.g., Windows Hello® authentication software) is triggered. Thus, the computing system is ready before the user is seated in front of any of the display devices or interacting (e.g., via user interface mechanisms, voice) with the computing system. For multiple display computing systems, the display device with which the user first engages (e.g., by directing her attention to that display device) triggers the computing system to wake up. Other display devices in the multiple display computing system remain off until the user has successfully logged into the computing system. The Wake on Face multiple display policy covers more real estate in which the user approaches and looks at the computing system. Because each display device has an associated camera with a different imaging field of view, the area around a multiple display computing system in which movement and light can be sensed and from which images can be captured is expanded relative to a single display computing system. This creates a more robust solution, especially for users who may enter a workspace from different directions.

In one or more embodiments, an Adaptive Dimming policy may be invoked in a multiple display computing system to progressively dim a backlight of a display panel over a defined period of time when the user is not attentive, and further turning off the display device when the user is no longer present. When an Adaptive Dimming policy is invoked, a regular or aggressive dimming operation mode may be selected for the particular display device. Significant battery life gains can be achieved by implementing this policy. Power savings and responsiveness can be optimized per display device for each display device in which a vision-based analyzer IC is implemented. For example, when a user is engaged and looking at a first display device directly in front of the user, the policy can be tuned to dim the display on any other display that the user is not looking at. In one implementation, the adaptive dimming policy can include progressively dimming over a period of time the display panel from which the user has disengaged, and turning off the display panel from which the user's face turned away (e.g., face orientation >90° in either direction). This policy can be applied to any number of additional external display devices with an integrated or add-on vision-based analyzer IC 3020 (or LCH 155, 260, 305, 954, 1860, 2830A, 2830B, etc.). Along with dimming and turning off the display panels of the display devices, a refresh rate can also be managed. For example, the refresh rate can be lowered for any display panel from which the user is disengaged. Thus, SoC 3002 can apply the adaptive dimming policy to reduce the refresh rate and reduce rendering, to optimize performance.

In one or more embodiments a No Lock on Presence policy may be invoked in a multiple display computing system to prevent the computing system from locking and the display device from turning off when the user is present, even if the user is not actively typing or moving the mouse or if the user is disengaged. When a No Lock on Presence policy is invoked, an engaged operation mode may be selected (or not changed) for the particular display device if the user is still engaged. This scenario may occur, for example, when the user is reading a long document or watching an embedded video. If the user is disengaged, then the disengaged operation mode may be selected (or not changed) for the particular display, but the no lock on presence policy may be invoked to prevent the computing system from locking and to prevent the backlight from turning off completely. Thus, in at least one embodiment of a multiple display computing system, the computing system will not lock if image metadata from at least one display device indicates that the user is present and either engaged (e.g., face orientation between ≤45° in either direction) or disengaged (e.g., face orientation >45° but ≤90° in either direction).

In one or more embodiments a Lock on Absence policy may be invoked in a multiple display computing system to turn off the display devices and lock the computing system quickly when the user walks away instead of waiting for an inactivity timeout to expire. When a Lock on Absence policy is invoked, an absent operation mode may be selected for each particular display device. Inactivity timeouts are commonly around five minutes and may be performed based on lack of user interaction with the computing system (e.g., via a user interface such as a mouse, touchpad). Inactivity timeouts may not occur at all when certain applications are running (e.g., embedded videos). In one or more embodiments, a multiple display computing system may be configured to lock the computing system and turn off all display devices when all display devices indicate that the user is not present (e.g., no user presence or face orientation >90° in either direction).

Embodiments of display management for multiple display computing systems provide an enhanced user experience. With better accuracy from additional user presence inputs, embodiments allow for detection when a user approaches their system much quickly and more seamlessly because the first display that can detect a user approaching can wake the system. Additionally, there is greater accuracy in multiple inputs. Adaptive dimming provides significant energy and power savings to turn off either the laptop display or the additional external displays that the user is not engaged with. This savings can be on the order of 29-100 W. This significant energy savings can also apply to wireless display scenarios.

Because embodiments of display management of multiple display computing systems allow refresh rates and rendering to be reduced by not having to drive additional external monitors when a user is disengaged from one or more of those external monitors, performance can be optimized. Typically, high resolutions displays translates to high costs including render tax on GPU overhead to process and render, display tax on graphics and display engine to compose and transmit data, and the CPU budget impact on thermally constrained form factors. Analysis with battery life measurement tools have indicated a ≥50% performance loss when attached to an external 4K display.

Not having to drive an additional display device unnecessarily can reduce rendering and refresh rates significantly. By opportunistically reducing the refresh rate and display rendering when the user is disengaged or not present, display power and energy can meet (and even exceed) certain state certifications (e.g., California Energy Commission and Energy Star standards). In addition, along with optimizing the user experience for certain features (e.g., Wake-on-Face, Adaptive Dimming, No Lock on Presence, and Lock on Absence), issues on correlation policies can be appropriately handled. Correlation policies can include when there are user input events (HID) correlated with whether the user is present and engaged, disengaged or not present, embodiments can solve this problem for multiple display computing system scenarios, to accurately indicate if the user is present and engaged or disengaged/not present without having to wait for user input events. In particular, embodiments can indicate which display is not correlated to manage power, energy, and performance effectively.

Turning to FIGS. 32-37, simplified flowcharts represent example hardware logic, machine-readable instructions, firmware, software, or any suitable combination thereof that may be associated with an embodiment of multiple display computing system 2500 in which user presence and attentiveness-based display management is implemented. In at least one embodiment, a set of operations corresponds to the activities shown in flowcharts of FIGS. 32-37. In one example, a lid control hub (e.g., 155, 260, 305, 954, 1705, 1860, 2830A, 2830B), or a portion thereof (e.g., vision-based analyzer integrated circuit (e.g., 2540A, 2540B, 2540C, 3020)) may utilize or perform at least some of the operations, and an SoC (e.g., 140, 390, 340, 914, 1840, 2840A, 2840B, 2508, 3002) may utilize or perform at least some of the operations. For ease of illustration, the flowcharts of FIGS. 32-37 may be described with reference to components of FIGS. 25 and 30, but it should be appreciated and understood that these components have been further illustrated and described throughout this application and that one or more of those illustrations and descriptions are applicable to the components referenced with respect to FIGS. 32-37.

Figure 32:
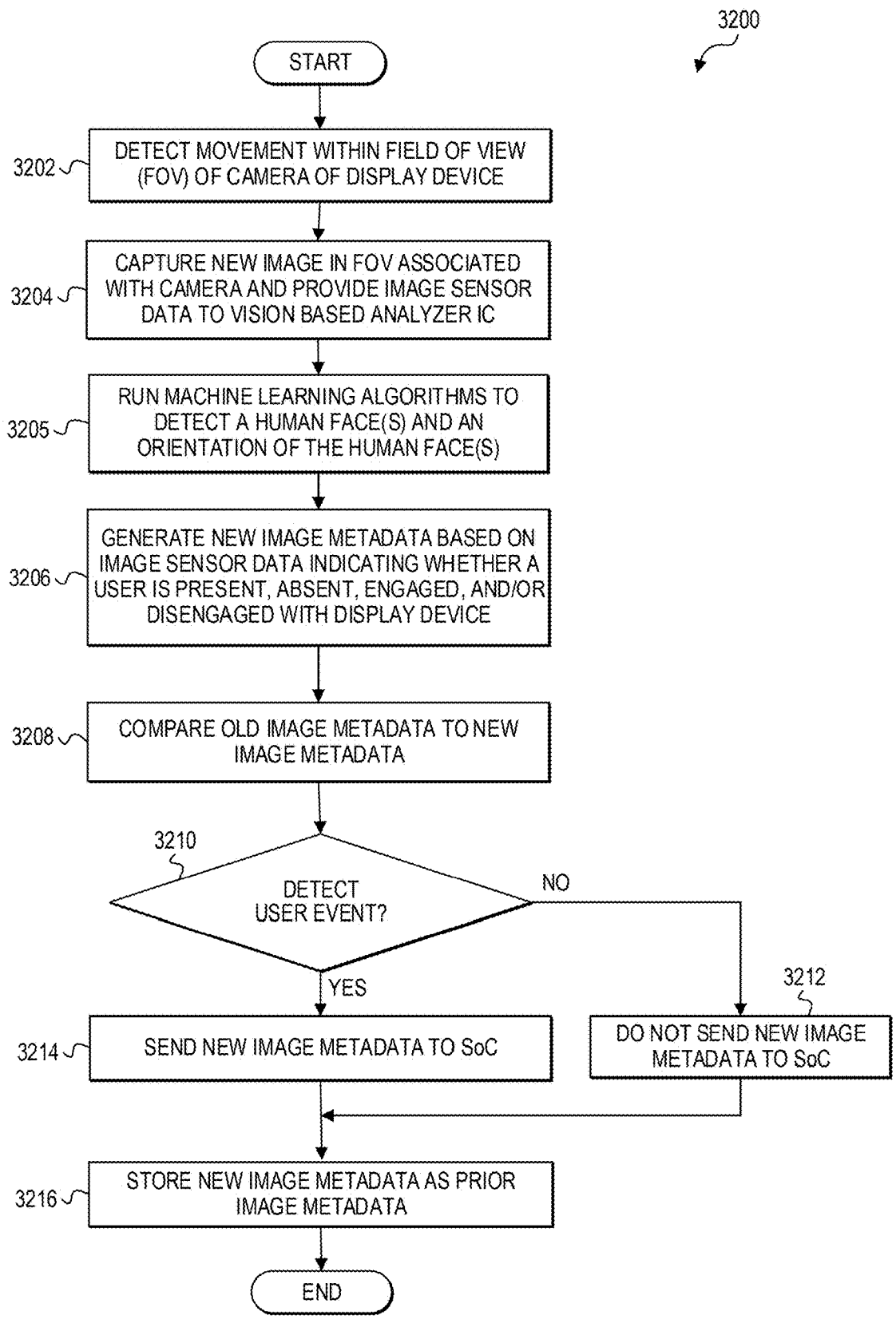
FIG. 32 is a high-level flowchart of an example process that may be associated with a lid controller hub according to at least one embodiment.
Figure 33:
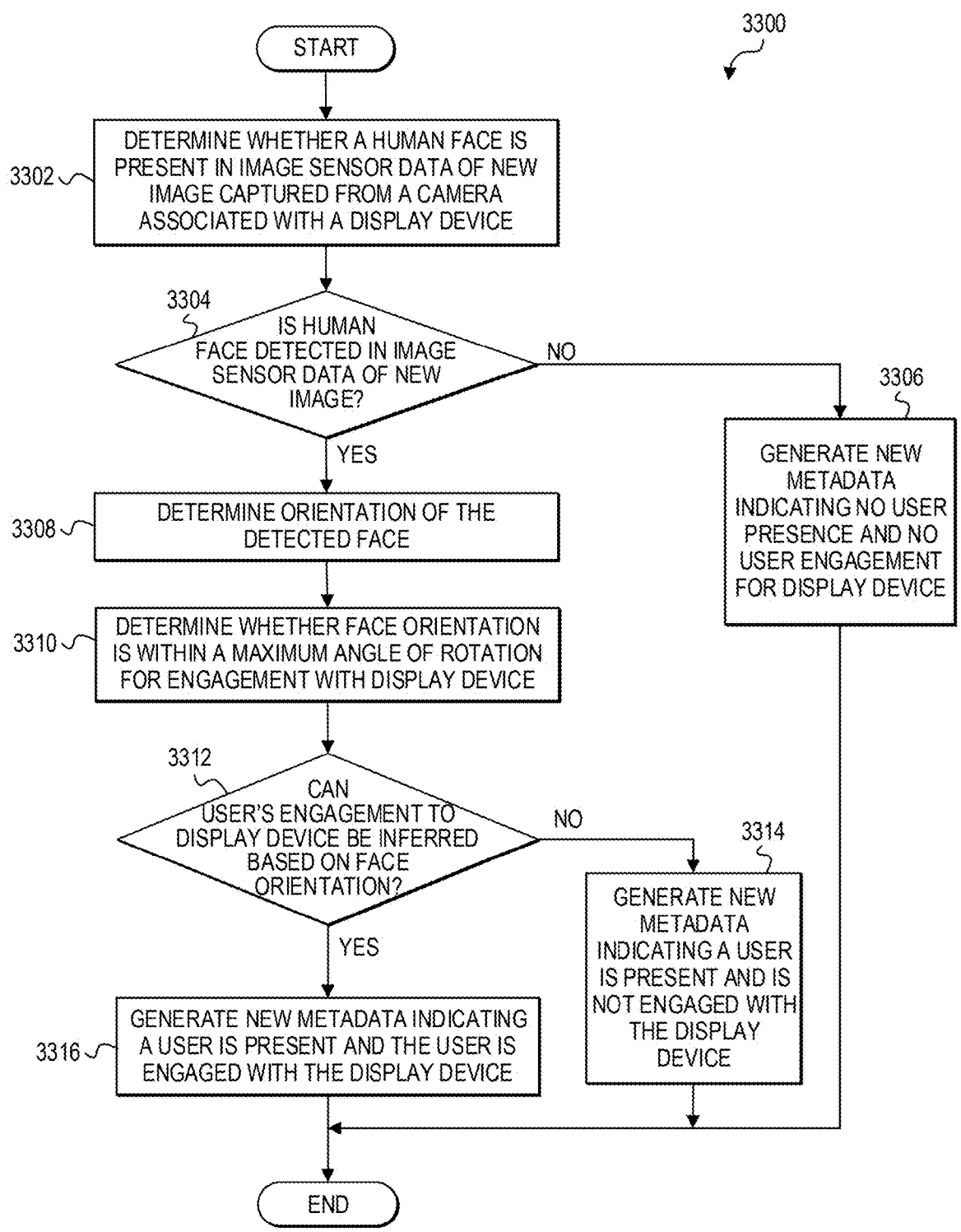
FIG. 33 is a simplified flowchart of an example process that may be associated with detecting user presence according to at least one embodiment.

FIG. 32 is a high-level flowchart of an example process 3200 associated with detecting user presence in a multiple display computing system (e.g., 2500) according to at least one embodiment. In at least one embodiment, a set of operations corresponds to the activities of example process 3200. In one example, the operations may be performed by vision/imaging module (e.g., 172, 263, 363, 1740, 1863, 2832A, 2832B, 3026) disposed in a display device (e.g., 391, 341, 2510, 2520, 2530, 3010) of a multiple display computing system and a camera (e.g., 2514, 3014) associated with the display device. More specifically, a neural network accelerator (e.g., 276, 327, 1740, 1863, 2834A, 2834B, 3030) may perform one or more of the operations.

At 3202, movement within a field of view (FoV) of camera 3014 associated with display device 3010 may be detected. In some implementations, detecting movement may be performed by an imaging sensor that is integrated with the camera or communicatively coupled to camera 3014. At 3204, the camera captures a new image (or frame) in the FoV associated with the camera. The camera generates image sensor data for the new image (or frame) and the image sensor data is provided to vision-based analyzer IC 3020, which is associated with display device 3010. More specifically, in at least one embodiment, the image sensor data is provided to neural network accelerator 3030 to perform user presence detection, face detection, face orientation detection, and possibly multi-face detection.

At 3205, NNA 3030 may run one or more machine learning algorithms to detect a human face(s) and, if a human face is detected, an orientation of the human face(s). At 3206, vision/imaging module 3026 may generate new image metadata based on face, user presence, and head orientation detection performed by NNA 3030. The new image metadata may include, for example, an indication of whether a user is present or absent from the new image captured in front of display device 3010 by camera 3014. Presence of the user may be determined based on face detection. If a human face is detected, then a user is present. If a user is determined to be present, then head orientation new image metadata may also include an indication of whether the user is engaged with the display device 3010 associated with the camera or disengaged (e.g., passively engaged) with display device 3010.

At 3208, the new image metadata may be compared to prior image metadata to determine whether any user events have occurred since the prior image associated with the prior image metadata was captured. To determine whether a user event has occurred, the new image metadata that was generated based on image sensor data of a new image captured by camera 3014 can be compared to stored prior image metadata that was previously generated based on image sensor data of an image captured prior to the new image being captured. Thus, the new image metadata is compared to the prior image metadata to identify differences and determine if those differences correspond to a user event. A user event may occur when a change in user presence is detected in the new image metadata as compared to the prior image data. For example, a user may not be present in the prior image but a user may be present in the new image, or a user may be present in the prior image but a user may not be present in the new image. Another user event that may occur is when the face orientation of a user changes. In this scenario, a human face would have been detected in the prior image and the orientation of the face may have been identified. If the new image metadata indicates that the face orientation of the detected user is different than the face orientation indicated in the prior image metadata, then a user event has occurred. For example, the prior image metadata may indicate the user was not engaged with the display device (which is determined based on face orientation) and the new image metadata may indicate the user is engaged with the display device (which is determined based on face orientation), or vice versa.

At 3210, a determination is made as to whether a user event has occurred based on the comparison performed in 3208. If a user event has not occurred (e.g., the prior image metadata and the new image metadata are the same), then at 3212, as an optimization, the new image metadata may not be sent to SoC 3002. If it is determined that a user event has occurred based on the comparison performed in 3208, then at 3214, the new image metadata is sent to SoC 3002 to determine an operation mode for the display device (and possibly the computing device to which the display device is connected). At 3216, the new image metadata may be stored as prior image metadata for comparison against the next new image metadata to be generated for the display device.

Figure 34:
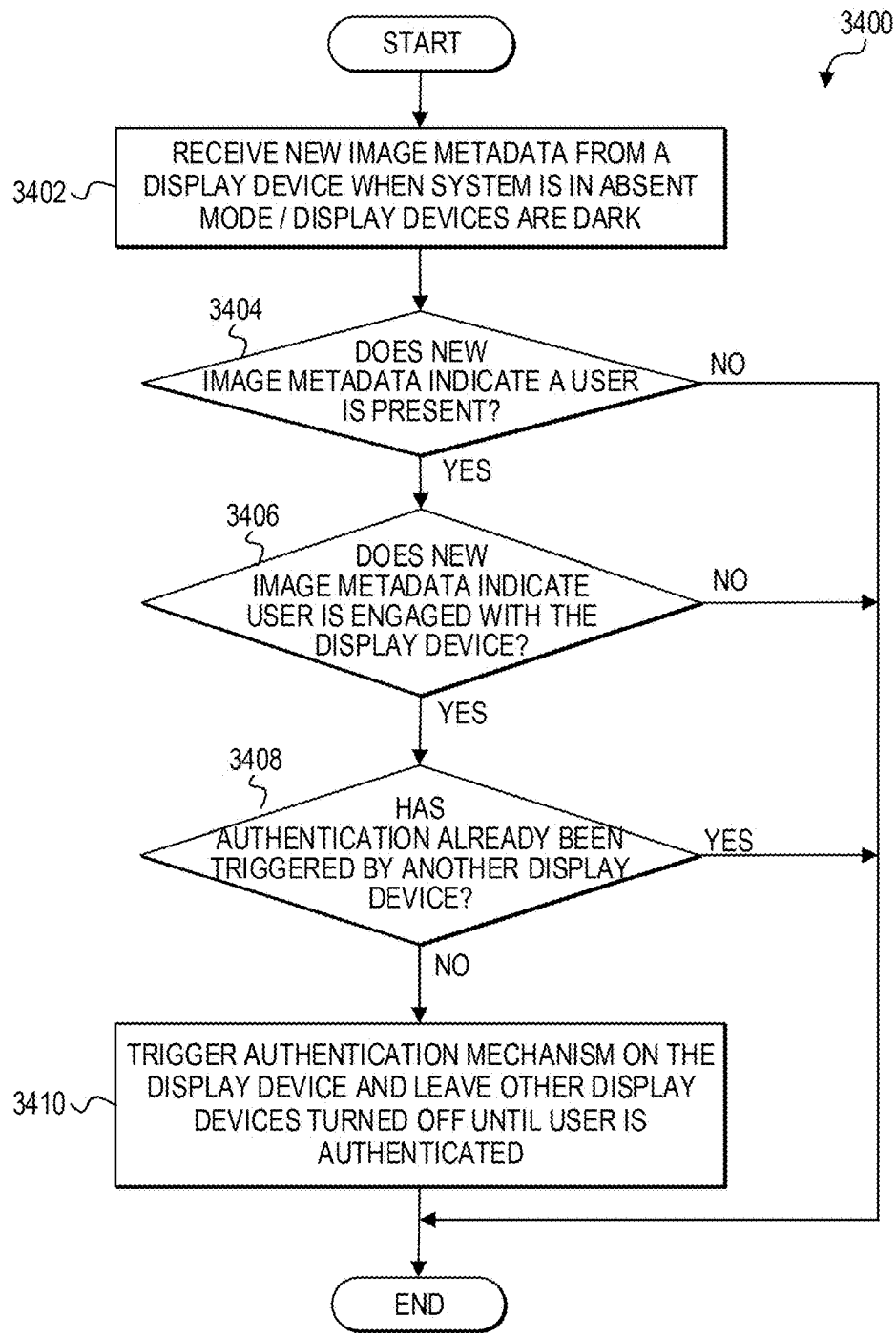
FIG. 34 is a simplified flowchart of an example process that may be associated with triggering an authentication mechanism according to at least one embodiment.

FIG. 34 is a high-level flowchart of an example process 3400 associated with processing new image sensor data in a multiple display computing system (e.g., 2500) to detect user presence, a human face(s), and head/face orientation according to at least one embodiment. Example process 3400 may provide additional details associated with one or more operations (e.g., 3205, 3206) of process 3200 in FIG. 32. In at least one embodiment, a set of operations corresponds to the activities of example process 3400. In one example, at least some of the operations may be performed by a neural network accelerator (e.g., 276, 327, 1740, 1863, 2834A 2834B, 3030) and possibly image processing algorithms 3039 in a vision/imaging module (e.g., 172, 263, 363, 1740, 1863, 2832A, 2832B, 3026) of a vision-based analyzer IC (e.g., 2540A, 2540B, 2540C, 3020).

At 3402, NNA 3030 can run one or more machine learning algorithms on image sensor data of a new image captured by camera 3014 associated with display device 3010. One example machine learning algorithm may be neural network models trained to detect human faces and, when executed, can detect whether a human face is present in the image sensor data. At 3404, a determination is made as to whether a human face was detected in the image sensor data by the neural network model for face detection. If a human face was not detected, then at 3406, new image metadata is generated to indicate that no user is present. The new image metadata may also indicate that no user is engaged with display device 3010.

If it is determined at 3404 that a human face was detected in the image sensor data by the neural network model for face detection, then at 3408, another machine learning algorithm may be run to determine the head/face orientation of the detected human face. One example machine learning algorithm may be a neural network model trained to detect the orientation of a human face (e.g., in degrees) and, when executed, can detect the orientation of the detected human face in the image sensor data. In at least one embodiment, the face orientation may be determined in degrees of rotation relative to a direct display path defined between the user's face and the display device The direct display path may be calculated from the detected face to a center of a display panel of the display device, to the camera that captured the image, or any other suitable point associated with the display device.

At 3410, the user's face orientation can be evaluated to determine if it is within a maximum angle of rotation for engagement with display device 3010 to be inferred. In one example the maximum angle of rotation is a first-level maximum of angle of rotation (e.g., 24°) of the user's face in either direction relative to the direct display path between the user's face and display device 3010 (e.g., at a center of the display panel of the display device, at the camera, or any other suitable location on display device).

At 3412, if the user's face orientation is determined to be within the first-level maximum angle of rotation (e.g., 24°), then an inference can be made that the user is engaged with the display panel of display device 3010 (e.g., the user may be reading or viewing something on the display panel). In this scenario, at 3416, new image metadata is generated to indicate that a user is present and that the user is engaged with display device 3010.

If the user's face orientation is determined to be greater than the first-level maximum angle of rotation but not greater than a second-level maximum angle of rotation (e.g., 90°), then it can be inferred that the user is disengaged from the display panel of display device 3010, but may be engaged with another display panel in the computing system to which display device 3010 is docked or otherwise connected. In this scenario, at 3414, new image metadata is generated to indicate that a user is present but that the user is not engaged (i.e., disengaged) with display device 3010.

It should be noted that if the user's face orientation is greater than the second-level maximum angle of rotation or is otherwise not detectable, then the user may be determined to be not present, as evaluated at 3406.

It should also be noted that, in another embodiment, the determination of whether the user's face orientation is within a particular threshold level of rotation to infer engagement or disengagement, could be made by the SoC (e.g., 3002). In this embodiment, the metadata could include an indication of the determined face orientation and this information could be used by the SoC to determine whether the user was engaged or disengaged from the display device.

FIG. 34 is a high level flowchart of an example process 3400 associated with processing new image metadata generated by a vision-based analyzer IC (e.g., 3020) of a display device (e.g., 3010) in a multiple display computing system (e.g., 2500). In at least one embodiment, a set of operations and/or instructions corresponds to the activities of example process 3400 for receiving new image metadata generated by a vision-based analyzer IC (or LCH) in a computing system when the computing system is locked (e.g., in an absent operation mode) and applying a Wake on Face policy if applicable. In one example, at least some of the operations may be performed by an SoC (e.g., 140, 390, 340, 914, 1840, 2840A, 2840B, 4140, 3002, 2508) of a multiple display computing system (e.g., 2500). In a more specific example, one or more operations of process 3400 may be performed by integrated sensor hub (e.g., 392, 342, 1790, 1842, 3006) of the SoC.

At 3402, new image metadata is received by SoC 3002 of a multiple display computing system from vision-based analyzer IC 3020 in display device 3010, when the display device is turned off (e.g., no backlight is provided to the display panels) and the computing system is locked. In at least one embodiment, a computing system may be locked when an absent operation mode is selected for all of the display devices.

At 3404, a determination is made as to whether the new image metadata indicates a user is present. A user may be indicated as present in the metadata if the machine learning algorithms (e.g., NNA 3030) detected a human face in image sensor data of a new image captured by camera 3014. If the new image metadata does not indicate that a user is present, then display device 3010 remains turned off and the computing system remains locked.

If the new image metadata indicates that a user is present, then at 3406 a determination is made as to whether the new image metadata indicates that the user is engaged with the display device. The new image metadata may indicate that the user is engaged with the display device if it was determined that the user's face orientation (e.g., relative to a direct display path to the display device) is not greater than a first-level maximum angle of rotation in either direction. If the new image metadata does not indicate that the user is engaged with the display device, then display device 3010 remains turned off and the computing system remains locked. However, the user may be engaged with another display device in the multiple display computing system and if so, new image metadata received from that other display device (which would indicate that the user is present and engaged with that display device) may cause the SoC to trigger an authentication mechanism.

At 3406, if the new image metadata indicates that the user is engaged with the display device, then at 3408 a determination can be made as to whether another display device in the multiple display computing system has already caused an authentication mechanism to be triggered by SoC 3002. If so, then display device 3010 remains turned off until the user is authenticated through the other display device.

If it is determined at 3408 that no other display device in the multiple display computing system has already caused an authentication mechanism to be triggered by SoC 3002, then at 3410, a Wake on Face policy may be invoked and the SoC can trigger the authentication mechanism on display device 3010. The other display devices in the multiple display computing system can remain turned off until the user is authenticated via display device 3010.

FIG. 35 illustrates a high level flowchart of an example process 3500 associated with processing new image metadata generated by a vision-based analyzer IC (e.g., 3020) of a display device (e.g., 3010) in a multiple display computing system (e.g., 2500). In at least one embodiment, a set of operations corresponds to the activities of example process 3500 for receiving the new image metadata when the display device is in an engaged operation mode (e.g., display panel of display device has default brightness) and invoking a Dimming Policy or Lock on Absence policy, if applicable. In one example, at least some of the operations may be performed by an SoC (e.g., 140, 390, 340, 914, 1840, 2840A, 2840B, 4140, 3002, 2508) of a multiple display computing system (e.g., 2500). In a more specific example, one or more operations of process 3400 may be performed by integrated sensor hub (e.g., 392, 342, 1790, 1842, 3006) of the SoC.

At 3502, new image metadata is received by SoC 3002 of a multiple display computing system from vision-based analyzer IC 3020 in display device 3010, when the display device is in an engaged operation mode (e.g., display panel of display device has default brightness).

At 3504, a determination is made as to whether the new image metadata indicates a user is present. If the new image metadata indicates a user is present, then at 3506 a determination is made as to whether the new image metadata indicates that the user is engaged with the display device. If the user is engaged with the display device, then the user's face orientation may be in a first-level area (e.g., not greater than a first-level maximum angle of rotation, in either direction). If the new image metadata indicates that the user is engaged with the display device, then as indicated at 3508, the display device remains in the engaged operation mode (e.g., full display brightness or default display brightness).

If a determination is made at 3506 that the new image metadata does not indicate that the user is engaged with display device 3010, then at 3510, a determination is made as to whether the new image metadata indicates that the user is disengaged (but still present) with the display device. If it is determined that the user is disengaged (but still present), then at 3514, an Adaptive Dimming policy may be invoked and a regular dimming operation mode can be selected for display device 3010. In one example, a regular dimming operation mode may reduce the backlight of the display panel of display device 3010 by a predetermined percentage of brightness until a predetermined minimum level of brightness is reached. For example, the brightness of the display panel may be reduced by five percent (5%) after five seconds have passed and then by five percent (5%) per second until twenty percent (20%) is reached. The display panel may remain at twenty percent (20%) brightness until a user event occurs.

If a determination is made at 3510 that the new image metadata indicates that the user is present, but not engaged or disengaged then the user's face orientation may be in a third level area (e.g., greater than a second-level maximum angle of rotation in either direction). Thus, the user's face may be undetectable. Different approaches may desirable by different users in this scenario. Initially, at 3512, an aggressive Adaptive Dimming policy may be invoked and an aggressive dimming operation mode can be selected for display device 3010. In one possible implementation (or system/user configuration), an aggressive dimming operation mode may reduce the backlight of the display panel of display device 3010 by a predetermined percentage of brightness until the backlight is turned off. For example, the brightness of display panel may be reduced by twenty percent (20%) after five seconds have passed, and then by one percent (1%) per second until zero percent (0%) is reached, and the backlight can be turned off. In another possible implementation (or system/user configuration), an aggressive dimming operation mode may reduce the backlight of the display panel of display device 3010 by a predetermined percentage of brightness until the backlight is reduced to a predetermined minimum level of brightness. In the implementation where the backlight is eventually turned off, a no lock on presence policy may be invoked (as will be further described herein) to prevent the computing system from locking while the user is still present, even if the user's face is undetectable. In other implementations, however, the system may be configured to lock after the backlight is turned off if the user's face is undetected (e.g., when user's face orientation is in the third-level area).

With reference again to 3504, if the new image metadata does not indicate that a user is present, then at 3520, an evaluation may be made as to whether a Lock on Absence policy should be invoked. At 3520, a determination is made as to whether the last image metadata received from each of the other display devices in the multiple display computing system indicate that a user is not present. If so, then at 3522, the Lock on Absence policy may be invoked and an absent operation mode may be selected for display device 3010. When the absent operation mode is selected, the display device is turned off and no backlight is provided. When an absent operation mode is selected for display device 3010, and all of the other display devices are already in the absent operation mode (or in an aggressive dimming operation mode), then the SoC of the computing system locks and the user must be authenticated again to unlock and use the computing system.

If it is determined at 3520 that the last image metadata from at least one of the other display devices in the computing system indicates a user is present, then at 3539, an aggressive Adaptive Dimming policy may be invoked and an aggressive dimming operation mode can be selected for display device 3010 as previously described.

Figure 36:
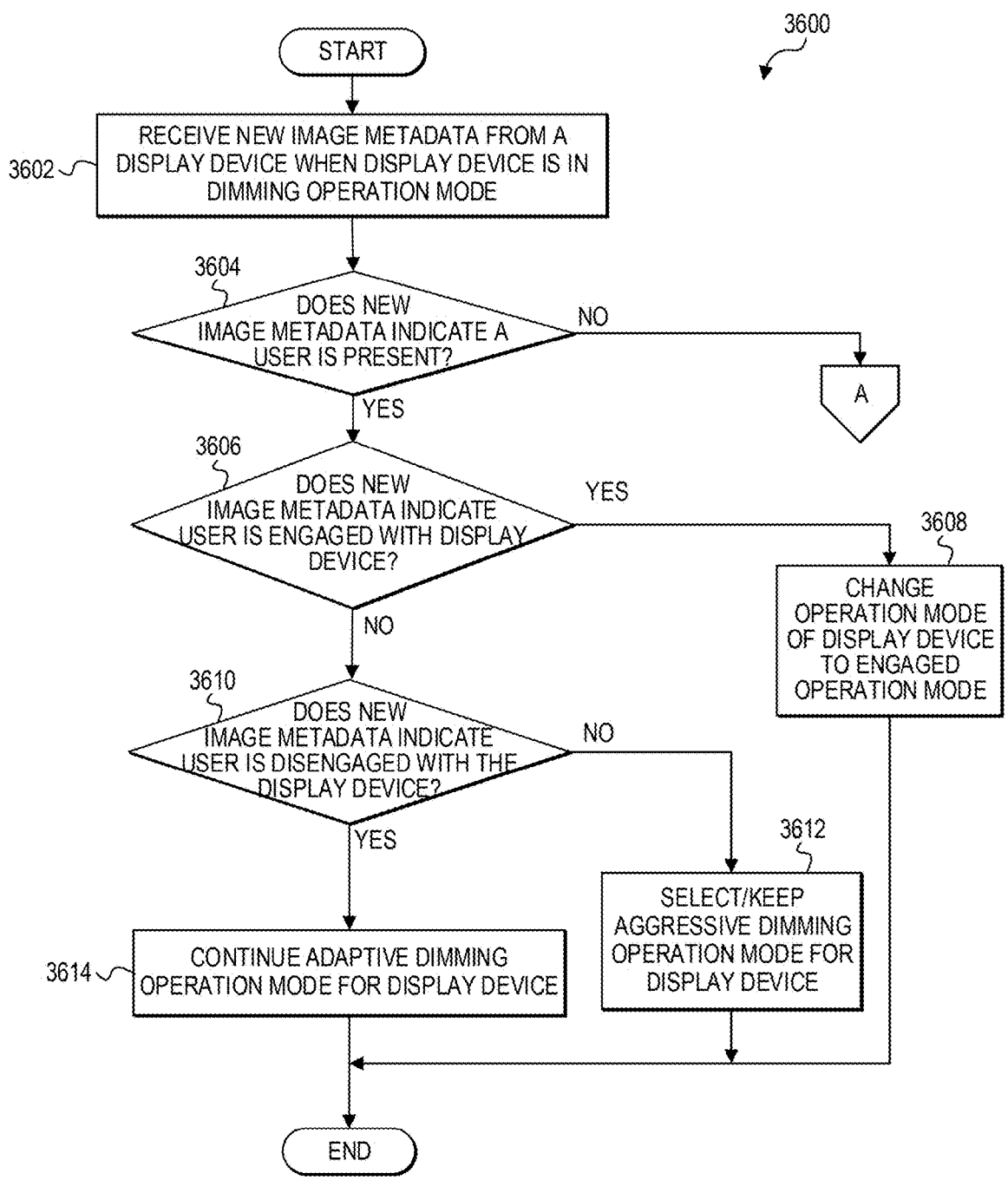
FIG. 36 is a simplified flowchart of an example process that may be associated with adaptively dimming a display panel according to at least one embodiment.

FIG. 36 is a high level flowchart of an example process 3600 associated with processing new image metadata generated by a vision-based analyzer IC (e.g., 3020) of a display device (e.g., 3010) in a multiple display computing system (e.g., 2500). In at least one embodiment, a set of operations corresponds to the activities of example process 3600 for receiving the new image metadata when the display device is in a regular or aggressive dimming operation mode. In one example, at least some of the operations may be performed by an SoC (e.g., 140, 390, 340, 914, 1840, 2840A, 2840B, 4140, 3002, 2508) of a multiple display computing system (e.g., 2500). In a more specific example, one or more operations of process 3600 may be performed by integrated sensor hub (e.g., 392, 342, 1790, 1842, 3006) of the SoC.

At 3602, new image metadata is received by SoC 3002 of a multiple display computing system from vision-based analyzer IC 3020 in display device 3010, when the display device is in a dimming operation mode.

At 3604, a determination is made as to whether the new image metadata indicates a user is present. If the new image metadata indicates that a user is present, then at 3606 a determination is made as to whether the new image metadata indicates that the user is engaged with the display device. If the new image metadata indicates that the user is engaged with the display device, then at 3608, the dimming operation mode for the display device is changed to an engaged operation mode. Thus, brightness of the display panel of display device 3010 may be increased to the full or default display brightness.

If a determination is made at 3606 that the new image metadata does not indicate that the user is engaged with display device 3010, then at 3610, a determination is made as to whether the new image metadata indicates that the user is disengaged with the display device. If the new image metadata indicates that the user is disengaged (but present), then the user's face orientation may be in a second-level area (e.g., greater than a first-level maximum angle of rotation but not greater than a second-level maximum angle of rotation, in either direction). In this scenario, at 3614, display device 3010 remains in the adaptive dimming operation mode as previously described herein.

If a determination is made at 3610 that the new image metadata indicates that the user is not disengaged (but is still present) then the user's face orientation may be in a third level area (e.g., greater than a second-level maximum angle of rotation in either direction). Thus, the user's face may not be detectable. In this scenario, at 3612, if the display device is currently in a regular adaptive dimming operation mode, an aggressive adaptive dimming operation mode can be selected for display device 3010, as previously described herein. Otherwise, if the aggressive adaptive dimming operation mode is already selected for display device 3010, then it remains selected.

With reference again to 3604, if the new image metadata does not indicate that a user is present, then the process may flow to process 3500 of FIG. 35, as indicated by (A), to evaluate whether a Lock on Absence policy should be invoked, as previously described herein.

Figure 37:
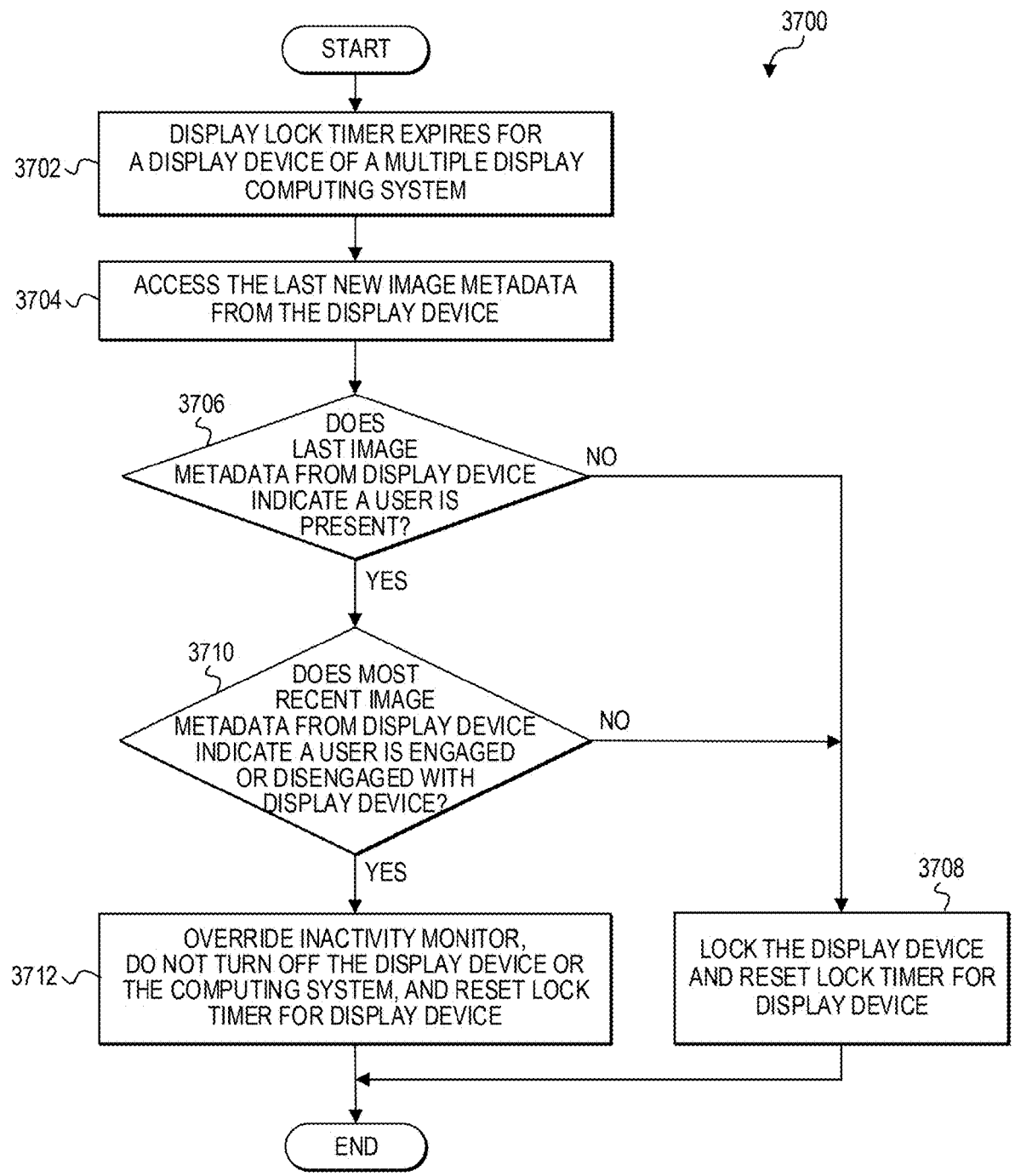
FIG. 37 is simplified flowchart of an example process that may be associated with inactivity timeout for a display device according to at least one embodiment.

FIG. 37 is a high-level flowchart of an example process 3700 associated with an inactivity timeout process for a display device (e.g., 3010) of a multiple display computing system (e.g., 2500). In at least one embodiment, a set of operations and/or instructions corresponds to the activities of example process 3700 for evaluating image metadata generated by a vision-based analyzer IC (or LCH) of a display device and applying a No Lock on Presence policy if applicable. In one example, at least some of the operations may be performed by an SoC (e.g., 140, 390, 340, 914, 1840, 2840A, 2840B, 4140, 3002, 2508) of a multiple display computing system (e.g., 2500). In a more specific example, one or more operations of process 3700 may be performed by integrated sensor hub (e.g., 392, 342, 1790, 1842, 3006) of the SoC.

At 3702, a display lock timer for display device 3010 expires. At 3704, the last image metadata from the display device is accessed. In one or more embodiments, the last image metadata of each display device in a multiple display computing system may be stored in any suitable memory or storage unit until a newer version of image data is received and replaces the currently stored image metadata.

At 3706, a determination is made as to whether the last image metadata from display device 3010 indicates a user is present. If it is determined at 3706 that the last image metadata of display device 3010 indicates that a user is present, then at 3710, a determination is made as to whether the last image metadata from display device 3010 indicates that the user is engaged or disengaged. For example, if the new image metadata indicates that the user is disengaged (but present), then the user's face orientation may be in a second-level area (e.g., greater than a first-level maximum angle of rotation but not greater than a second-level maximum angle of rotation, in either direction). Alternatively, if the last image metadata indicates that the user is engaged with the display device, then user's face orientation may be in a first-level area (e.g., not greater than a first-level maximum angle of rotation, in either direction). In either of these scenarios, the user is still present and at 3712, a No Lock on Presence policy may be invoked and an inactivity monitor can be overridden to prevent display device 3010 from being locked. Instead, display device 3010 remains in whatever mode is currently selected (e.g., engaged operation mode, adaptive dimming operation mode).

If it is determined at 3706 that the last image metadata of display device 3010 indicates that a user is not present, or if it is determined at 3710 that the last image metadata from display device 3010 indicates that a user is not engaged and not disengaged with the display device (i.e., the user is present, but the face is not detectable), then at 3708, an absent operation mode may be selected for the display device and the display device may be turned off (e.g., backlight is turned off) and the computing system may be locked. In addition, the lock timer for display device 3010 may be reset.

The following examples pertain to embodiments in accordance with this specification. Example DA1 provides a computing system comprising: first circuitry in a first display and communicatively coupled to a first camera, the first circuitry to generate first image metadata based on first image sensor data captured by the first camera; second circuitry in a second display device and communicatively coupled to a second camera, the second circuitry to generate second image metadata based on second image sensor data captured by the second camera from a second field of view of the second camera, wherein the first field of view and the second field of view partially overlap; and a processor operably coupled to the first display device and the second display device, where the processor is to: select a first operation mode for the first display device based on the first image metadata; and select a second operation mode for the second display device based on the second image metadata.

Example DA2 comprises the subject matter of Example DA1, and the computing system further includes third circuitry in a third display device, the second circuitry coupled to a third camera and to the processor, the third circuitry: generate third image metadata based on third image sensor data captured from a third field of view by the third camera, where the processor is to: receive the third image metadata from the third display device; and select a third operation mode for the third display device based on the third image metadata.

Example DA3 comprises the subject matter of any one of Examples DA1-DA2, and the first circuitry is further configured to: detect a face of a user in the first image sensor data; determine that the user is present in the first field of view of the first camera based on detecting the face of the user in the first image sensor data; determine, based on the first image sensor data, a first orientation of the face of the user; and determine whether the user is engaged or disengaged with the first display device based, at least in part, on the first orientation of the face of the user.

Example DA4 comprises the subject matter of Example DA3, and the user is determined to be engaged with the first display device based on determining that the face of the user is not rotated more than a first maximum angle of rotation in either direction relative to a first path between the face of the user and the first display device.

Example DA5 comprises the subject matter of any one of Examples DA3-DA4, and based on determining that the user is engaged with the first display device, the first image metadata is to indicate that the user is engaged with the first display device.

Example DA6 comprises the subject matter of any one of Examples DA3-DA5, and the second circuitry is configured to: detect the face of the user in the second image sensor data; and determine that the user is present in the second field of view of the second camera based on detecting the face of the user in the second image sensor data; determine, based on the second image sensor data, a second orientation of the face of the user; and determine whether the user is engaged or disengaged with the second display device based, at least in part, on the second orientation of the face of the user.

Example DA6.5 comprises the subject matter of Example DA6, and the user is determined to be disengaged with the second display device based on determining that the face of the user is rotated, in either direction relative to a second path between the face of the user and the second display device, more than a first maximum angle of rotation and not more than a second angle of rotation.

Example DA7 comprises the subject matter of any one of Examples DA6-DA6.5, and based on determining that the user is disengaged with the second display device, the second image metadata is to indicate that the user is disengaged with the second display device.

Example DA8 comprises the subject matter of any one of Examples DA6-DA7, and the first circuitry is further configured to: execute a machine-learning algorithm to detect the face of the user in the first image sensor data and to determine the first orientation of the face of the user, and the second circuitry is further to execute the machine learning algorithm to detect the face of the user in the second image sensor data and to determine the second orientation of the face of the user.

Example DA9 comprises the subject matter of Example DA8, and the machine learning algorithm includes one or more neural networks trained to recognize human faces and human face orientations.

Example DA10 comprises the subject matter of any one of Examples DA1-DA9, and the processor is further configured to: determine that the first image metadata indicates that a user is present and that the user is engaged with the first display device; determine that access to the computing system is locked; determine that an authentication mechanism is not currently running on the second display device; trigger the authentication mechanism to authenticate the user via the first display device; and leave the second display device turned off until the user is authenticated.

Example DA11 comprises the subject matter of any one of Examples DA1-DA10, and the processor is further configured to: determine that the second image metadata indicates that a user is present and that the user is disengaged with the second display device, where the second operation mode is to be selected based on determining that the user is disengaged with the second display device; and in response to selecting the second operation mode, progressively reduce a brightness of a backlight for a display panel of the second display device over a time period until a user event occurs or until the backlight is reduced to a predetermined minimum level of brightness.

Example DA12 comprises the subject matter of any one of Examples DA1-DA10, and the processor is further configured to: determine that the second image metadata indicates that a user is present and that a face of the user is not detectable, where the second operation mode is to be selected based on determining that the user is present and that the face of the user is not detectable; and in response to selecting the second operation mode, progressively reduce brightness of a backlight for a display panel of the second display device over a time period until a user event occurs or until the backlight is turned off.

Example DA13 comprises the subject matter of any one of Examples DA1-DA10, and the processor is further configured to: determine that the second image metadata indicates that a user is not present; determine that last image metadata associated with all the other display devices operably coupled to the processor indicate that the user is not present; and in response to selecting the second operation mode: turn off the second display device and all the other display devices operably coupled to the processor; and lock the computing system.

Example DA14 comprises the subject matter of any one of Examples DA1-DA13, and the processor is further configured to determine that a maximum amount of time allowed for inactivity has passed for the first display device, access last image metadata associated with the first display device, and based on determining that the last image metadata associated with the first display device indicates that a user is present, prevent the first display device from being turned off.

Example DA15 comprises the subject matter of any one of Examples DA1-DA14, and the first image metadata is to indicate whether a user is present or not present in the first field of view associated with the first camera and whether the user is engaged or disengaged with the first display device.

Example DA16 comprises the subject matter of any one of Examples DA1-DA14, and the first circuitry is further configured to determine a first event occurred in the first field of view, and in response to determining that the first event occurred in the first field of view, send the first image metadata to the processor.

Example DA17 comprises the subject matter of Example DA16, and the first circuitry is further configured to determine that the first event occurred by comparing the first image metadata to fourth image metadata previously generated by the first circuitry based on other image sensor data captured from the first field of view by the first camera prior to capturing the first image sensor data.

Example DA18 comprises the subject matter any one of Examples DA herein above, and further comprises the features of any one of Examples AB1-AB14 (as far as those features are not redundant with features of Examples DA herein above).

Example DB1 provides a computing system comprising: a computing device including: a lid containing a first display device, the first display device including: a first camera; first circuitry communicatively coupled to the first camera, the first circuitry to generate first image metadata based on first image sensor data captured by the first camera from a first field of view; and a processor operably coupled to the first circuitry in the lid, the processor configured to select a first operation mode for the first display device based on the first image metadata; and a second display device operably coupled to the processor of the computing device, the second display device including: second circuitry communicatively coupled to a second camera associated with the second display device, the second circuitry to generate second image metadata based on second image sensor data captured by the second camera from a second field of view, where the first field of view and the second field of view partially overlap, and where the processor is to select a second operation mode for the second display device based on the second image metadata.

Example DB2 comprises the subject matter of Example DB1, and the first circuitry is configured to detect a face of a user in the first image sensor data, determine that the user is present in the first field of view based on detecting the face of the user in the first image sensor data, determine, based on the first image sensor data, a first orientation of the face of the user, and determine whether the user is engaged or disengaged with the first display device based, at least in part, on the first orientation of the face of the user.

Example DB3 comprises the subject matter of Example DB2, and the user is determined to be engaged with the first display device based on determining that the face of the user is not rotated more than a first maximum angle of rotation in either direction relative to a path between the face of the user and the first display device.

Example DB4 comprises the subject matter of any one of Examples DB2-DB3, and the second circuitry is configured to detect the face of the user in the second image sensor data, and determine that the user is present in the second field of view of the second camera based on detecting the face of the user in the second image sensor data, determine, based on the second image sensor data, a second orientation of the face of the user, and determine whether the user is engaged or disengaged with the second display device based, at least in part, on the second orientation of the face of the use.

Example DB4.5 comprises the subject matter of Example DB4, and the user is determined to be disengaged with the second display device based on determining that the face of the user is rotated, in either direction relative to a second path between the face of the user and the second display device, more than a first maximum angle of rotation and not more than a second angle of rotation.

Example DB5 comprises the subject matter of any one of Examples DB4-DB4.5, and the first circuitry is further configured to execute a machine-learning algorithm to detect the face of the user in the first image sensor data and to determine the first orientation of the face of the user, and the second circuitry is further to execute the machine learning algorithm to detect the face of the user in the second image sensor data and to determine the second orientation of the face of the user.

Example DB6 comprises the subject matter of Example DB5, and the machine learning algorithm includes one or more neural networks trained to recognize human faces and human face orientations, where the human face orientations are represented in degrees of rotation.

Example DB7 comprises the subject matter of any one of Examples DB1-DB6, and the processor is further configured to determine that the first image metadata indicates that a user is present and that the user is engaged with the first display device, determine that access to the computing system is locked, trigger an authentication mechanism to authenticate the user via the first display device, and leave the second display device turned off until the user is authenticated.

Example DB8 comprises the subject matter of any one of Examples DB1-DB7, and the processor is further configured to determine that the second image metadata indicates that a user is present and that the user is disengaged with the second display device, where the second operation mode is to be selected based on determining that the user is disengaged with the second display device, and in response to selecting the second operation mode, progressively reduce a brightness of a backlight for a display panel of the second display device over a time period.

Example DB9 comprises the subject matter of any one of Examples DB1-DB7, and the processor is further configured to determine that the second image metadata indicates that a user is not present, determine that last image metadata associated with all the other display devices operably coupled to the processor indicate that the user is not present, and in response to selecting the second operation mode, turn off the second display device and all the other display devices operably coupled to the processor and lock the computing system.

Example DB10 comprises the subject matter of any one of Examples DB1-DB9, and the processor is further configured to determine that a maximum amount of time allowed for inactivity has passed for the first display device, access last image metadata associated with the first display device, and based on determining that the last image metadata associated with the first display device indicates that a user is present, prevent the first display device from being turned off.

Example DB11 comprises the subject matter of any one of Examples DB1-DB10, and the first image metadata is to indicate whether a user is present or not present in a first field of view associated with the first camera and whether the user is engaged or disengaged with the first display device.

Example DB12 comprises the subject matter of any one of Examples DB1-DB10, and the first circuitry is further configured to determine a first event occurred in the first field of view, and in response to determining that the first event occurred in the first field of view, send the first image metadata to the processor.

Example DB13 comprises the subject matter of Example DB12, and the first circuitry is further configured to determine that the first event occurred by comparing the first image metadata to third image metadata previously generated by the first circuitry based on other image sensor data captured from the first field of view by the first camera prior to capturing the first image sensor data.

Example DB14 comprises the subject matter of any one of Examples DB1-DB13, and the second display device is operably coupled to the computing device via a docking station.

Example DB15 comprises the subject matter any one of Examples DB herein above, and further comprises the features of any one of Examples AB1-AB14 (as far as those features are not redundant with features of Examples DB herein above).

Example DC1 provides an apparatus, comprising circuitry configured to be communicatively coupled to a camera associated with an external monitor and a computing device operably coupled to the external monitor, the circuitry to receive image sensor data captured from a field of view of the camera, detect a face of a user in the image sensor data, determine that the user is present in the field of view of the camera based on detecting the face of the user in the image sensor data, determine an orientation of the face of the user, and determine whether the user is engaged or disengaged with the external monitor based, at least in part, on the orientation of the face of the user, generate image metadata to indicate that the user is present in the field of view of the camera and to further indicate whether the user is engaged or disengaged with the external monitor, and send the image metadata to a processor of the computing device.

Example DC2 comprises the subject matter of Example DC1, and the orientation of the face of the user is to be determined relative to a path between the face of the user and the external monitor.

Example DC3 comprises the subject matter of any one of Examples DC1-DC2, and the circuitry is further configured to, based on the orientation of the face of the user, determine that the face of the user is not rotated more than a first maximum angle of rotation, where, based on a determination that the face of the user is not rotated more than the first maximum angle of rotation, the image metadata is to indicate that the user is engaged with the external monitor.

Example DC4 comprises the subject matter of any one of Examples DC1-DC2, and the circuitry is further configured to: based on the orientation of the face of the user, determine that the face of the user is rotated more than a first maximum angle of rotation but not more than a second maximum angle of rotation, where, based on a determination that the face of the user is rotated more than a first maximum angle of rotation but not more than a second maximum angle of rotation, the image metadata is to indicate that the user is disengaged with external monitor.

Example DC5 comprises the subject matter of any one of Examples DC1-DC2, and the circuitry is further configured to: based on the orientation of the face of the user, determine that the face of the user is rotated more than a second maximum angle of rotation, where, based on a determination that the face of the user is rotated more than a second maximum angle of rotation, the image metadata is to indicate that the user is present and that the face of the user is undetectable.

Example DC6 comprises the subject matter of any one of Examples DC1-DC5, and the circuitry is further configured to execute a machine-learning algorithm to detect the face of the user in the image sensor data and to determine the orientation of the face of the user.

Example DC7 comprises the subject matter of Example DC6, and the machine learning algorithm includes one or more neural networks trained to recognize human faces and human face orientations, where the human face orientations are represented in degrees of rotation.

Example DC8 comprises the subject matter of any one of Examples DC1-DC7, and the circuitry is external to the computing device.

Example DC9 comprises the subject matter of any one of Examples DC1-DC8, and the external monitor is connected to the computing device via a docking station.

Example DC10 comprises the subject matter of any one of Examples DC1-DC9, and the circuitry and the camera are either embedded in the external monitor or removably connected to the external monitor.

Example DD1 provides an apparatus comprising a processor operably coupled to a first display device and a second display device, the processor is to execute one or more instructions to receive first image metadata associated with a first image captured by a first camera from a first field of view proximate the first display device, determine that the first image metadata indicates that a user is present in the first field of view and that the user is engaged with the first display device, receive second image metadata associated with a second image captured by a second camera from a second field of view proximate the second display device, determine that the second image metadata indicates that the user is present in the second field of view and that the user is disengaged with the second display device, select a first operation mode for the first display device based, at least in part, on the first image metadata, and select a second operation mode for the second display device based, at least in part, on the second image metadata Example DD2 comprises the subject matter of Example DD1, and the processor is to execute the one or more instructions further to determine that access to a computing system comprising the processor is locked, determine that an authentication mechanism is not currently running on the second display device, trigger the authentication mechanism to authenticate the user via the first display device, and leave the second display device turned off until the user is authenticated.

Example DD3 comprises the subject matter of any one of Examples DD1-DD2, and the processor is to execute the one or more instructions further to determine that the second image metadata indicates that the user is disengaged with the second display device, and progressively reduce a brightness of a backlight for a display panel of the second display device over a time period.

Example DD4 comprises the subject matter of Example DD3, and the brightness of the backlight is to be progressively reduced until the backlight is either reduced to a predetermined minimum level of brightness or turned off.

Example DD5 comprises the subject matter of any one of Examples DD1-DD4, and the processor is to execute the one or more instructions further to receive third image metadata associated with a third image captured by a third camera from a third field of view proximate a third display device operably coupled to the processor, determine that the third image metadata indicates that the user is not present in the third field of view, determine that last image metadata associated with the first display device indicates that the user is not present in the first field of view and that last image metadata associated with the second display device indicates that the user is not present in the second field of view, select a third operation mode for the third display device, and in response to selecting the third operation mode: turn off the third display device, the first display device, and the second display device, and lock a computing system comprising the processor.

Example DD5.1 comprises the subject matter of any one of Examples DD1-DD6, and the user is determined to be engaged with the first display device based on determining that a face of the user is not rotated more than a first maximum angle of rotation in either direction relative to a first path between the face of the user and the first display device.

Example DD5.2 comprises the subject matter of any one of Examples DD1-DD6.1, and the user is determined to be disengaged with the first display device based on determining that a face of the user is rotated more than a first maximum angle of rotation and less than a second maximum angle of rotation, in either direction relative to a second path between the face of the user and the second display device.

Example DD6 comprises the subject matter of any one of Examples DD1-DD5.2, and the processor is to execute the one or more instructions further to determine that a maximum amount of time allowed for inactivity has passed for the first display device, access last image metadata associated with the first display device, and based on determining that the last image metadata associated with the first display device indicates that the user is present, prevent the first display device from being turned off.

Example DE1 provides a method comprising: generating, by first circuitry coupled to a first camera, first image metadata based on first image sensor data captured by the first camera from a first field of view proximate a first display device; generating, by second circuitry coupled to a second camera, second image metadata based on second image sensor data captured by the second camera from a second field of view proximate a second display device, wherein the first field of view and the second field of view partially overlap; receiving, by a processor of a computing device, the first image metadata from the first circuitry and the second image metadata from the second circuitry; selecting, by the processor, a first operation mode for the first display device based on the first image metadata; and selecting, by the processor, a second operation mode for the second display device based on the second image metadata.

Example DE2 comprises the subject matter of Example DE1, and the method further includes detecting a face of a user in the first image sensor data, determining that the user is present in the first field of view of the first camera based on the detecting the face of the user in the first image sensor data, determining, based on the first image sensor data, a first orientation of the face of the user, and determining whether the user is engaged or disengaged with the first display device based, at least in part, on the first orientation of the face of the user.

Example DE3 comprises the subject matter of Example DE2, and the method further includes determining that the user is engaged with the first display device based on determining that the face of the user is not rotated more than a first maximum angle of rotation in either direction relative to a first path between the face of the user and the first display device.

Example DE4 comprises the subject matter of any one of Examples DE2-DE3, and based on the determining that the user is engaged with the first display device, the first image metadata is generated to indicate that the user is engaged with the first display device.

Example DE5 comprises the subject matter of any one of Examples DE2-DE4, and the second circuitry is to: detecting the face of the user in the second image sensor data; and determining that the user is present in the second field of view of the second camera based on the detecting the face of the user in the second image sensor data; determining, based on the second image sensor data, a second orientation of the face of the user; and determining whether the user is engaged or disengaged with the second display device based, at least in part, on the second orientation of the face of the user.

Example DE5.5 comprises the subject matter of Example DE5, and the method further includes determining that the user is disengaged with the second display device based on determining that the face of the user is rotated more than a first maximum angle of rotation and not more than a second maximum angle of rotation in either direction relative to a second path between the face of the user and the second display device.

Example DE6 comprises the subject matter of any one of Example DE5-DE5.5, and based on the determining that the user is disengaged with the second display device, the second image metadata is generated to indicate that the user is disengaged with the second display device.

Example DE7 comprises the subject matter of any one of Examples DE5-DE6, and the detecting the face of the user in the second image sensor data and the determining the second orientation of the face of the user includes executing one or more machine learning algorithms, and the detecting the face of the user in the first image sensor data and the determining the first orientation of the face of the user includes executing the one or more machine learning algorithms.

Example DE8 comprises the subject matter of Example DE7, and the one or more machine learning algorithms include one or more neural networks trained to recognize human faces and human face orientations.

Example DE9 comprises the subject matter of any one of Examples DE1-DE8, and the method further includes determining that the first image metadata indicates that a user is present and that the user is engaged with the first display device, determining that access to a computing system comprising the processor is locked, determining that an authentication mechanism is not currently running on the second display device, triggering the authentication mechanism to authenticate the user via the first display device, and leaving the second display device turned off until the user is authenticated.

Example DE10 comprises the subject matter of any one of Examples DE1-DE9, and the method further includes: determining that the second image metadata indicates that a user is present and that the user is disengaged with the second display device, where the selecting the second operation mode is based on determining that the user is disengaged with the second display device; and, in response to the selecting the second operation mode, progressively reducing a brightness of a backlight for a display panel of the second display device over a time period.

Example DE11 comprises the subject matter of Example DE10, and the brightness of the backlight is progressively reduced until the backlight is either reduced to a predetermined minimum level of brightness or turned off Example DE12 comprises the subject matter of any one of Examples DE1-DE9, and the method further includes: determining that the second image metadata indicates that a user is present and that a face of the user is not detectable, where the selecting the second operation mode is based on the determining that the user is present and that the face of the user is not detectable; and in response to the selecting the second operation mode, progressively reducing a brightness of a backlight for a display panel of the second display device over a time period until either a user event occurs or the backlight is turned off Example DE13 comprises the subject matter of any one of Examples DE1-DE9, and the method further includes determining that the second image metadata indicates that a user is not present, determining that last image metadata associated with the first display device indicates that the user is not present, and in response to the selecting the second operation mode: turning off the first display device and the second display device, and locking a computing system comprising the processor.

Example DE14 comprises the subject matter of any one of Examples DE1-DE13, and the method further includes determining that a maximum amount of time allowed for inactivity has passed for the first display device, accessing last image metadata associated with the first display device, and based on determining that the last image metadata associated with the first display device indicates that a user is present, preventing the first display device from being turned off.

Example DE15 comprises the subject matter of any one of Examples DE1-DE14, and the first image metadata indicates whether a user is present or not present in the first field of view associated with the first camera and whether the user is engaged or disengaged with the first display device.

Example DE16 comprises the subject matter of any one of Examples DE1-DE14, and the method further includes determining a first event occurred in the first field of view, and in response to the determining that the first event occurred in the first field of view, sending, from the first circuitry, the first image metadata to the processor.

Example DE17 comprises the subject matter of Example DE16, and the method further includes determining that the first event occurred by comparing the first image metadata to third image metadata previously generated by the first circuitry based on other image sensor data captured from the first field of view by the first camera prior to capturing the first image sensor data.

Example DE18 comprises the subject matter any one of Examples DE herein above, and further comprises the elements of the method of any one of Examples AA1-AA16 (as far as those method elements are not redundant with method elements of Examples DE herein above).

Example DF1 provides an apparatus, the apparatus comprising means for performing the method of any one of Examples DE1-DE17.

Example DF2 comprises the subject matter of Example DF1, and the means for performing the method comprises at least one processor and at least one memory element.

Example DF3 comprises the subject matter of Example DF2, and the at least one memory element comprises machine-readable instructions that when executed, cause the apparatus to perform the method of any one of the preceding Examples.

Example DF4 comprises the subject matter of any one of Examples DF1-DF3, and the apparatus is one of a computing system, a processing element, or a system-on-a-chip.

Example DG1 provides at least one machine-readable storage medium comprising instructions, where the instructions when executed realize an apparatus, realize a computing system, or implement a method as in any one of the preceding Examples.

Improved Touch Experience

As discussed previously, a lid controller hub allows for the synchronization of the delivery of touch sensor data to an operating system with the display refresh rate. This synchronization provides for a smooth touch experience as frames can be rendered based on touch sensor data collected over the same time interval—the amount of time between display refreshes. Consider a user moving an icon across a display at a steady rate with their finger. If touch sensor data delivery to the operating system is synchronized with the display refresh rate, the icon will move substantially the same distance across the display with each screen refresh, and the icon will appear to move smoothly across the display. Without synchronization, the distance moved by the icon moves in successive frames can be different and movement of the icon may appear jumpier than in the synchronized approach.

Some existing applications smooth touch sensor data prior to use to account for this lack of synchronization, but such conditioning is performed at the application level and not all applications may smooth touch sensor data prior to use. The conditioning of touch sensor data by a lid controller hub provides for the conditioning of touch sensor data at the device level. Conditioned touch sensor data is sent by an LCH to the operating system, where it is available for use by the operating system and applications running on the computing device. Thus, a lid controller hub enables device-level features that provide an improved touch experience to users across all applications in at least two ways—through synchronizing the delivery of touch sensor data to the operating system with the display refresh rate and by conditioning the touch sensor data before it is sent to the operating system.

Generally, the synchronization of touch sensor data delivery with display refresh rates can be performed as follows. A touch display controller (e.g., 165, 285, 385) detects the start of touch interaction at a touch display (e.g., 145, 280, 380, 926, 2140) and provides touch sensor data to an LCH. At some point prior to the display being refreshed, the LCH (e.g., 155, 260, 305, 954, 1705) receives notification of the upcoming refresh. This notification can come from a display subsystem or component of a display subsystem, such as a timing controller (e.g., timing controller 150, 250, 355, 944, 1706, 2100). The LCH generates conditioned touch sensor data based on the touch sensor data received from the touch controller and sends the conditioned touch sensor data to the operating system. The conditioned touch sensor data can comprise conditioned touch location data, and, in some embodiments, conditioned touch intensity data. Sending conditioned touch sensor data to the operating system can comprise sending the data from a lid (e.g., 120, 123, 220, 301, 1701) to a host processing unit (e.g., 140, 390, 340, 1760, 2186) in a base (e.g., 110, 129, 210, 315, 910, 1702) of a computing device (e.g., 100, 122, 200, 300, 900).

The operating system can pass the conditioned touch sensor data to an application executing on the computing device. The operating system or the application can generate frame data based on the conditioned touch sensor data. The frame data can be provided to a display module (e.g., 391, 341, 2164) that generates a new frame to be displayed on the display. The display module sends video data comprising information representing the new frame to a timing controller (e.g., 150, 400, 355, 944, 1706, 2100), and the timing controller can cause the new frame to be displayed on the display. By having a lid controller hub provide conditioned touch sensor data to the operating system instead of having individual applications condition the touch sensor data they receive, conditioned touch sensor data can be made available to the operating system and any application operating on a computing device.

Figure 38:
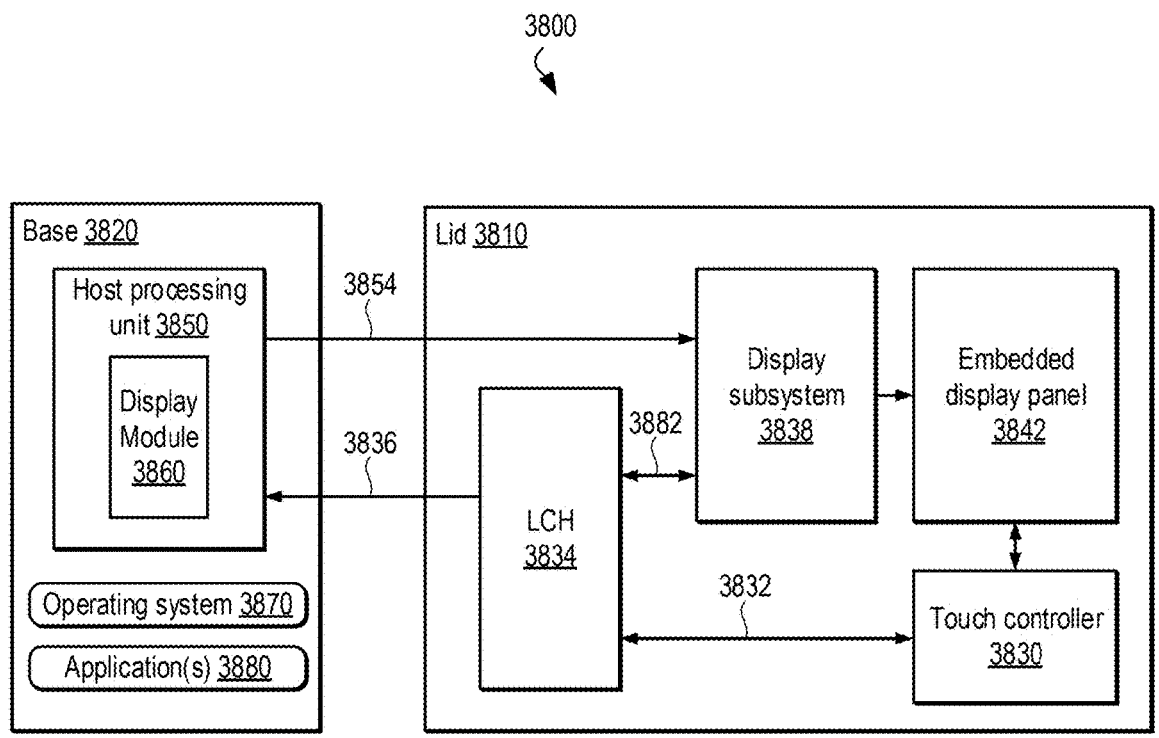
FIG. 38 is a simplified block diagram of an example computing device comprising a lid controller hub capable of providing an improved touch user experience.

FIG. 38 is a simplified block diagram of an example computing device comprising a lid controller hub capable of providing an improved touch user experience. The computing device 3800 comprises a lid 3810 and a base 3820. The lid 3810 comprises a touch display controller (touch controller) 3830, an LCH 3834, a display subsystem 3838, and an embedded display panel 3842. The base 3820 comprises host processing unit 3850, which comprises a display module 3860. An operating system 3870 and one or more applications 3880 can execute on computing resources in the base 3820 (e.g., host processing unit 3850).

The computing device 3800 can be any of the computing devices described herein (e.g., 100, 122, 200, 300, 900). The lid 3810 can be any of the lids described herein (e.g., 120, 123, 220, 301, 920, 1701). The touch controller 3830 can be any of the touch controllers described herein (e.g., 165, 285, 385). The embedded display panel 3842 is a touch display and can be any of the display panels described herein (e.g., 145, 280, 380, 926, 2140). The LCH 3834 can be any of the LCHs described herein (e.g., 155, 260, 305, 954, 1705). In some embodiments, the LCH 3834 has fewer than all of the components and modules discussed as being a part of an LCH in other LCH embodiments described herein. For example, the LCH 3834 may not comprise an audio module.

The display subsystem 3838 can comprise one or more components described herein that perform display-related operations, such as a timing controller (e.g., 150, 400, 355, 944, 1706, 2100) and its constituent timing controller components (e.g., frame buffer (e.g., 830, 2120), frame processing stack modules (e.g., 822-826, 2139-2128)), row drivers (e.g., 882, 2154, 2158), column drivers e.g., 884, 2160), display driver (e.g., 880, 2130), and video data receiver (e.g., 812, 2110). The host processing unit 3850 can be any host processing unit described herein (e.g., 140, 385, 380, 382, 340, 342, 914, 1760, 2186). The display module 3860 can be any display module described herein (e.g., 381, 341, 2164). The base 3820 can be any of the bases described herein (e.g., 110, 129, 210, 315, 910, 1702).

Figure 39:
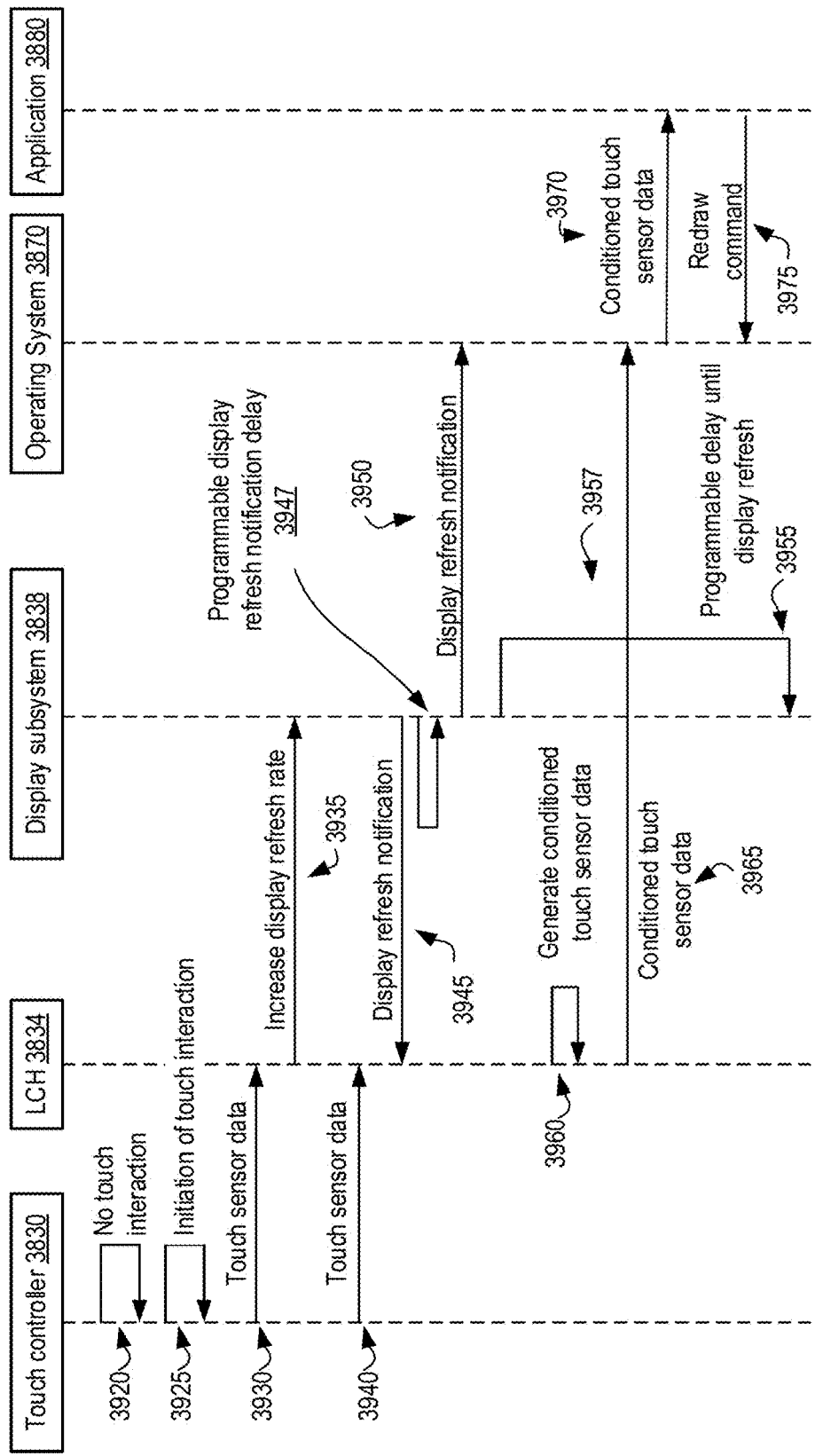
FIG. 39 illustrates an exemplary flow of information between components in the computing device illustrated in FIG. 38.

FIG. 39 illustrates an exemplary flow of information between components in the computing device 3900. At 3920, the touch controller 3830 does not detect touch interaction at the display 3842. In some embodiments, the touch controller 3830 can detect touch interaction by detecting a deviation in touch sensor data from touch sensor data indicating that no object is touching the display. At 3925, the touch controller 3830 detects the initiation of touch interaction at the display 3842. At 3930 in response to detecting the initiation of touch interaction at the display 3842, the touch controller 3830 provides touch sensor data to the LCH 3834. At 3935, the LCH 3834 sends a notification to the display subsystem 3838 to increase the refresh rate of the display 3842. In other embodiments, the LCH 3834 can notify the display subsystem 3838 to change the refresh rate to a rate specified in the notification or to change the refresh rate to a maximum refresh rate of the display 3842. In some embodiments, the LCH 3834 sends the notification to the display subsystem 3838 via a synchronization signal 3882 (e.g., 180, 226, 370). If the LCH 3834 keeps track of the display refresh rate and the display refresh rate is already at an "active" display rate (e.g., 60 Hz to 120 Hz), the LCH 3834 may not send this notification to the display subsystem 3838.

At 3940, the touch controller 3830 continues to send touch sensor data 3832 to the LCH 3834. At 3945 and 3950, the display subsystem 3838 sends a display refresh notification to the LCH 3834 and the operating system 3870 indicating that a display refresh is to occur. The display refresh notification 3945 sent to the operating system 3870 can be delayed by a delay 3947 after the display refresh notification 3945 is sent to the LCH 3834 to provide additional time for the operating system 3870 or the application 3880 to render a new frame based on the conditioned touch sensor data. In some embodiments, the delay 3947 is programmable. In some embodiments, the display refresh notification can be a notification that a redraw of the first row or column of the display is to occur. The delay between notification of an upcoming display refresh and the start of the display refresh is represented by 3955. In some embodiments, this delay is programmable. Even at the maximum refresh rate of some existing displays (e.g., 120 Hz) there is still time to generate conditioned touch sensor data, send the conditioned touch sensor data to the operating system, 3870, pass the conditioned touch sensor data to the application 3880, generate frame information based on the conditioned touch sensor data, generate a new frame based on the frame information, and provide video data comprising information representing the new frame to the display subsystem 3838 in time for the display 3842 to be refreshed with the new frame.

At 3960, in response to receiving the display refresh notification, the LCH 3834 generates conditioned touch sensor data 3836 based on the touch sensor data provided by the touch controller 3830. In some embodiments, the touch sensor data comprises touch location information (e.g., x-y coordinates) where the touch controller detected a touch and the conditioned touch data can comprise conditioned touch location data. In some embodiments, the touch sensor data 3832 comprises touch intensity information which can reflect the intensity of a touch interaction (e.g., how hard a user or object is pressing against the display) and the conditioned touch sensor data can comprise conditioned touch intensity data. If the LCH 3834 received multiple touch sensor data samples (e.g., multiple x-y coordinate sets) since the initiation of a touch interaction or since conditioned touch sensor data was last generated, the LCH 3834 can perform one or more conditioning operations on the multiple touch sensor data samples. The conditioning operations can be smoothing operations, such as averaging touch location x-y coordinates over multiple touch sensor data samples, a smoothing operation employing a Kaman filter, or any other type of smoothing operation. In some embodiments, the LCH 3834 can generate conditioned touch sensor data 3836 based on touch sensor data received at the LCH 3834 prior to previous display refreshes. For example, generating conditioned touch data location can comprise calculating the average of touch locations indicated by touch location data received by the LCH over the previous, for example, five display refreshes.

At 3965, the conditioned touch sensor data 3836 is sent to the operating system 3870. The LCH 3834 can receive touch sensor data 3832 from the touch controller 3830 to be used in generating conditioned touch sensor data for the next display refresh interval after conditioned touch sensor data 3836 is sent. At 3970, the operating system 3870 passes the conditioned touch sensor data to an application 3880, which can generate frame information based on the conditioned touch sensor data. In some embodiments, the operating system 3870 can generate frame information based on the conditioned touch sensor data. Frame information can represent all or a portion of a frame that has been updated by the application 3880 or operating system 3870 based on the conditioned touch sensor data, such as updating the position of a user element (e.g., cursor, pointer) or game character. At 3975, the application 3880 sends a redraw command to the operating system 3870. For example, if the operating system

3870 is a Windows® operating system, the application 3880 can send a redraw command to the Display Window Manager.

Although not illustrated in FIG. 39, additional actions to cause a new frame to be displayed during a display refresh can comprise the display subsystem 3838 receiving video data 3854 from the base 3820 of the computing device, and the display subsystem 3838 causing the display 3842 to be refreshed with the new frame. In some embodiments, the video data 3854 can be generated by a display module 3860 that is part of the host processing unit 3850. In some embodiments, the touch controller 3830 can send touch sensor data to a host module (e.g., 261, 362) in the LCH 3834. In some embodiments, conditioned touch sensor data 3836 can be passed to the operating system 3870 over an I3C connection (e.g., connection 221) or a USB connection (e.g., connection 238).

Figure 40:
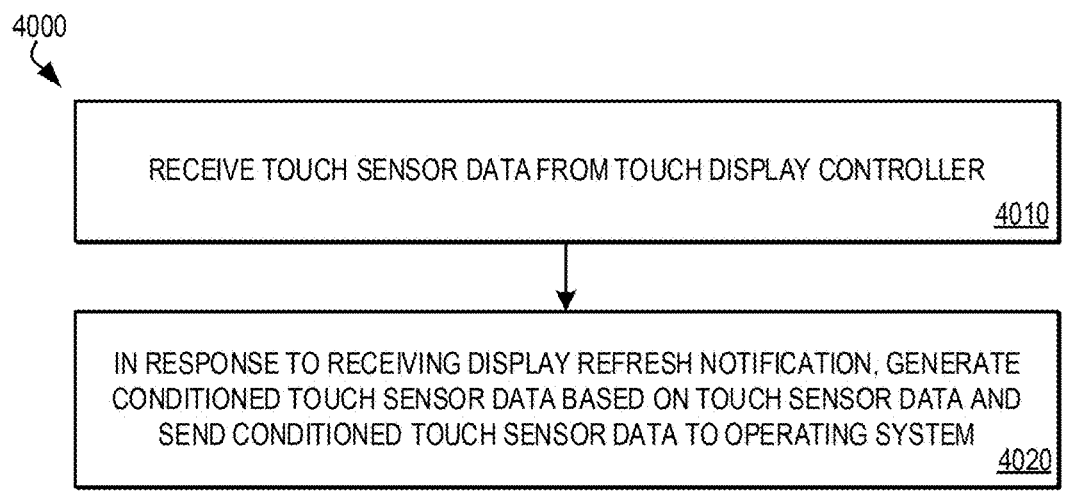
FIG. 40 illustrates an example method for synchronizing the sending of touch sensor data to an operating system with a display refresh rate.

FIG. 40 illustrates an example method for synchronizing the sending of touch sensor data to an operating system with a display refresh rate. The method can be performed by, for example, a lid controller hub (e.g., 155, 260, 305, 954, 1705, 3834) in a laptop. At 4010, touch sensor data is received from a touch display controller. At 4020, in response to receiving a display refresh notification, conditioned touch sensor data is generated based on the touch sensor data; and the conditioned touch sensor data is sent to an operating system. Receiving the touch sensor data, generating the conditioned touch sensor data, and sending the conditioned touch sensor data can be performed in a lid of a mobile computing device, and the operating system can be executing on one or more processing units located in a base of the mobile computing device.

In other embodiments, the method 4000 can comprise additional elements. For example, the display refresh notification can be received from a display subsystem. In another example, the operating system or an application executing on the mobile computing device generates frame information based on the conditioned touch sensor data, a new frame is generated based on the frame information, and the display is refreshed to display the new frame.

The follow examples pertain to embodiments in accordance with this specification.

Example EA1 is a method comprising: receiving touch sensor data from a touch display controller; and in response to receiving a display refresh notification: generating conditioned touch sensor data based on the touch sensor data; and sending the conditioned touch sensor data to an operating system; wherein the receiving the touch sensor data, the generating the conditioned touch sensor data, and the sending the conditioned touch sensor data are performed in a lid of a mobile computing device, and the operating system is executing on one or more processing units located in a base of the mobile computing device.

Example EA2 comprises the method of Example EA1, wherein the touch sensor data comprises touch location data, the generating the conditioned touch sensor data comprises generating conditioned touch location data based on the touch location data, the conditioned touch sensor data comprising the conditioned touch location data.

Example EA3 comprises the method of Example EA1 or EA2, wherein the touch sensor data comprises touch intensity data, the generating the conditioned touch sensor data comprising generating conditioned touch intensity data based on the touch intensity data, the conditioned touch sensor data comprising the conditioned touch intensity data.

Example EA4 comprises the method of any one of Examples EA1-EA3, wherein the generating the conditioned touch sensor data comprises smoothing the touch sensor data.

Example EA5 comprises the method of any one of Examples EA1-EA4, further comprising: receiving prior touch sensor data; and receiving a prior display refresh notification prior to the display refresh notification, the prior touch sensor data received prior to the receiving of the prior display refresh notification, wherein the generating the conditioned touch sensor data comprises averaging the touch sensor data with the prior touch sensor data.

Example EA6 comprises the method of any one of Examples EA1-EA5, further comprising notifying a display subsystem to change a refresh rate of a display.

Example EA7 comprises the method of any one of Examples EA1-EA5, further comprising notifying a display subsystem to increase a refresh rate of a display.

Example EA8 comprises the method of any one of Examples EA1-EA5, further comprising notifying a display subsystem to increase a refresh rate of the display to a maximum refresh rate.

Example EA9 comprises the method of any one of Examples EA6-EA8, further comprising notifying the display subsystem in response to receiving the touch sensor data.

Example EA10 comprises the method of any one of Examples EA1-EA9, further comprising sending the conditioned touch sensor data to an application executing on the mobile computing device.

Example EA11 comprises the method of any one of Examples EA1-EA10, further comprising: generating, by the operating system or an application executing on the mobile computing device, frame information based on the conditioned touch sensor data; generating a new frame based on the frame information; and refreshing a display to display the new frame.

Example EA12 includes the method of any one of Examples EA herein above and further comprises the elements of the method of any one of Examples AA1-AA16 or DE1-DE17 (as far as those method elements are not redundant with method elements of Examples EA herein above).

Example EB1 is an apparatus comprising circuitry to: receive touch sensor data from a touch display controller; receive a display refresh notification; and in response to receiving the display refresh notification: generate conditioned touch sensor data based on the touch sensor data; and send the conditioned touch sensor data to host processing unit; wherein the apparatus is for use in a lid of a mobile computing device.

Example EB1.5 comprises the apparatus of EB1, wherein the apparatus is a lid controller hub.

Example EB2 comprises the apparatus of Example EB1, wherein the touch sensor data comprises touch location data, to generate the conditioned touch sensor data comprises to generate conditioned touch location data based on the touch location data, the conditioned touch sensor data comprising the conditioned touch location data.

Example EB3 comprises the apparatus of Example EB1 or EB2, wherein the touch sensor data comprises touch intensity data, to generate the conditioned touch sensor data comprising to generate conditioned touch intensity data based on the touch intensity data, the conditioned touch sensor data comprising the conditioned touch intensity data.

Example EB4 comprises the apparatus of any one of Examples EB1-EB3, wherein to generate the conditioned touch sensor data comprises to average the touch sensor data with touch sensor data received prior to previous display refreshes.

Example EB5 comprises the apparatus of any one of Examples EB1-EB3, the circuitry to further notify a display subsystem to change a refresh rate of a display.

Example EB6 comprises the apparatus of any one of Examples EB1-EB3, the circuitry to further notify a display subsystem to increase a refresh rate of a display.

Example EB7 comprises the apparatus of any one of Examples EB1-EB3, the circuitry to further notify a display subsystem to increase a refresh rate of a display to a maximum refresh rate.

Example EB8 comprises the apparatus of any one of Examples EB6-EB7, the circuitry to further notify the display subsystem in response to receiving the touch sensor data.

Example EB9 comprises the apparatus of any one of the Examples EB herein above, and further the features of any one of the Examples DC1-DC10, or DD1-DD6 (as far as those features are not redundant with the features of Examples EB herein above).

Example EC1 is a mobile computing device comprising: a base comprising one or more host processing units to execute an operating system; and a lid rotatably coupled to the base, the lid comprising: a touch display; a touch display controller; a display subsystem to refresh the touch display; and circuitry to: receive touch sensor data from the touch display controller; receive a display refresh notification from the display subsystem; and in response to receiving the display refresh notification: generate conditioned touch sensor data based on the touch sensor data; and send the conditioned touch sensor data to the operating system.

Example EC1.5 comprises the apparatus of EC1, wherein the apparatus is a lid controller hub.

Example EC2 comprises the mobile computing device of Example EC1, wherein the touch sensor data comprises touch location data, to generate the conditioned touch sensor data comprises to generate conditioned touch location data based on the touch location data, the conditioned touch sensor data comprising the conditioned touch location data.

Example EC3 comprises the mobile computing device of Example EC1 or EC2, wherein the touch sensor data comprises touch intensity data, to generate the conditioned touch sensor data comprising to generate conditioned touch intensity data based on the touch intensity data, the conditioned touch sensor data comprising the conditioned touch intensity data.

Example EC4 comprises the mobile computing device of any one of Examples EC1-EC3, the circuitry further to: receive prior touch sensor data; and receive a prior display refresh notification prior to the display refresh notification, the prior touch sensor data received prior to the receiving of the prior display refresh notification, wherein to generate the conditioned touch sensor data comprises to average the touch sensor data with the prior touch sensor data.

Example EC5 comprises the mobile computing device of any one of Examples EC1-EC4, the circuitry to further notify the display subsystem to change a refresh rate of a display.

Example EC6 comprises the mobile computing device of any one of Examples EC1-EC4, the circuitry to further notify the display subsystem to increase a refresh rate of a display.

Example EC7 comprises the mobile computing device of any one of Examples EC1-EC4, the circuitry to further notify the display subsystem to increase a refresh rate of a display to a maximum refresh rate.

Example EC8 comprises the mobile computing device of Example EC7, the circuitry to further notify the display subsystem in response to receiving the touch sensor data.

Example EC9 comprises the mobile computing device of any one of Examples EC1-EC8, wherein the display subsystem comprises a timing controller.

Example EC10 comprises the mobile computing device of any one of Examples EC1-EC9, the host processing units to execute an application, the operating system to provide the conditioned touch sensor data to the application.

Example EC11 comprises the mobile computing device of any one of Examples EC1-EC10, the operating system or the application to generate frame information based on the conditioned touch sensor data; the operating system to generate a new frame based on the frame information, the display subsystem further to: receive video data from the base; and cause the display to be refreshed with the new frame.

Example EC12 includes the mobile computing device of any one of Examples EC herein above and further comprises the features of any of Examples AB1-AB14, DA1-DA17, or DB1-DB14 (as far as those features are not redundant with features of Examples EC herein above).

Example ED1 is a mobile computing device comprising: a base comprising one or more host processing units to execute an operating system; and a lid rotatably coupled to the base, the lid comprising: a touch display; a touch display controller; a display subsystem to refresh the touch display; and touch sensor data conditioning means for conditioning touch sensor data received from the touch display controller and sending the conditioned touch sensor data to the operating system in synchronization a refresh rate of the touch display.

Example ED2 comprises the mobile computing device of Example ED1, wherein the touch sensor data comprises touch location data, to generate the conditioned touch sensor data comprises to generate conditioned touch location data based on the touch location data, the conditioned touch sensor data comprising the conditioned touch location data.

Example ED3 comprises the mobile computing device of Examples ED1 or ED2, the host processing units to execute an application, the operating system to provide the conditioned touch sensor data to the application.

Example ED4 comprises the mobile computing device of any one of Examples ED1-ED3, the operating system or the application to generate frame information based on the conditioned touch sensor data; the operating system to generate a new frame based on the frame information, the display subsystem further to: receive video data from the base; and cause the touch display to be refreshed with the new frame.

Example ED5 includes the mobile computing device of any one of Examples ED herein above and further comprises the features of any of Examples AB1-AB14, DA1-DA17, or DB1-DB14 (as far as those features are not redundant with features of Examples ED herein above).

Example EE is one or more non-transitory computer-readable storage media storing instructions that when executed cause one or more processing units of a lid of a mobile computing device to perform the method of any one of Examples AA1-AA16, DE1-DE17, or EA1-EA8.

Example EF is an apparatus comprising one or more means to perform the method of any one of Examples AA1-AA16, DE1-DE17, or EA1-EA11.

Gesture Continuum

The integration of one or more front-facing cameras into the lid of a mobile computing device allows for in-air gestures to be handled as part of gesture continuums—a gesture space continuum in which a continuous gesture comprises an initial touch gesture component (2D gesture) followed by an in-air gesture (3D gesture) component made in the space in front of the display, and a gesture time continuum comprising related "multi-plane" gestures in which a touch gesture is followed by one or more related in-air gestures. The reverse situations are enabled as well. A continuous gesture can start with an in-air gesture component and finish with a touch gesture component, and a series of related multi-plane gestures can begin with an in-air gesture followed by one or more related touch gestures. Multi-plane gestures can be provided by multiple users. For example, a first user can provide a touch gesture and a second user can follow up with a related in-air gesture. Concurrent multi-plane gestures are also supported. Multiple users can supply related touch and in-air gestures simultaneously.

Generally, combined gestures are enabled as follows. Touch metadata and image metadata are determined from touch sensor data provided by a touch display controller (e.g., 165, 285, 385, 3830) and image sensor data provided by a camera (e.g., 160, 270, 346, 932, 2514, 3014) respectively. The touch metadata can be determined by a touch analyzer and the image metadata can be determined by a vision/imaging analyzer (172, 263, 363, 1740, 2540A, 2540B, 3020, 3026). The touch display controller, the camera, the touch analyzer and the vision/imaging analyzer can be located in the lid (e.g., 120, 123, 220, 301, 920, 1701, 3810) of a mobile computing device (e.g., 100, 122, 200, 300, 900, 3800), such as a laptop. The touch metadata and the image metadata are sent to an operating system and/or an application that determines whether a combined gesture has been made by a user, based on the touch metadata and the image metadata. The determination of whether a combined gesture has been made can additionally be based on a portion of touch sensor data and/or a portion of the image sensor data that may also be sent to the operating system and/or an application. The touch metadata can comprise information indicating the location of a touch to the display (e.g., 145, 280, 380, 926, 2140, 3842) and the image metadata can comprise information indicating the location of a gesture object (e.g., finger, stylus) in the space in front of the display. The image metadata can comprise distance information indicating the distance of the gesture object from the surface of the display. The touch analyzer and/or the vision/imaging analyzer can provide information to an operating system indicating whether the touch sensor data and image sensor data are spatially or temporally related, and the determination of whether a combined gesture has been made can be further based on the spatial and temporal relationship information. If a combined gesture is determined to have been made, the operating system and/or an application can perform one or more actions based on the combined gesture, such as "picking up" a virtual object and moving the object within an application environment.

Multi-plane gestures are similarly enabled. Touch metadata and image metadata are determined from first touch sensor data and image sensor data provided by the touch display controller (e.g., 165, 285, 385, 3830) and the camera (e.g., 160, 270, 346, 932, 2514, 3014), respectfully. In multi-plane gesture scenarios, the image metadata can be determined based on image sensor data received after the first touch sensor data is received. The first touch metadata and the image metadata are sent to an operating system or an application that performs one or more first actions based on the first touch metadata and subsequently performs one or more second actions based on the image sensor data. The second actions can be taken if a user has been engaged with the display (e.g., 145, 280, 380, 926, 2140, 3842) since a time associated with receipt of the first touch sensor data. Additional touch metadata can be determined based on additional touch sensor data and the additional touch metadata can be provided to the operating system or application. The operating system or application can then perform one or more third actions based on the additional touch metadata. The third actions may be performed if the user has been engaged with the display of the screen since the time associated with receipt of the first touch sensor data. As part of the first actions taken by the operating system and/or application, the device (e.g., 100, 122, 200, 300, 900, 3800) can enter a mode or context in which in-air gestures are recognized and acted upon. In some embodiments, entering the mode or context can comprise presenting a new user interface or updating an existing one to include a prompt for an in-air gesture.

Detecting user engagement with the display can be based on determining whether a user is present in front of the display and/or determining the orientation of the user's head or face with respect to the display. User presence and head/face orientation can be determined by an image analyzer. A neural network accelerator can be used for user presence detection and/or determining head/face orientation.

Multi-plane gestures provided by multiple users are also supported. For example, touch sensor data can be generated in response to a touch to a display (e.g., 145, 280, 380, 926, 2140, 3842) by a first user and image sensor data can represent an in-air gesture made by a second user. The operating system and/or application can perform one or more in-air gesture-related actions if it is determined that the second user has been engaged with the display from the time the touch by the first user was made until the time the in-air gesture was made, and the operating system and/or application can perform the one or more touch-relation actions if it is determined that the first user has been engaged with the display from the time the made the initial touch to the display until the time they made any subsequent touches to the display. An image analyzer (e.g., 172, 263, 363, 1740, 2540A, 2540B, 3020, 3026) can detect the presence of multiple users based on the image sensor data, associate a first user with the touch sensor data, associate a second user with the image sensor data, and determine whether each user is engaged with the display. Neural network accelerators can be used to detect the presence of one or more users in the image sensor data and determine whether the users are engaged with the display.

Multi-user multi-plane gestures can allow for simultaneous collaboration between users during the creative process. For example, in an illustration program, one person can work on one portion of an illustration via touch input while a second person can work on another portion of an illustration via in-air gestures, with each user interacting with the illustration application according to their individual preferences. Or, both users can be interacting simultaneously via in-air gestures. In another example of multi-plane gestures, a user can select a different brush color for a brush in an illustration application by touching an icon that allows the brush color to be changed and in response, a color wheel user interface element is displayed that the user can interact with to select a new color using in-air gestures. The in-air gesture can comprise, for example, the user pointing to the desired color with their fingertip and then pinching their fingers or withdrawing their extended finger into their first to make the selection.

In some mobile computing devices can utilize sensor data generated by sensors other than touch display controllers and camera to enable continuous gestures and multi-plane gestures, such as lidar sensors, radar sensors, and ultrasound sensors. The sensor data generated by these additional sensors (e.g., additional sensors 671) can be fused with touch sensor data and image sensor data in the lid of a mobile computing device, a base of a mobile computing device, or both.

Figure 41:
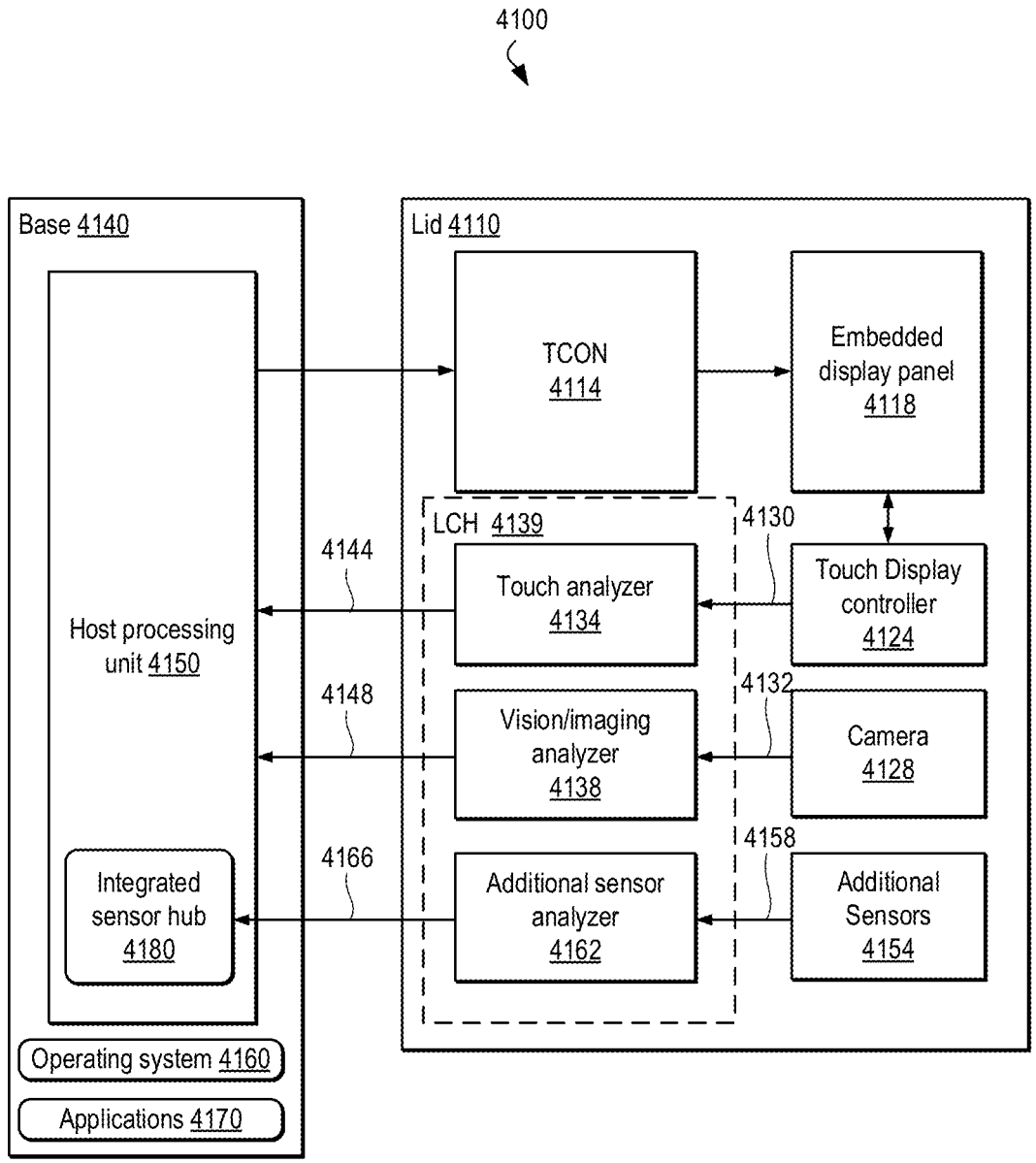
FIG. 41 is a simplified block diagram of an example computing device capable of supporting combined gestures and multi-plane gestures.

FIG. 41 is a simplified block diagram of an example computing device capable of supporting combined gestures and multi-plane gestures. The computing device 4100 comprises a lid 4110 and a base 4140. The lid 4110 comprises a timing controller (TCON) 4114, an embedded display panel 4118, a touch display controller 4124, a camera 4128, a touch analyzer 4134, and a vision/imaging analyzer 4138. The base 4140 comprises one or more host processing units 4150 that can execute an operating system 4160 and one or more applications 4170. The computing device 4100 can be any of the computing devices described herein (e.g., 100, 122, 200, 300, 900, 3800). The lid 4110 can be any of the lids described herein (e.g., 120, 123, 220, 301, 920, 1701, 3810). The touch display controller 4124 can be any of the touch controllers described herein (e.g., 165, 285, 385, 3830). The embedded display panel 4118 is a touch display and can be any of the display panels described herein (e.g., 145, 280, 380, 926, 2140, 3842). The touch analyzer 4134 and the vision/imaging analyzer 4138 can be part of any of the lid controller hubs described herein (e.g., 155, 260, 305, 954, 1705, 3810). In some embodiments, the touch analyzer 4134 can be part of an LCH host module (e.g., 176, 261, 362, 1720) and in some embodiments, the vision/imaging analyzer 4138 can comprise or be a part of any of the LCH vision/imaging modules or vision/imaging analyzer integrated circuits described herein (e.g., 172, 263, 363, 1740, 2540A, 2540B, 3020, 3026). In some embodiments, the touch analyzer 4134 and the vision/imaging analyzer 4138 can be a separate physical component (e.g., separate packaged integrated circuits or separate integrated circuits packaged together). The camera 4128 can be any camera described herein (e.g., 160, 270, 346, 932, 2514, 3014). The host processing unit 4150 can be any host processing unit described herein (e.g., 140, 385, 380, 382, 340, 342, 914, 1760, 2186, 3820). The base 4214 can be any of the bases described herein (e.g., 110, 129, 210, 315, 910, 1702).

Figure 42:
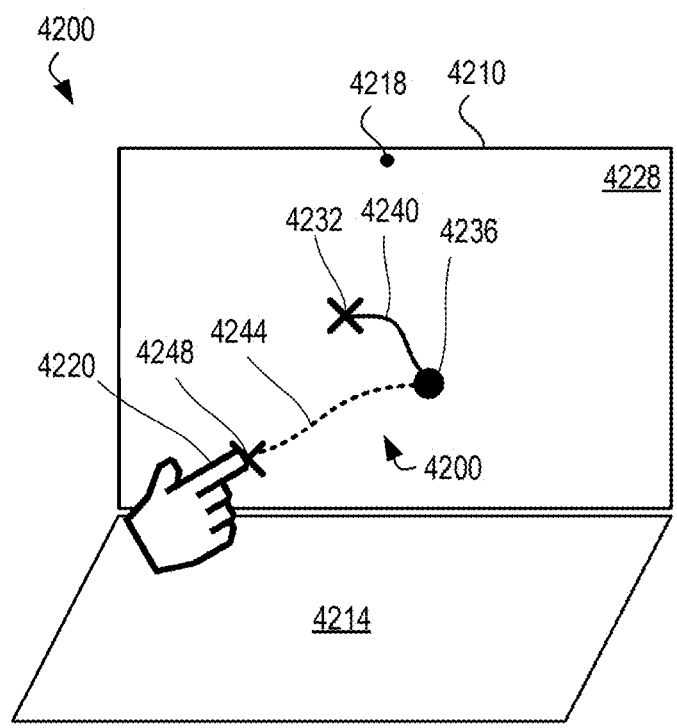
FIG. 42 illustrates an example combined gesture made at a computing device.

FIG. 42 illustrates an example combined gesture applied to a computing device. The computing device 4200 comprises a lid 4210, a base 4214, a camera 4218, and a display 4228. The combined gesture 4250 begins with the touch of a user's finger 4220 at a first point 4232 on the display 4228 to select a virtual object. The gesture continues with the user moving their finger 4220 along a path 4240 from the first point 4232 to a second point 4236 on the display 4228. An in-air portion of the combined gesture begins at the second point 4236, where the user pinches their fingers to "grab" the object and then pulls their fingers away from the display surface to "pick up" the selected object. The user pulls their pinched fingers away from the display surface along the path 4244, the dashed line representation of the path 4244 indicating that the path is made in the space in front of the display 4228. At a point 4248 in the space in front of the display the user ends the in-air gesture portion of the combined gesture by, for example, unpinching their fingers, which causes the selected virtual object to be "dropped" within the application environment.

With reference to FIG. 41, in some embodiments, the device 4100 can enable combined gestures, such as the combined gesture illustrated in FIG. 42, as follows. The touch analyzer 4134 receives touch sensor data 4130 from the touch display controller 4124, the touch sensor data 4130 being associated with a touch gesture made at the display (e.g., the pinch gesture at the first point 4232, dragging the virtual object along the path 4240). The touch analyzer 4134 determines touch metadata based on the received touch data. The touch analyzer can determine touch location information based on the received touch data (e.g., the location of the first point 4232 where the user selected the virtual object, the location of the second point 4136 where the user "picked up" the object, locations along the path 4240). The touch analyzer 4134 sends touch metadata 4144 to the host processing unit 4150. In some embodiments, the touch analyzer 4134 can send a portion of the touch sensor data 4130 received at the touch analyzer 4134 to the host processing unit 4150. In embodiments where the touch analyzer 4134 is part of a lid controller hub, a component of the LCH other than the touch analyzer 4134 can send the touch metadata 4144 to the host processing unit 4150. In some embodiments, the touch analyzer 4134 can determine the location of multiple touch locations and the touch metadata can comprise touch location information for multiple simultaneous touches to the display 4118. The location of multiple simultaneous touches to the display can allow the operating system 4160 or the application 4170 to determine multi-finger touch gestures at the display, such as the pinch gesture used to pick up the virtual object in the combined gesture example illustrated in FIG. 41.

The vision/imaging analyzer 4138 receives image sensor data 4132 from the camera 4128, the image sensor data being associated with in-air gestures made by a user (e.g., the user pulling back their pinched fingers from the surface of the display along the path 4244). The vision/imaging analyzer 4138 determines image metadata based on the received image sensor data. The vision/imaging analyzer 4138 can determine in-air gesture location information based on the image sensor data. In-air gesture location information can include the location of a gesture object (e.g., finger, stylus) detected in the image sensor data 4132. The location of a gesture object can be determined utilizing one or more NNAs (e.g., NNA 327) and/or DSPs (e.g., DSP 328). In some embodiments, the vision/imaging analyzer 4138 determines image metadata based on image sensor data received from multiple cameras located in the lid. The vision/imaging analyzer 4138 sends image metadata 4148 to the host processing unit 4150. In some embodiments, the vision/imaging analyzer 4138 can send a portion of the image sensor data 4132 to the host processing unit 4150. In embodiments where the vision/imaging analyzer 4138 is part of a lid controller hub, a component of the LCH other than the vision/imaging analyzer 4138 can send the image metadata 4148 to the host processing unit 4150.

In some embodiments, input sensors such as lidar sensors, radar sensors, and ultrasound sensors may serve better as proximity sensors than a camera as in-air gesture location information more be determined with less computation effort than by the location of gesture objects from image sensor data.

The touch analyzer 4134, the vision/imaging analyzer 4138, another component in the lid 4110, or a combination thereof can determine temporal relationship information indicating that the touch sensor data 4130 is temporally related to the image sensor data 4132, spatial relationship information indicating that the touch sensor data 4130 is spatially related to the image sensor data 4132, or both. Temporal relationship information and spatial relationship information can be sent to the host processor unit 4150 from the touch analyzer 4134, the vision/imaging analyzer 4138, or another lid component. The touch sensor data 4130 and the image sensor data 4132 can be temporally related if, for example, the touch sensor data corresponding to a touch to the display is determined to have been captured by the touch display controller 4124 or received at the touch analyzer 4134 immediately prior to or immediately after image sensor data corresponding to an in-air gesture is determined to have been captured by the camera 4128 or received by the vision/imaging analyzer 4138. The terms "immediately prior to" and "immediately after" as used in determining a temporal relationship between touch sensor data and image sensor data do not mean there is no time gap between capture of touch sensor data at the touch controller 4124 or receipt of touch sensor data at the touch analyzer 4134 and capture of the image sensor data at the camera 4128 or receipt of the image sensor data at the vision/imaging analyzer 4138, but rather that they occur consecutively in time and can be occur within a short time of each other (e.g., within one-tenth, one-quarter, one-half, or one second).

Touch sensor data and image sensor data can be spatially related if, for example, the determined start or end location of a touch to the display represented by the touch location data is proximate to the determined start or end location of an in-air gesture represented by the image sensor data. The term "proximate" as used in determining whether touch sensor data and image sensor data are spatially related does not mean that a touch gesture starts or ends at the precise location where an in-air gesture ends or starts. Rather, touch sensor data and image sensor can be determined to be spatially related if their corresponding touch gesture and in-air gestures start or end within a distance threshold of each other (e.g., within a number of pixels on the scale of the size of a human fingertip, the size of a stylus tip).

In some embodiments, the determination of whether a combined gesture has been made at a display can comprise determining if a user has been engaged with the display from the time a first gesture component begins (e.g., a time that touch/image sensor data is received by a touch analyzer or vision/imaging analyzer, or a time that a gesture has been determined to have begun based on analysis of touch/image sensor data by a touch analyzer or vision/imaging analyzer) until a time that a second gesture component ends (e.g., a time at which the last of touch/image sensor is received by a touch analyzer or vision/imaging analyzer, or a time a gesture has been determined to have ended based on analysis of touch/image sensor data by a touch analyzer or vision/imaging analyzer). Determining user engagement with the display is discussed in greater detail below.

An operating system 4160 or an application 4170 operating on the device 4100 can determine if a combined gesture has been made at the device 4100 based on the touch metadata 4144 and image metadata 4148. In some embodiments, this determination can be made based on one or more of the following: spatial relationship information, temporal relationship information, touch sensor data, image sensor data, touch location information, and in-air gesture location information. The operating system 4160 or the application 4170 can perform one or more actions in response to determining that a combined gesture has been made, such as performing the combined "move-pick-up-drop" gesture illustrated in FIG. 41.

In some embodiments, the device 4100 can comprise additional sensors 4154. The additional sensors 4154 can comprise one or more lidar ("light detection and ranging", "laser imaging, detection, and ranging") sensors, radar sensors, and ultrasound sensors. Lidar sensors include any sensor capable of illuminating an object with laser light and measuring the reflections. A lidar sensor can provide lidar sensor data to one or more other components in the lid 4110. Lidar sensor data can comprise information indicating the presence of or a distance to one or more detected objects in proximity to the device 4100 based on laser light reflections measured by the sensor, and/or data representing the measured laser light reflections for processing by another component.

Radar sensors include any sensor capable of transmitting radio waves into its surroundings and measuring the radio wave reflections. A radar sensor can provide radar sensor data to one or more other components in the lid 4110. Radar sensor data can comprise information indicating the presence of or a distance to one or more objects in proximity to the device 4100 based on radio wave reflections measured by the radar sensor, and/or data representing the measured radio waves reflections for processing by another component. Ultrasound sensors include any sensor capable of transmitting ultrasound waves into its surroundings and measuring the ultrasound reflections. An ultrasound sensor can provide ultrasound sensor data to one or more other components in the lid 4110. Ultrasound sensor data can comprise information indicating the presence of or a distance to one or more objects in proximity to the device 4100 based on ultrasound wave reflections measured by the sensor, and/or data representing the measured ultrasound waves reflections for processing by another component.

Lidar sensor data, radar sensor data, and ultrasound sensor data can be sent as additional data sensor data 4158 to an additional sensor analyzer 4162. The additional sensor analyzer 4162 can determine the presence of or a distance to an object based on the additional sensor data 4158. In some embodiments, the additional sensor analyzer 4162 can comprise multiple analyzers, with each analyzer processing one type of sensor data, such as a lidar analyzer that processes lidar sensor data, a radar analyzer that processes radar sensor data, and an ultrasound sensor that processes ultrasound sensor data. The additional sensor analyzers can generate additional sensor metadata 4166 that can be provided to the one or more host processing units 4150, where it can be further processed by the operating system 4160, one or more of the applications 4170, or an integrated sensor hub 4180.

In some embodiments, one or more components in the lid can utilize (or "fuse") the various types of sensor data to determine metadata information used by other components in the lid 4110 or the base 4140. For example, one or more of the lidar sensor data, image sensor data, radar sensor data, or ultrasound sensor data can be used to determine the presence of or location of one or more objects in front of the display 4118. Although image sensor data and image sensor metadata are referenced in the discussions herein pertaining to combined gestures and multi-plane gestures, combined and multi-plane gestures can rely on additional sensor data and additional sensor metadata as well. For example, determining that a combined gesture has been made or determining the relatedness of multi-plane gestures can be based on the additional sensor data 4158 and/or the additional sensor metadata 4166, and the image sensor metadata 4148 can comprise metadata based on the combined processing of image sensor data with one or more the of additional sensor data 4162 types.

For example, the operating system 4160 or one of the applications 4170 can determine a combined gesture based on image metadata comprising metadata determined from image sensor data and one or more of the additional sensor data types. In some embodiments, a combined gesture can further be determined based on additional sensor metadata. The additional sensor metadata and/or the image metadata can comprise in-air gesture location information based on one or more of the image sensor data, radar sensor, lidar sensor data, and the ultrasound sensor data. In some embodiments, one or more of a portion of the lidar sensor data, a portion of the radar sensor data, and a portion of the ultrasound sensor data can be provided to the one or more processing units 4150 and the determination of a combined gesture can be further determined based on this additional sensor data sent to the base 4140.

In some embodiments, the temporal relationship information and/or spatial relationship information can be based on one or more of the touch sensor data, image sensor data, radar sensor data, lidar sensor data, and ultrasound sensor data.

In some embodiments, user engagement information can also be based on the additional sensor data types. For, example, determining whether a user is present or not present in front of a display, the orientation of a user's head or face, and whether a user is engaged or not engaged with a display of the device 4100 can be based on one or more of the image sensor data, the radar sensor data, the lidar sensor data, and the ultrasound sensor data. In some embodiments, one or more NNAs (e.g., 327, 3030) and/or DSPs (e.g., DSP 328) can utilize one or more of the various sensor data types as part of making such determinations.

In some embodiments, the processing or "fusing" of multiple types of sensor data to determine touch location, in-air gesture location, spatial or temporal relationships, user presence, head/face orientation, user engagement, or any other determination involving multiple types of sensor data can be performed in the touch analyzer, the vision/imaging analyzer 4138, the additional sensor analyzer, and/or any other component in the lid 4110 not be shown in FIG. 41. Each of the touch analyzer 4134, the vision/imaging analyzer 4138, the additional sensor analyze 4162, can share sensor data received at the analyzer with any of the other analyzers, and any metadata generated by one of the analyzers can be shared with any of the other analyzers as well. The LCH 4138 can be any of the LCHs described herein (e.g., 155, 260, 305, 954, 3834). In some embodiments, the fusing of multiple sensor data types can be performed in the base by the integrated sensor hub 4180.

FIGS. 43A-43C illustrate a first example of related multi-plane gestures and a reference touch gesture. As used herein the phrase "multi-plane gestures" refers to two or more gestures in which one or more gestures is a touch gesture made at the display gesture (a first "plane") and one or more gestures is an in-air gesture made in the space in front of the display (a second "plane"). The use of the word "plane" in the term "multi-plane" does not require that in-air gestures be made along a fixed distance from the display and is meant to connote that in-air gestures are not made at the display surface. Multi-plane gestures can comprise in-air gestures that include movement towards and away from the display surface (e.g., along the z-axis relative to the surface of the display screen) and can occur at any distance away from the display surface.

The multi-plane gestures illustrated in FIGS. 43A-43B are shown applied to a computing device 4300. The device 4300 comprises a lid 4310, a base 4314, a camera 4304, and a display 4318. The device 4300 is executing an illustration application. In FIG. 43A, a user selects an editing mode by touching an editing user interface element at a point 4324 on the display 4318. In response to selection of the editing interface element, the application enters an editing mode in which it recognizes and responds to in-air gestures to edit an illustration. Thus, the touch to the point 4324 on the display 4318 is a first gesture in a series of multi-plane gestures. In FIG. 43B, the user edits (e.g., draws, paints, colors) the illustration using in-air gestures, as illustrated by a user's hand 4328 gesturing in the space in front of the display 4318. In-air gestures can include a user making gestures with an extended index finger extended or with their hand.

Editing the illustration with in-air gestures provides the user with the advantage of being able to interact with the illustration while having a less obstructed view of the display 4318. FIG. 43C illustrates a reference touch gesture to compare the in-air gesture of FIG. 43B against, in which a user edits the illustration via touch. As can be seen, by editing an illustration via touch gesture a user's hand (and wrist) can obscure a portion of the display. Thus, in-air gesturing allows a user to view more of a display during interaction. Further, in-air gestures may allow a user to interact with the display from a more comfortable physical condition. For example, a user interacting with a laptop while seated at a desk may have to lean forward to touch the laptop display surface. The use of in-air gestures can allow the user to be seated back in the chair, in a more comfortable and ergonomically correct position, when interacting with the device.

Related multi-plane gestures of the type illustrated in FIGS. 43A-43B are related in that a first action (e.g., touching an editing UI element) places the application, operating system, or device in a mode or context in which in-air gestures are recognized and acted upon. In some embodiments, in-air gestures made after a touch gesture are deemed to be related to the touch gesture based on how closely in time they were made to the touch gesture. For example, the illustration program shown in FIGS. 43A-43B can recognize any in-air gesture occurring within a specified time period (which could be a pre-defined time or a user-defined time) after the user selects the editing UI element and interpret the in-air gesture as one made for editing the illustration. One or more in-air gestures can be interpreted as being made for editing purposes. Once an in-air gesture has not been made for the specified time, the illustration program can exit the mode or context in which in-air gestures are interpreted for illustration editing purposes.

In some embodiments, an in-air gesture following a touch gesture can be related to the touch gesture based on continuity in the user's engagement with the display from the time the touch gesture was made to the time the in-air gesture is made. For example, multiple in-air gestures can be made after the editing UI element is touched and subsequent in-air gestures can be interpreted as illustration editing gestures as long as the user is engaged with the display. That is, the mode or context into which the device 4300, operating system, or application is placed in response to the touch gesture is maintained as long as the user remains engaged with the display 4318. If the user becomes disengaged because, for example, the user's presence in front of the display is no longer detected or the user is detected to be looking away from the display, the application, operating system, or application exits from the mode or context triggered by the touch gesture. Determining user engagement in regard to continuous gestures and multi-plane gestures is discussed in further detail below. It is not required that gestures made after an initial touch gesture be in-air gestures. Touch gestures made after the initial touch gesture can be interpreted being made in the mode or context entered into as a result of the initial touch gesture, and can be made after, between, or concurrently with in-air gestures.

Further, it is not necessary that a series of multi-plane gestures begin with a touch gesture. In some embodiments, an initial gesture in a series of multi-plane gestures can be an in-air gesture. For example, when a user is detected to be present in front of a screen, the detecting of a gesture object (e.g., finger, stylus) approaching the display can cause one or more actions to be taken, such as displaying one or more UI elements. In some embodiments, the UI elements can be displayed in the vicinity of the display where a finger is determined to be approaching the display. Monitoring image sensor data for an approaching gesture object can be performed continually when a user is detected in front of the screen or in certain contexts, such as when a particular application is operating, when a particular portion of the application is operating, etc. In some embodiments, a particular in-air gesture made by a gesture object can trigger a mode in which the detection of a gesture object approaching the display surface can cause one or more UI elements to be displayed or other actions to be taken.

With reference to FIG. 41, in some embodiments, the device 4100 can enable related multi-plane gestures, such as the multi-plane gestures illustrated in FIGS. 43A-43B, 44A-44C, 45A-45B, 46A-46B, 47A-47B, and 48A-48B, as follows. The touch analyzer 4134 receives touch sensor data 4130 from the touch display controller 4124, the touch sensor data 4130 being associated with a touch gesture made at the display (e.g., selecting the editing UI element in FIG. 43A). The touch analyzer 4134 determines touch metadata 4144 based on the received touch sensor data 4130. The touch analyzer 4134 can determine touch location information based on the received touch sensor data 4130. The touch analyzer 4134 sends touch metadata 4144 to the host processing unit 4150. In some embodiments, the touch analyzer 4134 can send a portion of the touch sensor data 4130 received at the touch analyzer 4134 to the host processing unit 4150. In embodiments where the touch analyzer 4134 is part of a lid controller hub, a component of the LCH other than the touch analyzer 4134 can send the touch metadata 4144 to the host processing unit 4150. In some embodiments, the touch analyzer 4134 can determine the location of multiple touch locations and the touch metadata can comprise touch location information for multiple touches to the display 4118. Location information of multiple touches to the display can allow the operating system 4160 or the application 4170 to detect multi-finger touch gestures.

The vision/imaging analyzer 4138 receives image sensor data 4132 from the camera 4128, the image sensor data 4132 being associated with one or more in-air gestures made by a user (e.g., the user making "drawing" or "painting" in-air gesture as illustrated in FIG. 43B). The vision/imaging analyzer 4138 determines image metadata 4148 based on the received image sensor data 4132. The vision/imaging analyzer 4138 can determine in-air gesture location information based on the image sensor data 4132. In-air gesture location information can include the location of a gesture object (e.g., finger, stylus) detected in the image sensor data 4132. The location of a gesture object can be determined utilizing one or more neural network accelerators (e.g., NNA 327, 3030) and/or digital signal processors (e.g., DSP 328). The vision/imaging analyzer 4138 sends image metadata 4148 to the host processing unit 4150. In embodiments where the vision/imaging analyzer 4138 is part of a lid controller hub, a component of the LCH other than the vision/imaging analyzer 4138 can send the image metadata 4148 to the host processing unit 4150. In some embodiments, the touch analyzer 4134 can send a portion of the touch sensor data 4130 to the host processing unit 4150.

The vision/imaging analyzer 4138 can determine user engagement information based on the image sensor data. The vision/imaging analyzer 4138 can determine user engagement by determining the orientation of a user's face or head with respect to the display and determine that the user is not engaged with the display if the face or head orientation information indicates they are not looking at the display. In some embodiments, determining user engagement information can determine whether a user is present in front of the display. In some embodiments, determining whether a user is present comprises determining whether a user is located within a field of view of a camera located in the device. 4100. The vision/imaging analyzer 4138 can detect the presence of a user or determine whether a user is engaged with the display via any of the approaches described herein, such as any of the approaches described for detecting the presence of a user and detecting whether the user is engaged in regard to display management in multiple display systems as disclosed herein at FIGS. 23-37 and the corresponding discussion. For example, the vision/imaging analyzer 4138 can utilize an NNA (e.g., NNA 327, 3030) to determine whether a user is present or not present in a field of view, and engaged or disengaged with the display 4118. The vision/imaging analyzer 4138 can utilize machine learning algorithms (e.g., neural networks) to detect a human face, and/or a face orientation in the image sensor data 4132 provided by the camera 4128. The image metadata can comprise user location information indicating the location of a detected face. In some embodiments, the vision/imaging analyzer 4138 can detect the presence of, determine head or face orientation for, and/or determine engagement information for multiple users based on the image sensor data 4132.

In some embodiments, a device can remain in an in-air recognition mode if the user is disengagement for a short period of time. This can allow a device to remain in a mode or context in which in-air gestures are recognized and acted upon for longer periods than if a user is to be looking at the screen for the device to remain in an in-air gesture recognition mode. For example, consider a scenario where a user is working at a laptop and selects a UI element that enters the laptop into an in-air gesture recognition mode. The user can be located in front of the screen and momentarily look away because they are taking a sip of coffee, checking their smartphone, etc. The device can allow for such moments of disengagement and remain in the in-air gesture mode. The period during which user disengagement is allowed can be pre-configured or user-defined and can be, for example, 1 second, 3 seconds, 1 minute, 5 minutes, 10 minutes, or any other length of time. In other embodiments, the device remains in an in-air gesture recognition mode as long as the user is present and without regard for whether the user is looking at the screen. This can allow for scenarios where a user is located in front of a device that is in an in-air gesture recognition mode and allow for the user to spend an indefinite amount of time to read a newspaper, read a book, etc. In such scenarios, if a system notification pops up on the device screen, which the user can be notified of via an audible alert, the user can look up, read the notification, and dismiss it with an in-air swipe of their hand without having to reach forward to touch the screen.

In some embodiments, user engagement can be based on detecting the presence of a user in front of the display but allow for brief moments or disengagement by the user. considering whether the user is looking at the screen. This can allow a device, operating system, or application to remain in a mode or context in which in-air gestures are recognized and acted upon for longer period than if a user is to be looking at the screen in order for the user to be considered to be engaged. For example, consider a scenario where a user is working at a laptop and selects a UI element that enters the laptop into a mode where it recognized in-air gestures. The user can be located in front of the screen but momentarily look away because they are taking a sip of the coffee, reading the newspaper, checking their smartphone, etc. Allowing from brief moments In some embodiments where the vision/imaging analyzer 4138 detects multiple users, the device can associate a user to a touch gesture or an in-air gesture. This association can be performed by the vision/imaging analyzer 4138, the touch analyzer 4134, another component in the lid 4110, or a combination thereof. In some embodiments, associating a user to a touch gesture or in-air gesture can be performed by computing resources in the base 4140 of the device 4100, such as by the host processing unit 4150. Associating one of multiple detected users with a touch gesture or in-air gesture can comprise determining which user is located closest to a gesture based on touch location information, image location information, and/or user location information. User engagement information for one or more users can be sent to the host processing unit 4150 by the vision/imaging analyzer 4138 or another component in the lid 4110.

An operating system 4160 or an application 4170 operating on the device 4100 can perform one or more first actions based on the touch metadata and subsequently perform one or more second actions based on the image metadata. The one or more second actions can be performed if the operating system 4160 or the application 4170 determines that a user is engaged with the display 4118 from a time associated with the receiving of the touch sensor data 4130 at the touch analyzer 4134 until a second time associated with the receiving of the image sensor data 4132 at the vision/imaging analyzer 4138. In some embodiments, a time associated with the receiving of the touch sensor data 4130 can be a time at which the touch metadata 4144 is sent to the host processing unit 4150, the time that a touch gesture has been determined to occur at the display 4118 based on the touch sensor data 4130, or another time related to the processing of the touch sensor data 4130. In some embodiments, the second time associated with the receiving of the image sensor data 4132 can be a time at which the image metadata 4148 is sent to the host processing unit 4150, the time that an in-air gesture has been determined to occur at the display 4118 based on the image sensor data 4132, or another time related to the processing of the image sensor data 4132 received at the vision/imaging analyzer 4138.

The operating system 4160 or the application 4170 can enable a series of related multi-user multi-plane gestures. For example, if the image metadata 4148 indicates the presence of multiple users, actions can be performed based on whether the user associated with a gesture has been engaged with the display since the initial multi-plane gesture. For example, if a first user touches a display and a second user makes a subsequent in-air gesture, the operating system 4160 or the application 4170 can perform one or more actions associated with the in-air gesture if it is determined that the second user has been engaged with the display since the first user touched the display. Similarly, the operating system 4160 or the application 4170 can perform actions in response to subsequent touches made by the first user if it is determined the first user has been engaged with the display since the first touch. In some embodiments, the operating system 4160 and the application 4170 can perform first actions based on touch metadata and second actions based on image metadata concurrently. Touch gestures and in-air gestures simultaneously provided by a single user can be recognized and acted upon as well.

In some embodiments, the device 4100 can comprise additional sensors 4154, which can be one or more lidar sensors, radar sensors, and ultrasound sensors. In other embodiments, the additional sensors 4154 can comprise further comprise one or more of an infrared sensor and light sensor. The additional sensors can generate additional sensor data 4158 that provided to an additional sensor analyzer 4162. The additional sensor analyzer 4162 can generate additional sensor metadata based on the additional sensor data. The additional sensor analyzer 4162 sends the additional sensor data 4166 to the one or more host processing units. The operating system 4160, one of the applications 4170 or an integrated sensor hub 4180 can utilize the additional sensor metadata. In some embodiments, the additional sensor analyzer 4162 send a portion of the additional sensor data 4158 to the host process units 4150. The additional sensor metadata can comprise additional sensor location information that indicates the location of an in-air gesture.

FIGS. 44A-44C illustrate a second example of related multi-plane multi-user gestures. FIGS. 44A-44C illustrate a scenario similar to that illustrated in FIGS. 43A-43C but with touch gestures and in-air gestures being made by two users. In FIG. 44A, a first user touches the editing UI element at the point 4324 and the application enters the editing mode in which in-air gestures are recognized. In FIGS. 44B-44C, a finger 4428 of the first user and a finger 4432 of the second user each provide touch gestures and in-air gestures for editing the illustration.

Figure 45B:
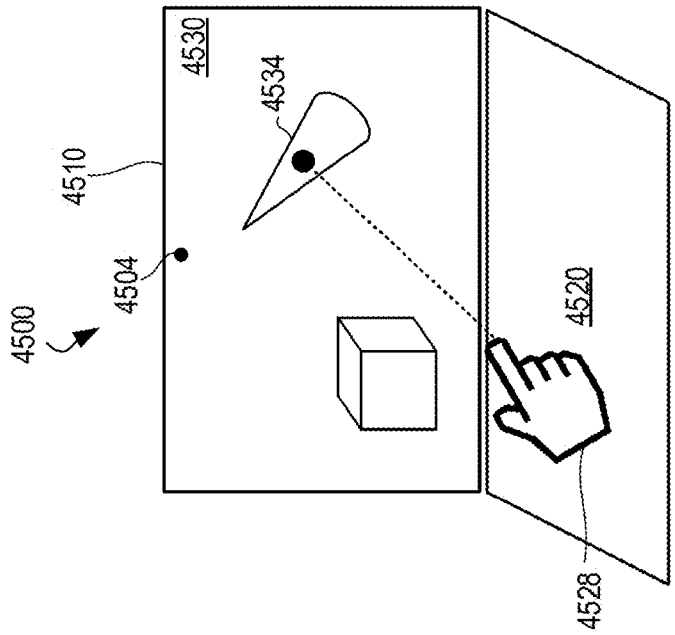
FIGS. 45A-45B illustrate a third example of multi-plane gestures.
Figure 45A:
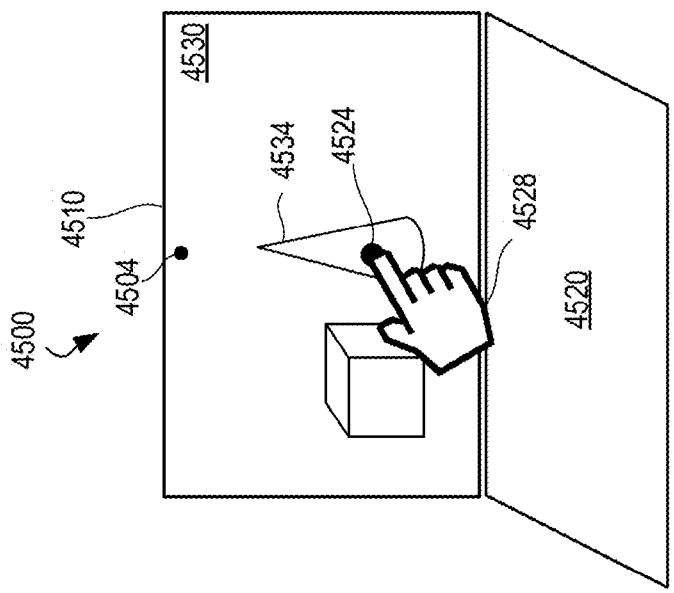

FIGS. 45A-45B illustrate a third example of multi-plane gestures. The gestures are shown as being applied to a computing device 4500 comprising a lid 4510, a base 4520, a camera 4504, and a display 4530. The device 4500 is executing a computer-aided drawing (CAD) application. In FIG. 45A, a user selects a cone 4534 for manipulation by touching a point 4524 on the display 4530. In response to selecting an object (e.g., the cone 4534), the CAD application enters a mode in which the selected object can be moved or otherwise manipulated via in-air gestures. FIG. 45B illustrates a user's hand 4528 manipulating the cone 4534 via one or more in-air gestures. In-air gestures that move or manipulate an object can comprise a "grabbing" gesture (e.g., a bringing together (but not touching) of one or more fingers toward a thumb) or a pinching gesture to pick up or lift the object from a surface in the CAD environment, and a twisting or movement of the pinched fingers or a hand that is in a grabbing position to rotate the object. A user moving their fingers or hand away from or towards the screen can cause the object to be moved closer to or further away from the user, respectively, in the CAD environment. As such, the CAD application can perform an action based on the distance from a user's finger, hand, or other gesture object from the surface of the display 4530.

FIGS. 46A-46B illustrate a fourth example of related multi-plane gestures. The gestures are shown as being applied to a computing device 4600 comprising a lid 4610, a base 4620, a camera 4604, and a display 4630. The device 4600 is executing a video conferencing application. In FIG.

46A, a user selects a volume control UI element via touch at point 4624 on the display 4630. In response, the video conferencing application enters a volume control mode in which the volume can be controlled via in-air gestures. In FIG. 46B, a finger 4628 of a user controls a volume slider UI element 4632 via in-air gesturing (e.g. movement of the user's finger 4628 to the left or right cause the volume slide UI element slide left or right and thereby reducing or increasing the volume level setting. Examples of in-air gestures that could be recognized as acceptance of an adjusted volume setting include swiping the finger 4628 up or down, or withdrawing of the finger 4628 into the user's fist.

FIGS. 46A-46B illustrate an example of a user interface element (the volume control slider) being presented in response to an initial gesture (touching a volume control UI element), the UI element being able to be interacted with via in-air gestures. Various other UI elements can be presented that can be interacted with via in-air gestures in response to touching the display. In some embodiments, an operating system or application can enter a mode or context that comprises displaying a new user interface in which in-air gestures are recognized and acted upon. The operating system or application can remain in this mode or context until a user is no longer is engaged with the display, an expected in-air gesture has been received, or the user exits the mode or context (by providing, for example, a touch gesture or in-air gesture that operating system or application recognizes as a gesture indicating the user desires to exit the mode or context), or a user touching a UI element that causes an in-air gesture mode or context to be exited.

In applications where the adjustment of a parameter value for an application setting can be made via in-air gestures, such as the volume setting for the video conferencing application illustrated in FIGS. 46A-46B, various types of in-air gestures can control adjustment of the parameter value. For example, a raised palm facing the display can mute audio, an upward-facing palm can increase a parameter value, and a downward-facing palm can decrease a parameter value. Examples of in-air gestures that can be recognized as selecting a parameter value include wiggling a finger, "double-tapping" the finger in the air, or making a fist. In some embodiments, adjustment of operating system-level parameters can be made via in-air gestures as well. For example, in response to a user touching an icon associated with an operating system parameter, the device can enter a mode or context in which subsequent in-air gestures can adjust the value of an operating system parameter.

FIGS. 47A-47B illustrate a fifth example of related multi-plane gestures. The gestures are shown being applied to a computing device 4700 comprising a lid 4710, a base 4720, a camera 4704, and a display 4730. The device 4700 is executing a video conferencing application in which a pie chart is being shared among participants. In FIG. 47A, a user selects a portion 4724 of the pie chart by touching the display 4730 at a point 4728. In response, the video conferencing application enters an annotation mode in which the chart can be annotated via in-air gestures. FIG. 47B illustrates a user's finger 4732 annotating the chart portion 4724 by adding a note "+10" and drawing an arrow from the portion 4724 along to the note via in-air gestures. In some embodiments, writing with an in-air gesture can be performed by the application interpreting in-air gestures made by a gesture object within a first range of distances from the display surface as a writing to be made on the display, and not interpreting in-air gestures made by the gesture object further away from the display than this range of distances as gestures to create annotations. In other video conferencing application embodiments, a user can touch a UI element that causes the application to enter a presentation mode in which in-air gestures control content being shared during a conference. For example, an in-air swipe to the right can cause a presentation to advance to the next slide, and in-air pinching or unpinching gestures can cause the application to zoom in or zoom out of the presented content.

FIGS. 48A-48B illustrate a sixth example of related multi-plane gestures. The gestures are shown applied to a computing device 4800 comprising a lid 4810, a base 4820, a camera 4804, and a display 4830. The device 4800 is executing an office productivity application and a plurality of notifications 4824 (e.g., text notifications, email notifications, system notifications, meeting notifications, incoming call notifications) have appeared in the lower right of the display 4830. In FIG. 48A, a user selects a notification from the plurality of notifications 4824 with a finger 4828 at a point 4832 on the display 4830. In response, the operating system enters a mode in which notifications can be dismissed or selected via in-air gestures. In FIG. 48B, the finger 4828 selects the notification 4824 via in-air gesture by, for example pointing at it for a threshold amount of time and then making a "swipe right" gesture to dismiss the notification. The user can dismiss the notifications 4836 and 4840 in a similar manner. Alternatively, the user can indicate to see more information regarding a selected notification by, for example, swiping left, swiping up, making an in-air "tapping" gesture, etc. Providing an indication to see more information about a notification can cause the device to open an email application to view an email, cause a pop-up window to be displayed that shows more of the notification content, or perform any other action that allows to user to see more information regarding the selected notification.

By allowing for improved control over when in-air gestures can be accepted by the operating system or an application, the related multi-plane gestures described herein can allow for improved control of collaboration applications, improved gaming experiences, and more immersive creator tools. As discussed, UI elements can be presented that allow a user to cause a device to enter a mode or context in which in-air gestures are recognized and acted upon. This can be beneficial in, for example, illustration applications. For example, a user can use their dominant hand to control a stylus to interact with an illustration application via touch gestures and use their other hand to touch a UI element to bring up a color wheel UI element in which the user can select a new color via an in-air gesture. The user can keep their dominant hand on the stylus and select a new color via an in-air gesture with their non-dominant hand, allowing for selection of a new color to be made without their non-dominant hand obstructing a portion of the display. Many other multi-plane gesture use cases are possible. For example, a brush size UI element can be presented that, when selected, allows a user to select a brush width via an in-air gesture. Brush width can be adjusted by a user moving their finger or hand closer to or further away from the screen, or by moving their finger or hand up or down.

Figure 49:
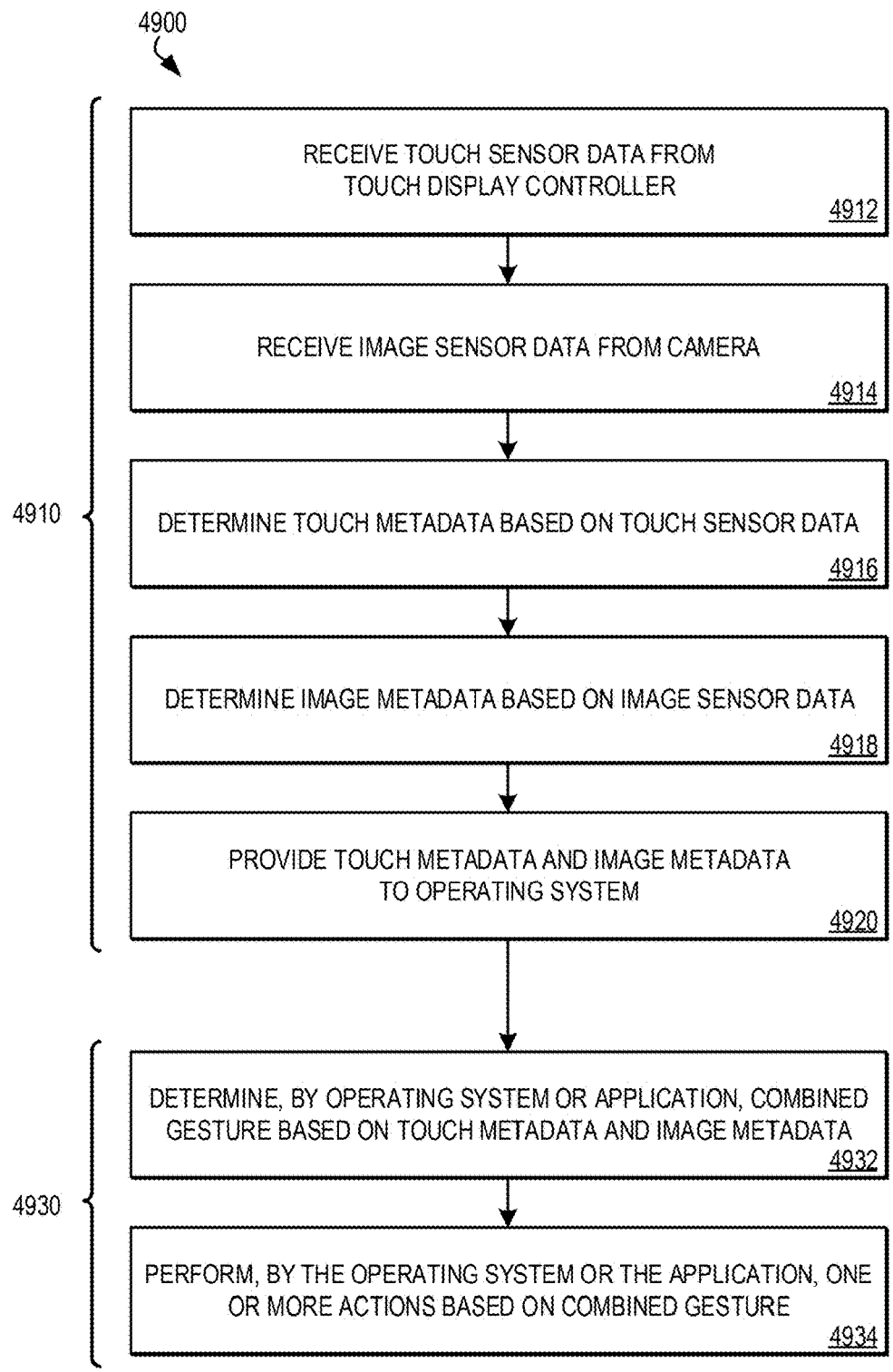
FIG. 49 is an example method of determining a combined gesture applied to a mobile computing device and performing actions based on the combined gesture

FIG. 49 is an example method of determining a combined gesture applied to a mobile computing device and performing actions based on the combined gesture. The method 4900 can be performed by a mobile computing device, such as a laptop (e.g., 100, 122, 200, 300, 900, 3800). The method elements 4910 can be performed in a lid of the mobile computing device and the method elements 4930 can be performed in a base of the mobile computing device. At 4912, touch sensor data is received from a touch display controller. At 4914, image sensor data is received from a camera. At 4916, touch metadata is determined based on the touch sensor data. At 4918, image metadata is determined based on the image sensor data. At 4920, the touch metadata and the image metadata are provided to an operating system. At 4932, the operating system or an application determine a combined gesture based on the touch metadata and the image metadata. The operating system and the application are executing on one or more processing units located in the base of the mobile computing device. At 4934, the operating system or the application performs one or more actions based on the combined gesture. In other embodiments, the method 4900 can comprise additional elements, such as providing a portion of the touch sensor data and/or a portion of the image sensor data to the operating system, the operating system or the application determining the combined gesture further based on the portion of the touch sensor data and/or the image sensor data.

Figure 50:
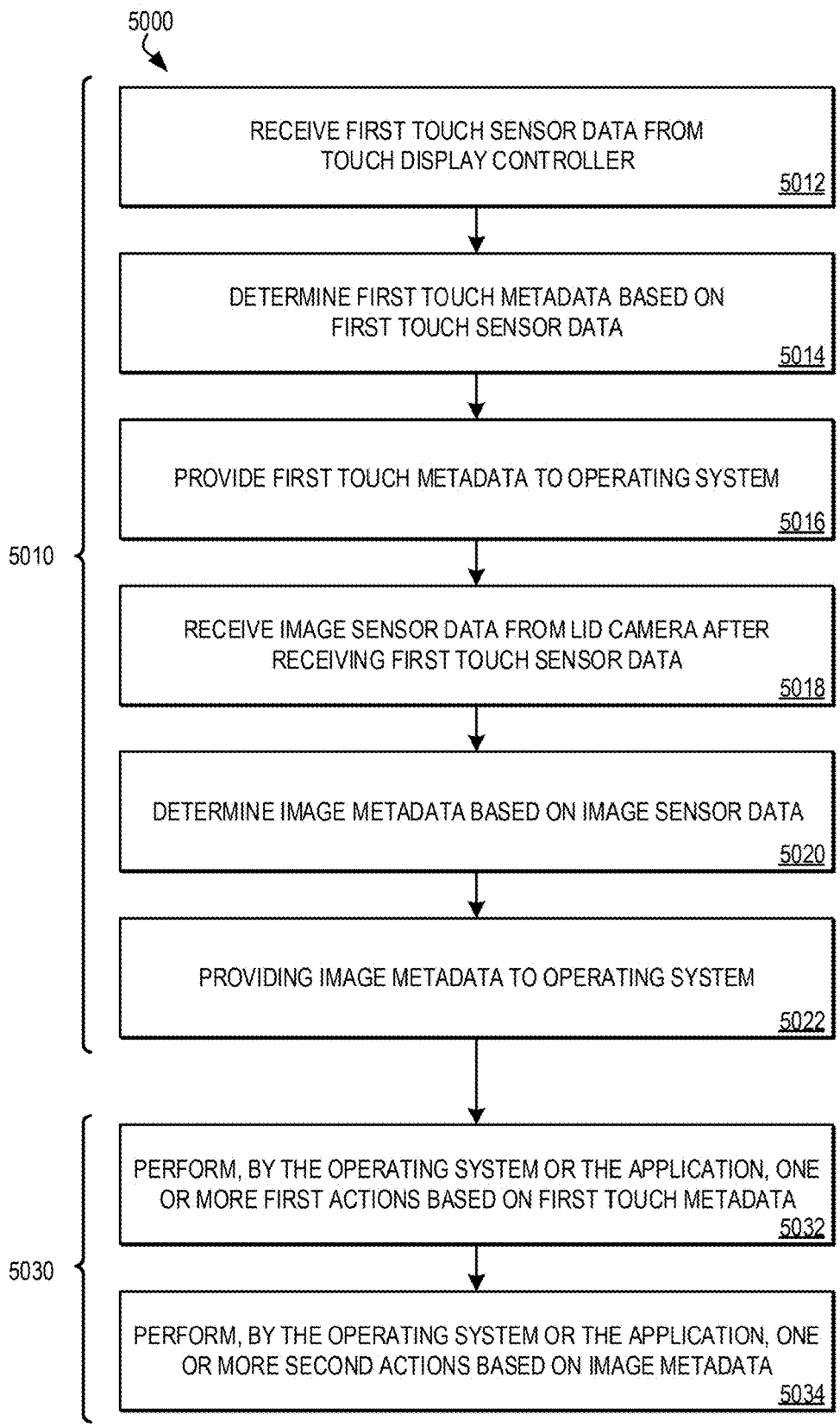
FIG. 50 is an example method of determining the presence of a series of multi-plane gestures and performing actions based on the multi-plane gestures.

FIG. 50 is an example method of determining the presence of a series of multi-plane gestures and performing actions based on the multi-plane gestures. The method 5000 can be performed by a mobile computing device, such as a laptop (e.g., 100, 122, 200, 300, 900, 3800). The method elements 5010 can be performed in a lid of the mobile computing device and the method elements 5030 can be performed in a base of the mobile computing device. At 5012, first touch sensor data is received from a touch display controller. At 5014, first touch metadata is determined based on the first touch sensor data. At 5016, the first touch metadata is provided to an operating system. At 5018, image sensor data is received from a camera located in the lid of the mobile computing device after the first touch sensor data is received. At 5020, image metadata is determined based on the image sensor data. At 5022, the image metadata is provided to the operating system. At 5032, the operating system or an application perform one or more first actions based on the first touch metadata. The operating system and the application are executing on one or more processing units located in the base of the mobile computing device. At 5034, the operating system or an application perform one or more second actions based on the first touch metadata.

In other embodiments, the method 5000 can comprise additional elements, such as determine first user engagement information indicating engagement of a first user with a display of the mobile computing device based on the image sensor data, and provide the first user engagement information to the operating system, wherein the operating system or the application perform the one or more second actions if the first user engagement information indicates engagement of the first user with the display from a first time associated with the receiving the first touch sensor data until a second time associated with the receiving the image sensor data.

The follow examples pertain to embodiments in accordance with this specification.

Example FA1 is a method comprising: in a lid of a mobile computing device: receiving touch sensor data from a touch display controller; receiving image sensor data from a camera; determining touch metadata based on the touch sensor data; determining image metadata based on the image sensor data; and providing the touch metadata and the image metadata to an operating system; and in a base of the mobile computing device: determining, by the operating system or an application, a combined gesture based on the touch metadata and the image metadata, the operating system and the application executing on one or more processing units located in the base; and performing, by the operating system or the application, one or more actions based on the combined gesture.

Example FA2 comprises the method of Example FA1, wherein the image metadata comprises in-air gesture location information.

Example FA3 comprises the method of Example FA2, wherein the in-air gesture location information comprises distance information indicating a distance of a gesture object from a display of the mobile computing device, performing the one or more actions being further based on the distance information.

Example FA4 comprises the method of Example FA1, wherein the touch metadata comprises touch location information.

Example FA5 comprises the method of Example FA1, further comprising, in the lid of the mobile computing device, providing at least a portion of the touch sensor data to the operating system, the determining the combined gesture further based on the at least a portion of the touch sensor data.

Example FA6 comprises the method of Example FA1, further comprising, in the lid of the mobile computing device, providing at least a portion of the image sensor data to the operating system, wherein the determining the combined gesture is further based on the at least a portion of the image sensor data.

Example FA7 comprises the method of Example FA1, further comprising, in the lid of the mobile computing device: determining temporal relationship information indicating that the touch sensor data and the image sensor data are temporally related; and providing the temporal relationship information to the operating system, wherein the determining the combined gesture is further based on the temporal relationship information.

Example FA8 comprises the method of Example FA1, further comprising, in the lid of the mobile computing device: determining spatial relationship information indicating that the touch sensor data and the image sensor data are spatially related; and providing the spatial relationship information to the operating system, wherein the determining the combined gesture is further based on the spatial relationship information.

Example FA9 comprises the method of Example FA1, further comprising, in the lid of the mobile computing device: receiving additional sensor data from one or more of a lidar sensor, a radar sensor, and an ultrasound sensor; determining additional sensor metadata based on the additional sensor data; and providing the additional sensor metadata to the one or more processing units, wherein the determining the combined gesture is further based on the additional sensor metadata.

Example FA10 comprises the method of any one of Examples FA herein above and further comprises the elements of the method of any one of Examples AA1-AA16, DE1-DE17, or EA1-EA10 (as far as those method elements are not redundant with method elements of Examples FA herein above).

Example FB1 is a mobile comprising device comprising: a lid comprising: a touch display; a camera; a touch display controller; vision/imaging analyzer circuitry to: receive image sensor data from the camera; determine image metadata based on the image sensor data; and send the image metadata to an operating system; and touch analyzer circuitry to: receive touch sensor data from the touch display controller; determine touch metadata based on the touch sensor data; and send the touch metadata to the operating system; and a base comprising one more processing units to execute the operating system and an application, the operating system or application to: determine a combined gesture based on the touch metadata and the image metadata; and perform one or more actions based on the combined gesture.

Example FB1.5 comprises the mobile comprising device of Example FB1, wherein the vision/imaging analyzer circuitry and the touch analyzer circuitry are part of a lid controller hub.

Example FB2 comprises the mobile comprising device of Example FB1, wherein the image metadata comprises in-air gesture location information.

Example FB3 comprises the mobile comprising device of Example FB2, wherein the in-air gesture location information comprises distance information indicating a distance of a gesture object from the touch display, to perform the one or more actions being further based on the distance information.

Example FB4 comprises the mobile comprising device of Example FB1, wherein the touch metadata comprises touch gesture location information.

Example FB5 comprises the mobile comprising device of Example FB1, wherein the touch analyzer circuitry is to further provide at least a portion of the touch sensor data to the operating system, wherein to determine the combined gesture is further based on the at least a portion of the touch sensor data.

Example FB6 comprises the mobile comprising device of Example FB1, wherein the vision/imaging analyzer circuitry is to further provide at least a portion of the image sensor data to the operating system, wherein to determine the combined gesture is further based on the at least a portion of the image sensor data.

Example FB7 comprises the mobile comprising device of Example FB1, wherein to determine the combined gesture is further based on whether the touch sensor data and the image sensor data are temporally related based on the touch metadata and the image metadata.

Example FB8 comprises the mobile comprising device of Example FB1, further comprising, the vision/imaging analyzer circuitry and/or the image analyzer circuitry to: generate temporal relationship information indicating that the touch sensor data and the image sensor data are temporally related; and provide the temporal relationship information to the operating system, wherein to determine the combined gesture is further based on the temporal relationship information.

Example FB9 comprises the mobile comprising device of Example FB1, wherein to determine the combined gesture is further based on whether the touch sensor data and the image sensor data are spatially related based on the touch metadata and the image metadata.

Example FB10 comprises the mobile comprising device of Example FB1, further comprising, the vision/imaging analyzer circuitry and/or the image analyzer circuitry to: generate spatial relationship information indicating that the touch sensor data and the image sensor data are spatially related; and provide the spatial relationship information to the operating system, wherein to determine the combined gesture is further based on the spatial relationship information.

Example FB11 comprises the mobile computing device of Example FB1, further comprising, in the lid: one or more additional sensors comprising one or more of a lidar sensor, a radar sensor, and an ultrasound sound sensor; and an additional sensor analyzer to: receive additional sensor data from the one or more additional sensors; determine additional sensor metadata based on the additional sensor data; and send the additional sensor metadata to the one or more processing units, wherein to determine the combined gesture is further based on the additional sensor metadata.

Example FB12 comprises the mobile computing device of any one of Examples FB herein above and further comprises the features of any of Examples AB1-AB14, DA1-DA17, DB1-DB14, or EC1-EC10 (as far as those features are not redundant with features of Examples FB herein above).

Example FC1 is a method comprising: in a lid of a mobile computing device: receiving first touch sensor data from a touch display controller; determining first touch metadata based on the first touch sensor data; providing the first touch metadata to an operating system; receiving image sensor data from a camera located in the lid after receiving the first touch sensor data; determining image metadata based on the image sensor data; and providing the image metadata to the operating system; and in a base of the mobile computing device, the operating system or an application executing on one or more processing units located in the base of the mobile computing device: performing one or more first actions based on the first touch metadata; and subsequent to performing the one or more first actions, performing one or more second actions based on the image metadata.

Example FC1.5 comprises the mobile comprising device of Example FC1, wherein the vision/imaging analyzer circuitry and the touch analyzer circuitry are part of a lid controller hub.

Example FC2 comprises the method of Example FC1 comprising, in the lid of the mobile computing device: determining first user engagement information indicating engagement of a first user with a display of the mobile computing device based on the image sensor data; and providing the first user engagement information to the operating system, wherein the operating system or the application performs the one or more second actions if the first user engagement information indicates engagement of the first user with the display from a first time associated with the receiving the first touch sensor data until a second time associated with the receiving the image sensor data.

Example FC3 comprises the method of Example FC1, further comprising: in the lid of the mobile computing device: receiving second touch sensor data from the touch display controller; determining second touch metadata based on the second touch sensor data; and determining first user engagement information indicating engagement of a first user with a display of the mobile computing device based on the image sensor data; and providing the second touch metadata and the first user engagement information to the operating system; and in the base of the mobile computing device, the operating system or the application performing one or more third actions based on the second touch metadata if the first user engagement information indicates engagement of the first user with the display from a first time associated with the receiving the first touch sensor data until a third time associated with the receiving the second touch sensor data.

Example FC4 comprises the method of Example FC3, wherein the determining the first user engagement information comprises: detecting presence of the first user in a field of view of the camera based on the image sensor data; determining a face orientation of the first user; and determining whether the first user is looking at a display of the mobile computing device based on the face orientation.

Example FC5 comprises the method of Example FC1, further comprising: in the lid of the mobile computing device: determining presence of a first user and of a second user in a field of view of the camera based on the image sensor data; associating the first user with the first touch sensor data; and associating the second user with the image sensor data.

Example FC6 comprises the method of Example FC4, further comprising in the lid of the mobile computing device: determining second user engagement information indicating engagement of the second user with a display of the mobile computing device; and providing the second user engagement information to the operating system, wherein the operating system or the application performs the one or more second actions if the second user engagement information indicates engagement of a second user with the display from a first time associated with the receiving the first touch sensor data until a second time associated with the receiving the image sensor data.

Example FC7 comprises the method of Example FC1, further comprising: in the lid of the mobile computing device: receiving second touch sensor data from the touch display controller after receiving the first touch sensor data; determining second touch metadata based on the second touch sensor data; determining first user engagement information indicating whether a first user is engaged with a display of the mobile computing device; and providing the second touch metadata and the first user engagement information to the operating system; and in the base of the mobile computing device, the operating system or the application performing one or more third actions based on the second touch metadata if the first user engagement information indicates engagement of first user with the display from a first time associated with the receiving the first touch sensor data until a third time associated with the receiving the second touch sensor data.

Example FC8 comprises the method of any of Examples FC1-FC7, wherein to perform the one or more second actions comprises causing a user interface that can be interacted with via an in-air gesture to be displayed.

Example FC9 comprises the method of Example FC1, further comprising, in the lid of the mobile computing device: receiving additional sensor data from one or more of a lidar sensor, a radar sensor, and an ultrasound sensor; determining additional sensor metadata based on the additional sensor data; and providing the additional sensor metadata to the one or more processing units, wherein the performing the one or more second actions is further based on the additional sensor metadata.

Example FC10 comprises the method of any one of Examples FC herein above and further comprises the elements of the method of any one of Examples AA1-AA16, DE1-DE17, or EA1-EA10 (as far as those method elements are not redundant with method elements of Examples FC herein above).

Example FD1 is a mobile computing device comprising: a lid comprising: a touch display; a camera; a touch display controller; vision/imaging analyzer circuitry to: receive first touch sensor data from the touch display controller; determine first touch metadata based on the first touch sensor data; and provide the first touch metadata to an operating system; touch analyzer circuitry to: receive image sensor data from the camera after the first touch sensor data is received at the vision/imaging analyzer circuitry; determine image metadata based on the image sensor data; and provide the image metadata to the operating system; and a base comprising one more processing units to execute the operating system and an application, the operating system or application to: perform one or more first actions based on the first touch metadata; and subsequent to performing the one or more first actions, perform one or more second actions based on the image metadata.

Example FD2 comprises the mobile computing device of Example FD1, the vision/imaging analyzer circuitry to further: determine first user engagement information indicates engagement of a first user with the touch display based on the image sensor data; and provide the first user engagement information to the operating system, the operating system or the application to perform the one or more second actions if the first user engagement information indicates engagement of the first user is engaged with the touch display from a first time associated with receipt of the first touch sensor data until a second time associated with receipt of the image sensor data.

Example FD3 comprises the mobile computing device of Example FD1, the touch analyzer circuitry further to: receive second touch sensor data from the touch display controller; and determine second touch metadata based on the second touch sensor data; and the vision/imaging analyzer circuitry further to: determine first user engagement information indicating whether a first user is engaged with the touch display based on the image sensor data; and provide the second touch metadata and the first user engagement information to the operating system, the operating system or the application further to perform one or more third actions based on the second touch metadata if the first user engagement information indicates engagement of the first user with the touch display from a first time associated with the receiving the first touch sensor data until a third time associated with the receiving the second touch sensor data.

Example FD4 comprises the mobile computing device of Example FD1, wherein to determine the first user engagement information comprises: to detect presence of the first user in a field of view of the camera based on the image sensor data; to determine a face orientation of the first user; and to determine whether the first user is looking at the touch display based on the face orientation.

Example FD5 comprises the mobile computing device of Example FD1, further comprising: in the lid of the mobile computing device: determining presence of a first user and a second user in a field of view of the camera based on the image sensor data; associating the first user with the first touch sensor data; and associating the second user with the image sensor data.

Example FD6 comprises the mobile computing device of Example FD5, the vision/imaging analyzer circuitry further to: determine second user engagement information indicating engagement of the second user with the touch display of the mobile computing device; and provide the second user engagement information to the operating system, the operating system or the application to perform the one or more second actions if the second user engagement information indicates engagement of the second user with the touch display from a first time associated with the receiving the first touch sensor data until a second time associated with the receiving the image sensor data.

Example FD7 comprises the mobile computing device of Example FD6: the touch analyzer circuitry to: receive second touch sensor data from the touch display controller after receiving the first touch sensor data; determine second touch metadata based on the second touch sensor data; and determine first user engagement information indicating engagement of the first user with the touch display; provide the second touch metadata and the first user engagement information to the operating system; and in the base of the mobile computing device, the operating system or the application to perform one or more third actions based on the second touch metadata if the first user engagement information indicates engagement of a first user with the touch display from the first time associated with receipt of the first touch sensor data until a third time associated with receipt of the second touch sensor data.

Example FD8 comprises the mobile computing device of any of Examples FD1-FD7, wherein the one or more second actions comprises causing a user interface to be displayed at the touch display prompting a user for an in-air gesture.

Example FD9 comprises the mobile computing device of Example FD1, further comprising, in the lid: one or more additional sensors comprising one or more of a lidar sensor, a radar sensor, and an ultrasound sound sensor; and an additional sensor analyzer to: receive additional sensor data from the one or more additional sensors; determine additional sensor metadata based on the additional sensor data; and provide the additional sensor metadata to the one or more processing units, wherein the performing the one or more second actions is further based on the additional sensor metadata.

Example FD10 comprises the mobile computing device of any one of Examples FD herein above and further comprises the features of any of Examples AB1-AB14, DA1-DA17, DB1-DB14, EC1-EC10 (as far as those features are not redundant with features of Examples FD herein above).

Example FE1 is an apparatus comprising circuitry to: receive touch sensor data at a first input port of the apparatus; determine touch metadata based on the touch sensor data; receive image sensor data at a second input port of the apparatus; determine image metadata based on the image sensor data; generate temporal relationship information indicating that the touch sensor data and the image sensor data are temporally related; and provide the touch metadata, the image metadata, and the temporal relationship information at one or more output ports of the apparatus, the apparatus is for use in a lid of a mobile computing device.

Example FE1.5 is the apparatus of Example FE1, wherein the apparatus is a lid controller hub.

Example FE2 is the apparatus of Example FE1, the circuitry further to: generate spatial relationship information indicating that the touch sensor data and the image sensor data are spatially related; and provide the spatial relationship information at one of the output ports of the apparatus.

Example FE3 is the apparatus of Example FE1, the circuitry further to: receive additional sensor data at a third input port of the apparatus, the additional sensor data provided by one or more of a lidar sensor, a radar sensor, and an ultrasound sensor; determine additional sensor metadata based on the additional sensor data; and provide the additional sensor metadata at the one or more of the output ports of the apparatus, wherein to generate the temporal relationship comprises determining that the touch sensor data and/or the image sensor data is temporally related to the additional sensor data, the temporal relationship information further indicating that the touch sensor data and/or the image sensor data is temporally related to the additional sensor data.

Example FF1 is an apparatus comprising circuitry to: receive first touch sensor data at a first input port of the apparatus; determine first touch metadata based on the first touch sensor data; receive image sensor data at a second input port of the apparatus; determine image metadata based on the image sensor data; determine first user engagement information indicating engagement of a first user with a touch display based on the image sensor data; and provide the image metadata, the first touch metadata, and the first user engagement information at one or more output ports of the apparatus, wherein the apparatus is for us in a lid of a mobile computing device.

Example FF1.5 is the apparatus of Example FF1, wherein the apparatus is a lid controller hub.

Example FF2 comprises the apparatus of Example FF1, wherein to determine the first user engagement information comprises: to detect presence of the first user in a field of view of a camera based on the image sensor data; to determine a face orientation of the first user; and to determine whether the first user is looking at the touch display based on the face orientation.

Example FF3 comprises the apparatus of Example FF1, the circuitry further to: determine presence of a first user and of a second user in a field of view of a camera based on the image sensor data; associating the first user with the first touch sensor data; and associating the second user with the image sensor data.

Example FF4 comprises the apparatus of Example FF3, the circuitry further to: determine second user engagement information indicating engagement of the second user with the touch display of the mobile computing device; and provide the second user engagement information at one of the output ports of the apparatus.

Example FF5 comprises the apparatus of Example FF1, the circuitry further to: receive additional sensor data at a third input port of the apparatus, the additional sensor data provided by one or more of a lidar sensor, a radar sensor, and an ultrasound sensor; determine additional sensor metadata based on the additional sensor data; determine first user engagement information indicating engagement of a first user with a touch display based on the image sensor data; and provide the additional sensor metadata at the one or more output ports of the apparatus, wherein the apparatus is for use in a lid of a mobile computing device.

Example FG1 is an apparatus comprising: circuitry to: receive touch sensor data at a first input port of the apparatus; determine touch metadata based on the touch sensor data; receive image sensor data at a second input port of the apparatus; determine image metadata based on the image sensor data; provide the touch metadata, the image metadata, and temporal relationship information at one or more output ports of the apparatus, the temporal relationship information indicating that the touch sensor data and the image sensor data are temporally related; and provide the touch metadata, the image metadata, and the temporal relationship information at one or more output ports of the apparatus, the apparatus is for use in a lid of a mobile computing device; and a temporal relationship determination means for determining the temporal relationship information.

Example FG2 comprises the apparatus of Example FG1, the circuitry further to provide spatial relationship information at one of the output ports of the apparatus, the spatial relationship information indicating that the touch sensor data and the image sensor data are spatially related, the apparatus further comprising a spatial relationship determination means for determining the spatial relationship information.

Example FH1 is an apparatus comprising: circuitry to: receive first touch sensor data at a first input port of the apparatus; determine first touch metadata based on the first touch sensor data; receive image sensor data at a second input port of the apparatus; determine image metadata based on the image sensor data; and provide the image metadata, the first touch metadata, and first user engagement information at one or more output ports of the apparatus, the first user engagement information indicating engagement of a first user with a touch display based on the image sensor data, wherein the apparatus is for us in a lid of a mobile computing device; and a user engagement determination means to determine the first user engagement information.

Example FI1 is one or more non-transitory computer-readable storage media storing instructions that when executed cause one or more processing units of a lid of a computing device to perform the method of any one of claims FA1-FA9.

Example FJ1 is an apparatus comprising one or more means to perform the method of any one of the of Examples FA1-FA9.

Low Power Touch with User Presence

As discussed previously, the LCH can place lid-based components in a low power state. For example, display pipeline components can be placed in a low-power state to disable at least a portion of the display when the lid of a mobile computing device is closed. An LCH can also place the touch display controller and components related to the processing of touch sensor data into a low-power state under various conditions, such as when a user is not present in of front of a lid display, when the user is not looking at the display, or when the user is not interacting with the device. increased power consumption. The touch report rate is a rate at which touch sensor data or touch metadata is reported to the operating system. An Operation_3 state in which the display refresh rate, touch scan rate, and touch report rate are all set to 60 Hz results in decreased display panel power consumption, but results in a degraded touch experience.

With user presence detection, the sampling of touch sensor data can be halted in idle mode and about half of the idle touch power (~200 mW) consumed in existing in-cell displays can be saved. When a user's presence is detected based on sensor data generated by input sensors incorporated into device lid of a mobile computing device (e.g., camera, touch display, lidar sensor, radar sensor, ultrasound sensor, microphone), the device's touch functionality can be woken from a low-power state. Touch sampling or scanning operations can be enabled (if they had been disabled in the low-power state) and sampling can occur at active sampling rates (e.g., 60 Hz and higher). In some embodiments, a higher active scan rate can be utilized, such as 120 Hz or 240 Hz. These higher scanning rates may be utilized in gaming applications.

TABLE 1

Power consumption and display refresh, touch scan, and touch report rates for an existing in-cell display panel

| | | Condition | | | |
|---|---|---|---|---|---|
| Mode | Logic Power | Display refresh rate | Touch Scan Rate | Report Rate | Comment |
| Idle_1 | Typ: 0.75 W Max: 0.89 W | 60 Hz | 60 Hz | None | Normal idle |
| Idle_2 | Idle_1 − 0.01 W | 60 Hz | 30 Hz | None | Lower wake-up response than Idle_1 |
| Operation_1 | 1 finger: 0.89 W 10 fingers: 1.08 W | 60 Hz | 120 Hz | 120 Hz | Normal operation |
| Operation_2 | Operation_1 + 0.32 W | 120 Hz | 120 Hz | 120 Hz | Smoother touch experience with increased display power consumption |
| Operation_3 | Operation_1 − 0.08 W | 60 Hz | 60 Hz | 60 Hz | Reduced display power consumption with degraded touch experience |

In some embodiments of mobile computing devices with lid controller hubs, the power consumed by the touch display controller (the component responsible for generating touch sensor data by sampling or scanning the touch display) when in a low-power mode may be reduced by approximately 50% relative to existing embodiments. Based on an existing supplier's architecture for a 13.3" FHD (Full HD (High Definition)) touch display, reducing touch idle power consumption by 50% would reduce their display's touch idle power consumption from 400 mW to 200 mW.

Table 1 shows power consumption values for an existing in-cell touch display. The logic portion of the in-cell display consumes approximately a maximum of 0.89 W during normal operation, which is approximately 450 mW more than the power consumed by the logic portion of a comparable on-cell display. The increased power consumption of the in-cell display is due to the ongoing touch scanning that occurs while the display is in idle mode. As can be seen, when the in-cell display of Table 1 is in either of its idle states (Idle_1, Idle_2), touch scan operations are still being performed at a rate of 30 or 60 Hz. Operational states of the in-cell display include an Operation_2 state in which a smoother touch experience is realized by increasing touch scan (sampling) and touch report rates to 120 Hz, but also increases the display refresh rate of 120 Hz results in Generally, touch component power consumption reduction is based on user presence, user engagement and/or user interaction is enabled as follows. Touch components, such as a touch display controller and components that process touch sensor data can be placed into a low-power state if no user is present. A touch display controller can be placed into a low-power state by reducing the rate at when it scans or samples the touch display to generate touch sensor data to a low rate (e.g., 20 Hz or below), or by disabling the touch display controller via reduction of the power supplied to the touch display controller. Placing a component that processes touch sensor data into a low-power mode can comprise reducing the power supplied to the component or enabling a mode of the component in which the component or the portion of the component that processes touch sensor data does not operate.

When user presence is detected, the touch sampling rate of the touch display controller can be increased to an active touch sampling rate, such as 60 Hz or greater (e.g., 120 Hz, 240 Hz). User presence can be detected based on sensor data generated by one or more input sensors located in the lid, such as a camera, lidar sensor, radar sensor, ultrasound sensor, microphone, and even the touch display, if the touch display is still operating. For example, user presence can be determined by the detection of a touch event at the touch display, by detecting a user in image sensor data provided by a camera, or by detecting a user, finger, or another object in proximity of the display by one of the proximity sensors (e.g., lidar sensor, radar sensor, ultrasound sensor). Detection of a touch event can be detected by the touch display controller or a touch analyzer that processes touch sensor data. Detection of a user in image sensor data can be performed by one or more NNAs (e.g., 276, 327, 3030) and/or DSPs (e.g., 275, 378). Touch sensor data can be provided to a touch analyzer (which can be part of an LCH) at the touch sampling rate. Touch metadata can be generated based on the touch sensor data and reported to the operating system at a touch report rate, the touch report rate, the rate at which touch metadata and/or touch sensor data is supplied to an operating system. The touch report rate can be increased in response to detecting the presence of a user. In some cases, the touch sampling rate and the touch report rate can be the same. If the display was in a low-power state (e.g., the display was disabled or operating at a low refresh rate, such as 20 Hz or below), the refresh rate of the display can increase in response to detecting the presence of a user. The touch report rate, the display refresh rate, or both can be made to match the touch sampling rate. In a base of the mobile computing device, the operating system and one or more applications can perform actions based on the touch metadata and/or touch sensor data.

Once user presence has been detected, the display refresh rate, touch sampling rate, and touch report rate can be subsequently adjusted based on whether the user remains present, is engaged with the display, and/or is interacting with the device. These subsequent adjustments can be based on additional touch sensor data, and/or base input device sensor data. User engagement can be determined as described herein previously (e.g., determining whether the user is looking at the display based on a determined head or face orientation of the user). A level of user interaction can be determined based on how recently a user has interacted with the device, such as touching the touch display, typing a keystroke on a physical or virtual keyboard, touching a trackpad or touchpad, or moving a mouse communicatively coupled to the device. If a user is present, engaged, and actively interacting with the device, the display refresh rate, touch sampling rate, touch report rate can all be set to high values (e.g. 120 Hz, 240 Hz) to provide a highly responsive user experience. The touch sampling rate and touch report can be scaled down if the user is still present but their level of interaction decreases or if they become disengaged. A user can be determined to be disengaged if the user is looking away from the display for a threshold period of time (e.g., on the order of 1-5 seconds). If the user is present but disengaged with the display, the touch display controller can be disabled or the touch sampling rate reduced to 0 Hz. The touch display controller can also be turned off if the user is no longer present. Additionally, the host processing units in the base can be placed into a low-power state if the user is no longer present. If user-initiated tasks are still running when the user is determined to be no longer present, placing the processing units into a low-power state can be postponed until the user-initiated tasks have finished executing.

Detecting user presence, user engagement, and a level of user interaction, as well as causing the display refresh rate, touch sampling rate and touch reporting rate to change can all take place in one or more components in the lid of the computing device, such as a lid controller hub.

Figure 51:
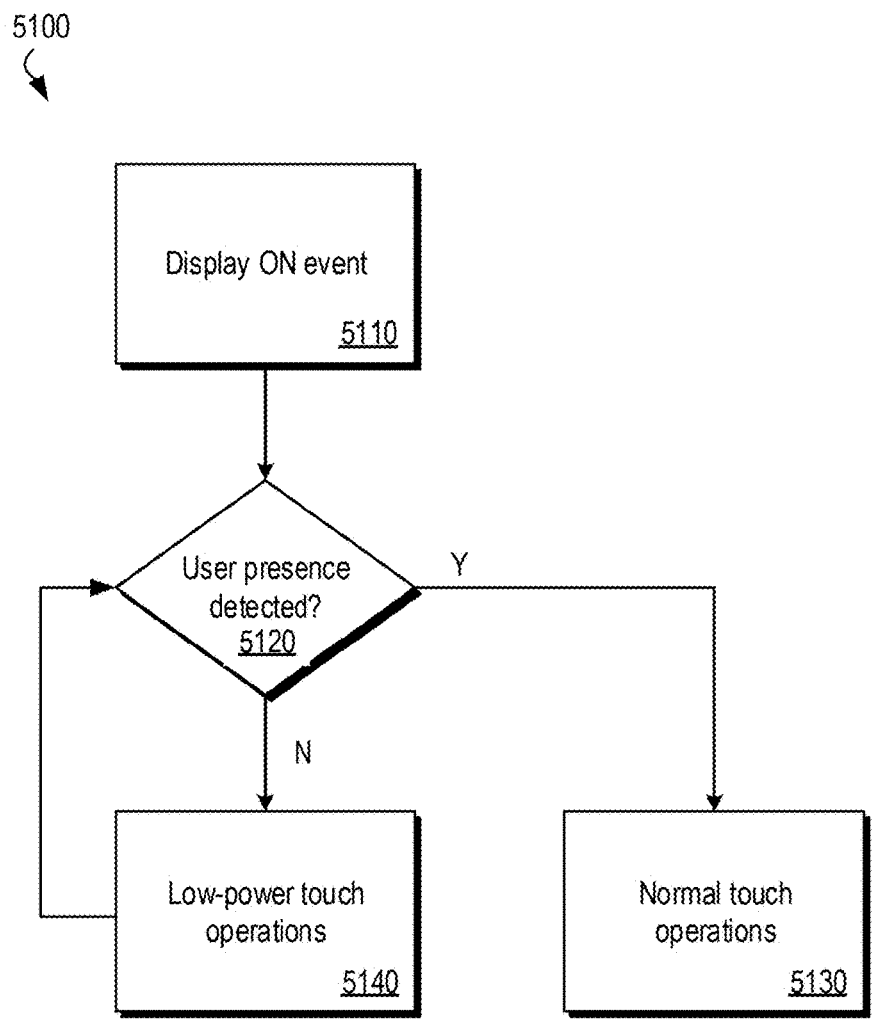
FIG. 51 illustrates an example method of adjusting touch operations based on user presence.

FIG. 51 illustrates an example method of adjusting touch operations based on user presence. The method 5100 can be performed by, for example, a laptop (e.g., 100, 122, 200, 300, 900, 3800). At 5110, a "display on" event occurs, such as the display turning on in response to the device being turned on or the lid of the mobile device is opened. At 5120, user presence in front of the display is determined. User presence detection can be performed by, for example, detecting the finger of a user touching the touch display surface, detecting the presence of a user in image data captured by one or more cameras integrated into the laptop device, detecting a wake phrase or key phrase in audio captured by a microphone incorporated into the computing device and integrated into the lid controller hub architecture, or detecting the proximity of a user's head, finger, or object in proximity of the device based on proximity sensor data (e.g., lidar sensor data, radar sensor data, ultrasound sensor data, light sensor data). If the presence of a user is detected, normal touch operation is enabled at 5130. Normal touch operation can correspond to setting the touch sampling rate and the touch report rate set to values of 60 Hz or greater (e.g., 120 Hz, 240 Hz). If no user is detected at 5140, touch operations are placed in a low-power state, in which the touch sampling rate and the touch report rate are set to low values (e.g., 20 Hz or lower) or the touch display controller and touch processing components are disabled.

Figure 52:
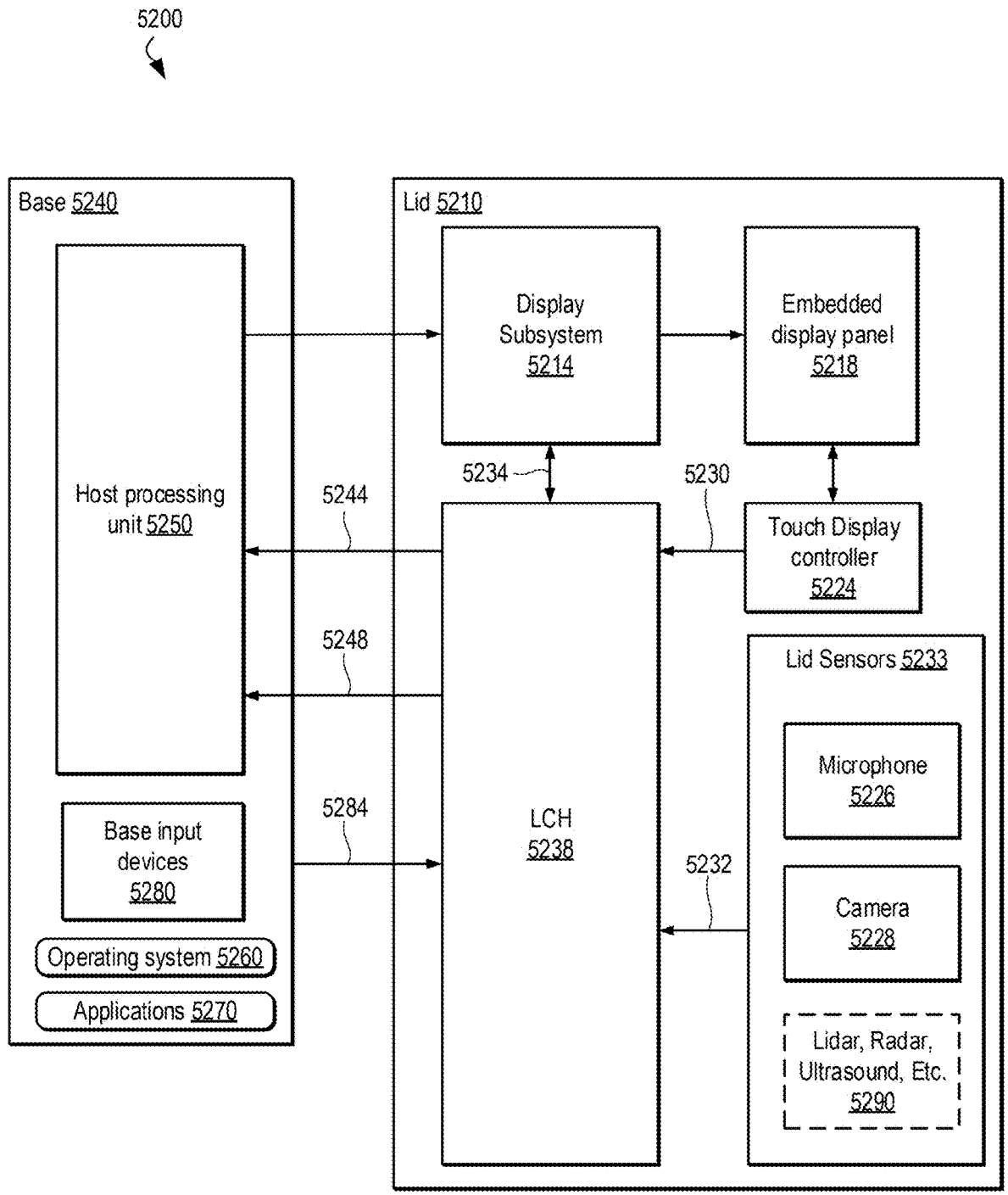
FIG. 52 is a simplified block diagram of an example computing device capable of controlling touch operations based on user presence, engagement, and interaction.

FIG. 52 is a simplified block diagram of an example computing device capable of controlling touch operation based on user presence, engagement, and interaction. The computing device 5200 comprises a lid 5210 and a base 5240. The lid 5210 comprises a display subsystem 5214, an embedded display panel 5218, a touch display controller 5224, lid sensors 5233, and a lid controller hub 5238. The base 5240 comprises one or more host processing units 5250 that can execute an operating system 5260 and one or more applications 5270. The base 5240 further comprises base input devices 5280 (e.g., keyboard, trackpad, touchpad, mouse).

The computing device 5200 can be any of the computing devices described herein (e.g., 100, 122, 200, 300, 900, 3800, 4100) and the lid 5210 can be any of the lids described herein (e.g., 120, 123, 220, 301, 920, 1701, 3810). The embedded display panel 5218 is a touch display and can be any of the display panels described herein (e.g., 145, 280, 380, 926, 2140, 3842, 4124). The LCH 5238 can be any of the LCHs described herein (e.g., 155, 260, 305, 954, 1705, 3834, 4138). The display subsystem 5214 can be any of the display subsystems described herein (e.g., 3838) can comprise one or more components described herein that perform display-related operations, such as a timing controller (e.g., 150, 400, 355, 944, 1706, 2100, 3830, 4124) and its constituent timing controller components (e.g., frame buffer (e.g., 830, 2120), frame processing stack modules (e.g., 822-826, 2139-2128)), row drivers (e.g., 882, 2154, 2158), column drivers e.g., 884, 2160), display driver (e.g., 880, 2130), and video data receiver (e.g., 812, 2110). The touch display controller 5224 can be any of the touch display controllers described herein (e.g., 165, 285, 385, 3830, 4110).

The touch display controller 5224 scans or samples the touch display 5218 to generate touch sensor data samples (e.g., touch sensor data) 5230 that are provided to the LCH 5238. The lid sensors 5233 comprise a camera 5228, which can be any of the cameras described herein (e.g., 160, 270, 346, 932, 2514, 3014, 4128), and a microphone 5226, which can be any of the microphones described herein (e.g., 158, 290, 390, 926). The lid sensors 5233 can optionally include one or more additional sensors 5290, such as a lidar sensor, radar sensor, ultrasound sensor, or light sensor.

The microphone 5226 generates audio sensor data, the camera 5228 generates image sensor data, and the additional sensors 5290 generate additional lid sensor data, all of which can be collectively referred to as lid sensor data, which is provided to the LCH 5238. The LCH 5238 generates lid sensor metadata 5248 based on the lid sensor data 5232. In some embodiments, lid sensor metadata 5248 can be generated by one or more of a touch analyzer (e.g., 4134), a host module (e.g., 176, 261, 362, 1720), an audio module (e.g., 170, 264, 364, 1730), and a vision/imaging analyzer module or vision/imaging integrated circuit (e.g., 172, 263, 363, 1740, 2540A, 2540B, 3020, 3026, 4162). The LCH 5238 generates lid sensor metadata 5248 that is delivered to the host processing units 5250. In some embodiments, the LCH 5238 can send at least a portion of the touch sensor data 5230 and/or a portion of the lid sensor data 5232 to the host processing units 5250. In some embodiments, the LCH 5238 can comprise additional analyzers such as a lidar analyzer that processes lidar sensor data, a radar analyzer that processes radar sensor data, and an ultrasound analyzer that processes ultrasound sensor data.

In some embodiments, one or more types of sensor data can be used to determine user presence, user engagement or a level of user interaction. For example, user presence can be detected using one or more of the lidar sensor data, radar sensor data, or ultrasound sensor data and determining if an object (e.g., face, finger, gesture object) is within proximity of the display 4118. In other embodiments, user presence can be detected by using one or more NNAs (e.g., 276, 327, 3030) and/or DSPs (e.g., 275, 378) to detect the presence of a user in image sensor data (e.g. Wake on Face). In still other embodiments, user presence is determined based on the detection of an authorized user's face in image sensor data (e.g., Face ID). The orientation of a user's head or face can similarly be detected using one or more NNAs (e.g., 276, 327, 3030) and/or DSPs (e.g., 275, 378) to process image sensor data. User presence or head/face orientation can be determined by providing two or more types of sensor data supplied to an NNA and/or a DSP, such as, for example, image sensor data and lidar sensor data. The determination of whether a user is interacting with the device 5200 or a level of user interaction with the device 5200 can be based on one or more sensor data types generated by sensors that capture a user's physical interaction with the device, such as touch sensor data indicating a touch to the display and base input device sensor data 5284 indicating a keystroke at a physical or virtual keyboard, the touching of a trackpad or touchpad, or movement of a mouse communicatively coupled to the device.

In some embodiments, the level of user interaction with the device can be determined based on how recently the user has interacted with the device based on one or more of the touch sensor data 5230, the lid sensor data 5232, and the base input device sensor data 5284. If the user has most recently interacted with the device (e.g., touched the screen, typed a key on a virtual or physical keyboard, moved a mouse) within a time period (e.g., within one-half, one, or two seconds) since the most previous user interaction reflecting the user is actively interacting with the device, the display refresh rate, the touch sampling rate and the touch reporting rate can be set to levels (e.g., 120 Hz or 240 Hz) that allow the device 4100 to provide a highly responsive user experience. In some embodiments, in this high responsiveness mode, the display refresh rate, the touch sampling rate, and the touch reporting rate can be set to their maximum values and the touch metadata can comprise conditioned touch sensor data (e.g., 3965) to provide a smooth touch experience. In some embodiments, the device 4100 can defer scheduled tasks to make device resources available to maintain the responsive user experience.

If the user is present and engaged, but at a lower level of interaction, the device can reduce one or more of the display refresh rate, the touch sampling rate, and the touch reporting rate lower active levels (e.g., 60 Hz) to save power while still being responsive to the user's lower degree of interaction. In some embodiments, a user can be determined to be interacting at a high level if the user has most recently interacted with the device within a first time period since the most recent prior interaction and be engaged at a lower level of interaction if the user has most recently interacted with the device longer than the first time period since the most recent prior interaction. If the user is interacting at the higher level of interaction, the touch sampling rate and the touch reporting rate can set to a higher rate (e.g., 120 Hz, 240 Hz) and if the user is interacting with the device at the lower level of interaction, touch sampling rate and the touch reporting rate can set to a lower rate (e.g. 60 Hz).

In some embodiments, the device can distinguish between more than two user interaction levels. For example, if the most recent user interaction with the device since the most recent prior interaction is within a first period, the touch sampling and touch reporting rates can be set to a high level (e.g., 120 Hz, 240 Hz), if the most recent user interaction with the device since the most recent prior interaction is within a second period that is longer than the first period, the touch sampling and reporting rates can be set to a middle level (e.g., 60 Hz), and if the most recent user interaction with the device since the most recent prior interaction is within a third period that is longer than the third period, the touch sampling and reporting rates can be set to a lower level (e.g. 20 Hz or less).

If the user is present but disengaged (for example, if the user is in front of the laptop but reading a magazine article, a book, a report, etc.), the touch sampling rate and the touch reporting rate can be set to zero, or the touch display controller and/or components that process touch sensor data can be disabled, but the host processing units can continue to operate at an active level and scheduled tasks can continue to be performed.

If the user is not present (due to, for example, the lid of the device having been closed, or the user simply having wandered off), the device can enter a standby mode in which the touch sampling rate and the touch reporting rate are set to zero, or the touch display controller and/or components that process touch sensor data are disabled. The display can be disabled and the host processing units can be placed in a low-power state. The device can be locked when in the standby state.

In some embodiments, prior to the processing units being placed in a low-power state and the device entering the standby state, the device can be in a quiet state in which any user-initiated task that is still executing may be allowed to finish and any other tasks scheduled to run while the user-initiated tasks are still executing can be allowed to execute before the device enters the standby state.

Upon detecting user presence, the LCH 5238 can cause the touch sampling rate, and the display refresh rate to adjust. The LCH 5238 can cause the display refresh rate to adjust via a synchronization signal 5234 (e.g., 180, 226, 370) with the display subsystem 5214 and can cause the touch sampling rate to adjust through its connection with the touch display controller 5224.

Figure 53:
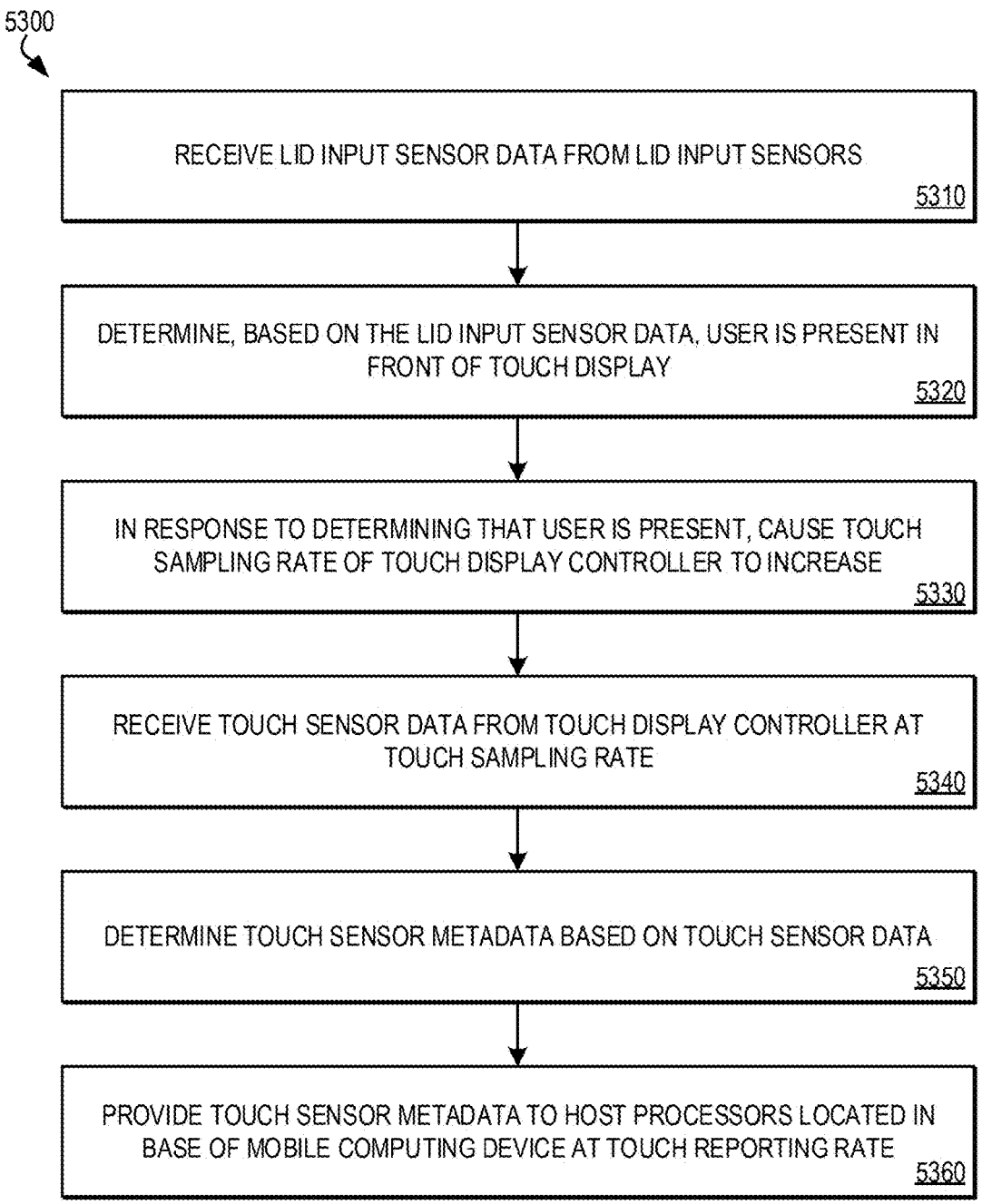
FIG. 53 is an example method of controlling touch operations based on user presence, engagement, and interaction.

FIG. 53 is an example method of controlling touch operations based on user presence, engagement, and interaction. The method 5300 can be performed by a lid controller hub in the lid of a laptop. At 5310, lid input sensor data is received from one or more lid input sensors located in the lid. At 5320, based on the lid input sensor data, the presence of a user is in front of a touch display located in the lid is determined. At 5330, in response to determining that the user is present, a touch sampling rate of a touch display controller is caused to increase. At 5340, touch sensor data is received from the touch display controller at the touch sampling rate. At 5350, touch metadata is determined based on the touch sensor data. At 5360, the touch metadata is provided to one or more host processors located in a base of the mobile computing device at a touch reporting rate. In other embodiments, the method 5300 may comprise additional elements. For example, the method 5300 can further receive additional lid input sensor data from the one or more lid input sensors, determine that the user is not present based on the additional input sensor data; and in response to determining that the user is not present, cause the touch sampling rate of the touch display controller to decrease.

The follow examples pertain to embodiments in accordance with this specification.

Example GA1 is a method comprising: in a lid of a mobile computing device: receiving lid input sensor data from one or more lid input sensors located in the lid; determining, based on the lid input sensor data, that a user is present in front of a touch display located in the lid; in response to determining that the user is present, causing a touch sampling rate of a touch display controller to increase; receiving touch sensor data from the touch display controller at the touch sampling rate; determining touch metadata based on the touch sensor data; and providing the touch metadata to one or more host processors located in a base of the mobile computing device at a touch reporting rate.

Example GA2 comprises the method of Example 1, wherein the touch sensor data is second touch sensor data and the lid input sensor data further comprises first touch sensor data provided by the touch display controller.

Example GA3 comprises the method of Example 1, wherein the one or more lid input sensors comprise a camera.

Example GA4 comprises the method of Example 3, wherein the one or more lid input sensors further comprise one or more of a lidar sensor, a radar sensor, and an ultrasound sensor.

Example GA5 comprises the method of Example 1, further comprising performing, in the base, by an operating system, one or more actions based on the touch sensor data, the operating system executing on one or more processing units located in the base.

Example GA6 comprises the method of Example 1, further comprising, in the lid, in response to determining that the user is present, increasing the touch reporting rate.\

Example GA7 comprises the method of Example 1, further comprising, in the lid, in response to determining that the user is present, causing an increase in a display refresh rate of the touch display.

Example GA8 comprises the method of Example 1, wherein the touch reporting rate is the same as the touch sampling rate.

Example GA9 comprises the method of Example 1, further comprising, in the lid, in response to determining that the user is present, causing a display refresh rate of the touch display to be increased, wherein the touch sampling rate, the display refresh rate, and the touch sampling rate are the same.

Example GA10 comprises the method of Example 1, wherein at least two of the touch sampling rate, the touch reporting rate, and a display refresh rate of the touch display are different.

Example GA11 comprises the method of Example 1, wherein the touch sampling rate, the touch reporting rate, and a display refresh of the touch display are all different from each other.

Example GA12 comprises the method of Example 1, further comprising, in the lid: receiving additional lid input sensor data from the one or more lid input sensors; determining that the user is not present based on the additional input lid sensor data; and in response to determining that the user is not present, causing the touch sampling rate of the touch display controller to decrease.

Example GA13 comprises the method of Example 12, further comprising reducing the touch reporting rate in response to the determining that the user is not present.

Example GA14 comprises the method of Example 12, further comprising causing a display refresh rate of the touch display to reduce in response to the determining that the user is not present.

Example GA15 comprises the method of Example 1, further comprising, in the lid: receiving additional lid input sensor data from the one or more lid input sensors; determining that the user is not engaged with the touch display based on the additional lid input sensor data; and in response to determining that the user is not engaged with the touch display, causing the touch sampling rate to decrease and/or decreasing the touch reporting rate.

Example GA16 comprises the method of Example 15, where the touch sampling rate is caused to be reduced to zero and the touch reporting rate is reduced to zero.

Example GA17 comprises the method of Example 1, further comprising: in the base, executing of a user-initiated task on one or more processing units; in the lid: receiving additional lid input sensor data from the one or more lid input sensors; determining that the user is not engaged with the touch display based on the additional lid input sensor data and; in response to determining that the user is not engaged with the touch display, causing the touch sampling rate to decrease and/or decreasing the touch reporting rate; and in the base, allowing the user-initiated task to complete before placing the one or more processing units into a low-power state.

Example GA18 comprises the method of Example 1, further comprising, in the lid: receiving additional lid input sensor data from the one or more lid input sensors; determining engagement of the user with the touch display based on the additional lid input sensor data; determining whether the user is interacting with the mobile computing device based on one or more of the touch sensor data and the lid input sensor data; and if the user engaged with the touch display and the user is interacting with the device, setting the touch sampling rate to a maximum touch sampling rate of the touch display controller.

Example GA19 comprises the method of Example 18, further comprising conditioning the touch sensor data to generate conditioned touch sensor data, wherein the touch metadata comprises the conditioned touch sensor data.

Example GA20 comprises the method of Example 18, wherein the determining engagement of the user with the touch display comprises: determining a face orientation of the user; and determining whether the user is looking at the touch display based on the face orientation.

Example GA21 comprises the method of Example 1, further comprising, in the lid: receiving additional lid input sensor data from the one or more lid input sensors; determining engagement of the user with the touch display based on the additional lid input sensor data; determining how recently the user has interacted with the mobile computing device based on one or more of the touch sensor data and the additional lid input sensor data; and if the user is engaged with the touch display: setting the touch sampling rate to a first touch sampling rate if the user has interacted with the mobile computing device since a prior interaction within a first time period that is shorter than a second time period; and if the user has not interacted with the device within the first time period, setting the touch sampling rate to a second touch sampling rate if the user has interacted with the device within the second time period, the first touch sampling rate greater than the second touch sampling rate.

Example GA22 comprises the method of Example 1, further comprising: receiving additional lid input sensor data from the one or more lid input sensors; determining engagement of the user with the touch display based on the additional lid input sensor data; determining how recently the user has interacted with the mobile computing device based on one or more of the touch sensor data and the additional lid input sensor data; and if the user is engaged with the touch display: setting the touch sampling rate to a first touch sampling rate if the user has interacted with the mobile computing device since a prior interaction within a first time period, the first time period shorter than a second time period, the second time period shorter than a third time period; and setting the touch sampling rate to a second touch sampling rate if the user has interacted with the mobile computing device since the prior interaction within the second time period if the user has not interacted with the mobile computing device within the first time period; and setting the touch sampling rate to a third touch sampling rate if the user has interacted with the device since the prior interaction within the third time period if the user has not interacted with the mobile computing device within the second time period, the first touch sampling rate greater than the second touch sampling rate, the second touch sampling rate greater than the third touch sampling rate.

Example GA23 The method of any one of the claim 18-22, further comprising receiving base input device sensor data associated with one or more base input devices, the determining how recently the user has interacted with the mobile computing device being further based on the base input device sensor data.

Example GA24 comprises the method of Example 23, wherein the one or more base input devices comprises one or more of a keyboard, trackpad, touchpad, and a mouse.

Example GA25 comprises the method of any one of Examples GA herein above and further comprises the elements of the method of any one of Examples AA1-AA16, DE1-DE17, EA1-EA10 or FA1-FA9 (as far as those method elements are not redundant with method elements of Examples GA herein above).

Example GB1 is a mobile computing device comprising: a base comprising one or more host processing units; and a lid comprising: a touch display; a touch display controller; one or more lid input sensors; and circuitry to: receive lid input sensor data from the one or more lid input sensors; determine, based on the lid input sensor data, that a user is present in front of the touch display; in response to determining that the user is present, causing a touch sampling rate of the touch display controller to increase; receiving touch sensor data from the touch display controller at the touch sampling rate; determining touch metadata based on the touch sensor data; and providing the touch metadata to the one or more host processing units at a touch reporting rate.

Example GB2 comprises the mobile computing device of Example GB1, wherein the touch sensor data is second touch sensor data and the lid input sensor data further comprises first touch sensor data provided by the touch display controller.

Example GB3 comprises the mobile computing device of Example GB1, wherein the one or more lid input sensors comprise a camera.

Example GB4 comprises the mobile computing device of Example GB1, wherein the one or more lid input sensors further comprise one or more of a lidar sensor, a radar sensor, and an ultrasound sensor.

Example GB5 comprises the mobile computing device of Example GB1, the one or more host processing units to execute an operating system to perform one or more actions based on the touch sensor data.

Example GB6 comprises the mobile computing device of Example GB1, the circuitry further to increase the touch reporting rate in response to determining that the user is present.

Example GB7 comprises the mobile computing device of Example GB1, the circuitry further to causing an increase in a display refresh rate of the touch display in response to determining that the user is present.

Example GB8 comprises the mobile computing device of Example GB1, wherein the touch reporting rate is the same as the touch sampling rate.

Example GB9 comprises the mobile computing device of Example GB1, the circuitry further to, in response to determining that the user is present, cause a display refresh rate of the touch display to be increased, wherein the touch sampling rate, the display refresh rate, and the touch sampling rate are the same.

Example GB10 comprises the mobile computing device of Example GB1, wherein at least two of the touch sampling rate, the touch reporting rate, and a display refresh rate of the touch display are different.

Example GB11 comprises the mobile computing device of Example GB1, wherein the touch sampling rate, the touch reporting rate, and a display refresh of the touch display are all different from each other.

Example GB12 comprises the mobile computing device of Example GB1, the circuitry further to: receive additional lid input sensor data from the one or more lid input sensors; determine that the user is not present based on the additional lid input sensor data; and in response to determining that the user is not present, cause the touch sampling rate of the touch display controller to decrease.

Example GB13 comprises the mobile computing device of Example GB12, the circuitry further to reduce the touch reporting rate in response to determining that the user is not present.

Example GB14 comprises the mobile computing device of Example GB12, the circuitry further to cause a display refresh rate of the touch display to reduce in response to the determining that the user is not present.

Example GB15 comprises the mobile computing device of Example GB1, the circuitry further to: receive additional lid input sensor data from the one or more lid input sensors; determine that the user is not engaged with the touch display based on the additional lid input sensor data; and in response to determining that the user is not engaged with the touch display, cause the touch sampling rate to decrease and/or decreasing the touch reporting rate.

Example GB16 comprises the mobile computing device of Example GB15, where the touch sampling rate is caused to be reduced to zero and the touch reporting rate is reduced to zero.

Example GB17 comprises the mobile computing device of Example GB1, the one or more host processing units to begin execution of a user-initiated task; the circuitry further to: receive additional lid input sensor data from the one or more lid input sensors; determine that the user is not engaged with the touch display based on the additional lid input sensor data and; in response to determining that the user is not engaged with the touch display, cause the touch sampling rate to decrease and/or decreasing the touch reporting rate; and the one or more host processing units to allow the user-initiated task to complete before being placed into a low-power state.

Example GB18 comprises the mobile computing device of Example GB1, the circuitry further to: receive additional lid input sensor data from the one or more lid input sensors; determine engagement of the user with the touch display based on the additional lid input sensor data; determine whether the user is interacting with the mobile computing device based on one or more of the touch sensor data and the lid input sensor data; and if the user is engaged with the touch display and the user is interacting with the mobile computing device, set the touch sampling rate to a maximum touch sampling rate of the touch display controller.

Example GB19 comprises the mobile computing device of Example GB18, the circuitry further to conditioning the touch sensor data to generate conditioned touch sensor data, wherein the touch metadata comprises the conditioned touch sensor data.

Example GB20 comprises the mobile computing device of Example GB18, wherein to determine engagement of the user with the touch display comprises: to determine a face orientation of the user; and to determine whether the user is looking at the touch display based on the face orientation.

Example GB21 comprises the mobile computing device of Example GB1, the circuitry further to: receive additional lid input sensor data from the one or more lid input sensors; determine engagement of the user with the touch display based on the additional lid input sensor data; determine how recently the user has interacted with the mobile computing device based on one or more of the touch sensor data and the additional lid input sensor data; and if the user is engaged with the touch display: set the touch sampling rate to a first touch sampling rate if the user has interacted with the mobile computing device since a prior interaction within a first time period that is shorter than a second time period; and if the user has not interacted with the mobile computing device within the first time period, set the touch sampling rate to a second touch sampling rate if the user has interacted with the mobile computing device within the second time period, the first touch sampling rate greater than the second touch sampling rate.

Example GB22 comprises the mobile computing device of Example GB1, the circuitry further to: receive additional lid input sensor data from the one or more lid input sensors; determine engagement of the user with the touch display based on the additional lid input sensor data; determine how recently the user has interacted with the mobile computing device based on one or more of the touch sensor data and the additional lid input sensor data; and if the user is engaged with the touch display: set the touch sampling rate to a first touch sampling rate if the user has interacted with the mobile computing device since a prior interaction within a first time period, the first time period shorter than a second time period, the second time period shorter than a third time period; and set the touch sampling rate to a second touch sampling rate if the user has interacted with the mobile computing device since the prior interaction within the second time period if the user has not interacted with the mobile computing device within the first time period; and set the touch sampling rate to a third touch sampling rate if the user has interacted with the mobile computing device since the prior interaction within the third time period if the user has not interacted with the mobile computing device within the second time period, the first touch sampling rate greater than the second touch sampling rate, the second touch sampling rate greater than the third touch sampling rate.

Example GB23 comprises the mobile computing device of Example GB19-GB22, the circuitry further to receive base input device sensor data associated with one or more base input devices, to determine how recently the user has interacted with the mobile computing device being further based on the base input device sensor data.

Example GB24 comprises the mobile computing device of Example GB24, wherein the one or more base input devices comprises one or more of a keyboard, trackpad, touchpad, and a mouse.

Example GB25 comprises the mobile computing device of any one of Examples GB herein above and further comprises the features of any of Examples AB1-AB14, DA1-DA17, DB1-DB14, EC1-EC10, FB1-FB10, or FD1-FD9 (as far as those features are not redundant with features of Examples FB herein above).

Example GC0 is an apparatus comprising circuitry to: receive lid input sensor data from one or more lid input sensors; determine, based on the lid input sensor data, that a user is present in front of a touch display; in response to determining that the user is present, causing a touch sampling rate of a touch display controller to increase; receive touch sensor data from the touch display controller at the touch sampling rate; determine touch metadata based on the touch sensor data; and providing the touch metadata to one or more host processing units at a touch reporting rate.

Example GC1 comprises the apparatus of Example GC0, wherein the one or more lid input sensors comprise a camera.

Example GC2 comprises the apparatus of Example GC0, wherein the one or more lid input sensors further comprise one or more of a lidar sensor, a radar sensor, and an ultrasound sensor.

Example GC3 comprises the apparatus of Example GC0, the circuitry further to increase the touch reporting rate in response to determining that the user is present.

Example GC4 comprises the apparatus of Example GC0, the circuitry further to causing an increase in a display refresh rate of the touch display in response to determining that the user is present.

Example GC5 comprises the apparatus of Example GC0, wherein the touch reporting rate is the same as the touch sampling rate.

Example GC6 comprises the apparatus of Example GC0, the circuitry further to, in response to determining that the user is present, cause a display refresh rate of the touch display to be increased, wherein the touch sampling rate, the display refresh rate, and the touch sampling rate are the same.

Example GC7 comprises the apparatus of Example GC0, wherein at least two of the touch sampling rate, the touch reporting rate, and a display refresh rate of the touch display are different.

Example GC8 comprises the apparatus of Example GC0, wherein the touch sampling rate, the touch reporting rate, and a display refresh of the touch display are all different from each other.

Example GC9 comprises the apparatus of Example GC0, the circuitry further to: receive additional lid input sensor data from the one or more lid input sensors; determine that the user is not present based on the additional lid input sensor data; and in response to determining that the user is not present, cause the touch sampling rate of the touch display controller to decrease.

Example GC10 comprises the apparatus of Example GC9, the circuitry further to reduce the touch reporting rate in response to determining that the user is not present. The apparatus of claim 58, the circuitry further to cause a display refresh rate of the touch display to reduce in response to the determining that the user is not present.

Example GC11 comprises the apparatus of Example GC0, the circuitry further to: receive additional lid input sensor data from the one or more lid input sensors; determine that the user is not engaged with the touch display based on the additional lid input sensor data; and in response to determining that the user is not engaged with the touch display, cause the touch sampling rate to decrease and/or decreasing the touch reporting rate.

Example GC12 comprises the apparatus of Example GC11, where the touch sampling rate is caused to be reduced to zero and the touch reporting rate is reduced to zero.

Example GC13 comprises the apparatus of Example GC11, the circuitry further to: receive additional lid input sensor data from the one or more lid input sensors; determine engagement of the user with the touch display based on the additional lid input sensor data; determine whether the user is interacting with a mobile computing device based on one or more of the touch sensor data and the lid input sensor data; and if the user is engaged with the touch display and the user is interacting with the mobile computing device, set the touch sampling rate to a maximum touch sampling rate of the touch display controller.

Example GC14 comprises the apparatus of Example GC11, the circuitry further to conditioning the touch sensor data to generate conditioned touch sensor data, wherein the touch metadata comprises the conditioned touch sensor data.

Example GC15 comprises the apparatus of Example GC11, wherein to determine engagement of the user with the touch display comprises: to determine a face orientation of the user; and to determine whether the user is looking at the touch display based on the face orientation.

Example GC16 comprises the apparatus of Example GC0, the circuitry further to: receive additional lid input sensor data from the one or more lid input sensors; determine engagement of the user with the touch display based on the additional lid input sensor data; determine how recently the user has interacted with a mobile computing device based on one or more of the touch sensor data and the additional lid input sensor data; and if the user is engaged with the touch display: set the touch sampling rate to a first touch sampling rate if the user has interacted with the mobile computing device since a prior interaction within a first time period that is shorter than a second time period; and if the user has not interacted with the mobile computing device within the first time period, set the touch sampling rate to a second touch sampling rate if the user has interacted with the mobile computing device within the second time period, the first touch sampling rate greater than the second touch sampling rate.

Example GC17 comprises the apparatus of Example GC0, the circuitry further to: receive additional lid input sensor data from the one or more lid input sensors; determine engagement of the user with the touch display based on the additional lid input sensor data; determine how recently the user has interacted with a mobile computing device based on one or more of the touch sensor data and the additional lid input sensor data; and if the user is engaged with the touch display: set the touch sampling rate to a first touch sampling rate if the user has interacted with the mobile computing device since a prior interaction within a first time period, the first time period shorter than a second time period, the second time period shorter than a third time period; and set the touch sampling rate to a second touch sampling rate if the user has interacted with the mobile computing device since the prior interaction within the second time period if the user has not interacted with the mobile computing device within the first time period; and set the touch sampling rate to a third touch sampling rate if the user has interacted with the mobile computing device since the prior interaction within the third time period if the user has not interacted with the mobile computing device within the second time period, the first touch sampling rate greater than the second touch sampling rate, the second touch sampling rate greater than the third touch sampling rate.

Example GC18 comprises the apparatus of any of one Examples GC13-GC17, the circuitry further to receive base input device sensor data associated with one or more base input devices, to determine how recently the user has interacted with the mobile computing device being further based on the base input device sensor data.

Example GC18 comprises the apparatus of Example GC18, wherein the one or more base input devices comprises one or more of a keyboard, trackpad, touchpad, and a mouse.

Example GD1 is one or more non-transitory computer-readable storage media storing instructions that when executed cause one or more processing units of a lid of a computing device to perform the method of any one of Examples GA1-GA24.

Example GE1 is an apparatus comprising one or more means to perform the method of any one of the claims GA1-GA24.

Figure 54:
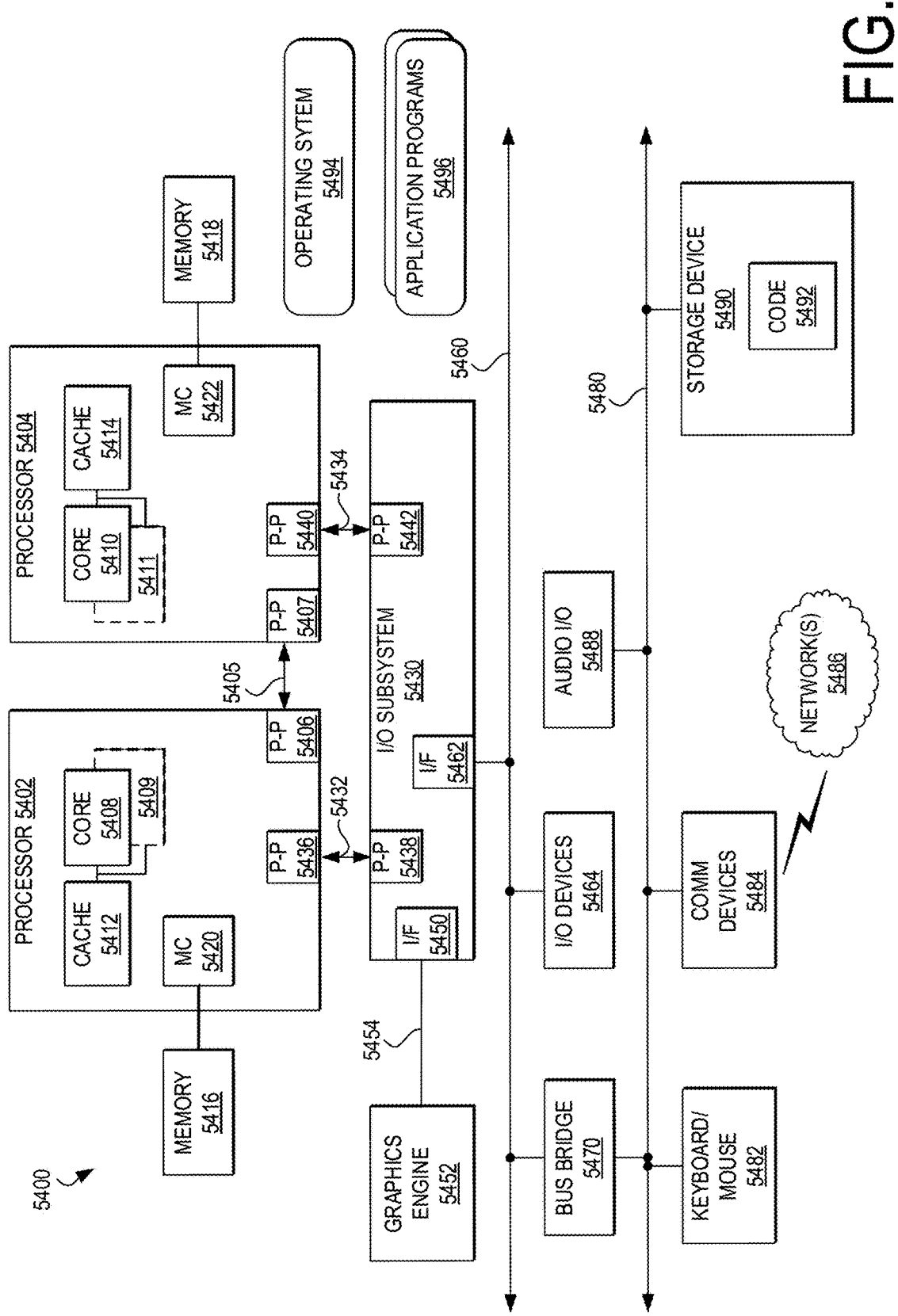
FIG. 54 is a block diagram of computing device components in a base of an example mobile computing device comprising a lid controller hub.

FIG. 54 is a block diagram of computing device components in a base of an example mobile computing device comprising a lid controller hub. Generally, components shown in FIG. 54 can communicate with other shown components, including those in a lid controller hub, although not all connections are shown, for ease of illustration. The components 5400 comprise a multiprocessor system comprising a first processor 5402 and a second processor 5404 and is illustrated as comprising point-to-point (P-P) interconnects. For example, a point-to-point (P-P) interface 5406 of the processor 5402 is coupled to a point-to-point interface 5407 of the processor 5404 via a point-to-point interconnection 5405. It is to be understood that any or all of the point-to-point interconnects illustrated in FIG. 54 can be alternatively implemented as a multi-drop bus, and that any or all buses illustrated in FIG. 54 could be replaced by point-to-point interconnects.

As shown in FIG. 54, the processors 5402 and 5404 are multicore processors. Processor 5402 comprises processor cores 5408 and 5409, and processor 5404 comprises processor cores 5410 and 5411. Processor cores 5408-5411 can execute computer-executable instructions in a manner similar to that discussed below in connection with FIG. 70, or in other manners.

Processors 5402 and 5404 further comprise at least one shared cache memory 5412 and 5414, respectively. The shared caches 5412 and 5414 can store data (e.g., instructions) utilized by one or more components of the processor, such as the processor cores 5408-5409 and 5410-5411. The shared caches 5412 and 5414 can be part of a memory hierarchy for the device. For example, the shared cache 5412 can locally store data that is also stored in a memory 5416 to allow for faster access to the data by components of the processor 5402. In some embodiments, the shared caches 5412 and 5414 can comprise multiple cache layers, such as level 1 (L1), level 2 (L2), level 3 (L3), level 4 (L4), and/or other caches or cache layers, such as a last level cache (LLC).

Although two processors are shown, the device can comprise any number of processors or other compute resources, including those in a lid controller hub. Further, a processor can comprise any number of processor cores. A processor can take various forms such as a central processing unit, a controller, a graphics processor, an accelerator (such as a graphics accelerator, digital signal processor (DSP), or AI accelerator)). A processor in a device can be the same as or different from other processors in the device. In some embodiments, the device can comprise one or more processors that are heterogeneous or asymmetric to a first processor, accelerator, FPGA, or any other processor. There can be a variety of differences between the processing elements in a system in terms of a spectrum of metrics of merit including architectural, microarchitectural, thermal, power consumption characteristics and the like. These differences can effectively manifest themselves as asymmetry and heterogeneity amongst the processors in a system. In some embodiments, the processors 5402 and 5404 reside in a multi-chip package. As used herein, the terms "processor unit" and "processing unit" can refer to any processor, processor core, component, module, engine, circuitry or any other processing element described herein. A processor unit or processing unit can be implemented in hardware, software, firmware, or any combination thereof capable of. A lid controller hub can comprise one or more processing units.

Processors 5402 and 5404 further comprise memory controller logic (MC) 5420 and 5422. As shown in FIG. 54, MCs 5420 and 5422 control memories 5416 and 5418 coupled to the processors 5402 and 5404, respectively. The memories 5416 and 5418 can comprise various types of memories, such as volatile memory (e.g., dynamic random-access memories (DRAM), static random-access memory (SRAM)) or non-volatile memory (e.g., flash memory, solid-state drives, chalcogenide-based phase-change non-volatile memories). While MCs 5420 and 5422 are illustrated as being integrated into the processors 5402 and 5404, in alternative embodiments, the MCs can be logic external to a processor, and can comprise one or more layers of a memory hierarchy.

Processors 5402 and 5404 are coupled to an Input/Output (I/O) subsystem 5430 via P-P interconnections 5432 and 5434. The point-to-point interconnection 5432 connects a point-to-point interface 5436 of the processor 5402 with a point-to-point interface 5438 of the I/O subsystem 5430, and the point-to-point interconnection 5434 connects a point-to-point interface 5440 of the processor 5404 with a point-to-point interface 5442 of the I/O subsystem 5430. Input/Output subsystem 5430 further includes an interface 5450 to couple I/O subsystem 5430 to a graphics module 5452, which can be a high-performance graphics module. The I/O subsystem 5430 and the graphics module 5452 are coupled via a bus 5454. Alternately, the bus 5454 could be a point-to-point interconnection.

Input/Output subsystem 5430 is further coupled to a first bus 5460 via an interface 5462. The first bus 5460 can be a Peripheral Component Interconnect (PCI) bus, a PCI Express bus, another third generation I/O interconnection bus or any other type of bus.

Various I/O devices 5464 can be coupled to the first bus 5460. A bus bridge 5470 can couple the first bus 5460 to a second bus 5480. In some embodiments, the second bus 5480 can be a low pin count (LPC) bus. Various devices can be coupled to the second bus 5480 including, for example, a keyboard/mouse 5482, audio I/O devices 5488 and a storage device 5490, such as a hard disk drive, solid-state drive or other storage device for storing computer-executable instructions (code) 5492. The code 5492 can comprise computer-executable instructions for performing technologies described herein. Additional components that can be coupled to the second bus 5480 include communication device(s) or unit(s) 5484, which can provide for communication between the device and one or more wired or wireless networks 5486 (e.g. Wi-Fi, cellular or satellite networks) via one or more wired or wireless communication links (e.g., wire, cable, Ethernet connection, radio-frequency (RF) channel, infrared channel, Wi-Fi channel) using one or more communication standards (e.g., IEEE 5402.11 standard and its supplements).

The device can comprise removable memory such as flash memory cards (e.g., SD (Secure Digital) cards), memory sticks, Subscriber Identity Module (SIM) cards). The memory in the computing device (including caches 5412 and 5414, memories 5416 and 5418 and storage device 5490, and memories in the lid controller hub) can store data and/or computer-executable instructions for executing an operating system 5494, or application programs 5496. Example data includes web pages, text messages, images, sound files, video data, sensor data or any other data received from a lid controller hub, or other data sets to be sent to and/or received from one or more network servers or other devices by the device via one or more wired or wireless networks, or for use by the device. The device can also have access to external memory (not shown) such as external hard drives or cloud-based storage.

The operating system 5494 can control the allocation and usage of the components illustrated in FIG. 54 and support one or more application programs 5496. The application programs 5496 can include common mobile computing device applications (e.g., email applications, calendars, contact managers, web browsers, messaging applications) as well as other computing applications.

The device can support various input devices, such as a touchscreen, microphones, cameras (monoscopic or stereoscopic), trackball, touchpad, trackpad, mouse, keyboard, proximity sensor, light sensor, pressure sensor, infrared sensor, electrocardiogram (ECG) sensor, PPG (photoplethysmogram) sensor, galvanic skin response sensor, and one or more output devices, such as one or more speakers or displays. Any of the input or output devices can be internal to, external to or removably attachable with the device. External input and output devices can communicate with the device via wired or wireless connections.

In addition, the computing device can provide one or more natural user interfaces (NUIs). For example, the operating system 5494, applications 5496, or a lid controller hub can comprise speech recognition as part of a voice user interface that allows a user to operate the device via voice commands. Further, the device can comprise input devices and components that allows a user to interact with the device via body, hand, or face gestures.

The device can further comprise one or more communication components 5484. The components 5484 can comprise wireless communication components coupled to one or more antennas to support communication between the device and external devices. Antennas can be located in a base, lid, or other portion of the device. The wireless communication components can support various wireless communication protocols and technologies such as Near Field Communication (NFC), IEEE 1002.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM). In addition, the wireless modems can support communication with one or more cellular networks for data and voice communications within a single cellular network, between cellular networks, or between the mobile computing device and a public switched telephone network (PSTN).

The device can further include at least one input/output port (which can be, for example, a USB, IEEE 1394 (FireWire), Ethernet and/or RS-232 port) comprising physical connectors; a power supply (such as a rechargeable battery); a satellite navigation system receiver, such as a GPS receiver; a gyroscope; an accelerometer; and a compass. A GPS receiver can be coupled to a GPS antenna. The device can further include one or more additional antennas coupled to one or more additional receivers, transmitters and/or transceivers to enable additional functions.

FIG. 54 illustrates one example computing device architecture. Computing devices based on alternative architectures can be used to implement technologies described herein. For example, instead of the processors 5402 and 5404, and the graphics module 5452 being located on discrete integrated circuits, a computing device can comprise a SoC (system-on-a-chip) integrated circuit incorporating one or more of the components illustrated in FIG. 54. In one example, an SoC can comprise multiple processor cores, cache memory, a display driver, a GPU, multiple I/O controllers, an AI accelerator, an image processing unit driver, I/O controllers, an AI accelerator, an image processor unit. Further, a computing device can connect elements via bus or point-to-point configurations different from that shown in FIG. 54. Moreover, the illustrated components in FIG. 54 are not required or all-inclusive, as shown components can be removed and other components added in alternative embodiments.

Figure 55:
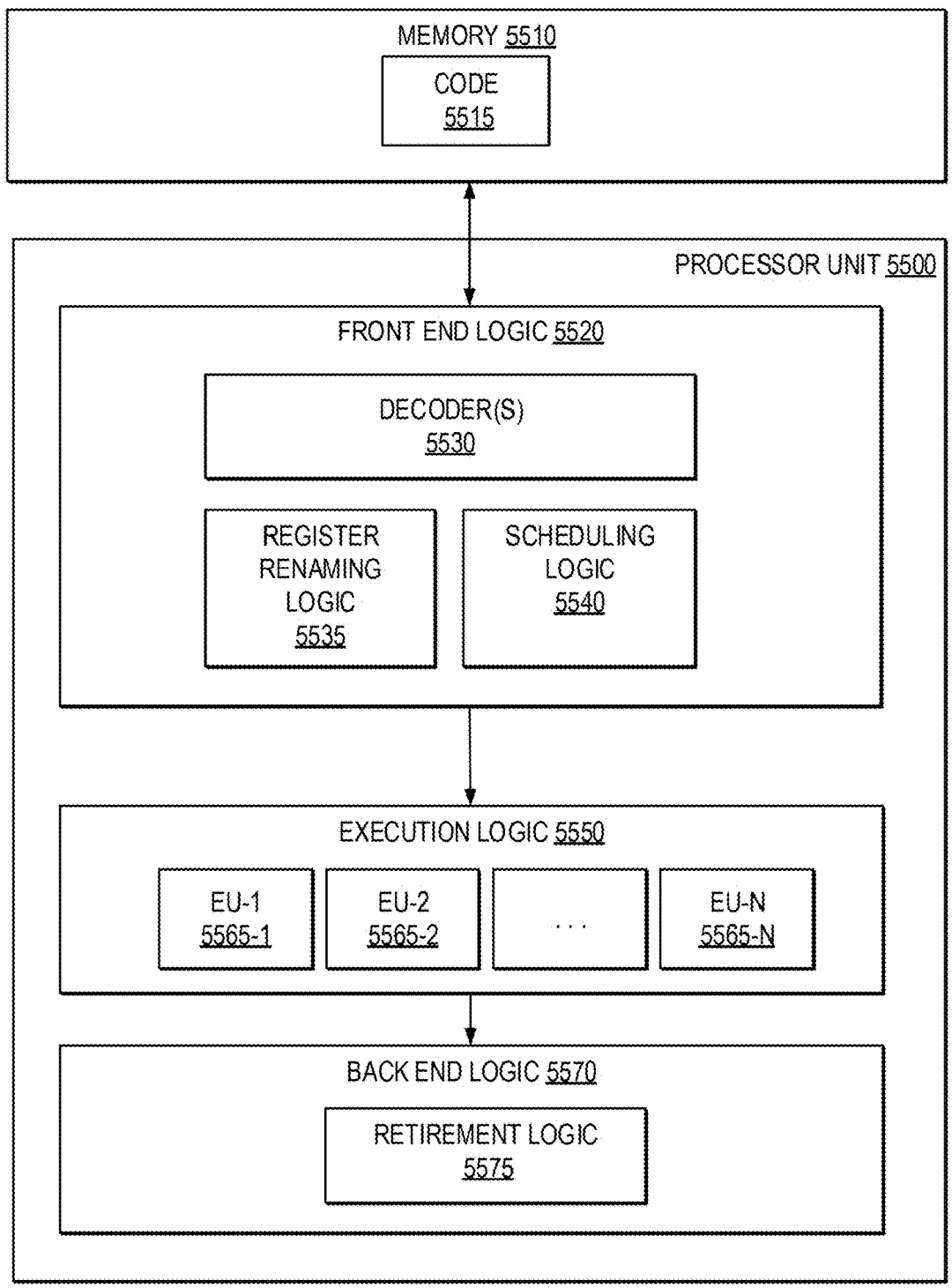
FIG. 55 is a block diagram of an exemplary processing unit that can execute instructions as part of implementing technologies described herein.

FIG. 55 is a block diagram of an example processing unit 5500 to execute computer-executable instructions as part of implementing a lid controller hub. The processing unit 5500 can be any type of processor or processor core, such as a microprocessor, an embedded processor, a digital signal processor (DSP), network processor, or accelerator. The processing unit 5500 can be a single-threaded core or a multithreaded core in that it may include more than one hardware thread context (or "logical processor") per core.

FIG. 55 also illustrates a memory 5510 coupled to the processor 5500. The memory 5510 can be any memory described herein or any other memory known to those of skill in the art. The memory 5510 can store computer-executable instructions 5515 (code) executable by the processing unit 5500.

The processor core comprises front-end logic 5520 that receives instructions from the memory 5510. An instruction can be processed by one or more decoders 5530. The decoder 5530 can generate as its output a micro operation such as a fixed width micro operation in a predefined format, or generate other instructions, microinstructions, or control signals, which reflect the original code instruction. The front-end logic 5520 further comprises register renaming logic 5535 and scheduling logic 5540, which generally allocate resources and queues operations corresponding to converting an instruction for execution.

The processing unit 5500 further comprises execution logic 5550, which comprises one or more execution units (EUs) 5565-1 through 5565-N. Some processor core embodiments can include a number of execution units dedicated to specific functions or sets of functions. Other embodiments can include only one execution unit or one execution unit that can perform a particular function. The execution logic 5550 performs the operations specified by code instructions. After completion of execution of the operations specified by the code instructions, back end logic 5570 retires instructions using retirement logic 5575. In some embodiments, the processing unit 5500 allows out of order execution but requires in-order retirement of instructions. Retirement logic 5575 can take a variety of forms as known to those of skill in the art (e.g., re-order buffers or the like).

The processing unit 5500 is transformed during execution of instructions, at least in terms of the output generated by the decoder 5530, hardware registers and tables utilized by the register renaming logic 5535, and any registers (not shown) modified by the execution logic 5550. Although not illustrated in FIG. 55, a processor can include other elements on an integrated chip with the processing unit 5500. For example, a processor may include additional elements such as memory control logic, one or more graphics modules, I/O control logic and/or one or more caches.

As used in any embodiment herein, the term "module" refers to logic that may be implemented in a hardware component or device, software or firmware running on a processor, or a combination thereof, to perform one or more operations consistent with the present disclosure. Software may be embodied as a software package, code, instructions, instruction sets and/or data recorded on non-transitory computer-readable storage mediums. Firmware may be embodied as code, instructions or instruction sets and/or data that are hard-coded (e.g., nonvolatile) in memory devices. As used in any embodiment herein, the term "circuitry" can comprise, for example, singly or in any combination, hard-wired circuitry, programmable circuitry such as computer processors comprising one or more individual instruction processing cores, state machine circuitry, and/or firmware that stores instructions executed by programmable circuitry. Modules described herein may, collectively or individually, be embodied as circuitry that forms a part of one or more devices. Thus, any of the modules can be implemented as circuitry, such as continuous itemset generation circuitry, entropy-based discretization circuitry, etc. A computer device referred to as being programmed to perform a method can be programmed to perform the method via software, hardware, firmware or combinations thereof.

In some embodiments, a lid controller hub is a packaged integrated circuit comprising components (modules, ports, controllers, driver, timings, blocks, accelerators, processors, etc.) described herein as being a part of the lid controller hub. Lid controller hub components can be implemented as dedicated circuitry, programmable circuitry that operates firmware or software, or a combination thereof. Thus, modules can be alternately referred to as "circuitry" (e.g., "image preprocessing circuitry"). Modules can also be alternately referred to as "engines" (e.g., "security engine", "host engine", "vision/imaging engine," "audio engine") and an "engine" can be implemented as a combination of hardware, software, firmware or a combination thereof. Further, lid controller hub modules (e.g., audio module, vision/imaging module) can be combined with other modules and individual modules can be split into separate modules.

The use of reference numbers in the claims and the specification is meant as in aid in understanding the claims and the specification and is not meant to be limiting.

Any of the disclosed methods can be implemented as computer-executable instructions or a computer program product. Such instructions can cause a computer or one or more processors capable of executing computer-executable instructions to perform any of the disclosed methods. Generally, as used herein, the term "computer" refers to any computing device or system described or mentioned herein, or any other computing device. Thus, the term "computer-executable instruction" refers to instructions that can be executed by any computing device described or mentioned herein, or any other computing device.

The computer-executable instructions or computer program products as well as any data created and used during implementation of the disclosed technologies can be stored on one or more tangible or non-transitory computer-readable storage media, such as optical media discs (e.g., DVDs, CDs), volatile memory components (e.g., DRAM, SRAM), or non-volatile memory components (e.g., flash memory, solid state drives, chalcogenide-based phase-change non-volatile memories). Computer-readable storage media can be contained in computer-readable storage devices such as solid-state drives, USB flash drives, and memory modules. Alternatively, the computer-executable instructions may be performed by specific hardware components that contain hardwired logic for performing all or a portion of disclosed methods, or by any combination of computer-readable storage media and hardware components.

The computer-executable instructions can be part of, for example, a dedicated software application or a software application that is accessed via a web browser or other software application (such as a remote computing application). Such software can be read and executed by, for example, a single computing device or in a network environment using one or more networked computers. Further, it is to be understood that the disclosed technology is not limited to any specific computer language or program. For instance, the disclosed technologies can be implemented by software written in C++, Java, Perl, Python, JavaScript, Adobe Flash, or any other suitable programming language. Likewise, the disclosed technologies are not limited to any particular computer or type of hardware.

Furthermore, any of the software-based embodiments (comprising, for example, computer-executable instructions for causing a computer to perform any of the disclosed methods) can be uploaded, downloaded or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the claims, a list of items joined by the term "and/or" can mean any combination of the listed items. For example, the phrase "A, B and/or C" can mean A; B; C; A and B; A and C; B and C; or A, B, and C. Further, as used in this application and in the claims, a list of items joined by the term "at least one of" can mean any combination of the listed terms. For example, the phrase "at least one of A, B, or C" can mean A; B; C; A and B; A and C; B and C; or A, B, and C. Moreover, as used in this application and in the claims, a list of items joined by the term "one or more of" can mean any combination of the listed terms. For example, the phrase "one or more of A, B and C" can mean A; B; C; A and B; A and C; B and C; or A, B, and C. Furthermore, as used in this application and in the claims, the phrase "at least two" can mean any two of the listed term. For example, the phrase "at least two of A, B, or C" can be A and B; A and C; or A and C. Further, as used in this application and in the claims, the phrase "all different from each other" means that each of listed items is different from each other. For example, "A, B, C are all different from each other" can mean that A, B, and C each have different values (e.g., A is 20 Hz, B is 60 Hz, and C is 120 Hz).

Furthermore, the words "optimize," "optimization," "optimizing," and related terms are terms of art that refer to relative improvements in power consumption, latency or other performance or behavioral traits of a system, component, or process and do not indicate that a system, component, or process has been perfectly improved upon such that an "optimal" state of power consumption, latency, or a performance or behavior trait has been achieved.

The disclosed methods, apparatuses and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The invention claimed is:

1. A method comprising:
  receiving, at one or more processing units located in a lid of a mobile computing device, touch sensor data from a touch display controller; and
  in response to receiving a display refresh notification at the one or more processing units located in the lid:
    generating, at the one or more processing units located in the lid, conditioned touch sensor data based on the touch sensor data; and
    sending, from the one or more processing units located in the lid, the conditioned touch sensor data to an operating system;

wherein the operating system is executing on one or more processing units located in a base of the mobile computing device.

2. The method of claim 1, wherein the touch sensor data comprises touch location data, the generating the conditioned touch sensor data comprises generating conditioned touch location data based on the touch location data, the conditioned touch sensor data comprising the conditioned touch location data.

3. The method of claim 1, wherein the touch sensor data comprises touch intensity data, the generating the conditioned touch sensor data comprises generating conditioned touch intensity data based on the touch intensity data, the conditioned touch sensor data comprising the conditioned touch intensity data.

4. The method of claim 1, wherein the generating the conditioned touch sensor data comprises smoothing the touch sensor data.

5. The method of claim 1, further comprising:
receiving, at the one or more processing units located in the lid, prior touch sensor data; and
receiving, at the one or more processing units located in the lid, a prior display refresh notification prior to the display refresh notification, the prior touch sensor data received prior to the receiving of the prior display refresh notification, wherein the generating the conditioned touch sensor data comprises averaging the touch sensor data with the prior touch sensor data.

6. The method of claim 1, further comprising notifying, by the one or more processing units located in the lid, a display subsystem to change a refresh rate of a display.

7. The method of claim 1, further comprising:
generating, by the operating system or an application executing on the mobile computing device, frame information based on the conditioned touch sensor data;
generating a new frame based on the frame information; and
refreshing a display to display the new frame.

8. One or more processing units to:
receive touch sensor data from a touch display controller;
receive a display refresh notification; and
in response to receiving the display refresh notification:
generate conditioned touch sensor data based on the touch sensor data; and
send the conditioned touch sensor data to a host processing unit;
wherein the one or more processing units are for use in a lid of a mobile computing device.

9. The one or more processing units of claim 8, wherein the touch sensor data comprises touch location data, to generate the conditioned touch sensor data comprises to generate conditioned touch location data based on the touch location data, the conditioned touch sensor data comprising the conditioned touch location data.

10. The one or more processing units of claim 8, wherein the touch sensor data comprises touch intensity data, to generate the conditioned touch sensor data comprising to generate conditioned touch intensity data based on the touch intensity data, the conditioned touch sensor data comprising the conditioned touch intensity data.

11. The one or more processing units of claim 8, wherein to generate the conditioned touch sensor data comprises to average the touch sensor data with touch sensor data received prior to previous display refreshes.

12. The one or more processing units of claim 8, the one or more processing units to further notify a display subsystem to increase a refresh rate of a display.

13. The one or more processing units of claim 8, the one or more processing units to further notify a display subsystem to increase a refresh rate of a display to a maximum refresh rate.

14. The one or more processing units of claim 13, the one or more processing units to further notify the display subsystem in response to receiving the touch sensor data.

15. A mobile computing device comprising:
a base comprising one or more host processing units to execute an operating system; and
a lid rotatably coupled to the base, the lid comprising:
a touch display;
a touch display controller;
a display subsystem to refresh the touch display; and
one or more processing units located in the lid, the one or more processing units located in the lid to:
receive touch sensor data from the touch display controller;
receive a display refresh notification from the display subsystem; and
in response to receiving the display refresh notification:
generate conditioned touch sensor data based on the touch sensor data; and
send the conditioned touch sensor data to the operating system.

16. The mobile computing device of claim 15, wherein the touch sensor data comprises touch location data, to generate the conditioned touch sensor data comprises to generate conditioned touch location data based on the touch location data, the conditioned touch sensor data comprising the conditioned touch location data.

17. The mobile computing device of claim 15, wherein the touch sensor data comprises touch intensity data, to generate the conditioned touch sensor data comprises to generate conditioned touch intensity data based on the touch intensity data, the conditioned touch sensor data comprising the conditioned touch intensity data.

18. The mobile computing device of claim 15, the one or more processing units located in the lid further to:
receive prior touch sensor data; and
receive a prior display refresh notification prior to the display refresh notification, the prior touch sensor data received prior to the receiving of the prior display refresh notification, wherein to generate the conditioned touch sensor data comprises to average the touch sensor data with the prior touch sensor data.

19. The mobile computing device of claim 15, the one or more processing units located in the lid to further notify the display subsystem to change a refresh rate of a display.

20. The mobile computing device of claim 15, the one or more processing units located in the lid to further notify the display subsystem in response to receiving the touch sensor data.

21. The mobile computing device of claim 15, wherein the display subsystem comprises a timing controller.

22. The mobile computing device of claim 15, the host processing units to execute an application, the operating system to provide the conditioned touch sensor data to the application.

23. The mobile computing device of claim 15, the operating system to generate frame information based on the conditioned touch sensor data; the operating system to generate a new frame based on the frame information, the display subsystem further to:
   receive video data from the base; and
   cause the touch display to be refreshed with the new frame.

\* \* \* \* \*